(12) United States Patent
Park et al.

(10) Patent No.: US 11,175,560 B2
(45) Date of Patent: Nov. 16, 2021

(54) ELECTROCHROMIC ELEMENT AND ELECTROCHROMIC DEVICE INCLUDING THE SAME

(71) Applicant: LeapHigh Inc., Hwaseong-si (KR)

(72) Inventors: Sang Hyun Park, Asan-si (KR); Byoung Dong Kim, Yongin-si (KR); Hyun Jong Kim, Hwaseong-si (KR); Cheol Hwan Kim, Miryang-si (KR); Sang Woo Yoo, Asan-si (KR); Yun Chui Choi, Hwaseong-si (KR); Sung Joong Kim, Hwaseong-si (KR); Kwang Jin Jeon, Asan-si (KR); Hyeon Jun Kong, Asan-si (KR); Jin Ah Sohn, Hwaseong-si (KR)

(73) Assignee: LeapHigh Inc., Gyeonggi-Do (KR)

( * ) Notice: Subject to any disclaimer, the term of this patent is extended or adjusted under 35 U.S.C. 154(b) by 256 days.

(21) Appl. No.: 16/557,478

(22) Filed: Aug. 30, 2019

(65) Prior Publication Data

US 2019/0384134 A1    Dec. 19, 2019

Related U.S. Application Data

(63) Continuation of application No. PCT/KR2018/002602, filed on Mar. 5, 2018, which is
(Continued)

(30) Foreign Application Priority Data

Apr. 26, 2017  (KR) .................... 10-2017-0053818
Apr. 26, 2017  (KR) .................... 10-2017-0053819
(Continued)

(51) Int. Cl.
*G02F 1/163*    (2006.01)
*B60R 1/08*     (2006.01)
(Continued)

(52) U.S. Cl.
CPC ............. *G02F 1/163* (2013.01); *B60R 1/088* (2013.01); *E06B 3/6722* (2013.01); *G02F 1/155* (2013.01); *G02F 1/1508* (2013.01); *G02F 1/1523* (2013.01)

(58) Field of Classification Search
CPC ...... G02F 1/163; G02F 1/1508; G02F 1/1523; G02F 1/155; G02F 1/1524; G02F 1/1514;
(Continued)

(56) References Cited

U.S. PATENT DOCUMENTS 5,142,406 A    8/1992  Lampert et al.
6,768,574 B2 * 7/2004  Bertran Serra ....... G02F 1/1524
                                                    359/265
(Continued)

FOREIGN PATENT DOCUMENTS

JP    H03-56943     3/1991
JP    10-030181     3/1998
(Continued)

OTHER PUBLICATIONS

Korean Office Action received in Application No. 10-2017-0053819, dated May 20, 2018.
(Continued)

*Primary Examiner* — Tuyen Tra
(74) *Attorney, Agent, or Firm* — Knobbe, Martens, Olson & Bear, LLP

(57) ABSTRACT

In the electrochromic device according to an embodiment of the present application, when the first voltage is applied to the electrochromic device in a state that the electrochromic element has the first state, the electrochromic device becomes the second state, and when the first voltage is applied to the electrochromic element in a state that the electrochromic element has the fourth state, the electrochromic element becomes the third state.

12 Claims, 96 Drawing Sheets

Related U.S. Application Data a continuation of application No. 15/844,429, filed on Dec. 15, 2017, now Pat. No. 10,739,662.

(60) Provisional application No. 62/466,991, filed on Mar. 3, 2017.

(30) Foreign Application Priority Data

| Apr. 26, 2017 | (KR) | ......................... 10-2017-0053820 |
| Apr. 26, 2017 | (KR) | ......................... 10-2017-0053821 |
| Jul. 21, 2017 | (KR) | ......................... 10-2017-0092368 |

(51) Int. Cl.
  *E06B 3/67*      (2006.01)
  *G02F 1/155*     (2006.01)
  *G02F 1/15*      (2019.01)
  *G02F 1/1523*    (2019.01)

(58) Field of Classification Search
  CPC ..................... G02F 2001/1502; B60R 1/088; E06B 3/6722
  See application file for complete search history.

(56) References Cited

U.S. PATENT DOCUMENTS

| 8,018,644 | B2* | 9/2011 | Gustavsson | ............. G02F 1/163 |
| | | | | 359/296 |
| 9,091,868 | B2* | 7/2015 | Bergh | ................... G02F 1/1524 |
| 2002/0154382 | A1 | 10/2002 | Morrison et al. | |
| 2006/0018000 | A1 | 1/2006 | Greer | |
| 2006/0125758 | A1 | 6/2006 | Yamamura et al. | |
| 2009/0262411 | A1 | 10/2009 | Karmhag et al. | |
| 2010/0172010 | A1 | 7/2010 | Gustavsson et al. | |
| 2010/0245973 | A1 | 9/2010 | Wang et al. | |
| 2011/0043885 | A1 | 2/2011 | Lamine et al. | |
| 2011/0157149 | A1 | 6/2011 | Lee et al. | |
| 2012/0239209 | A1 | 9/2012 | Brown et al. | |
| 2013/0057939 | A1 | 3/2013 | Yeh et al. | |
| 2015/0185580 | A1 | 7/2015 | Cho et al. | |
| 2016/0085128 | A1 | 3/2016 | Karmhag et al. | |

FOREIGN PATENT DOCUMENTS

| JP | 2006-053551 | | 2/2006 |
| JP | 2006-195141 | A | 7/2006 |
| JP | 2006-218362 | A | 8/2006 |
| JP | 2015-143826 | A | 8/2015 |
| JP | 2016-218359 | A | 12/2016 |
| JP | 2017-026750 | A | 2/2017 |
| KR | 10-0153510 | B1 | 7/1998 |
| KR | 10-1997-0065684 | | 4/2000 |
| KR | 10-2003-0073121 | A | 9/2003 |
| KR | 10-2005-0092607 | A | 9/2005 |
| KR | 10-2006-0101210 | A | 9/2005 |
| KR | 10-2006-0053111 | A | 5/2006 |
| KR | 2066-0060570 | A | 6/2006 |
| KR | 10-2008-0022319 | A | 3/2008 |
| KR | 10-2008-0051280 | A | 6/2008 |
| KR | 10-2009-0043531 | A | 5/2009 |
| KR | 10-2010-0017542 | | 2/2010 |
| KR | 10-2010-0048076 | A | 5/2010 |
| KR | 10-2012-0035834 | A | 4/2012 |
| KR | 10-2012-0040722 | A | 4/2012 |
| KR | 2012-0033302 | | 4/2012 |
| KR | 2013-0000382 | A | 1/2013 |
| KR | 10-2014-0125996 | A | 10/2014 |
| KR | 10-2015-0031917 | A | 3/2015 |
| KR | 10-2015-0085213 | A | 7/2015 |
| KR | 10-1535100 | B1 | 7/2015 |
| KR | 2015-0076780 | | 7/2015 |
| KR | 10-2015-0090460 | A | 8/2015 |
| KR | 10-2015-0122319 | A | 11/2015 |
| KR | 10-1630118 | B1 | 6/2016 |
| KR | 10-2016-0079174 | A | 7/2016 |
| KR | 10-2016-0130735 | A | 11/2016 |

OTHER PUBLICATIONS

Office Action received in Korean Patent Application No. 10-2017-0092368, dated Jul. 23, 2018.
Notice of Allowance received in Korean Patent Application No. 10-2017-0053821, dated Jul. 27, 2018.
International Search Report received in PCT Application No. PCT/KR2018/002602, dated Aug. 23, 2018.
Notice of Allowance dated Nov. 29, 2018 received in Korean Patent Application No. KR 10-2017-0053819.
Notice of Allowance dated Nov. 29, 2018 received in Korean Patent Application No. KR10-2017-0053820.
Office Action dated Feb. 20, 2019 received in Korean Patent Application No. KR10-2018-0026001.
Notice of Allowance from KR Patent Application No. 10-2018-0026001 dated Jun. 27, 2019.
Notice of Allowance received in KR Patent Application No. 10-2019-0023441, dated Nov. 27, 2019.
Notification of Reason for Refusal received in KR 10-2017-0053818, dated Oct. 19, 2017.
Notification of Reason for Refusal received in KR 10-2017-0053819, dated May 20, 2018.
Notification of Reason for Refusal received in KR 10-2017-0053820, dated May 20, 2018.
Notification of Reason for Refusal received in KR 10-2017-0092368, dated Jul. 23, 2018.
Written Opinion of PCT/KR2018/002602, dated Aug. 23, 2018.
Notification of Reason for Refusal received in Office Action of KR 10-2018-0026001, dated Feb. 20, 2019.
Notification of Reason for Refusal received in KR 10-2019-0023441, dated May 22, 2019.
Notification of Reason for Refusal received in KR 10-2019-0023442, dated May 22, 2019.
Notification of Reason for Refusal received in KR 10-2021-0019792, dated Feb. 18, 2021.
Notification of Reason for Refusal received in KR 10-2019-0117232, dated May 2, 2021.
Notice of Allowance of KR 10-2020-0024641, dated May 28, 2021.
Vasilyeva, Svetlana V., et al. "Material strategies for black-to-transmissive window-type polymer electrochromic devices." *ACS applied materials & interfaces* 3.4 (2011): 1022-1032.
Extended European Search Report dated Apr. 1, 2020 received in EP Patent Application No. 18761827.7.
Notice of Allowance dated Apr. 24, 2020 received in U.S. Appl. No. 15/844,429.
Final Office Action dated Jan. 15, 2020 received in U.S. Appl. No. 15/844,429.
Office Action dated Jul. 26, 2019, received in U.S. Appl. No. 15/844,429, filed Dec. 15, 2017.
Office Action dated Jul. 26, 2020 in Korean Appiication No. 10-2018-0116606, in 10 pages.
Office Action dated Jul. 26, 2020 In Korean Application No. 10-2020-0024641, in 7 pages.
Notice of Allowance dated Aug. 4, 2020 in Korean Application No. 10-2019-0128378, in 6 pages.
Notice of Reason for Refusal received in JP 2019-569651 dated Nov. 4, 2020.
Notice of Allowance received in KR 2018-0116606 dated Jan. 27, 2021.
Notice of Allowance received in KR 2020-0143348 dated Nov. 12, 2020.
Chinese First Office Action received in Application No. 201880015704.2 dated Jul. 14, 2021.
Korean Notification of Reason for Refusal received in Application No. 10-2021-0071425, dated Aug. 17, 2021.

* cited by examiner

10200

FIG. 43
22000
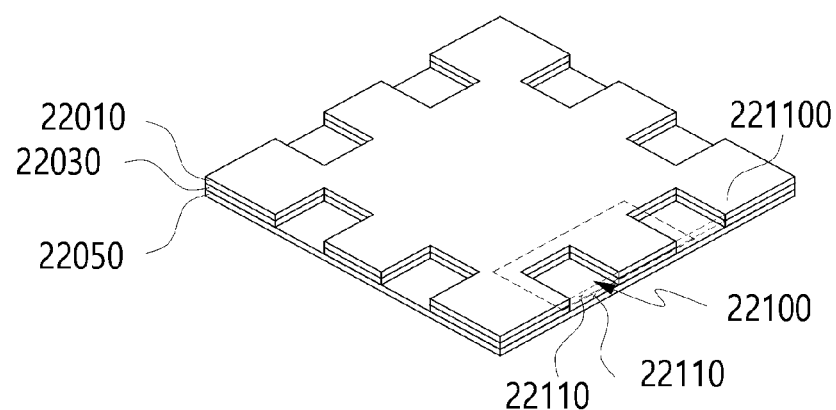
(a)
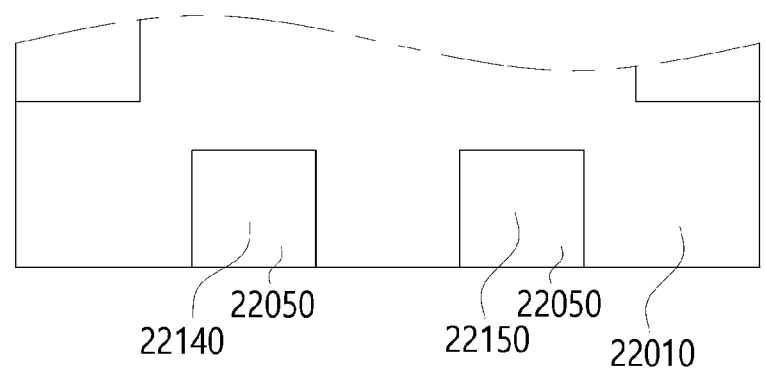
(b)

FIG. 46
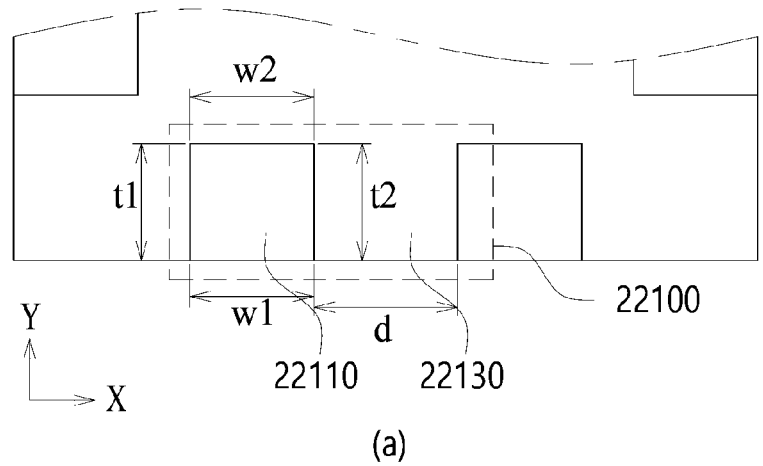
(a)
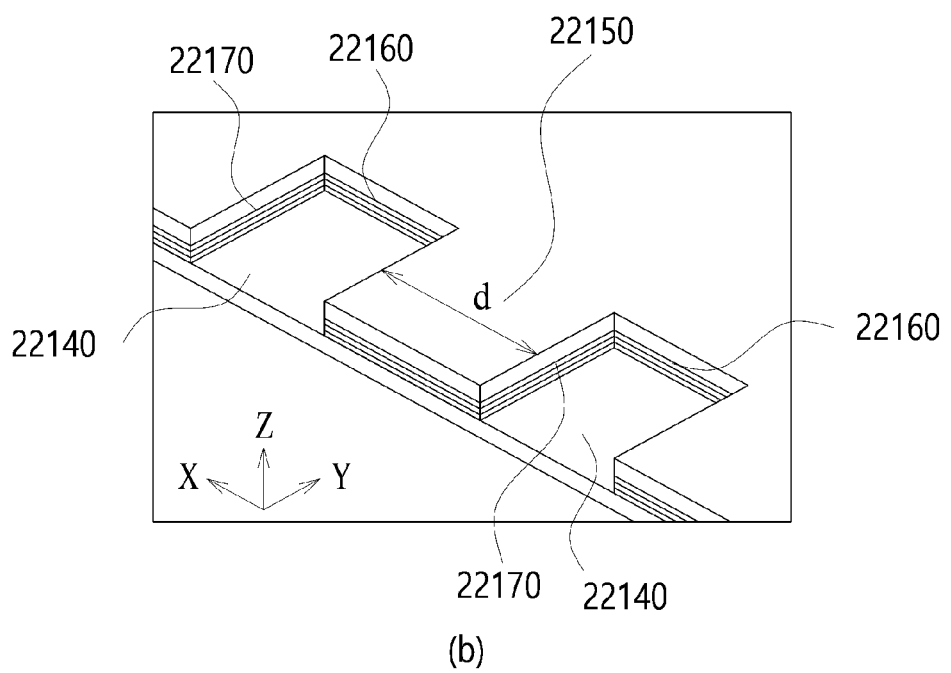
(b)

FIG. 48
21500
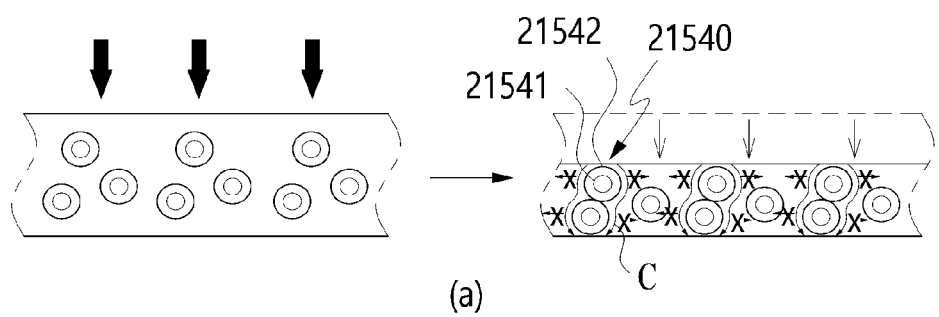
(a)
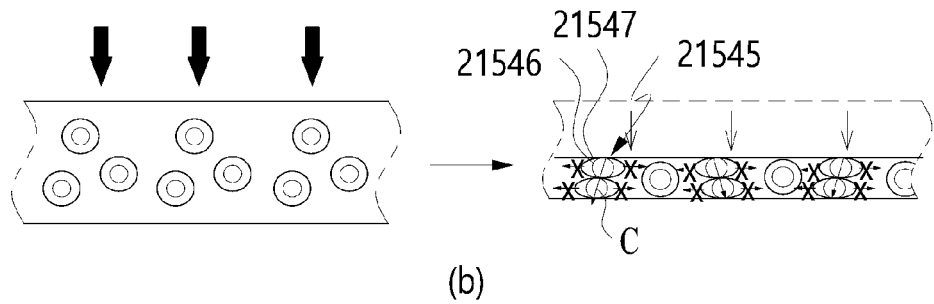
(b)

FIG. 49
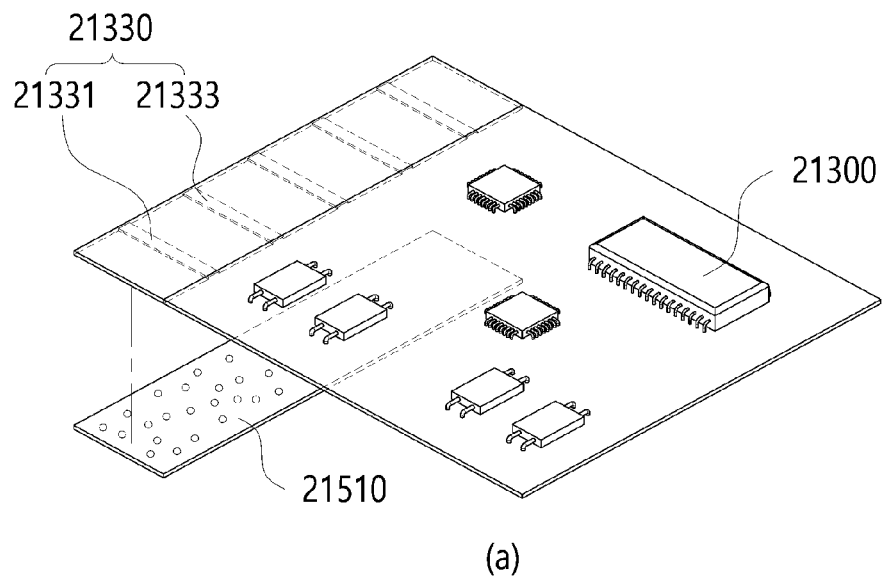
(a)
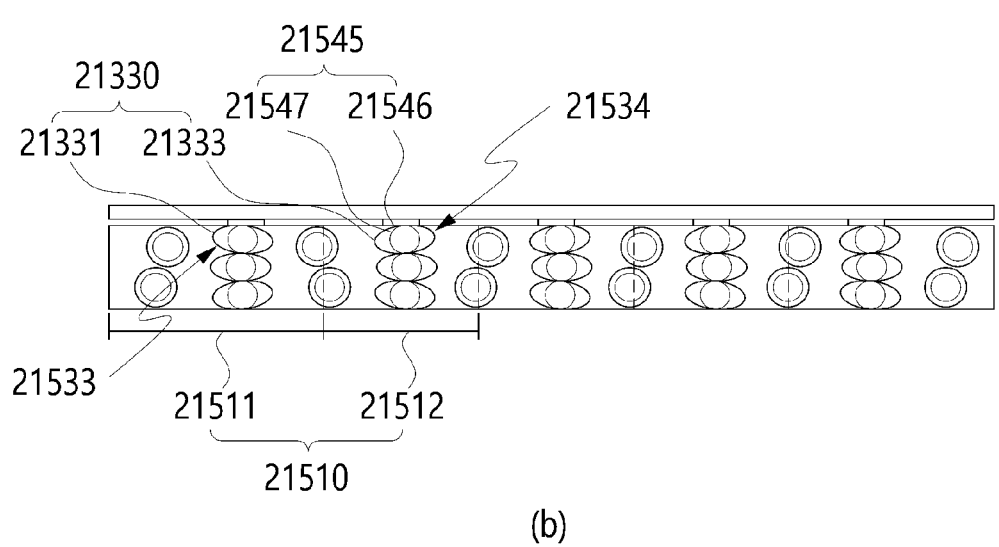
(b)

FIG. 50
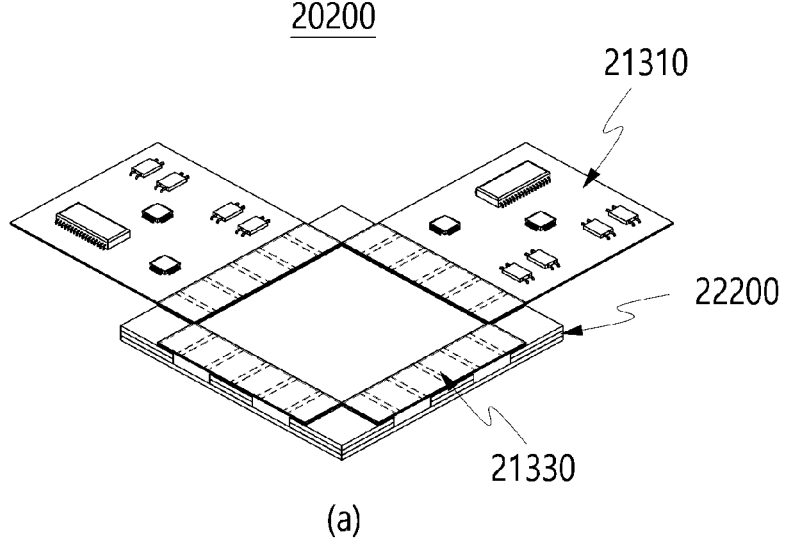
(a)
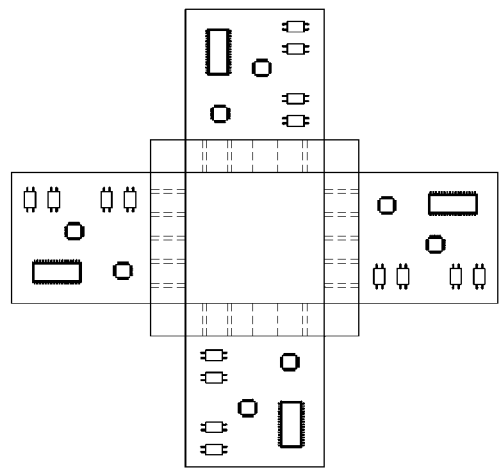
(b)

FIG. 54
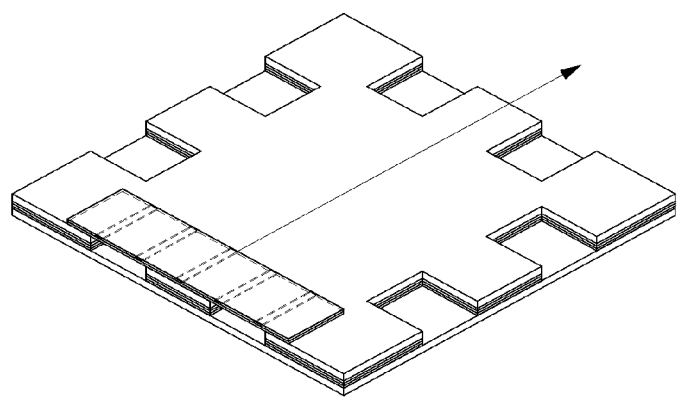
(a)
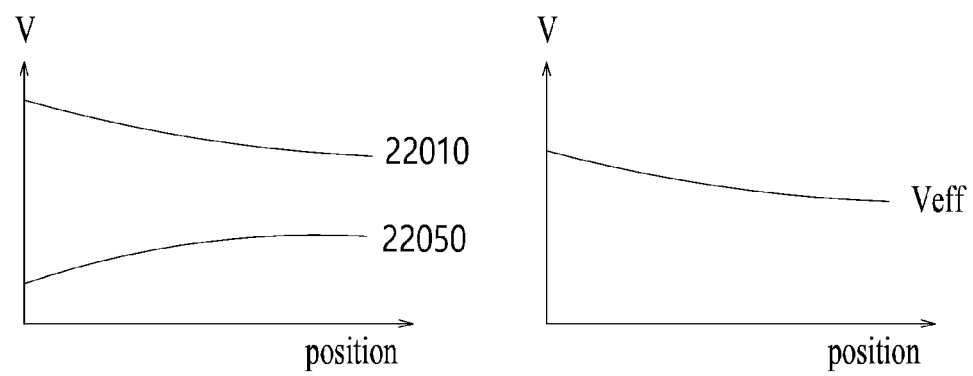
(b)

FIG. 55
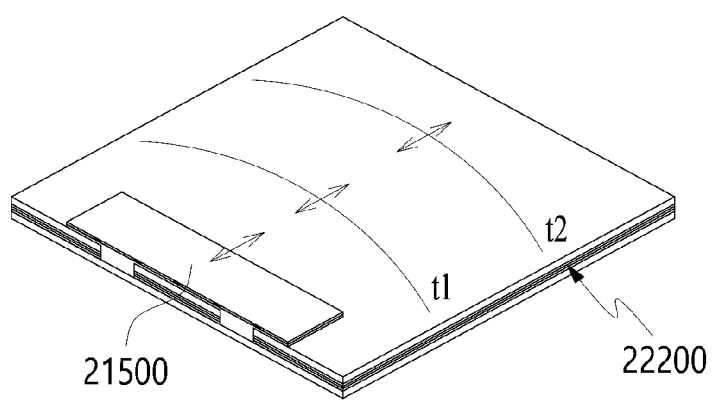
(a)
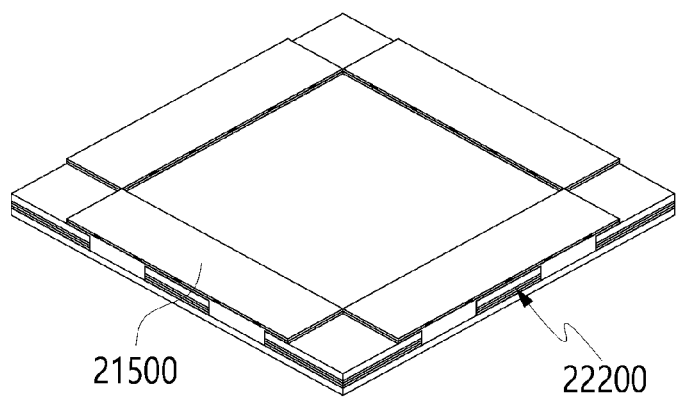
(b)

FIG. 61
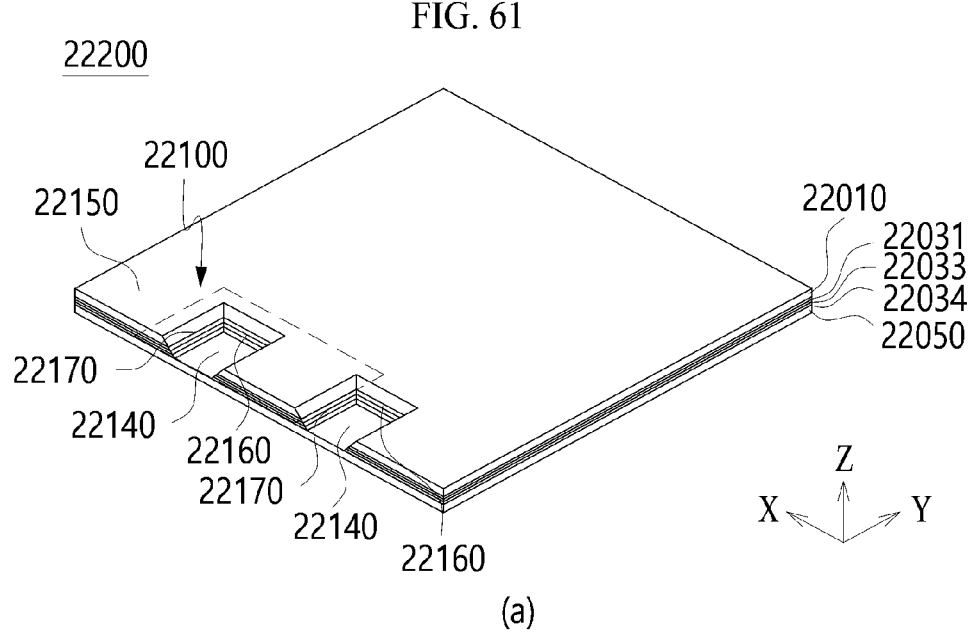
(a)
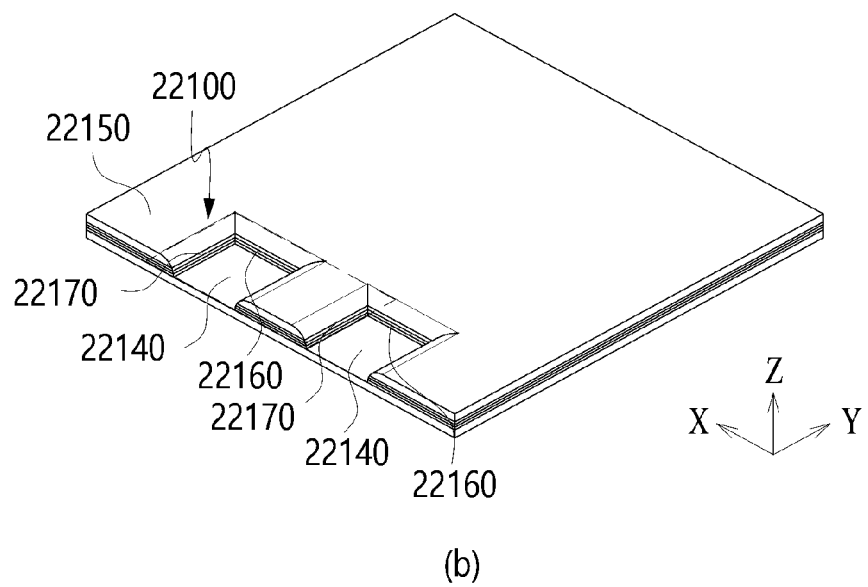
(b)

FIG. 70
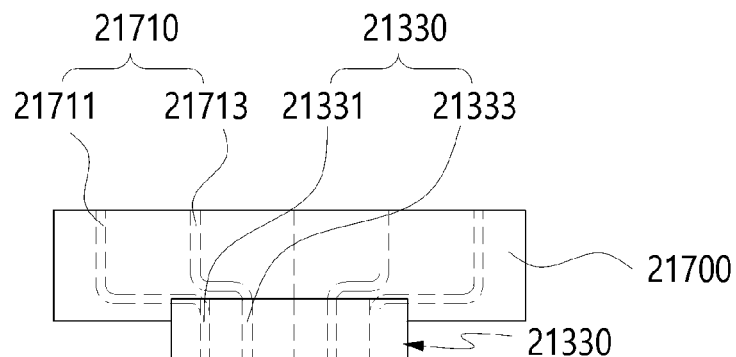
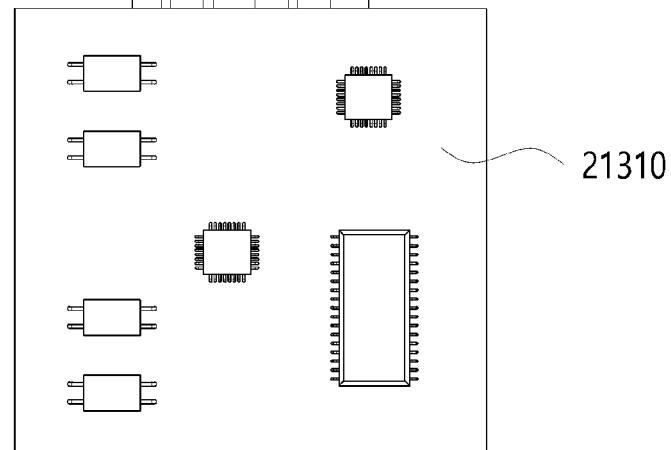
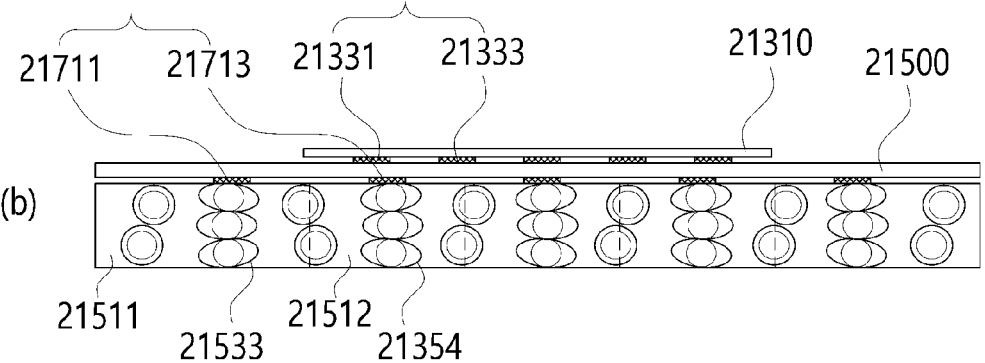

20200

FIG. 72
22200
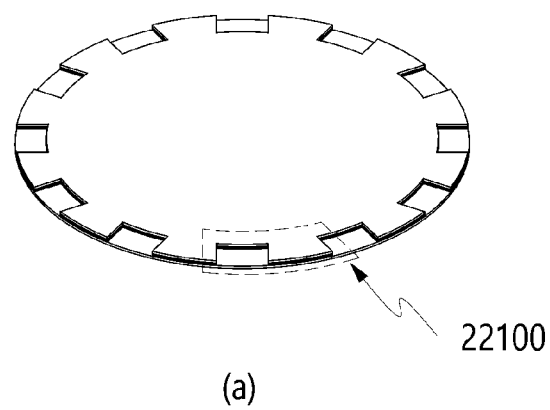
22100
(a)
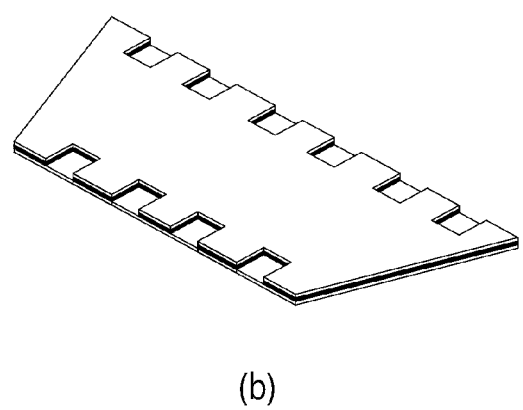
(b)

FIG. 82
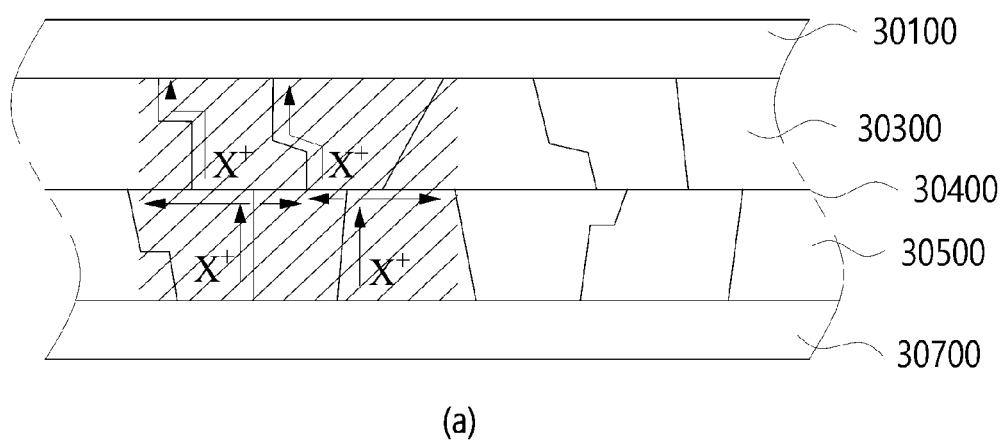
(a)
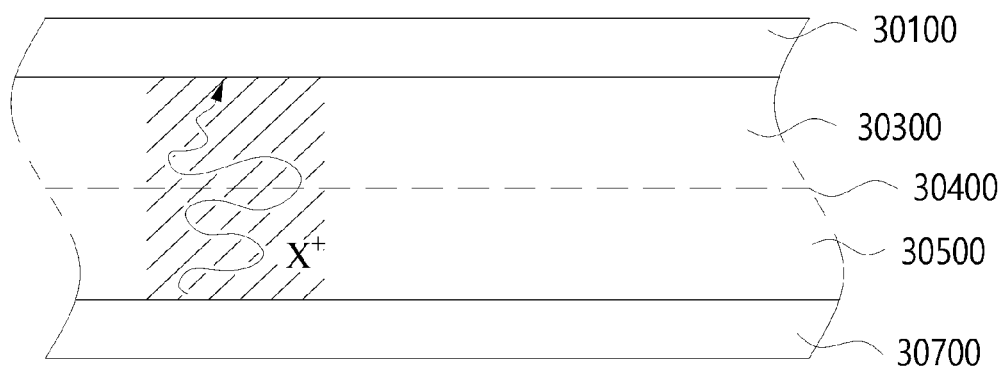
(b)

FIG. 83
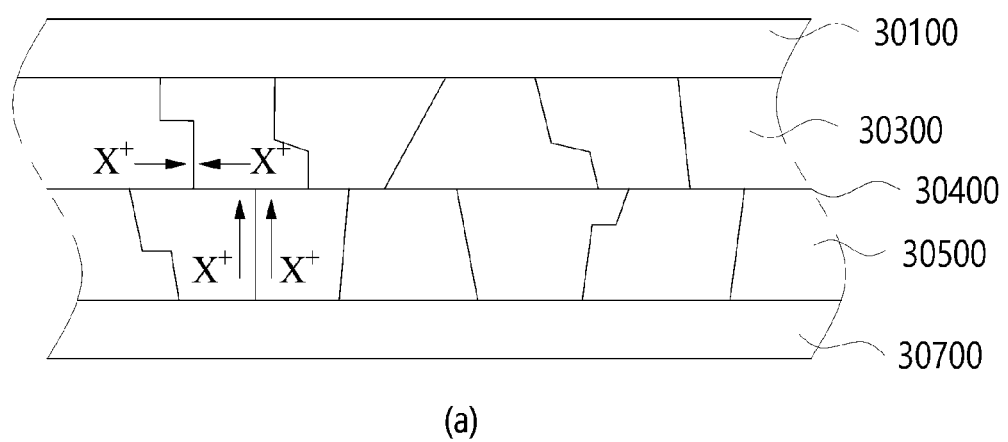
(a)
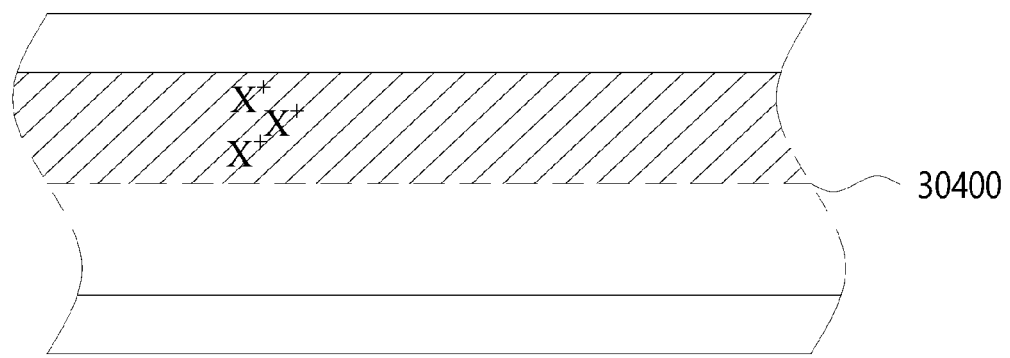
(b)

ELECTROCHROMIC ELEMENT AND ELECTROCHROMIC DEVICE INCLUDING THE SAME

CROSS-REFERENCE TO RELATED APPLICATION

This application is a continuation of International Application No. PCT/KR2018/002602 filed on Mar. 5, 2018, which claims priority to and the benefit of Korean Patent Application Nos. 10-2017-0053818, 10-2017-0053819, 10-2017-0053820 and 10-2017-0053821 filed on Apr. 26, 2017, Korean Patent Application No. 10-2017-0092368 filed on Jul. 21, 2017 and U.S. Provisional Application No. 62/466,991 filed on Mar. 3, 2017, the disclosures of which are incorporated herein by reference in their entirety.

This application is also a continuation of U.S. application Ser. No. 15/844,429 filed on Dec. 15, 2017, which claims priority to and the benefit of Korean Patent Application Nos. 10-2017-0053818, 10-2017-0053819, 10-2017-0053820 and 10-2017-0053821 filed on Apr. 26, 2017, Korean Patent Application No. 10-2017-0092368 filed on Jul. 21, 2017 and U.S. Provisional Application No. 62/466,991 filed on Mar. 3, 2017, the disclosures of which are incorporated herein by reference in their entirety.

BACKGROUND

Technological Field

The present application relates to an electrochromic element and an electrochromic device including the same, and more particularly, to an electrochromic element whose optical state is changed and an electrochromic device for changing the optical state of the electrochromic element.

Description of the Related Technology

Electrical discoloration is a phenomenon in which a color is changed on the basis of an oxidation-reduction (redox) caused by an applied power. A material that may be electrically discolored may be defined as an electrochromic material. The electrochromic material has a characteristic of not exhibiting a color when power is not applied thereto from outside and then exhibiting a color when the power is applied thereto or, conversely, exhibiting a color when power is not applied thereto from outside and then not exhibiting a color when the power is applied thereto.

An electrochromic device including the electrochromic material has been used for various purposes. The electrochromic device has been used for a purpose of adjusting light transmittance or reflectance of construction window glass or vehicle glass. Particularly, the electrochromic device has been used for a rear view mirror used in a vehicle to prevent strong light of a vehicle therebehind reflected by the rear view mirror of the vehicle day and night from interfering with a visual field of a driver.

In the case of the electrochromic device, because discoloration occurs due to power, there is a technical problem of having to properly control an applied voltage to realize a desired extent of discoloration.

Also, because power is required in a discoloration process and a maintenance process of the electrochromic device, there is a problem in that power consumption increases as an area increases.

Also, when a driving module for supplying power is disposed in the electrochromic device, the driving module is not efficiently disposed in the electrochromic device, and there is a problem in that an inside of the electrochromic device becomes complicated.

Also, because an electric discoloration speed of the electrochromic element is slow and uniformity of the electric discoloration is low, there is a problem in that performance of an application in which the electrochromic element is included is deteriorated.

SUMMARY OF CERTAIN INVENTIVE ASPECTS

It is an aspect of the present application to provide an electrochromic device capable of realizing a desired discoloration level.

It is another aspect of the present application to provide an electrochromic device that reduces power consumption.

It is still another aspect of the present application to provide an electrochromic device capable of reducing a discoloration variation in each region.

It is yet another aspect of the present application to provide an electrochromic device including an electrochromic element having a predetermined structure so that one side is able to receive power for electric discoloration.

It is yet another aspect of the present application to provide an electrochromic device including a driving module that is able to be efficiently disposed in the electrochromic element.

It is yet another aspect of the present application to provide an electrochromic element having a high speed of discoloration.

It is yet another aspect of the present application to provide an electrochromic element having a high uniformity of discoloration.

It is yet another aspect of the present application to provide an electrochromic element that is able to be rapidly bleached when application of power is stopped.

The aspects of the present application are not limited to the above-described aspects, and other unmentioned aspects should be clearly understood by one of ordinary skill in the art to which the present application pertains from the present specification and the accompanying drawings.

According to one aspect of the present application, there may be provided an electrochromic device comprising: an electrochromic element including a first electrode, a second electrode, an electrochromic layer disposed between the first electrode and the second electrode, and an ion storage layer disposed between the electrochromic layer and the second electrode; and a control unit for controlling a state of the electrochromic element to change to at least one of a first state having a first transmittance, a second state having a second transmittance, a third state having a third transmittance, or a fourth state having a fourth transmittance by applying power to the electrochromic element so that an at least one ion in the electrochromic element is moved, wherein the second transmittance has a larger value than a value of the first transmittance, the third transmittance has a larger value than a value of the second transmittance, and the fourth transmittance has a larger value than a value of the third transmittance, when a first voltage is applied to the electrochromic element in a state that the electrochromic element has the first state, the electrochromic element becomes the second state, and when the first voltage is applied to the electrochromic element in a state that the electrochromic element has the fourth state, the electrochromic element becomes the third state.

According to another aspect of the present application, there may be provided an electrochromic device comprising: an electrochromic element including a first electrode, a second electrode, an electrochromic layer disposed between the first electrode and the second electrode, and an ion storage layer disposed between the electrochromic layer and the second electrode; and a control unit for controlling a state of the electrochromic element to change to at least one of a first state having a first transmittance, a second state having a second transmittance, or a third state having a third transmittance by applying power to the electrochromic element so that an at least one ion in the electrochromic element is moved, wherein the second transmittance has a larger value than the first transmittance, the third transmittance has a larger value than the second transmittance, wherein the control unit changes the state of the electrochromic element to the second state by applying a first voltage to the electrochromic element in the state that the electrochromic element has the first state, the control unit changes the state of the electrochromic element to the second state by applying a second voltage to the electrochromic element in the state that the electrochromic element has the third state, and the first voltage and the second voltage are different from each other.

According to the other aspect of the present application, there may be provided an electrochromic element comprising: a first electrode, a second electrode, an electrochromic layer disposed between the first electrode and the second electrode, and an ion storage layer disposed between the electrochromic layer and the second electrode; and a control unit applying power to the electrochromic element to color or bleach the electrochromic element by being moved at least one of the ions in the electrochromic element; wherein, when the electrochromic element is in a bleached state by applying a first voltage, an application of a second voltage causes the electrochromic element to be colored, wherein a third voltage which does not change a previous state of the electrochromic exists between the first voltage and the second voltage.

According to the present application, an electrochromic device that realizes a desired discoloration level by applying a different applied voltage in accordance with an initial state can be provided.

According to the present application, an electrochromic device capable of reducing a discoloration variation for each region by applying a driving voltage for a period longer than a threshold period can be provided.

According to the present application, an electrochromic device capable of reducing power consumption by controlling an application period of a driving voltage on the basis of a threshold period can be provided.

According to the present application, an electrochromic device capable of reducing power consumption by controlling an application period of a maintenance voltage on the basis of a threshold period can be provided.

According to the present application, an electrochromic device including an electrochromic element having a predetermined structure so that one side is able to receive power for electric discoloration can be provided.

According to the present application, an electrochromic device including a driving module that is able to be efficiently disposed in the electrochromic element can be provided.

According to the present application, an electrochromic element having a high speed of discoloration can be provided.

According to the present application, an electrochromic element having a high uniformity of discoloration can be provided.

According to the present application, an electrochromic element that is able to be rapidly bleached when application of power is stopped can be provided.

BRIEF DESCRIPTION OF THE DRAWINGS

FIG. 43 is a view illustrating an electroactive element in which a trench structure according to an embodiment of the present application is formed;

FIG. 46 is a view illustrating the electrochromic element in which a trench structure according to an embodiment of the present application is formed;

FIG. 48 is a view illustrating an anisotropic conductor having conductivity and an insulating property according to an embodiment of the present application;

FIG. 49 is a view illustrating an electrical connecting member and a driving substrate according to an embodiment of the present application;

FIG. 50 is a view illustrating an electrochromic module according to an embodiment of the present application;

FIG. 54 is a view illustrating an effective voltage formed in the electrochromic element according to an embodiment of the present application;

FIG. 55 is a view illustrating electrical discoloration according to an embodiment of the present application;

FIG. 61 is a view illustrating a trench structure having a slope of the electrochromic element according to an embodiment of the present application;

FIG. 70 is a side view illustrating the driving module further including the distributing member according to an embodiment of the present application;

FIG. 72 is a view illustrating an electrochromic element according to an embodiment of the present application;

FIG. 82 is a comparative view for illustrating improved uniformity of electric discoloration of the electrochromic element including the column and the boundary surface according to an embodiment of the present application;

FIG. 83 is a comparative view for illustrating an improved bleaching action of the electrochromic element including the column and the boundary surface according to an embodiment of the present application;

DETAILED DESCRIPTION

Figure 1:
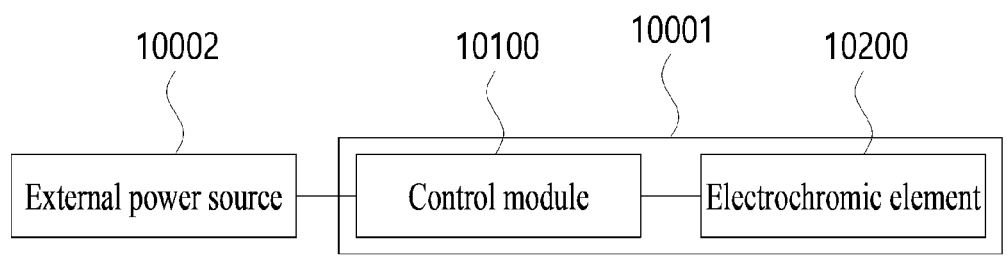
FIG. 1 is a view illustrating an electrochromic device according to an embodiment of the present application.

Embodiments described in the present specification are for clearly describing the idea of the present embodiment to one of ordinary skill in the art to which the present embodiment pertains. Thus, the present embodiment is not limited by the embodiments described in the present specification, and the scope of the present embodiment should be construed as including modified examples that belong to the idea of the present embodiment.

The terms used in the present specification are selected from currently widely used general terms in consideration of functions in the present embodiment, but may vary according to the intentions or practices of one of ordinary skill in the art to which the present embodiment pertains or the advent of new technology. In contrast, when an applicant arbitrarily defines and uses specific terms, meanings of the terms will be described below. Accordingly, the terms used in the present specification should be interpreted on the basis of substantial meanings that the terms have and the contents throughout the present specification instead of simply the names of the terms.

The drawings attached to the present specification are for facilitating description of the present embodiment, and shapes illustrated in the drawings may be exaggerated as needed to assist understanding the present embodiment. Thus, the present embodiment is not limited by the drawings.

In the present specification, when detailed description of a known configuration or function related to the present embodiment is deemed to blur the gist of the present embodiment, detailed description thereof will be omitted as needed.

According to one aspect of the present application, there may be provided an electrochromic device comprising: an electrochromic element including a first electrode, a second electrode, an electrochromic layer disposed between the first electrode and the second electrode, and an ion storage layer disposed between the electrochromic layer and the second electrode; and a control unit for controlling a state of the electrochromic element to change to at least one of a first state having a first transmittance, a second state having a second transmittance, a third state having a third transmittance, or a fourth state having a fourth transmittance by applying power to the electrochromic element so that an at least one ion in the electrochromic element is moved, wherein the second transmittance has a larger value than a value of the first transmittance, the third transmittance has a larger value than a value of the second transmittance, and the fourth transmittance has a larger value than a value of the third transmittance, when a first voltage is applied to the electrochromic element in a state that the electrochromic element has the first state, the electrochromic element becomes the second state, and when the first voltage is applied to the electrochromic element in a state that the electrochromic element has the fourth state, the electrochromic element becomes the third state.

Herein, the electrochromic layer and the ion storage layer may be discolored by movement of the ions.

Herein, the electrochromic layer and the ion storage layer may have a binding force with the ions, and the binding force between the electrochromic layer and the ions and the binding force between the ion storage layer and the ions may be different from each other.

Herein, a first threshold voltage for releasing a binding between the electrochromic layer and the ions and a second threshold voltage for releasing a binding between the ion storage layer and the ions may be different from each other.

Herein, the electrochromic layer may have an internal potential, and the internal potential may be proportional to the number of the ions located in the electrochromic layer.

Herein, the control unit may apply a voltage higher than a sum of the internal potential and the first threshold voltage to move the ions.

Herein, the control unit may apply a voltage lower than a difference between the internal potential and the first threshold voltage to move the ions.

Herein, the first state, the second state, the third state, or the fourth state may be determined by the number of ions contained in the electrochromic layer.

Herein, the first state, the second state, the third state, or the fourth state may be determined according to a ratio of ions contained in the electrochromic layer and ions contained in the ion storage layer.

Herein, the binding force between the electrochromic layer and the ion storage layer and the ions may be a physical binding force or a chemical binding force.

Herein, the physical binding force between the electrochromic layer and the ion storage layer may be different from that of the ion storage layer due to physical structure difference of the electrochromic layer and the ion storage layer.

Herein, the ion may be a hydrogen ion or a lithium ion.

According to another aspect of the present application, there may be provided an electrochromic device comprising: an electrochromic element including a first electrode, a second electrode, an electrochromic layer disposed between the first electrode and the second electrode, and an ion storage layer disposed between the electrochromic layer and the second electrode; and a control unit for controlling a state of the electrochromic element to change to at least one of a first state having a first transmittance, a second state having a second transmittance, or a third state having a third transmittance by applying power to the electrochromic element so that an at least one ion in the electrochromic element is moved, wherein the second transmittance has a larger value than the first transmittance, the third transmittance has a larger value than the second transmittance, wherein the control unit changes the state of the electrochromic element to the second state by applying a first voltage to the electrochromic element in the state that the electrochromic element has the first state, the control unit changes the state of the electrochromic element to the second state by applying a second voltage to the electrochromic element in the state that the electrochromic element has the third state, and the first voltage and the second voltage are different from each other.

Herein, the second voltage may be higher than the first voltage.

Herein, the controller may change the state of the electrochromic element to the second state, and selectively may apply the first voltage or the second voltage based on whether the electrochromic element in the first state or the third state.

Herein, the control unit selectively may apply the first voltage or second voltage by determining whether the process for changing the electrochromic device to the second state is coloring process or bleaching process base on the electrochromic device is in the first state or the third state.

Herein, the control unit may determine a previous state through a voltage applied to the previous state Herein, the electrochromic device further comprising: a storage unit storing each of driving voltages in the coloring process and in the bleaching process.

Herein, the storage unit may store driving voltages for each target state in the coloring process and driving voltages for each target level in the bleaching process.

According to the other aspect of the present application, there may be provided an electrochromic element comprising: a first electrode, a second electrode, an electrochromic layer disposed between the first electrode and the second electrode, and an ion storage layer disposed between the electrochromic layer and the second electrode; and a control unit applying power to the electrochromic element to color or bleach the electrochromic element by being moved at least one of the ions in the electrochromic element; wherein, when the electrochromic element is in a bleached state by applying a first voltage, an application of a second voltage causes the electrochromic element to be colored, wherein a third voltage which does not change a previous state of the electrochromic exists between the first voltage and the second voltage.

Herein, when the third voltage is applied, the ions existed in the electrochromic layer and the ion storage layer may do not move.

According to the other aspect of the present application, there may be provided an electrochromic device comprising: an electrochromic element comprising, a first electrode, a second electrode, an electrochromic layer disposed between the first electrode and the second electrode, and an ion storage layer disposed between the electrochromic layer and the second electrode; and a control unit applying power to the electrochromic element to color or bleach the electrochromic element by being moved at least one of the ions in the electrochromic element; wherein, when the electrochromic element is in a bleached state by applying a first voltage, an application of a second voltage causes the electrochromic element to be colored, the second voltage is greater than the first voltage as much as an unchangeable voltage section.

Herein, the electrochromic layer and the ion storage layer may have a binding force with the ions, and a binding force between the electrochromic layer and the ions and a binding force between the ion storage layer and the ions may be different from each other.

Herein, the unchangeable voltage section may correspond to a sum of a first threshold voltage and a second threshold voltage, and the first threshold voltage may be a voltage for releasing the binding between the electrochromic layer and the ions, and the second threshold voltage may be a voltage for releasing the binding between the ion storage layer and the ions.

According to the other aspect of the present application, there may be provided an electrochromic device comprising: an electrochromic element including a first electrode, a second electrode, an electrochromic layer disposed between the first electrode and the second electrode, and an ion storage layer disposed between the electrochromic layer and the second electrode; and a control unit for controlling a state of the electrochromic element to change at least one of a first state having a first transmittance or a second state having a second transmittance having a larger value than the first transmittance by applying power to the electrochromic element so that an at least one ion in the electrochromic element is moved, wherein the electrochromic element includes a first region and a second region, wherein a voltage is applied for a threshold period so that a transmittance of the first region corresponds to a transmittance of the second region, when a first voltage applied to the electrochromic element to change state to the first state, the threshold period is a first threshold period, when a second voltage applied to the electrochromic element to change state to the second state, the threshold period is a second threshold period.

Herein, an initial state of the electrochromic element being discolored to the first state may be same as an initial state of the electrochromic element being discolored to the second state, and the initial state may be a third state.

Herein, the first threshold period may be changed by the third state.

Herein, the first threshold period may be reduced when a difference between a transmittance of the third state and a transmittance of the first state is reduced.

Herein, the threshold period may be changed by a temperature.

Herein, the electrochromic element may include a contact region electrically connected to the control unit, and a transmittance of electrochromic element may be changed from a region adjacent to the contact region.

Herein, the transmittance of the first region and the transmittance of the second region may have a difference when a voltage may be applied to electrochromic element for the threshold period.

Herein, the difference between the transmittance of the first region and the transmittance of the second region may be proportional to a sheet resistance of one of the first electrode and the second electrode.

Herein, the second voltage may be greater than the first voltage.

Herein, the second threshold period may be longer than the first threshold period.

According to the other aspect of the present application, there may be provided an electrochromic device comprising: an electrochromic element including a first electrode, a second electrode, an electrochromic layer disposed between the first electrode and the second electrode, and an ion storage layer disposed between the electrochromic layer and the second electrode; and a control unit for controlling a state of the electrochromic element to change at least one of a first state having a first transmittance or a second state having a second transmittance having a larger value than the first transmittance by applying power to the electrochromic element so that an at least one ion in the electrochromic element is moved, wherein the electrochromic element includes a first region and a second region, wherein the control unit applies a voltage to electrochromic element for an application period that is at least a threshold period so that a transmittance of the first region correspond to a transmittance of the second region, wherein the control unit applies for a first application period when the electrochromic element is changed to the first state, wherein the control unit applies for a second application period when the electrochromic element is changed to the second state.

Herein, the second application period may be different from the first application period.

Herein, the second application period may be longer than the first application period.

Herein, the first application period may be same as the second application period.

Herein, the first application period and the second application period may be set according to an area of the electrochromic element.

Herein, control unit may apply the voltage for the second application period when the electrochromic element may be changed to all states when the second state has a maximum transmittance.

Herein, the control unit may determine the application period based on a current state of the electrochromic element.

Herein, the control unit may determine the current state of the electrochromic element based on the voltage applied when the electrochromic element is changed to the current state.

Herein, there may be provided the electrochromic device further comprising: a storage unit for storing the voltage applied when the electrochromic element is changed to the current state.

According to the other aspect of the present application, there may be provided an electrochromic device comprising: an electrochromic element including a first electrode, a second electrode, an electrochromic layer disposed between the first electrode and the second electrode, and an ion storage layer disposed between the electrochromic layer and the second electrode; and a control unit for controlling a state of the electrochromic element to change at least one of a first state having a first transmittance, a second state having a second transmittance or a third state having a third transmittance by applying power to the electrochromic element so that an at least one ion in the electrochromic element is moved, wherein the second transmittance has a larger value than a value of the first transmittance, the third transmittance has a larger value than a value of the second transmittance, wherein the electrochromic element includes a first region and a second region, wherein a voltage is applied for a threshold period so that a transmittance of the first region correspond to a transmittance of the second region, wherein the threshold period when a first voltage is applied to the electrochromic element for changing the state of the electrochromic element from the first state to the third state is a first threshold period, wherein the threshold period when the first voltage is applied to the electrochromic element for changing the state of the electrochromic element from the second state to the third state is a second threshold period, wherein the first threshold period is different from the second threshold period.

Herein, the second threshold period may be longer than the first threshold period.

Herein, the first threshold period may be determined by a difference of the first transmittance and the third transmittance, and the second threshold period may be determined by a difference of the first transmittance and the second transmittance, Herein, the first threshold period may be determined by a difference of the first voltage and a voltage applied when the electrochromic element is changed to the first state, and the second threshold period may be determined by a difference of the first voltage and a voltage applied when the electrochromic element is changed to the second state.

According to the other aspect of the present application, there may be provided an electrochromic device comprising: an electrochromic element including a first electrode, a second electrode, an electrochromic layer disposed between the first electrode and the second electrode, and an ion storage layer disposed between the electrochromic layer and the second electrode; and a control unit for controlling a state of the electrochromic element to change at least one of a first state having a first transmittance, a second state having a second transmittance or a third state having a third transmittance by applying power to the electrochromic element so that an at least one ion in the electrochromic element is moved, wherein the second transmittance has a larger value than a value of the first transmittance, the third transmittance has a larger value than a value of the second transmittance, wherein the electrochromic element includes a first region and a second region, wherein the control unit applies a voltage to electrochromic element for an application period that is at least a threshold period so that a transmittance of the first region corresponds to a transmittance of the second region, wherein the control unit applies the voltage for a first application period so that the electrochromic element is changed from the first state to the third state, wherein the control unit applies the voltage for a second application period so that the electrochromic element is changed from the second state to the third state.

Herein, the second application period may be shorter than the first application period.

Herein, a magnitude of the voltage applied during the first application period may be same as a magnitude of the voltage applied during the second application period.

Herein, all of the voltage applied from control unit may be applied during the first application period when the first transmittance is a minimum transmittance and the third transmittance is a maximum transmittance.

Herein, the control unit may determine the first application period based on a difference of the first transmittance and the second transmittance, the control unit may determine the second application period based on a difference of the first transmittance and the third transmittance.

According to the other aspect of the present application, there may be provided an electrochromic device comprising: an electrochromic element including a first electrode, a second electrode, an electrochromic layer disposed between the first electrode and the second electrode, and an ion storage layer disposed between the electrochromic layer and the second electrode; and a control unit for controlling a state of the electrochromic element to change at least one of a first state having a first transmittance or a second state having a second transmittance having a larger value than the first transmittance by applying power to the electrochromic element so that an at least one ion in the electrochromic element is moved, wherein the electrochromic element includes a first region and a second region, wherein a voltage is applied for a threshold period so that a transmittance of the first region corresponds to a transmittance of the second region, wherein the control unit applies a maintenance voltage for maintaining the state of the electrochromic element in a maintenance stage, wherein the threshold period for maintaining the first state of the electrochromic element is a first threshold period, wherein the threshold period for maintaining the second state of the electrochromic element is a second threshold period.

Herein the second threshold period may be longer than the first threshold period.

Herein the maintenance stage may include an application period being applied the maintenance voltage and an non-application period being not applied the maintenance voltage, and the threshold period for maintaining the first state of the electrochromic element may be a third threshold period when the non-application period is a first non-application period in the maintenance stage, and the threshold period for maintaining the first state of the electrochromic element may be a fourth threshold period when the non-application period is a second non-application period in the maintenance stage.

Herein, the third threshold period may be longer than the fourth threshold period when the first non-application period is longer than the second non-application period.

Herein, the maintenance voltage for maintaining the first state may be a first maintenance voltage, and the maintenance voltage for maintaining the second state may be a second maintenance voltage.

Herein, the first maintenance voltage may be smaller than the second maintenance voltage.

Herein, an initial state changing to the first state may be a third state in a discoloration stage of the electrochromic element, and an initial state changing to the second state may be a third state in a discoloration stage of the electrochromic element.

Herein, the first threshold period may be changed based on the third state.

Herein, the first threshold period may be reduced when a difference between a transmittance of the third state and a transmittance of the first state is reduced.

Herein, the threshold period may be changed based on the temperature.

Herein, the threshold period for which the first voltage applies to the electrochromic element for changing the state of the electrochromic element to the first state in a discoloration stage may be a fifth threshold period, and the threshold period for which the second voltage applies to the electrochromic element for changing the state of the electrochromic element to the second state in the discoloration stage may be a sixth threshold period, and the sixth threshold period may be shorter than the fifth threshold period.

According to the other aspect of the present application, there may be provided an electrochromic device comprising: an electrochromic element including a first electrode, a second electrode, an electrochromic layer disposed between the first electrode and the second electrode, and an ion storage layer disposed between the electrochromic layer and the second electrode; and a control unit for controlling a state of the electrochromic element to change at least one of a first state having a first transmittance or a second state having a second transmittance having a larger value than the first transmittance by applying power to the electrochromic element so that an at least one ion in the electrochromic element is moved, wherein the electrochromic element includes a first region and a second region, wherein the control unit applies a maintenance voltage for an application period that is at least a threshold period so that a transmittance of the first region corresponds to a transmittance of the second region in order to maintain the state of the electrochromic element in a maintenance stage, wherein the control unit applies a first maintenance voltage for maintaining the first state of the electrochromic element during a first application period, wherein the control unit applies a second maintenance voltage for maintaining the second state of the electrochromic element during a second application period.

Herein, the second application period may be longer than the first application period.

Herein, the maintenance stage may further include an non-application period being not applied the maintenance voltage, and the control unit may apply the first maintenance voltage during a third application period for maintaining the first state of the electrochromic element when the non-application period is a first non-application period in the maintenance stage, and the control unit may apply the first maintenance voltage during a fourth application period for maintaining the first state of the electrochromic element when the non-application period is a second non-application period in the maintenance stage.

Herein, the third application period may be longer than the fourth application period when the first non-application period is longer than the second non-application period.

Herein, the control unit may apply the maintenance voltage during the second application period for maintaining a changed state after changing the electrochromic element to all states where the electrochromic element can be changed in case that the second transmittance is a maximum transmittance.

Herein, the control unit may apply a first discoloration voltage to change the electrochromic element to the first state in a discoloration stage, and the control unit may apply a second discoloration voltage to change the electrochromic element to the second state in the discoloration stage.

Herein, the first discoloration voltage may be same as the first maintenance voltage.

Herein, the control unit may apply the first discoloration voltage to change the electrochromic element to the first state during a first discoloration voltage application period in the discoloration stage, and the control unit may apply the second discoloration voltage to change the electrochromic element to the second state during a second discoloration voltage application period in the discoloration stage, and the first discoloration voltage application period may be longer than or equal to the first application period.

Herein, wherein the control unit may determine the application period of discoloration based on a current state of the electrochromic element.

According to the other aspect of the present application, there may be provided a method of driving electrochromic element, the electrochromic element including a first electrode, a second electrode, an electrochromic layer disposed between the first electrode and the second electrode, and an ion storage layer disposed between the electrochromic layer and the second electrode, the method comprising: a discoloration stage of applying a first voltage to electrochromic element so that the electrochromic element is in a first state having an first transmittance; and a maintenance stage of applying the first voltage to electrochromic element during an application period for maintaining the first state, wherein the application period is longer than or equal to a threshold period for allowing a transmittance of a first region to correspond to a transmittance of a second region.

Herein, the maintain stage may include an application stage and a non-application stage, and the application stage may be applying a first voltage during the application period, and the non-application stage may be not applying the first voltage during a non-application period, and the application period may be determined based on a length of the non-application period.

Herein, the threshold period may be proportional to the non-application period.

Herein, the threshold period may be proportional to a magnitude of the first voltage.

Herein, the application period may be determined based on a magnitude of the first voltage.

Herein, the first voltage may have a first rise period in the discoloration stage, and the first voltage may have a second rise period in the maintenance stage, and the first rise period may be shorter than the second rise period.

Herein, the first voltage may have a first rise angle in the discoloration stage, and the first voltage may have a second rise angle in the maintenance stage, and the first rise angle may be smaller than the second rise angle.

Herein, the first rise angle may be determined based on a magnitude of the first voltage.

According to the other aspect of the present application, there may be provided an electrochromic device comprising: an electrochromic element including a first electrode including a contact region, a second electrode including a pad region, and an intermediate layer disposed between the first electrode and the second electrode; a base contacting with the electrochromic element; a conductor being contained in the base, wherein the conductor includes a first conductor and a second conductor; and a driving substrate being disposed on the upper surface of the base; wherein the driving substrate includes a driving unit generating a driving power for changing an optical state of the electrochromic device, and the driving power includes a first driving power and a second driving power; wherein the intermediate layer includes an electrochromic layer, an electrolyte layer, and an ion storage layer, wherein the conductor which is contained in the base is contact with the electrochromic element, the first conductor contacts the pad region and the second conductor contacts the contact region, and wherein the first conductor transfers the first driving power to the pad region and the second conductor transfers the second driving power to the contact region.

According to the other aspect of the present application, there may be provided an electrochromic device comprising: an electrochromic device comprising a first electrode, a second electrode, and an intermediate layer disposed between the first electrode and the second electrode; a base being disposed so as to be in contact with the electrochromic device; and a conductor being contained in the base, the conductor including a first conductor and a second conductor, wherein the conductor which is contained in the base is in contact with the electrochromic device, and the first conductor contacts the first electrode, and the second conductor contacts the second electrode, wherein a driving power including a first driving power and a second driving power is applied to the first electrode and the second electrode through the conductor, and the first electrode receives the first driving power through the first conductor and the second electrode receives the second driving power through the second conductor.

Herein, the intermediate layer may include an electrochromic layer, an electrolyte layer, and an ion storage layer, the electrochromic element is discolored by redox reaction.

Herein, the trench structure exposing an area of the second electrode of the electrochromic element may be formed at an area adjacent to the side of the electrochromic element, and the trench structure may include the contact region and the pad region, and the contact region may be an exposed area of the first electrode included in the trench structure, and the pad region may be an exposed area of the second electrode.

Herein, the first conductor may contact the pad region and the second conductor contacts the contact region.

Herein, the trench structure may include a protruded region disposed between a depressed region and an adjacent depressed region, and the depressed region may be an area that the first electrode and the intermediate layer may be removed so that the pad region is exposed in the direction of the first electrode.

Herein, the base may be inserted onto the depressed region, and the inserted base may be in contact with the pad portion.

Herein, the driving substrate may be disposed in contact with the upper surface of the base.

Herein, the driving substrate may include a connecting member for outputting the driving power, and the connecting member may be in contact with the upper surface of the base.

Herein, the connecting member may include a first connecting member for outputting the first driving power and a second connecting member for outputting the second driving power, and the first connecting member may transfer the first driving power to the first conductor, and the second connecting member may transfer the second driving power to the second conductor.

Herein, the first driving power may be transferred to the pad region through the first conductor, and the second driving power may be transferred to the contact region through the second conductor.

Herein, an effective voltage may be formed in the electrochromic element based on the first driving power and the second driving power, and the electrochromic element may be discolored by the effective voltage.

Herein, the base may include a plurality of the first conductors and a plurality of the second conductors, at least one of the first conductors may be contact with the first connecting member, and at least one of the second conductors may be contact with the second connecting member.

Herein, a conduction path for transferring the driving power may be formed in the base, the conduction path including a first conduction path and a second conduction path, and the first conduction path may be formed by at least one of the first conductors, and the second conduction path may be formed by at least one of the second conductors.

Herein, the first driving power is transferred to the pad region through the first conduction path and the second driving power is transferred to the contact region through the second conduction path.

Herein, the base may have an insulating property, and an area between the first conduction path and the second conduction path may be insulated by the base.

Herein, there may exist at least two conductors which are not contact with each other between the first conduction path and the second conduction path.

Herein, a buffer region may be formed in the area of the electrochromic element between the contact region and the pad region, and the buffer region may be an area where the driving power is not transmitted.

Herein, the conductor further may include a third conductor which is in contact with the buffer area, and the third conductor may be electrically isolated.

Herein, an area of the base corresponding to the buffer region may be electrically isolated, the third conductor may be contained in the area of the base corresponding to the buffer region.

Herein, the connecting member formed at an area corresponding to the buffer region may be electrically isolated.

Herein, the driving unit may do not transmit the driving power to the connecting member positioned corresponding to the buffer area.

Herein, the trench structure may include a connecting surface connecting the pad region and the contact region, and the connecting surface may have an angle with the first electrode and the second electrode.

Herein, the connecting surface may be exposed upwardly.

Herein, there may be provided the electrochromic device further comprising: a distributing member electrically connecting the driving substrate and the conductor included in the base.

Herein, the distributing member may include a first distributing member and a second distributing member, the first distributing member may be connected to the first connecting member to transfer the first driving power to the first conductor, the second distributing member may be connected to the second connecting member to transfer the second driving power to the second conductor.

According to the other aspect of the present application, there may be provided electrical connecting member comprising: an anisotropic conductor disposed in a conductor comprising a first region, a second region, and a third region; base; and a conductor contained in the base; wherein the third region is located between the first region and the second region, wherein the conductor including a first conductor contacting only the first region, a second conductor contacting only the second region, and a third conductor contacting only the third region, wherein when the first driving power is applied to the first conductor and the second driving power is applied to the second conductor, the first region has a first potential based on the first driving power, the second region has a second potential based on the second driving power source, and the third region is electrically isolated.

According to the other aspect of the present application, there may be provided an electrochromic device comprising: a first electrode including a first depressed portion; a second electrode facing the first electrode; an electrochromic layer which is located between the first electrode and the second electrode including a second depressed portion, wherein an optical characteristic of the electrochromic layer is changed by the movement of at least one ion; and an ion storage layer which is located between the first electrode and the electrochromic layer including a third depressed portion; wherein an optical characteristic of the ion storage layer is changed by the movement of at least one ion; and an electrolyte layer which is positioned between the electrochromic layer and the ion storage layer including a fourth depressed portion; wherein the second electrode includes a protruded surface exposed upward by the first depressed portion, the second depressed portion, the third depressed portion, and the fourth depressed portion, wherein the protruded surface has an angle with the first electrode, wherein the protruded surface is in contact with a conductor.

According to the other aspect of the present application, there may be provided an electrochromic element having an optical state changed by an applied power, the electrochromic element including: a first electrode; a second electrode disposed to face the first electrode; an electrochromic layer disposed between the first electrode and the second electrode; and an ion transport storage layer disposed to be contact with a lower surface of the electrochromic layer and an upper surface of the second electrode; wherein when a first potential difference is formed between the first electrode and the second electrode, the electrochromic element has a first optical state according that the electrochromic layer receives at least one electron from the first electrode and at least one ion from the ion transport storage layer, and when a second potential difference is formed between the first electrode and the second electrode, the electrochromic element has a second optical state according that the ion transport storage layer receives at least one electron from the second electrode and at least one ion from the electrochromic layer, wherein an physical structure of the ion transport storage layer is continuous, wherein the physical structure of the ion transport storage layer and a physical structure of the electrochromic layer are discontinuous with respect to the boundary.

Herein, the ion transport storage layer may be divided into a first ion region and a second ion region by a first imaginary line, the first ion region may be adjacent to the electrochromic layer, and the first imaginary line may be set in the ion transport storage layer, and the first ion region and the second ion region may be continuous with respect to the first imaginary line.

Herein, the physical structure of the electrochromic layer and the physical structure of the first ion region may be visually distinguished by the boundary.

Herein, there may be provided electrochromic element further comprising: a column having a shape extending in a direction of the first electrode or a direction of the second electrode, wherein the column comprises a discoloration column formed in the electrochromic layer and an ion column formed in the ion transport storage layer.

Herein, the discoloration column and the ion column may be in contact with the boundary.

Herein, the discoloration column may include a discoloration left side and a discoloration right side, and the discoloration right side may be located apart from the discoloration left side in the direction parallel to the lower surface of the first electrode, the ion column may include an ion left side and a ion right side, and the ion right side is located apart from the ion left side in the direction parallel to the upper surface of the second electrode, Herein, the ion left side may have a first angle with the boundary and the ion right side may have a second angle with the boundary, and the first angle and the second angle may be different.

Herein, the ion column may comprise a first region and a second region, a distance between the ion left side and the ion right side may be a first length in the first region, and a distance between the ion left side and the ion right side may be a second length in the second region, and the first length and the second length are different.

Herein, there may exist a first imaginary line extending in the direction parallel to the lower surface of the first electrode in the electrochromic layer, and there may exist a second imaginary line extending in a direction parallel to the upper surface of the second electrode in the ion transfer storage layer, and the discoloration column may be continuous with respect to the first imaginary line, and the ion column may be continuous with respect to the second imaginary line.

Herein, the discoloration left side and the discoloration right side may be continuous with respect to the first imaginary line, and the ion left side and the ion right side may be continuous with respect to the second imaginary line.

Herein, the discoloration left side and the ion right side may be in contact with each other, and the discoloration column and the ion column may be visually distinguished by the boundary.

Herein, the ion transport storage layer may include an upper region in contact with the electrochromic layer and a lower region in contact with the second electrode, and the ion of the electrochromic layer and the ion of the ion transport storage layer may move through the upper region, and the upper region may block the movement of electrons between the electrochromic layer and the ion transport storage layer.

Herein, the upper region may have the first optical state when the first potential difference is formed between the first electrode and the second electrode, the upper region may have the first optical state when the second potential difference is formed between the first electrode and the second electrode.

According to the other aspect of the present application, there may be provided an electrochromic element including: a first electrode; a second electrode disposed to face the first electrode; an electrochromic layer disposed between the first electrode and the second electrode; and an ion transport storage layer disposed to be contact with a lower surface of the electrochromic layer and an upper surface of the second electrode; wherein first imaginary line is set in the electrochromic layer extending parallel to a lower surface of the first electrode and a second imaginary line is set in the ion transport storage layer extending parallel to the upper surface of the second electrode, wherein a region of the electrochromic layer is divided by the first imaginary line into a first discoloration region and a second discoloration region which is in contact with the ion transport storage layer, and a region of the ion transport storage layer is divided by the second imaginary line into a first ion region and a second ion region which is in contact with the electrochromic layer, wherein a physical structure of the first discoloration region and a physical structure of the second discoloration region are continuous with respect to the first imaginary line, and the physical structure of the first ion region and the physical structure of the second ion region are continuous with respect to the second imaginary line, wherein the physical structure of the second discoloration region of the electrochromic layer and the physical structure of the second ion region of the ion transport storage layer are in contact with each other, and the physical structure of the second discoloration region of the electrochromic layer and the physical structure of the second ion region of the ion transport storage layer are discontinuous with respect to the boundary.

An electrochromic device according to an embodiment includes: a reflective layer; a first electrochromic layer positioned on the reflective layer; an ion transport layer positioned on the first electrochromic layer; a second electrochromic layer positioned on the ion transport layer; a transparent electrode layer positioned on the second electrochromic layer; and a driving circuit for applying a voltage to the reflective layer and the transparent electrode layer, wherein a distance between the first electrochromic layer and the driving circuit is shorter than a distance between the second electrochromic layer and the driving circuit, wherein when the first electrochromic layer is colored by the movement of ions, the second electrochromic layer is also colored.

Wherein the first electrochromic layer may include an atom of iridium, and the second electrochromic layer may include an atom of tungsten.

wherein the electrochromic device further comprising a contact hole formed through the reflective layer, the first electrochromic layer, the ion transport layer, and the second electrochromic layer, and a removal region of the first electrochromic layer by the contact hole may be larger than a removal region of the second electrochromic layer by the contact hole.

wherein the electrochromic device further comprising a cutting region formed by cutting the reflective layer, the first electrochromic layer, the ion transport layer, the second electrochromic layer, the transparent electrode and a substrate, a cutting region of the first electrochromic layer may be larger than a cutting region of the second electrochromic layer.

Wherein the first electrochromic layer may include an atom of tungsten, and the second electrochromic layer may include an atom of iridium.

An electrochromic device according to an embodiment includes: a substrate having a curvature; a first transparent electrode positioned on the substrate; a first electrochromic layer positioned on the first transparent electrode; an ion transport layer positioned on the first electrochromic layer; a second electrochromic layer positioned on the ion transport layer; and a second transparent electrode positioned on the second electrochromic layer, wherein the first electrochromic layer has a first radius of curvature, the second electrochromic has a second radius of curvature, and the first radius of curvature and the second radius of curvature are different from each other.

Wherein the first radius of curvature may be greater than the second radius of curvature.

Wherein the first electrochromic layer may include an atom of tungsten, and the second electrochromic layer may include an atom of iridium.

Wherein the first electrochromic layer may include an atom of iridium, and the second electrochromic layer may include an atom of tungsten.

wherein the electrochromic device further comprising a contact hole formed through the second transparent electrode, the second electrochromic layer, the ion transport layer, and the first electrochromic layer, and a removal region of the first electrochromic layer by the contact hole may be smaller than a removal region of the second electrochromic layer by the contact hole.

wherein the electrochromic device further comprising a cutting region formed by cutting the first transparent electrode, the first electrochromic layer, the ion transport layer, the second electrochromic layer, and the second transparent electrode, a cutting region of the first electrochromic layer may be smaller than a cutting region of the electrochromic layer.

An electrochromic device according to an embodiment includes: a substrate; a first transparent electrode positioned on the substrate; a first electrochromic layer positioned on the first transparent electrode; an ion transport layer disposed on the first electrochromic layer; a second electrochromic layer positioned on the ion transport layer; a second transparent electrode positioned on the second electrochromic layer; a glass substrate in contact with outdoor air; and a fluid positioned between the glass substrate and the second transparent electrode, wherein the second electrochromic layer is adjacent to the fluid as compared to the first electrochromic layer.

Wherein the first electrochromic layer may include an atom of tungsten, and the second electrochromic layer may include an atom of iridium.

Wherein the first electrochromic layer may include an atom of iridium, and the second electrochromic layer may include an atom of tungsten.

In the present specification, an "optical state" of a configuration may be defined as a meaning that covers characteristics of the configuration related to light. The optical state may include a refractive index, a transmittance (transmissivity), color efficiency, an optical density, a color index, a discolored/bleached state, and the like.

In the present specification, a "change in an optical state" may refer to changes in the above-mentioned optical states. However, unless particularly mentioned, hereinafter, a change in an optical state refers to a change in a discolored/bleached state.

In the present specification, "differentiation" may refer to a visual differentiation. When one configuration and another configuration are differentiated, the configuration and the other configuration may be visually differentiated. In other words, when the configuration and the other configuration are differentiated, the configuration and the other configuration may be viewed as different configurations.

Hereinafter, an electrochromic device according to an embodiment will be described with reference to the drawings.

First Embodiment Group

1. Electrochromic Device

FIG. 1 is a view illustrating an electrochromic device according to an embodiment of the present application.

Referring to FIG. 1, an electrochromic device 10001 according to an embodiment includes a control module 10100 and an electrochromic element 10200.

The electrochromic device 10001 may receive power from an external power source 10002.

The external power source 10002 may supply power to the electrochromic device 10001. The external power source 10002 may supply power to the control module 10100. The external power source 10002 may supply a voltage and/or a current to the control module 10100. The external power source 10002 may supply a DC voltage or an AC voltage to the control module 10100.

The control module 10100 may control the electrochromic element 10200. The control module 10100 may generate driving power on the basis of the power received from the external power source 10002 and supply the generated driving power to the electrochromic element 10200. The control module 10100 may drive the electrochromic element 10200. The control module 10100 may change a state of the electrochromic element 10200 by the driving power. The control module 10100 may change a transmittance of the electrochromic element 10200. The control module 10100 may change a reflectance of the electrochromic element 10200. The control module 10100 may discolor the electrochromic element 10200. The control module 10100 may bleach or color the electrochromic element 10200. The control module 10100 may control the electrochromic element 10200 to be bleached or colored.

A state of the electrochromic element 10200 may be changed by the control module 10100. The state of the electrochromic element 10200 may be changed by a driving voltage. The electrochromic element 10200 may be discolored by the driving voltage. The electrochromic element 10200 may be bleached or colored by the driving voltage. The transmittance of the electrochromic element 10200 may be changed by the driving voltage. The reflectance of the electrochromic element 10200 may be changed by the driving voltage.

The electrochromic element 10200 may be a mirror. The electrochromic element 10200 may be a window. When the electrochromic element 10200 is a mirror, the reflectance thereof may be changed by the driving voltage. When the electrochromic element 10200 is a window, the transmittance thereof may be changed by the driving voltage.

When the electrochromic element 10200 is a mirror, the reflectance thereof may be decreased when the electrochromic element is colored, and the reflectance thereof may be increased when the electrochromic element is bleached.

When the electrochromic element 10200 is a window, the transmittance thereof may be decreased when the electrochromic element is colored, and the transmittance thereof may be increased when the electrochromic element is bleached.

Figure 2:
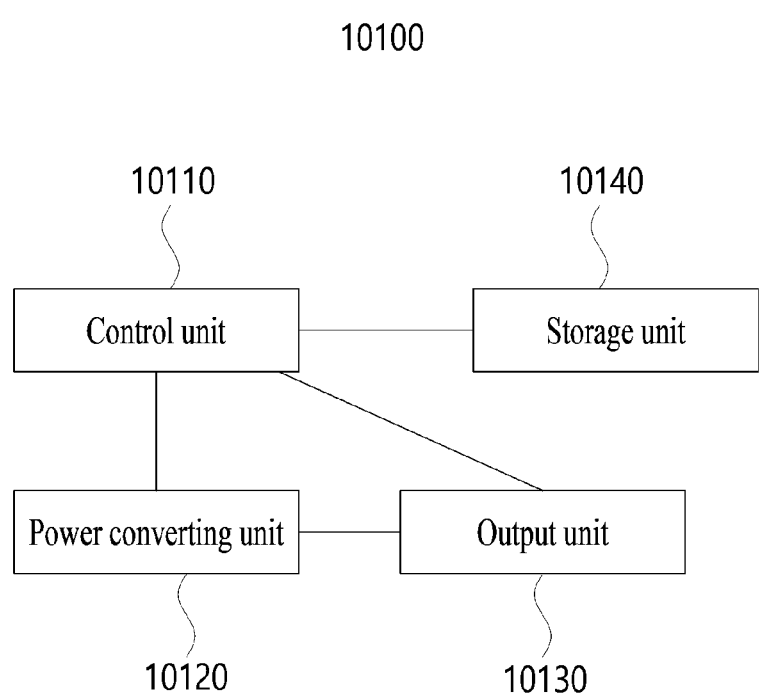
FIG. 2 is a view illustrating a control module according to an embodiment of the present application.

FIG. 2 is a view illustrating the control module according to an embodiment of the present application.

Referring to FIG. 2, the control module 10100 according to an embodiment may include a control unit 10110 (also referred to as a controller), a power converting unit 10120 (also referred to as a power converter), an output unit 10130 (also referred to as an output), and a storage unit 10140 (also referred to as a storage device).

The control unit 10110 may control the power converting unit 10120, the output unit 10130, and the storage unit 10140.

The control unit 10110 may generate a control signal that changes the state of the electrochromic element 10200, output the generated control signal to the output unit 10130, and control a voltage output by the output unit 10130.

The control unit 10110 may operate by a voltage output from the external power source 10002 or the power converting unit 10120.

When the control unit 10110 operates by a voltage output from the external power source 10002, the control unit 10110 may include a configuration capable of converting power. For example, when the control unit 10110 receives an AC voltage from the external power source 10002, the control unit 10110 may convert the AC voltage into a DC voltage and use the DC voltage in the operation. When the control unit 10110 receives a DC voltage from the external power source 10002, the control unit 10110 may drop the DC voltage received from the external power source 10002 and use the dropped DC voltage in the operation.

The power converting unit 10120 may receive power from the external power source 10002. The power converting unit 10120 may receive a current and/or a voltage. The power converting unit 10120 may receive a DC voltage or an AC voltage.

The power converting unit 10120 may generate internal power on the basis of the power received from the external power source 10002. The power converting unit 10120 may generate internal power by converting the power received from the external power source 10002. The power converting unit 10120 may supply the internal power to each of the configurations of the control module 10100. The power converting unit 10120 may supply the internal power to the control unit 10110, the output unit 10130, and the storage unit 10140. The internal power may be an operating power for operating each of the configurations of the control module 10100. The control unit 10110, the output unit 10130, and the storage unit 10140 may be operated by the internal power. When the power converting unit 10120 supplies the internal power to the control unit 10110, the control unit 10110 may not receive power from the external power source 10002. In this case, the configuration capable of converting power may be omitted from the control unit 10110.

The power converting unit 10120 may change a level of the power received from the external power source 10002 or change the received power to a DC power. Alternatively, the power converting unit 10120 may change the power received from the external power source 10002 to a DC power and then change the level of the received power.

When the power converting unit 10120 receives an AC voltage from the external power source 10002, the power converting unit 10120 may change the received AC voltage into a DC voltage and then change a level of the DC voltage. In this case, the power converting unit 10120 may include a regulator. The power converting unit 10120 may include a linear regulator configured to directly regulate received power or may include a switching regulator configured to generate a pulse on the basis of received power and adjust an amount of the pulse to output a regulated voltage.

When the power converting unit 10120 receives a DC voltage from the external power source 10002, the power converting unit 10120 may change a level of the received DC voltage.

The internal power output from the power converting unit 10120 may include a plurality of voltage levels. The power converting unit 10120 may generate internal power having a plurality of voltage levels required for each of the configurations of the control module 10100 to operate.

The output unit 10130 may generate a driving voltage. The output unit 10130 may generate a driving voltage on the basis of the internal power. The output unit 10130 may generate a driving voltage by the control of the control unit 10110. The output unit 10130 may apply the driving voltage to the electrochromic element 10200. The output unit 10130 may output a driving voltage having a different level by the control of the control unit 10110. That is, the output unit 10130 may change a level of the driving voltage by the control of the control unit 10110. The electrochromic element 10200 may be discolored by the driving voltage output from the output unit 10130. The electrochromic element 10200 may be colored or discolored by the driving voltage output from the output unit 10130.

Coloration and bleaching of the electrochromic element 10200 may be determined by a range of the driving voltage. For example, when the driving voltage is at a specific level or higher, the electrochromic element 10200 may be colored, and when the driving voltage is at a level that is less than the specific level, the electrochromic element 10200 may be bleached. Alternatively, when the driving voltage is at a specific level or higher, the electrochromic element 10200 may be may be bleached, and when the driving voltage is at a level that is less than the specific level, the electrochromic element 10200 may be colored. When the specific level is 0, the electrochromic element 10200 may be changed to a colored or bleached state due to a polarity of the driving voltage.

An extent of discoloration of the electrochromic element 10200 may be determined by a magnitude of the driving voltage. The extent of discoloration of the electrochromic element 10200 may correspond to the magnitude of the driving voltage. An extent of coloration or bleaching of the electrochromic element 10200 may be determined by the magnitude of the driving voltage. For example, when a driving voltage at a first level is applied to the electrochromic element 10200, the electrochromic element 10200 may be colored to a first extent. When a driving voltage at a second level that is higher than the first level is applied to the electrochromic element 10200, the electrochromic element 10200 may be colored to a second extent that is higher than the first extent. That is, when a voltage at a high level is supplied to the electrochromic element 10200, an extent of coloration of the electrochromic element 10200 may be higher. When the electrochromic element 10200 is a mirror and a higher voltage is supplied to the electrochromic element 10200, the reflectance of the electrochromic element 10200 may be decreased. When the electrochromic element 10200 is a window and a higher voltage is supplied to the electrochromic element 10200, the transmittance of the electrochromic element 10200 may be decreased.

The storage unit 10140 may store data related to the driving voltage. The storage unit 10140 may store a driving voltage corresponding to the extent of discoloration. The storage unit 10140 may store the driving voltage corresponding to the extent of discoloration in the form of a lookup table.

The control unit 10110 may receive an extent of discoloration from outside, load a driving voltage corresponding to the received extent of discoloration from the storage unit 10140, and control the output unit 10130 to generate the driving voltage corresponding to the received extent of discoloration.

Figure 3:
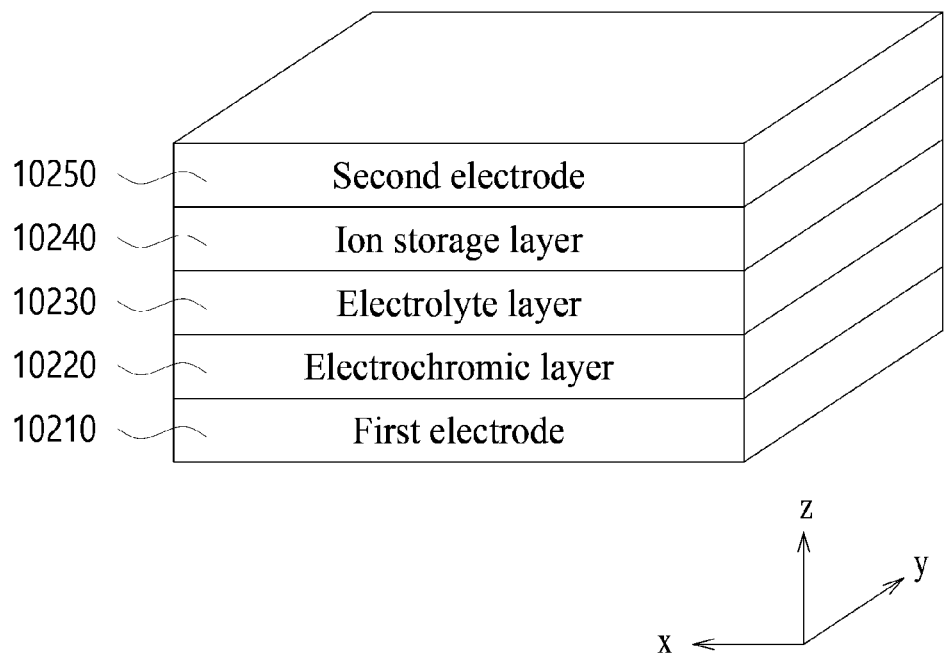
FIG. 3 is a view illustrating an electrochromic element according to an embodiment of the present application.

FIG. 3 is a view illustrating an electrochromic element according to an embodiment of the present application.

Referring to FIG. 3, an electrochromic element 10200 according to an embodiment may include a first electrode 10210, an electrochromic layer 10220, an electrolyte layer 10230, an ion storage layer 10240, and a second electrode 10250.

The first electrode 10210 and the second electrode 10250 may be located to face each other. The electrochromic layer 10220, the electrolyte layer 10230, and the ion storage layer 10240 may be located between the first electrode 10210 and the second electrode 10250.

The first electrode 10210 and the second electrode 10250 may transmit incident light. Any one of the first electrode 10210 and the second electrode 10250 may reflect incident light and the other one may transmit the incident light.

When the electrochromic element 10200 is a window, the first electrode 10210 and the second electrode 10250 may transmit incident light. When the electrochromic element 10200 is a mirror, any one of the first electrode 10210 and the second electrode 10250 may reflect incident light.

When the electrochromic element 10200 is a window, the first electrode 10210 and the second electrode 10250 may be formed with transparent electrodes. The first electrode 10210 and the second electrode 10250 may be formed with a transparent conductive material. The first electrode 10210 and the second electrode 10250 may include a metal which is doped with at least one of indium, tin, zinc, and/or oxide. For example, the first electrode 10210 and the second electrode 10250 may be formed with indium tin oxide (ITO), zinc oxide (ZnO), or indium zinc oxide (IZO).

When the electrochromic element 10200 is a mirror, any one of the first electrode 10210 and the second electrode 10250 may be a transparent electrode, and the other one may be a reflective electrode. For example, the first electrode 10210 may be a reflective electrode, and the second electrode 10250 may be a transparent electrode. In this case, the first electrode 10210 may be formed with a metal material with a high reflectance. The first electrode 10210 may include at least one of aluminum (Al), copper (Cu), molybdenum (Mo), chrome (Cr), titanium (Ti), gold (Au), silver (Ag), and tungsten (W). The second electrode 10250 may be formed with a transparent conductive material.

The electrochromic layer 10220 may be located between the first electrode 10210 and the second electrode 10250. The electrochromic layer 10220 may be located at an upper surface of the first electrode 10210.

An optical property of the electrochromic layer 10220 may be changed due to ion migration in the electrochromic layer 10220. The electrochromic layer 10220 may be discolored due to ion migration in the electrochromic layer 10220.

Ions may be injected into the electrochromic layer 10220. When ions are injected into the electrochromic layer 10220, an optical property of the electrochromic layer 10220 may be changed. When ions are injected into the electrochromic layer 10220, the electrochromic layer 10220 may be discolored. When ions are injected into the electrochromic layer 10220, the electrochromic layer 10220 may be colored or bleached. When ions are injected into the electrochromic layer 10220, a light transmittance and/or a light absorptivity of the electrochromic layer 10220 may be changed. The electrochromic layer 10220 may be reduced by ions being injected into the electrochromic layer 10220. The electrochromic layer 10220 may be reduced and discolored by ions being injected into the electrochromic layer 10220. The electrochromic layer 10220 may be reduced and colored by ions being injected into the electrochromic layer 10220. Alternatively, the electrochromic layer 10220 may be reduced and bleached when ions are injected into the electrochromic layer 10220.

The ions injected into the electrochromic layer 10220 may be released. When the ions in the electrochromic layer 10220 are released, an optical property of the electrochromic layer 10220 may be changed. When the ions in the electrochromic layer 10220 are released, the electrochromic layer 10220 may be discolored. When the ions in the electrochromic layer 10220 are released, the electrochromic layer 10220 may be colored or bleached. When the ions in the electrochromic layer 10220 are released, a light transmittance and/or a light absorptivity of the electrochromic layer 10220 may be changed. The electrochromic layer 10220 may be oxidized by the ions in the electrochromic layer 10220 being released. The electrochromic layer 10220 may be oxidized and discolored by ions in the electrochromic layer 10220 being released. The electrochromic layer 10220 may be oxidized and colored by ions in the electrochromic layer 10220 being released. Alternatively, the electrochromic layer 10220 may be oxidized and bleached when ions in the electrochromic layer 10220 are released.

The electrochromic layer 10220 may be formed with a material that is discolored due to ion migration. The electrochromic layer 10220 may include at least one oxide of TiO, $V_2O_5$, $Nb_2O_5$, $Cr_2O_3$, $FeO_2$, $CoO_2$, $NiO_2$, $RhO_2$, $Ta_2O_5$, $IrO_2$, and $WO_3$. The electrochromic layer 10220 may have a physical internal structure.

The electrolyte layer 10230 may be located on the electrochromic layer 10220. The electrolyte layer 10230 may be located between the electrochromic layer 10220 and the second electrode 10250.

The ion storage layer 10240 may be located on the electrolyte layer 10230. The ion storage layer 10240 may be located between the electrolyte layer 10230 and the second electrode 10250.

The ion storage layer 10240 may store ions. An optical property of the ion storage layer 10240 may be changed due to ion migration. The ion storage layer 10240 may be discolored due to ion migration.

Ions may be injected into the ion storage layer 10240. When ions are injected into the ion storage layer 10240, an optical property of the ion storage layer 10240 may be changed. When ions are injected into the ion storage layer 10240, the ion storage layer 10240 may be discolored. When ions are injected into the ion storage layer 10240, the ion storage layer 10240 may be colored or bleached. When ions are injected into the ion storage layer 10240, a light transmittance and/or a light absorptivity of the ion storage layer 10240 may be changed. The ion storage layer 10240 may be reduced by ions being injected into the ion storage layer 10240. The ion storage layer 10240 may be reduced and discolored by ions being injected into the ion storage layer 10240. The ion storage layer 10240 may be reduced and colored by ions being injected into the ion storage layer 10240. Alternatively, the ion storage layer 10240 may be reduced and bleached when ions are injected into the ion storage layer 10240.

The ions injected into the ion storage layer 10240 may be released. When the ions in the ion storage layer 10240 are released, an optical property of the ion storage layer 10240 may be changed. When the ions in the ion storage layer 10240 are released, the ion storage layer 10240 may be discolored. When the ions in the ion storage layer 10240 are released, the ion storage layer 10240 may be colored or bleached. When the ions in the ion storage layer 10240 are released, a light transmittance and/or a light absorptivity of the ion storage layer 10240 may be changed. The ion storage layer 10240 may be oxidized by the ions in the ion storage layer 10240 being released. The ion storage layer 10240 may be oxidized and discolored by ions in the ion storage layer 10240 being released. The ion storage layer 10240 may be oxidized and colored by ions in the ion storage layer 10240 being released. Alternatively, the ion storage layer 10240 may be oxidized and bleached when ions in the ion storage layer 10240 are released.

The ion storage layer 10240 may be formed with a material that is discolored due to ion migration. The ion storage layer 10240 may include at least one oxide of $IrO_2$, $NiO_2$, $MnO_2$, $CoO_2$, iridium-magnesium oxide, nickel-magnesium oxide, and titanium-vanadium oxide. The ion storage layer 10240 may have a physical internal structure. The physical internal structure of the ion storage layer 10240 may be different from the physical internal structure of the electrochromic layer 10220.

The electrolyte layer 10230 may be an ion migration path between the electrochromic layer 10220 and the ion storage layer 10240. The electrochromic layer 10220 and the ion storage layer 10240 may exchange ions via the electrolyte layer 10230. The electrochromic layer 10220 may serve as a migration path for ions but may serve as a barrier for electrons. That is, although ions may migrate through the electrochromic layer 10220, electrons are unable to migrate therethrough. In other words, the electrochromic layer 10220 and the ion storage layer 10240 may exchange ions through the electrolyte layer 10230 but are unable to exchange electrons through the electrolyte layer 10230.

The electrolyte layer 10230 may include an insulating material. The electrolyte layer 10230 may be a solid. The electrolyte layer 10230 may include at least one of $SiO_2$, $Al_2O_3$, $Nb_2O_3$, $Ta_2O_5$, $LiTaO_3$, $LiNbO_3$, $La_2TiO_7$, $La_2TiO_7$, $SrZrO_3$, $ZrO_2$, $Y_2O_3$, $Nb_2O_5$, $La_2Ti_2O_7$, $LaTiO_3$, and $HfO_2$.

When ions in the electrochromic layer 10220 are released, the released ions may be injected into the ion storage layer 10240, and when ions in the ion storage layer 10240 are released, the released ions may be injected into the electrochromic layer 10220. The ions may migrate through the electrolyte layer 10230.

Chemical reactions that occur in the electrochromic layer 10220 and the ion storage layer 10240 may be different reactions. Chemical reactions opposite to each other may occur in the electrochromic layer 10220 and the ion storage layer 10240. When the electrochromic layer 10220 is oxidized, the ion storage layer 10240 may be reduced. When the electrochromic layer 10220 is reduced, the ion storage layer 10240 may be oxidized.

Accordingly, the ion storage layer 10240 may serve as a counter electrode of the electrochromic layer 10220.

States of the electrochromic layer 10220 and the ion storage layer 10240 may be changed due to ion migration.

State changes that correspond to each other may be caused in the electrochromic layer 10220 and the ion storage layer 10240. For example, when the electrochromic layer 10220 is colored, the ion storage layer 10240 may also be colored, and when the electrochromic layer 10220 is bleached, and the ion storage layer 10240 may also be bleached. When the electrochromic layer 10220 is oxidized and colored, the ion storage layer 10240 may be reduced and colored, and when the electrochromic layer 10220 is reduced and colored, the ion storage layer 10240 may be oxidized and colored.

State changes that are different from each other may be caused in the electrochromic layer 10220 and the ion storage layer 10240. For example, when the electrochromic layer 10220 is colored, and the ion storage layer 10240 may be bleached, and when the electrochromic layer 10220 is bleached, the ion storage layer 10240 may be colored. When the electrochromic layer 10220 is oxidized and colored, the ion storage layer 10240 may be reduced and bleached, and when the electrochromic layer 10220 is oxidized and bleached, the ion storage layer 10240 may be reduced and colored. The electrochromic layer 10220 and the ion storage layer 10240 may have transmittances different from each other. By the electrochromic layer 10220 and the ion storage layer 10240 having transmittances different from each other, the transmittances may be adjusted also by the different state changes of the electrochromic layer 10220 and the ion storage layer 10240.

For example, because a transmittance of the electrochromic element 10200 may be determined by a transmittance of a colored layer, when the electrochromic layer 10220 is colored in a case in which a transmittance when the electrochromic layer 10220 is colored is lower than a transmittance when the ion storage layer 10240 is colored, the transmittance of the electrochromic element 10200 may be lower than the transmittance of the electrochromic element 10200 when the ion storage layer 10240 is colored. Consequently, the transmittance of the electrochromic element 10200 may be controlled by changing a colored layer.

Figure 4:
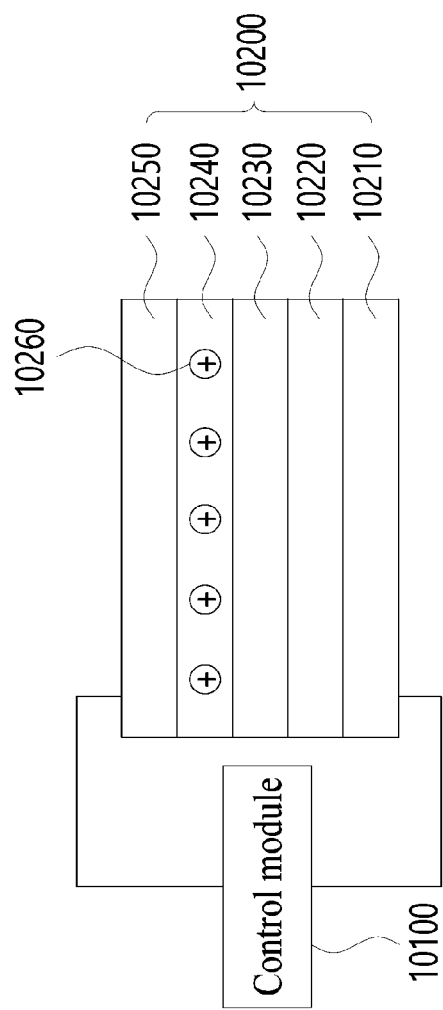
FIGS. 4 to 6 are views illustrating a state change during coloration of the electrochromic device according to an embodiment of the present application.
Figure 5:
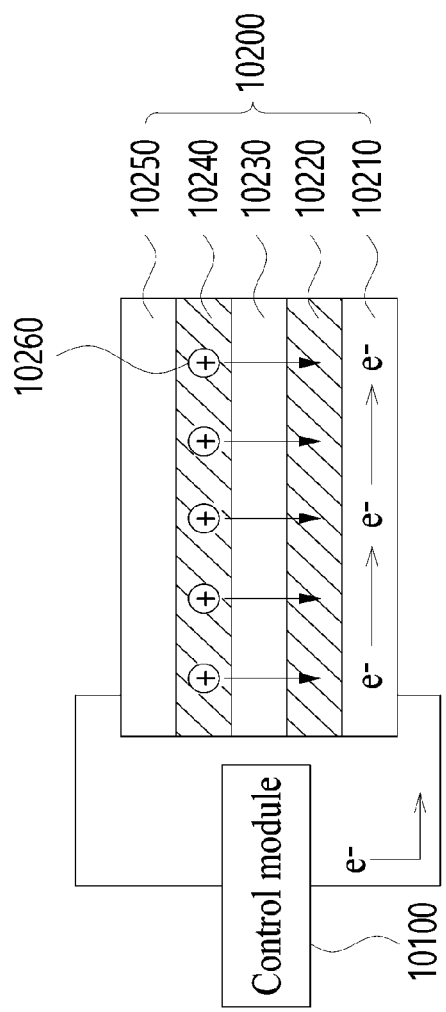
Figure 6:
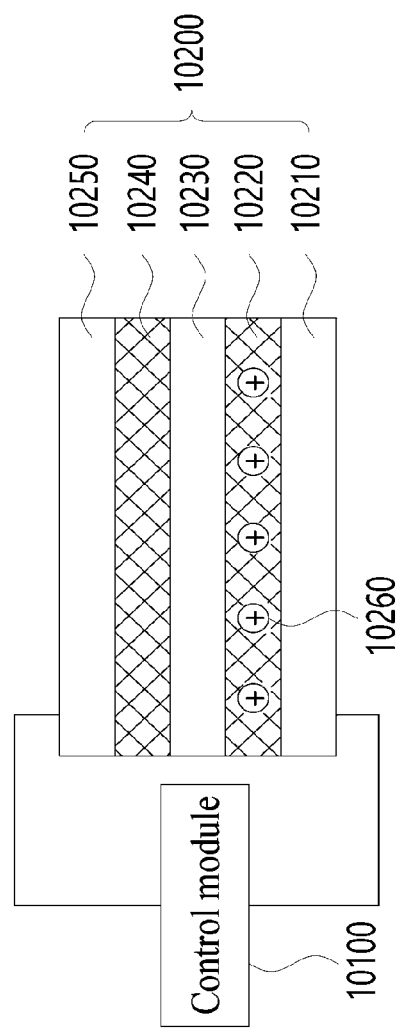

FIGS. 4 to 6 are views illustrating a state change during coloration of the electrochromic device according to an embodiment of the present application.

FIG. 4 is a view illustrating the electrochromic device in an initial state.

Referring to FIG. 4, the electrochromic element 10200 in the initial state according to an embodiment is electrically connected to the control module 10100.

The control module 10100 may be electrically connected to the first electrode 10210 and the second electrode 10250 and supply a voltage to the first electrode 10210 and the second electrode 10250.

A plurality of ions 10260 may be located in the ion storage layer 10240. The plurality of ions 10260 may be injected into the ion storage layer 10240 in a formation process of the ion storage layer 10240. The ions 10260 may be at least one of H+ and Li+.

Although the plurality of ions 10260 are illustrated in the drawings as being located in the ion storage layer 10240, the ions may also be located in at least one of the electrochromic layer 10220 and the electrolyte layer 10230 in the initial state. That is, ions may also be injected in to the electrochromic layer 10220 and the electrolyte layer 10230 in formation processes of the electrochromic layer 10220 and the electrolyte layer 10230.

Due to the plurality of ions 10260 located in the ion storage layer 10240, the ion storage layer 10240 may be in a reduced and bleached state. The ion storage layer 10240 may be in a state capable of transmitting light.

Referring to FIG. 5, the control module 10100 applies a voltage to the electrochromic element 10200.

The control module 10100 may apply a voltage to the first electrode 10210 and the second electrode 10250. The control module 10100 may apply a low voltage to the first electrode 10210 and apply a high voltage to the second electrode 10250. Here, the high voltage and the low voltage are relative concepts, and a voltage applied to the second electrode 10250 may be a voltage at a relatively higher level than a voltage applied to the first electrode 10210. A potential difference is generated between the first electrode 10210 and the second electrode 10250 due to the voltages applied to the first electrode 10210 and the second electrode 10250.

By the voltages being applied to the first electrode 10210 and the second electrode 10250, electrons may be injected into the first electrode 10210. The electrons may migrate toward the first electrode 10210 from the control module 10100. Because the control module 10100 and the first electrode 10210 are connected to each other at a contact region at one side of the first electrode 10210, electrons migrated to the contact region through the control module 10100 may migrate to the other side of the first electrode 10210 along the first electrode 10210. Electrons are disposed in the entire region of the first electrode 10210 by the electron migration from the one side to the other side of the first electrode 10210.

Because the electrons have different polarities from the plurality of ions 10260 in the ion storage layer 10240, the electrons and the ions 10260 may migrate in a direction approaching each other due to a Coulomb force between the electrons and the plurality of ions. The electrons and the ions 10260 may migrate to the electrochromic layer 10220 due to the Coulomb force between the electrons and the ions. The electrons may migrate toward the second electrode 10250 due to the Coulomb force with the ions and be injected into the electrochromic layer 10220. The ions 10260 may migrate toward the first electrode 10210 due to the Coulomb force with the electrons and be injected into the electrochromic layer 10220. Here, because the electrolyte layer 10230 serves as a migration path for the ions 10260 and blocks migration of the electrons, the electrons and the ions 10260 may stay in the electrochromic layer 10220.

By the ions 10260 being injected into the electrochromic layer 10220, the electrochromic layer 10220 that gained the ions may be reduced and colored, and the ion storage layer 10240 that lost the ions may be oxidized and colored. That is, the electrochromic element 10200 may be discolored due to migration of the ions 10260. More specifically, the electrochromic element 10200 may be colored due to migration of the ions 10260.

Migration of the electrons in a horizontal direction in the first electrode 10210 and migration of the electrons in a vertical direction toward the second electrode 10250 may occur simultaneously. That is, the electrons may migrate toward the second electrode 10250 while migrating in the horizontal direction in the first electrode 10210 and be injected into the electrochromic layer 10220. Due to the complex migration of the electrons in the horizontal direction and the vertical direction, the ions 10260 located in the ion storage layer 10240 may also migrate first in a region into which the electrons are injected.

That is, ions in a region adjacent to the contact region in which the first electrode 10210 and the control module 10100 are electrically connected may migrate first to the electrochromic layer 10220, and ions in a region spaced apart from the contact region in which the first electrode 10210 and the control module 10100 are electrically connected may migrate later to the electrochromic layer 10220. In this way, a region of the electrochromic element 10200 adjacent to the contact region may be discolored first, and a region of the electrochromic element 10200 spaced apart from the contact region may be discolored later. For example, when the contact region is located at an outer boundary region of the electrochromic element 10200, the electrochromic element 10200 may be discolored in an order from the outer boundary region to a central region. That is, the electrochromic element 10200 may be sequentially colored from the outer boundary region to the central region.

The extent of discoloration of the electrochromic element 10200 may be proportional to the number of electrons injected by the control module 10100. The extent of discoloration of the electrochromic element 10200 may be proportional to the extent of discoloration of the electrochromic layer 10220 and the ion storage layer 10240. The number of electrons injected by the control module 10100 may be determined by magnitudes of the voltages applied to the first electrode 10210 and the second electrode 10250 by the control module 10100. The number of electrons injected by the control module 10100 may be determined by the potential difference between the first electrode 10210 and the second electrode 10250. That is, by regulating a level of a voltage applied to the electrochromic element 10200, the control module 10100 may control the extent of discoloration of the electrochromic element 10200.

FIG. 6 is a view illustrating a location of ions when discoloration is completed in the electrochromic element 10200.

Referring to FIG. 6, when injection of the electrons injected by the control module 10100 and the ions 10260 migrated due to the electrons into the electrochromic layer 10220 is completed, the state of the electrochromic element 10200 is maintained.

That is, the colored state of the electrochromic element 10200 is maintained. This may be referred to as a memory effect.

Even when a voltage is not applied to the electrochromic element 10200 by the control module 10100, the ions present in the electrochromic layer 10220 stay in the electrochromic layer 10220, and in this way, the colored state of the electrochromic element 10200 may be maintained.

Figure 7:
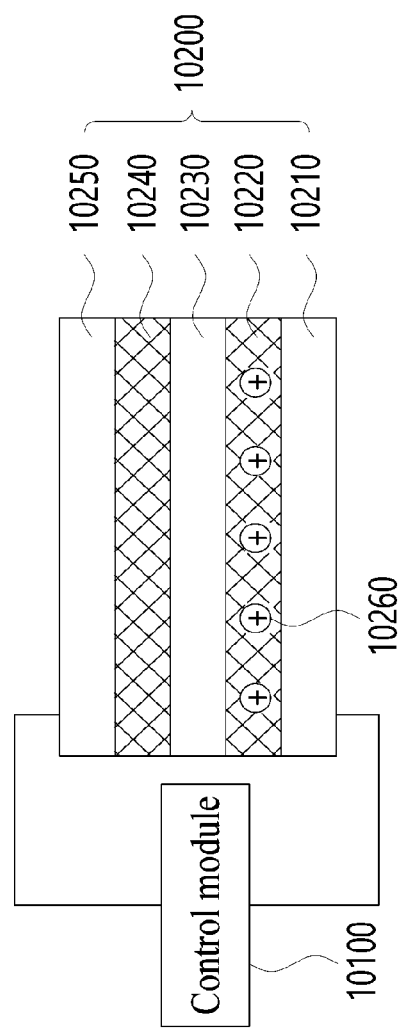
FIGS. 7 to 9 are views illustrating a state change during bleaching of the electrochromic device according to an embodiment of the present application.
Figure 8:
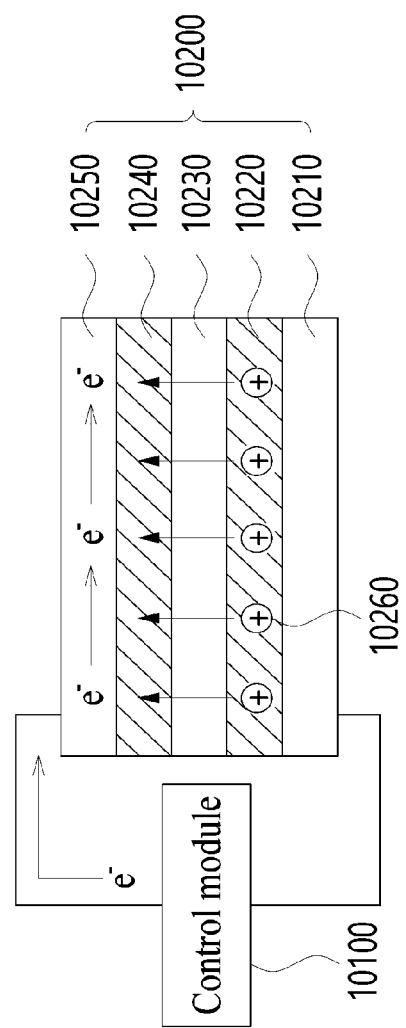
Figure 9:
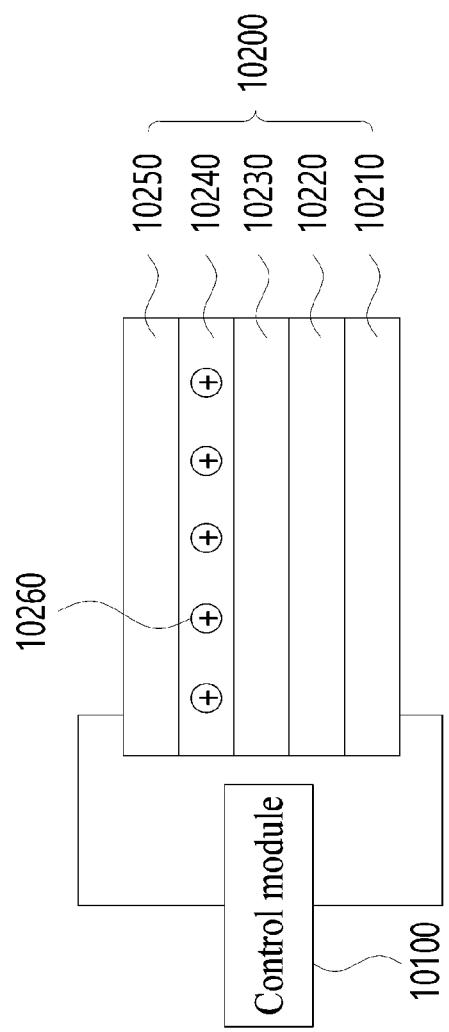

FIGS. 7 to 9 are views illustrating a state change during bleaching of the electrochromic device according to an embodiment of the present application.

FIG. 7 is a view illustrating the electrochromic device in an initial state.

Referring to FIG. 7, the electrochromic element 10200 in the initial state according to an embodiment is electrically connected to the control module 10100.

Because the electrochromic element 10200 is in a colored state, the plurality of ions 10260 may be located in the electrochromic layer 10220.

Due to the plurality of ions 10260 located in the electrochromic element 10200, the electrochromic layer 10220 may be in an oxidized and colored state, and the ion storage layer 10240 may be in a reduced and colored state.

Referring to FIG. 8, the control module 10100 applies a voltage to the electrochromic element 10200.

The control module 10100 may apply a voltage to the first electrode 10210 and the second electrode 10250. The control module 10100 may apply a high voltage to the first electrode 10210 and apply a low voltage to the second electrode 10250. Here, the high voltage and the low voltage are relative concepts, and a voltage applied to the first electrode 10210 may be a voltage at a relatively higher level than a voltage applied to the second electrode 10250. A potential difference is generated between the first electrode 10210 and the second electrode 10250 due to the voltages applied to the first electrode 10210 and the second electrode 10250. The potential difference in the bleaching process may be in an opposite direction of the potential difference in the coloring process of FIGS. 4 to 6. That is, a voltage applied to the first electrode 10210 may be a voltage at a lower level than a voltage applied to the second electrode 10250 in the coloring process, and a voltage applied to the first electrode 10210 may be a voltage at a higher level than a voltage applied to the second electrode 10250 in the bleaching process.

By the voltages being applied to the first electrode 10210 and the second electrode 10250, electrons may be injected into the second electrode 10250. The electrons may migrate toward the second electrode 10250 from the control module 10100. Because the control module 10100 and the second electrode 10250 are connected to each other at a contact region at one side of the second electrode 10250, electrons migrated to the contact region through the control module 10100 may migrate to the other side of the second electrode 10250 along the second electrode 10250. Electrons are disposed in the entire region of the second electrode 10250 by the electron migration from the one side to the other side of the second electrode 10250.

Because the electrons have different polarities from the plurality of ions 10260 in the electrochromic layer 10220, the electrons and the ions 10260 may migrate in a direction approaching each other due to a Coulomb force between the electrons and the plurality of ions. The electrons and the ions 10260 may migrate to the ion storage layer 10240 due to the Coulomb force between the electrons and the ions 10260. The electrons may migrate toward the first electrode 10210 due to the Coulomb force with the ions 10260 and be injected into the ion storage layer 10240. The ions 10260 may migrate toward the second electrode 10250 due to the Coulomb force with the electrons and be injected into the ion storage layer 10240. Here, because the electrolyte layer 10230 serves as a migration path for the ions 10260 and blocks migration of the electrons, the electrons and the ions 10260 may stay in the ion storage layer 10240.

By the ions 10260 being injected into the ion storage layer 10240, the ion storage layer 10240 that gained the ions may be oxidized and bleached, and the electrochromic layer 10220 that lost the ions may be reduced and bleached. That is, the electrochromic element 10200 may be discolored due to migration of the ions 10260. More specifically, the electrochromic element 10200 may be bleached due to migration of the ions 10260.

Migration of the electrons in a horizontal direction in the second electrode 10250 and migration of the electrons in a vertical direction toward the first electrode 10210 may occur simultaneously. That is, the electrons may migrate toward the first electrode 10210 while migrating in the horizontal direction in the second electrode 10250 and be injected into the ion storage layer 10240. Due to the complex migration of the electrons in the horizontal direction and the vertical direction, the ions 10260 located in the electrochromic layer 10220 may also migrate first in a region into which the electrons are injected.

That is, ions in a region adjacent to the contact region in which the second electrode 10250 and the control module 10100 are electrically connected may migrate first to the ion storage layer 10240, and ions in a region spaced apart from the contact region in which the second electrode 10250 and the control module 10100 are electrically connected may migrate later to the ion storage layer 10240. In this way, a region of the electrochromic element 10200 adjacent to the contact region may be discolored first, and a region of the electrochromic element 10200 spaced apart from the contact region may be discolored later. For example, when the contact region is located at an outer boundary region of the electrochromic element 10200, the electrochromic element 10200 may be discolored in an order from the outer boundary region to a central region. That is, the electrochromic element 10200 may be sequentially colored from the outer boundary region to the central region.

FIG. 9 is a view illustrating a location of ions when discoloration is completed in the electrochromic element 10200.

Referring to FIG. 9, when injection of the electrons injected by the control module 10100 and the ions 10260 migrated due to the electrons into the ion storage layer 10240 is completed, the state of the electrochromic element 10200 is maintained.

That is, the bleached state of the electrochromic element 10200 may be maintained.

1.1. Voltage Application to Electrochromic Element

Figure 10:
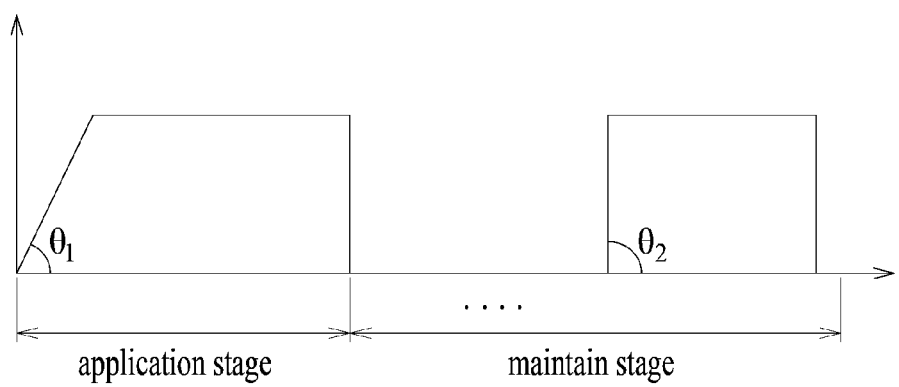
FIG. 10 is a view illustrating a voltage applied to the electrochromic device according to an embodiment of the present application.

FIG. 10 is a view illustrating a voltage applied to the electrochromic device according to an embodiment of the present application.

Referring to FIG. 10, in the electrochromic device according to an embodiment, the control module 10100 may apply power to the electrochromic element 10200.

The control module 10100 may apply a voltage to the electrochromic element 10200. The voltage applied here may be a potential difference applied between the first electrode 10210 and the second electrode 10250.

The control module 10100 may apply a voltage to the electrochromic element 10200 in an application stage and a maintenance stage.

The application stage may be a stage in which the electrochromic element 10200 is discolored by the control module 10100. The application stage may be a stage in which the electrochromic element 10200 is discolored to a target discoloration level by the control module 10100. The application stage may include an initial discoloration stage and a discoloration level changing stage.

The initial discoloration stage may be defined as a stage in which a voltage for discoloring the electrochromic element 10200 is applied to the electrochromic element 10200 in a state in which a voltage is not applied to the electrochromic element 10200. The discoloration level changing stage may be defined as a stage in which the electrochromic element 10200 is discolored to a different discoloration level in a state in which the electrochromic element 10200 is discolored to a specific discoloration level.

The maintenance stage refers to a stage in which a maintenance voltage is applied to the electrochromic element 10200 to maintain a state of the electrochromic element 10200. The control module 10100 may apply a maintenance voltage in the form of a pulse to the electrochromic element 10200 to maintain the state of the electrochromic element 10200 in the maintenance stage. The control module 10100 may periodically apply a maintenance voltage in the form of a pulse to the electrochromic element 10200 to maintain the state of the electrochromic element 10200 in the maintenance stage.

That is, in the maintenance stage, instead of continuously applying the voltage to the electrochromic element 10200, the control module 10100 may apply a voltage at a high level to the electrochromic element 10200 during a specific period and apply a voltage at a low level to the electrochromic element 10200 during the remaining period. The control module 10100 may periodically apply a voltage at a high level to the electrochromic element 10200 and apply a voltage at a low level to the electrochromic element 10200 during the remaining period. In the maintenance stage, by applying a maintenance voltage in the form of a pulse to the electrochromic element 10200, the control module 10100 may reduce power consumption for state maintenance in comparison to a method of continuously applying a voltage to the electrochromic element 10200.

With respect to the electrochromic element 10200, a period except the application stage may be referred to as the maintenance stage, and the control module 10100 may apply a maintenance voltage in the form of a pulse to the electrochromic element 10200 at predetermined intervals during the maintenance stage. By applying a maintenance voltage to the electrochromic element 10200 in the maintenance stage, the control module 10100 may return the electrochromic element 10200 that is naturally discolored to a different discoloration level, which is not a target discoloration level, with time to the target discoloration level and maintain the electrochromic element 10200 to be discolored at the target discoloration level.

Because natural discoloration of the electrochromic element 10200 is proportional to time after the application stage is ended, a cycle of the maintenance voltage in the form of a pulse that is applied in the maintenance stage may be controlled in accordance with when the application stage is ended. For example, when a period after the application stage of the electrochromic element 10200 is ended is relatively long, the control module 10100 may set a period during which the maintenance voltage at a high level is applied to the electrochromic element 10200 to be relatively long, and when the time after the application stage of the electrochromic element 10200 is ended is relatively short, the control module 10100 may set a period during which the maintenance voltage at a high level is applied to the electrochromic element 10200 to be relatively short.

The natural discoloration of the electrochromic element 10200 may be proportional to a discoloration level of the electrochromic element that is discolored in the application stage.

That is, the electrochromic element 10200 having a relatively high extent of discoloration in the application stage may have a relatively high extent of natural discoloration. In other words, in the case of the electrochromic element 10200 with a high extent of discoloration in the application stage, a difference between a target discoloration level in the application stage and a discoloration level after the natural discoloration may be relatively large. In this case, the control module 10100 may maintain a period during which the maintenance voltage at a high level is applied to the electrochromic element 10200 to be relatively long for the electrochromic element 10200 having a high extent of discoloration in the application stage.

The electrochromic element 10200 having a relatively low extent of discoloration in the application stage may have a relatively low extent of natural discoloration. In other words, in the case of the electrochromic element 10200 with a low extent of discoloration in the application stage, the difference between the target discoloration level in the application stage and the discoloration level after the natural discoloration may be relatively small. In this case, the control module 10100 may maintain a period during which the maintenance voltage at a high level is applied to the electrochromic element 10200 to be relatively short for the electrochromic element 10200 having a low extent of discoloration in the application stage.

In the application stage, the control module 10100 may maintain a voltage at a predetermined level after a rise period. The rise period in the application stage may be different from a rise period in the maintenance stage. The rise period in the application stage may be longer than the rise period in the maintenance stage.

In the application stage, the control module 10100 may apply a voltage so that a slope of the applied voltage has a first angle θ1 during the rise period and then maintain the voltage at a predetermined level. In the maintenance stage, the control module 10100 may apply a voltage so that a slope of the applied voltage has a second angle θ2 during the rise period and then maintain the voltage at a predetermined level. The first angle θ1 may be different from the second angle θ2. The first angle θ1 may be smaller than the second angle θ2. The second angle θ1 may be a right angle.

In the application stage, the control module 10100 may relatively gradually increase a voltage applied to the electrochromic element 10200 to prevent an inner portion of the electrochromic element 10200 from being electrically damaged. That is, in the application stage, the control module 10100 may set the rise period to be relatively long and prevent the inner portion of the electrochromic element 10200 from being electrically damaged. In other words, in the application stage, the control module 10100 may apply a voltage so that the first angle θ1 is an acute angle and prevent the inner portion of the electrochromic element 10200 from being damaged.

The first angle θ1 may be changed on the basis of an applied voltage at a predetermined level. Because damage to the inner portion of the electrochromic element 10200 depends on a magnitude of an applied voltage at a predetermined level, the first angle θ1 may be increased when the magnitude of the voltage at the predetermined level is large, and the first angle θ1 may be decreased when the magnitude of the voltage at the predetermined level is small.

In the maintenance stage, because an internal voltage is present in the electrochromic element 10200 due to discoloration, the inner portion of the electrochromic element 10200 may not be electrically damaged even when the voltage sharply increases. Consequently, in the maintenance stage, the control module may set the rise period to be relatively short and increase a speed at which the electrochromic element 10200 is restored to a target discoloration level.

However, when the electrochromic element 10200 is returned to an initial state, in which the electrochromic element 10200 is not discolored, due to natural discoloration, a voltage in which the second angle θ2 is an acute angle may be applied to the electrochromic element 10200 even during the maintenance stage.

1.2. Coloring Process of Electrochromic Device

Figure 11:
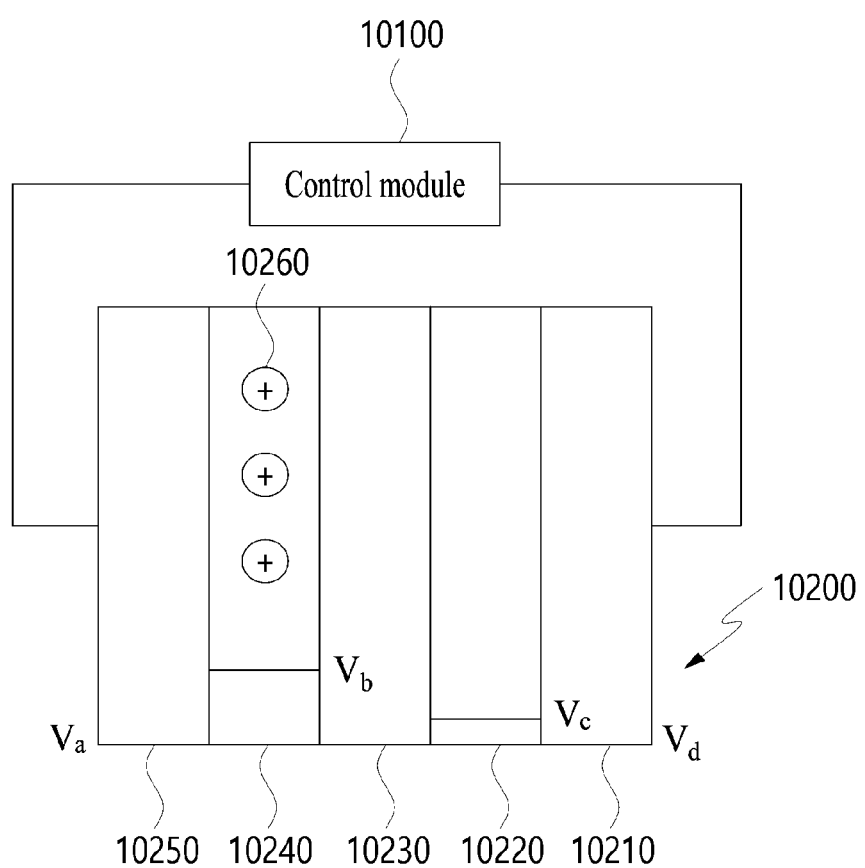
FIG. 11 is a view illustrating an internal potential in the electrochromic device before a voltage is applied to the electrochromic device according to an embodiment of the present application.

FIG. 11 is a view illustrating an internal potential in the electrochromic device before a voltage is applied to the electrochromic device according to an embodiment of the present application.

Referring to FIG. 11, the electrochromic element 10200 may be connected to the control module 10100. The electrochromic element 10200 may include the first electrode 10210, the electrochromic layer 10220, the electrolyte layer 10230, the ion storage layer 10240, and the second electrode 10250.

Before a voltage is applied to the electrochromic element 10200, the electrochromic element 10200 may be in a bleached state. The plurality of ions 10260 may be located in the ion storage layer 10240 of the electrochromic element 10200.

Each of the layers of the electrochromic element 10200 may have an internal potential. The internal potential may be a potential based on a ground. An internal potential of the second electrode 10250 may be defined as a first internal potential Va, an internal potential of the ion storage layer 10240 may be defined as a second internal potential Vb, an internal potential of the electrochromic layer 10220 may be defined as a third internal potential Vc, and an internal potential of the first electrode 10210 may be defined as a fourth internal potential Vd.

When a voltage is not applied to the electrochromic element 10200, because a voltage is not applied to the first electrode 10210 and the second electrode 10250, the first internal potential Va and the fourth internal potential Vd may be 0.

The electrochromic layer 10220 and the ion storage layer 10240 may have an internal potential. The second internal potential Vb of the ion storage layer 10240 and the third internal potential Vc of the electrochromic layer 10220 may have different values.

The second internal potential Vb and the third internal potential Vc may be built-in potentials. The second internal potential Vb and the third internal potential Vc may be changed due to at least one of a material characteristic of the respective layers, a relationship with a material of an adjacent layer, and ions included in the respective layers.

The second internal potential Vb may be determined by an energy level of a material constituting the ion storage layer 10240.

Alternatively, the second internal potential Vb may be determined by a difference between energy levels of the ion storage layer 10240 and the electrolyte layer 10230. Alternatively, the second internal potential Vb may be determined by a difference between energy levels of the ion storage layer 10240 and the second electrode 10250. Even when the second internal potential Vb is determined by a difference between energy levels of the ion storage layer 10240 and a layer adjacent to the ion storage layer 10240, the second internal potential Vb may be marked as an internal potential of the ion storage layer 10240 as illustrated in FIG. 11.

The second internal potential Vb may be determined by the ions 10260 included in the ion storage layer 10240. The second internal potential Vb may be determined by the number of the ions 10260 included in the ion storage layer 10240.

The second internal potential Vb may be determined by at least one of an energy level of the above-described ion storage layer 10240 itself, a difference between energy levels of the ion storage layer 10240 and a layer adjacent to the ion storage layer 10240, and the ions 10260 included in the ion storage layer 10240. Alternatively, the second internal potential Vb may be determined by a combination of the energy level of the above-described ion storage layer 10240 itself, a difference between energy levels of the ion storage layer 10240 and a layer adjacent to the ion storage layer 10240, and the ions 10260 included in the ion storage layer 10240.

The third internal potential Vc may be determined by an energy level of a material constituting the electrochromic layer 10220.

Alternatively, the third internal potential Vc may be determined by a difference between energy levels of the electrochromic layer 10220 and the first electrode 10210. Alternatively, the third internal potential Vc may be determined by a difference between energy levels of the electrochromic layer 10220 and the electrolyte layer 10230. Even when the third internal potential Vc is determined by a difference between energy levels of the electrochromic layer 10220 and a layer adjacent to the electrochromic layer 10220, the third internal potential may be marked as an internal potential of the electrochromic layer 10220 as illustrated in FIG. 11.

The third internal potential Vc may be determined by ions included in the electrochromic layer 10220. The third potential Vc may be determined by the number of ions included in the electrochromic layer 10220.

The third internal potential Vc may be determined by at least one of an energy level of the above-described electrochromic layer 10220 itself, a difference between energy levels of electrochromic layer 10220 and a layer adjacent to the electrochromic layer 10220, and the ions 10260 included in the electrochromic layer 10220. Alternatively, the third internal potential Vc may be determined by a combination of the energy level of the above-described electrochromic layer 10220 itself, a difference between energy levels of the electrochromic layer 10220 and a layer adjacent to the electrochromic layer 10220, and the ions 10260 included in the electrochromic layer 10220.

Figure 12:
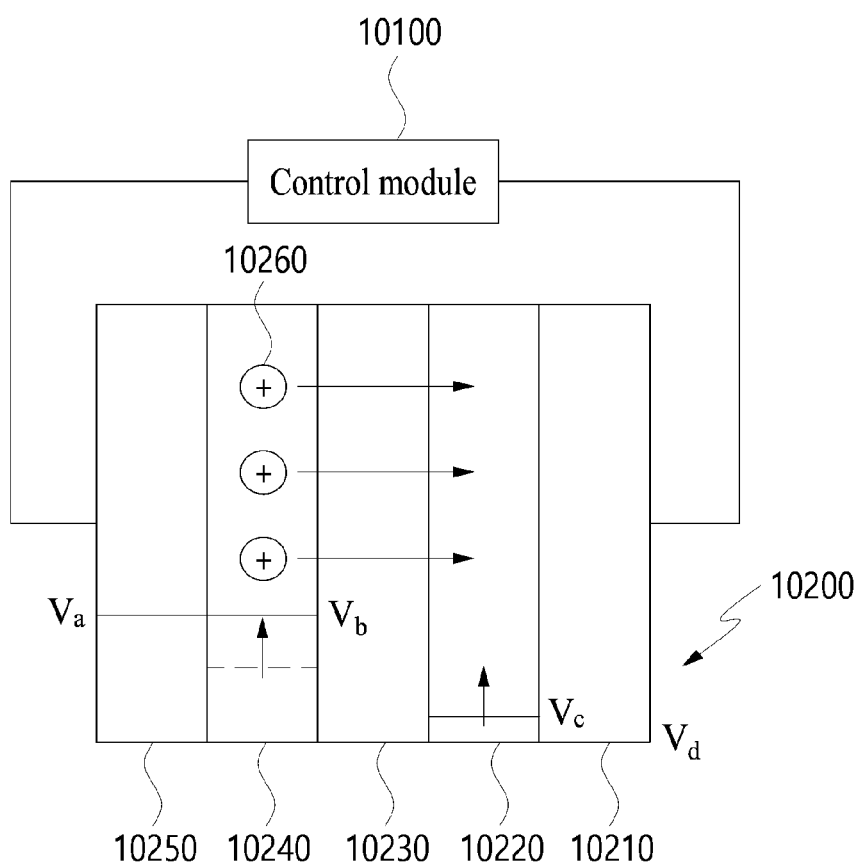
FIG. 12 is a view illustrating a change in a potential in an initial stage of coloration in the electrochromic device according to an embodiment of the present application.

FIG. 12 is a view illustrating a change in a potential in an initial stage of coloration in the electrochromic device according to an embodiment of the present application.

Referring to FIG. 12, the electrochromic element 10200 according to an embodiment may be electrically connected to the control module 10100.

The control module 10100 may supply a voltage to the electrochromic element 10200. The control module 10100 may supply a voltage to the first electrode 10210 and the second electrode 10250 of the electrochromic element 10200. The control module 10100 may apply a low voltage to the first electrode 10210 and apply a high voltage to the second electrode 10250.

As a high voltage is applied to the second electrode 10250, the internal potential of the second electrode 10250 may rise corresponding to the applied high voltage. The first internal potential Va of the second electrode 10250 may rise to correspond to the voltage supplied to the second electrode 10250 by the control module 10100.

Because the second electrode 10250 and the ion storage layer 10240 are electrically connected, as the internal potential of the second electrode 10250 rises, the internal potential of the ion storage layer 10240 also rises. Due to the rise of the first internal potential Va, the second internal potential Vb also rises corresponding to the first internal potential Va. The first internal potential Va and the second internal potential Vb may be at the same level. Alternatively, the first internal potential Va and the second internal potential Vb may be at different levels. The first internal potential Va may have a higher value than the second internal potential Vb.

As the internal potential of the ion storage layer 10240 rises, a potential difference may be generated between the ion storage layer 10240 and the electrochromic layer 10220. A potential difference between the second internal potential Vb and the third internal potential Vc may be generated due to the rise of the second internal potential Vb.

The ions 10260 present in the ion storage layer 10240 may migrate due to the potential difference between the second internal potential Vb and the third internal potential Vc. The ions 10260 may migrate to the electrochromic layer 10220 via the electrolyte layer 10230 due to the potential difference between the second internal potential Vb and the third internal potential Vc.

When the potential difference between the second internal potential Vb and the third internal potential Vc is higher than a predetermined range, the ions 10260 may migrate to the electrochromic layer 10220 via the electrolyte layer 10230. The electrochromic layer 10220 and the ion storage layer 10240 may be discolored due to the migration of the ions 10260. By the ions 10260 migrating from the ion storage layer 10240 to the electrochromic layer 10220, the ion storage layer 10240 may be oxidized and discolored due to losing the ions 10260, and the electrochromic layer 10220 may be reduced and discolored due to gaining the ions 10260. The ion storage layer 10240 may be oxidized and colored due to losing the ions 10260, and the electrochromic layer 10220 may be reduced and colored due to gaining the ions 10260. By the ion storage layer 10240 and the electrochromic layer 10220 being colored, the electrochromic element 10200 may be colored. By the ion storage layer 10240 and the electrochromic layer 10220 being colored, the transmittance of the electrochromic element 10200 may be decreased.

The ions 10260 in the ion storage layer 10240 may be present in a state in which the ions 10260 are bonded to the material constituting the ion storage layer 10240. The ions 10260 in the ion storage layer 10240 may be present in the form in which the ions 10260 are physically inserted between particles of the material constituting the ions storage layer 10240. Alternatively, the ions in the ion storage layer 10240 may be present in the state in which the ions are chemically bonded to the material constituting the ion storage layer 10240.

A potential difference higher than the predetermined range is required to release bonding between the ions 10260 present in the ion storage layer 10240 and the material constituting the ion storage layer 10240. A minimum voltage required to release the bonding between the ions 10260 and the material constituting the ion storage layer 10240 may be defined as a first threshold voltage Vth1. When the potential difference between the second internal potential Vb and the third internal potential Vc is the first threshold voltage Vth1 or higher, the ions 10260 may migrate to the electrochromic layer 10220.

By the ions 10260 migrating to the electrochromic layer 10220, the internal potential of the electrochromic layer 10220 may rise. By the ions 10260 migrating to the electrochromic layer 10220, the third internal potential Vc may rise.

Figure 13:
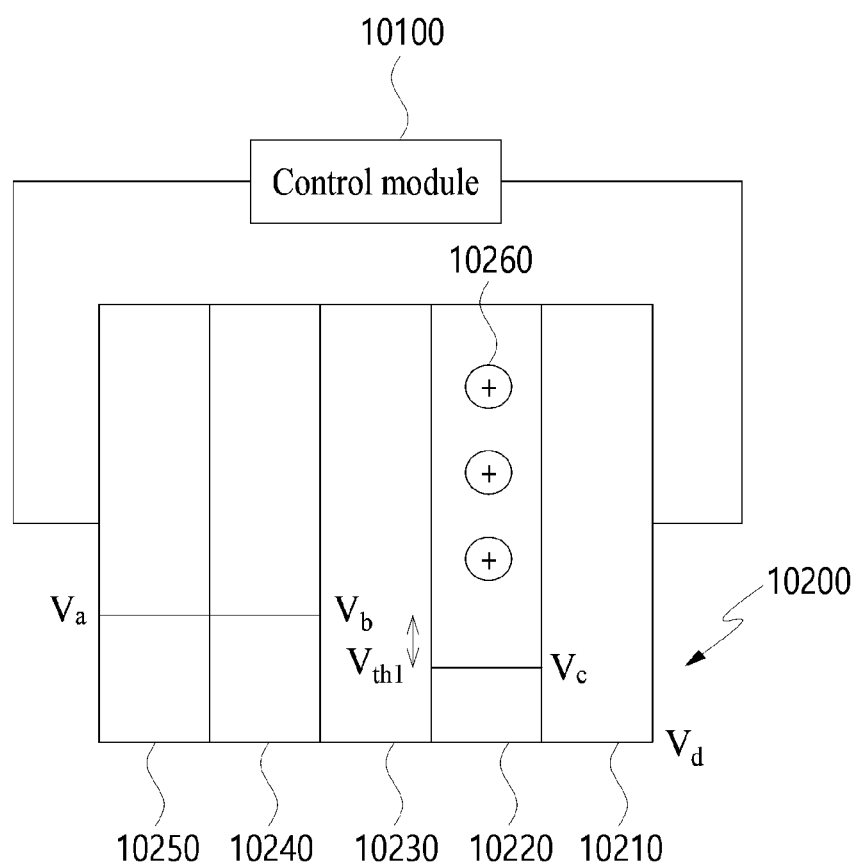
FIG. 13 is a view illustrating a change in a potential in a completion stage of coloration in the electrochromic device according to an embodiment of the present application.

FIG. 13 is a view illustrating a change in a potential in a completion stage of coloration in the electrochromic device according to an embodiment of the present application.

Referring to FIG. 13, the electrochromic element 10200 according to an embodiment may be connected to the control module 10100 and receive a voltage.

The second internal potential Vb rises due to the high voltage that is applied to the second electrode 10250 in FIG. 12, and the ions 10260 present in the ion storage layer 10240 migrate due to the potential difference between the second internal potential Vb and the third internal potential Vc.

FIG. 13 illustrates a state in which migration of the ions 10260 is completed. By the ions 10260 migrating to the electrochromic layer 10220, the internal potential of the electrochromic layer 10220 may rise. By the ions 10260 migrating to the electrochromic layer 10220, the third internal potential Vc may rise.

The internal potential of the electrochromic layer 10220 may rise to a predetermined level. The third internal potential Vc may rise to the predetermined level. The third internal potential Vc may rise until a difference between the third internal potential Vc and the second internal potential Vb is the predetermined level. The third internal potential Vc may rise until the third internal potential Vc differs from the second internal potential Vb by the first threshold voltage Vth1. That is, in the coloration completion stage, the difference between the third internal potential Vc and the second internal potential Vb may be the same as a magnitude of the first threshold voltage Vth1.

The ions 10260 migrate in accordance with the potential difference between the second internal potential Vb and the third internal potential Vc, and the third internal potential Vc also rises due to the migration of the ions 10260. When the difference between the second internal potential Vb and the third internal potential Vc is less than the magnitude of the first threshold voltage Vth1, the ions 10260 are unable to migrate. Consequently, the third internal potential Vc may rise only up to a value resulting from subtracting the first threshold voltage Vth1 from the second internal potential Vb. The third internal potential Vc may be maintained as long as the second internal potential Vb is not changed.

Figure 14:
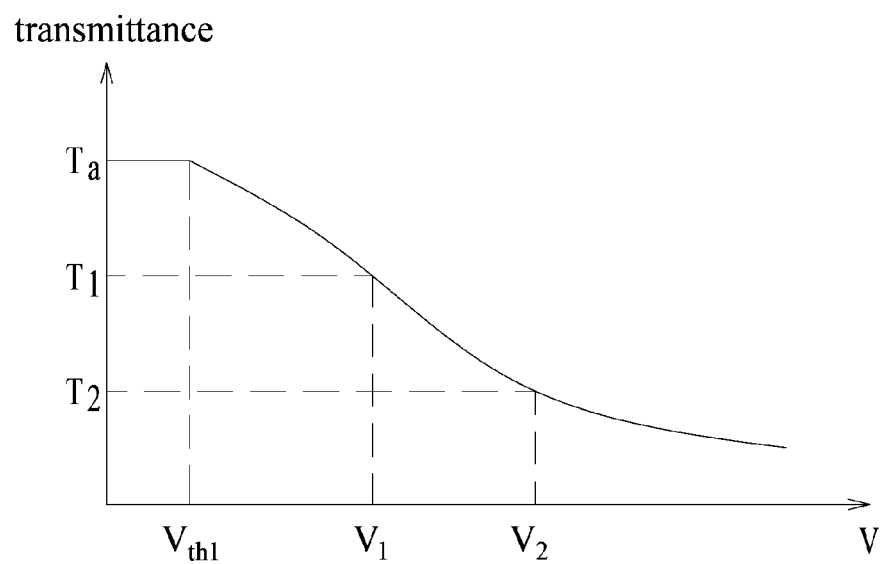
FIG. 14 is a graph illustrating a relationship between a voltage applied to the electrochromic device according to an embodiment of the present application and a transmittance of the electrochromic device.

FIG. 14 is a graph illustrating a relationship between a voltage applied to the electrochromic device according to an embodiment of the present application and a transmittance of the electrochromic device.

A voltage in FIG. 14 may refer to a potential difference due to voltages applied to the first electrode 10210 and the second electrode 10250. As illustrated in FIG. 11, the initial state of the electrochromic element 10200 is a bleached state. The ion storage layer 10240 of the electrochromic element 10200 includes the plurality of ions 10260.

Even when a voltage applied to the electrochromic element 10200 rises, the transmittance does not change until a predetermined level. The plurality of ions 10260 present in the ion storage layer 10240 do not migrate to the electrochromic layer 10220 before the potential difference applied between the first electrode 10210 and the second electrode 10250 reaches the predetermined level. Because the plurality of ions 10260 present in the ion storage layer 10240 migrate at a voltage equal to or higher than the first threshold voltage Vth1, the ions 10260 do not migrate when the potential difference between the first electrode 10210 and the second electrode 10250 is less than the first threshold voltage Vth1 and migrate only when the potential difference between the first electrode 10210 and the second electrode 10250 is equal to or higher than the first threshold voltage Vth1.

Consequently, when the potential difference between the first electrode 10210 and the second electrode 10250 is less than the first threshold voltage Vth1, migration of the ions 10260 does not occur, and thus the electrochromic element 10200 is not discolored. When the potential difference between the first electrode 10210 and the second electrode 10250 is equal to or higher than the first threshold voltage Vth1, the ions 10260 migrate, and the electrochromic element 10200 is discolored. Consequently, when the potential difference between the first electrode 10210 and the second electrode 10250 is less than the first threshold voltage Vth1, the transmittance is not changed, and when the potential difference between the first electrode 10210 and the second electrode 10250 is equal to or higher than the first threshold voltage Vth1, the transmittance is changed.

When the potential difference between the first electrode 10210 and the second electrode 10250 is equal to or higher than the first threshold voltage Vth1, the electrochromic layer 10220 and the ion storage layer 10240 are colored, and the transmittance of the electrochromic element 10200 gradually decreases. The transmittance of the electrochromic element 10200 may decrease to a predetermined transmittance.

By applying a voltage that is equal to or higher than the first threshold voltage Vth1 to the electrochromic element 10200, the control module 10100 may change the transmittance of the electrochromic element 10200. By applying a first voltage V1 to the electrochromic element 10200, the control module 10100 may discolor the electrochromic element 10200 so that the electrochromic element 10200 has a first transmittance T1. By applying a second voltage V2 to the electrochromic element 10200, the control module 10100 may discolor the electrochromic element 10200 so that the electrochromic element 10200 has a second transmittance T2. In this case, the first voltage V1 may be lower than the second voltage V2, and the first transmittance T1 may be higher than the second transmittance T2.

By applying a voltage equal to or higher than the first threshold voltage Vth1 to the electrochromic element 10200, the control module 10100 may change the transmittance of the electrochromic element 10200 regardless of a current state of the electrochromic element 10200. By applying the second voltage V2 to the electrochromic element 10200 in a state in which the electrochromic element 10200 has a maximum transmittance Ta, the control module 10100 may discolor the electrochromic element 10200 so that the electrochromic element 10200 has the second transmittance T2. By applying the second voltage V2 to the electrochromic element 10200 in a state in which the electrochromic element 10200 has the first transmittance T1, the control module 10100 may discolor the electrochromic element 10200 so that the electrochromic element 10200 has the second transmittance T2.

Because the electrochromic element 10200 may be discolored to have a desired transmittance by the control module 10100 controlling a magnitude of a voltage applied to the electrochromic element 10200 regardless of the current state of the electrochromic element 10200, a configuration for measuring the current state of the electrochromic element 10200 can be omitted.

The control module 10100 may control the electrochromic element 10200 to be discolored to have a desired transmittance on the basis of a driving voltage corresponding to an extent of discoloration stored in the storage unit 10140 of the control module 10100.

Figure 15:
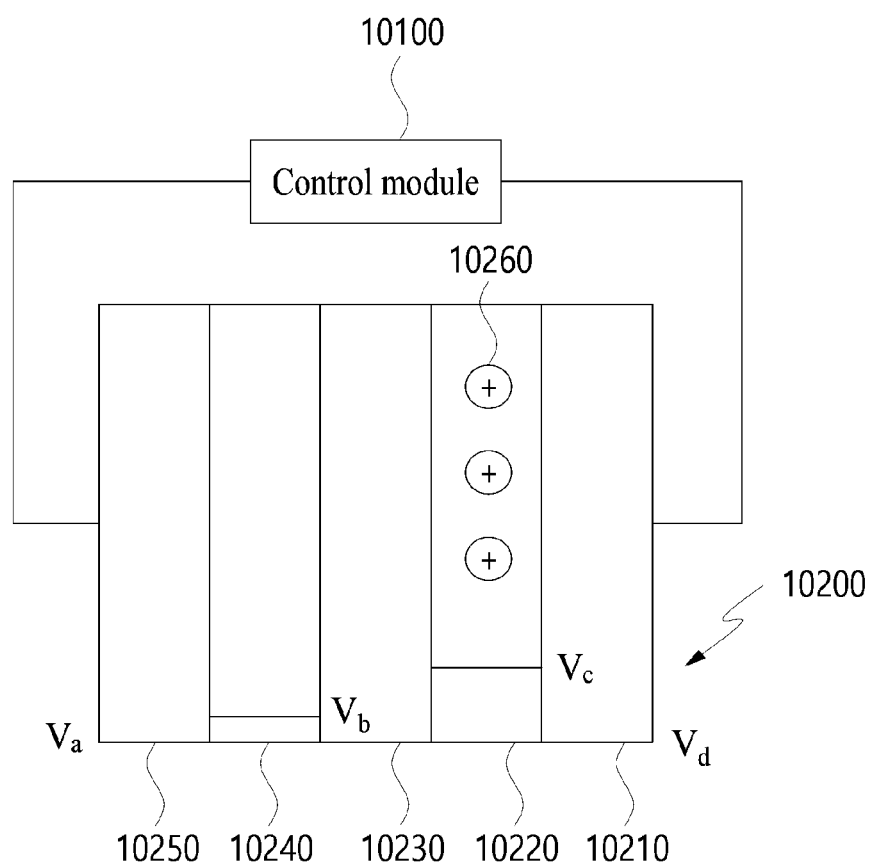
FIG. 15 is a view illustrating a potential when a voltage application is released after completion of discoloration in the electrochromic device according to an embodiment of the present application.

FIG. 15 is a view illustrating a potential when a voltage application is released after completion of discoloration in the electrochromic device according to an embodiment of the present application.

Referring to FIG. 15, the electrochromic element 10200 according to an embodiment may be electrically connected to the control module 10100.

The control module 10100 may release voltage application to the electrochromic element 10200 after discoloration is completed. The control module 10100 and the first electrode 10210 may be electrically insulated, and the control module 10100 and the second electrode 10250 may be electrically insulated. The first electrode 10210 and the second electrode 10250 may float.

The internal potential of the second electrode 10250 may drop due to removal of the voltage that was applied to the second electrode 10250. The first internal potential Va may drop.

Due to the drop of the internal potential of the second electrode 10250, the internal potential of the ion storage layer 10240 connected to the second electrode 10250 may also drop. Due to the drop of the first internal potential Va, the second internal potential Vb may drop.

The ions 10260 may stay in the electrochromic layer 10220 even when the internal potential of the ion storage layer 10240 drops and a potential difference is generated between the internal potential of the ion storage layer 10240 and the internal potential of the electrochromic layer 10220.

By the ions 10260 being present in the electrochromic layer 10220, a colored state of the electrochromic element 10200 may be maintained even when the voltage that was applied to the electrochromic element 10200 from the control module 10100 is released. This may be defined as a memory effect.

Because a colored state may be maintained even when a voltage is not applied to the electrochromic element 10200 due to the memory effect, power for maintaining the state of the electrochromic element 10200 is reduced, and thus the power consumption can be reduced.

Even when the electrochromic element 10200 has the memory effect, the ions 10260 may naturally migrate with time, and an extent of discoloration of the electrochromic element 10200 may be changed. This may be defined as a leakage effect. The leakage effect may be proportional to time. The electrochromic element 10200 may be naturally discolored due to the leakage effect.

1.3. Bleaching Process of Electrochromic Device

FIG. 15 is a view illustrating the electrochromic device when a voltage application is released after completion of discoloration according to an embodiment of the present application and is a view illustrating an internal potential before a voltage is applied to the electrochromic device in a state in which the electrochromic device is colored.

Referring to FIG. 15, the electrochromic element 10200 may be connected to the control module 10100.

In an initial state, the control module 10100 does not apply a voltage to the electrochromic element 10200. The control module 10100 does not apply a voltage to the first electrode 10210 and the second electrode 10250.

In the initial state, the plurality of ions 10260 may be located in the electrochromic layer 10220. By the plurality of ions 10260 present in the electrochromic layer 10220, the electrochromic element 10200 may be in a colored state.

The electrochromic layer 10220 and the ion storage layer 10240 may have internal potentials. The internal potential of the electrochromic layer 10220 and the internal potential of the ion storage layer 10240 may be different from each other. The internal potential of the electrochromic layer 10220 may be higher than the internal potential of the ion storage layer 10240.

The second internal potential Vb may be different from the third internal potential Vc. The second internal potential Vb may be lower than the third internal potential Vc.

Figure 16:
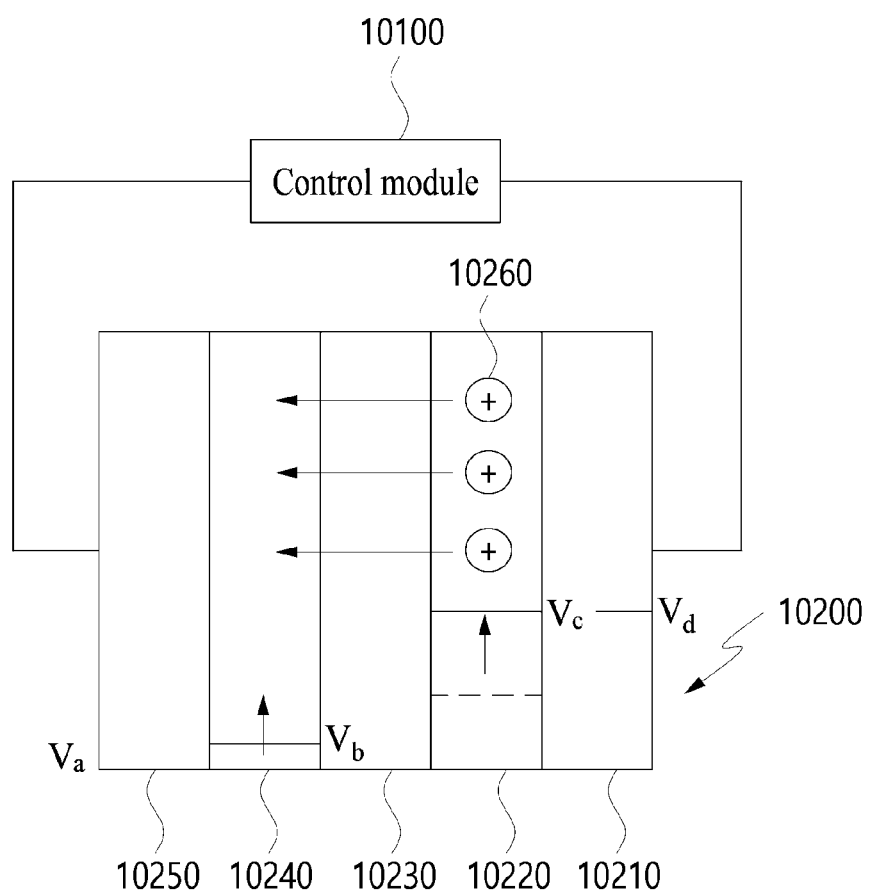
FIG. 16 is a view illustrating a change in a potential in an initial stage of bleaching in the electrochromic device according to an embodiment of the present application.

FIG. 16 is a view illustrating a change in a potential in an initial stage of bleaching in the electrochromic device according to an embodiment of the present application.

Referring to FIG. 16, the electrochromic element 10200 according to an embodiment may be electrically connected to the control module 10100.

The control module 10100 may supply a voltage to the electrochromic element 10200. The control module 10100 may supply a voltage to the first electrode 10210 and the second electrode 10250 of the electrochromic element 10200. The control module 10100 may apply a high voltage to the first electrode 10210 and apply a low voltage to the second electrode 10250.

As a high voltage is applied to the first electrode 10210, the internal potential of the first electrode 10210 may rise corresponding to the high voltage applied by the control module 10100. The fourth internal potential Vd of the first electrode 10210 may rise to correspond to the voltage supplied by the control module 10100.

Because the first electrode 10210 and the electrochromic layer 10220 are electrically connected, as the fourth internal potential Vd of the first electrode 10210 rises, the third internal potential Vc of the electrochromic layer 10220 also rises.

The third internal potential Vc and the fourth internal potential Vd may be at the same level. Alternatively, the third internal potential Vc and the fourth internal potential Vd may be at different levels. The fourth internal potential Vd may have a higher value than the third internal potential Vc.

As the third internal potential Vc of the electrochromic layer 10220 rises, a potential difference may be generated between the electrochromic layer 10220 and the ion storage layer 10240. A potential difference between the third internal potential Vc and the second internal potential Vb may be generated due to the rise of the third internal potential Vc.

The ions 10260 present in the electrochromic layer 10220 may migrate due to the potential difference between the third internal potential Vc and the second internal potential Vb. The ions 10260 may migrate to the ion storage layer 10240 via the electrolyte layer 10230 due to the potential difference between the third internal potential Vc and the second internal potential Vb.

When the potential difference between the third internal potential Vc and the second internal potential Vb is higher than a predetermined range, the ions 10260 may migrate to the ion storage layer 10240 via the electrolyte layer 10230. The electrochromic layer 10220 and the ion storage layer 10240 may be discolored due to the migration of the ions 10260. The electrochromic layer 10220 may be oxidized and discolored due to losing the ions 10260, and the ion storage layer 10240 may be reduced and discolored due to gaining the ions 10260. The electrochromic layer 10220 may be oxidized and bleached, and the ion storage layer 10240 may be reduced and bleached. By the electrochromic layer 10220 and the ion storage layer 10240 being bleached, the electrochromic element 10200 may be bleached. By the electrochromic layer 10220 and the ion storage layer 10240 being bleached, the transmittance of the electrochromic element 10200 may be increased.

The ions 10260 in the electrochromic layer 10220 may be present in a state in which the ions 10260 are bonded to the material constituting the electrochromic layer 10220. The ions 10260 in the electrochromic layer 10220 may be present in the form in which the ions 10260 are physically inserted between particles of the material constituting the electrochromic layer 10220. Alternatively, the ions 10260 in the electrochromic layer 10220 may be present in the state in which the ions 10260 are chemically bonded to the material constituting the electrochromic layer 10220.

A potential difference higher than the predetermined range is required to release bonding between the ions 10260 present in the electrochromic layer 10220 and the material constituting the electrochromic layer 10220. A minimum voltage required to release the bonding between the ions 10260 and the material constituting the electrochromic layer 10220 may be defined as a second threshold voltage Vth2. When the potential difference between the third internal potential Vc and the second internal potential Vd is the second threshold voltage Vth2 or higher, the ions 10260 may migrate to the ion storage layer 10240.

A strength of a physical and/or chemical bond between the electrochromic layer 10220 and the ions 10260 and a strength of a physical and/or chemical bond between the ion storage layer 10240 and the ions 10260 may be different from each other. Because physical structures of internal materials of the electrochromic layer 10220 and the ion storage layer 10240 differ, the strengths of the physical bonds with the ions 10260 may be different. Also, because chemical structures of the internal materials of the electrochromic layer 10220 and the ion storage layer 10240 differ, the strengths of the chemical bonds with the ions 10260 may be different.

Consequently, the second threshold voltage Vth2 of the electrochromic layer 10220 may be different from the first threshold voltage of the ion storage layer 10240.

By the ions 10260 migrating to the ion storage layer 10240, the internal potential of the ion storage layer 10240 may rise. By the ions 10260 migrating to the ion storage layer 10240, the second internal potential Vb may rise.

Figure 17:
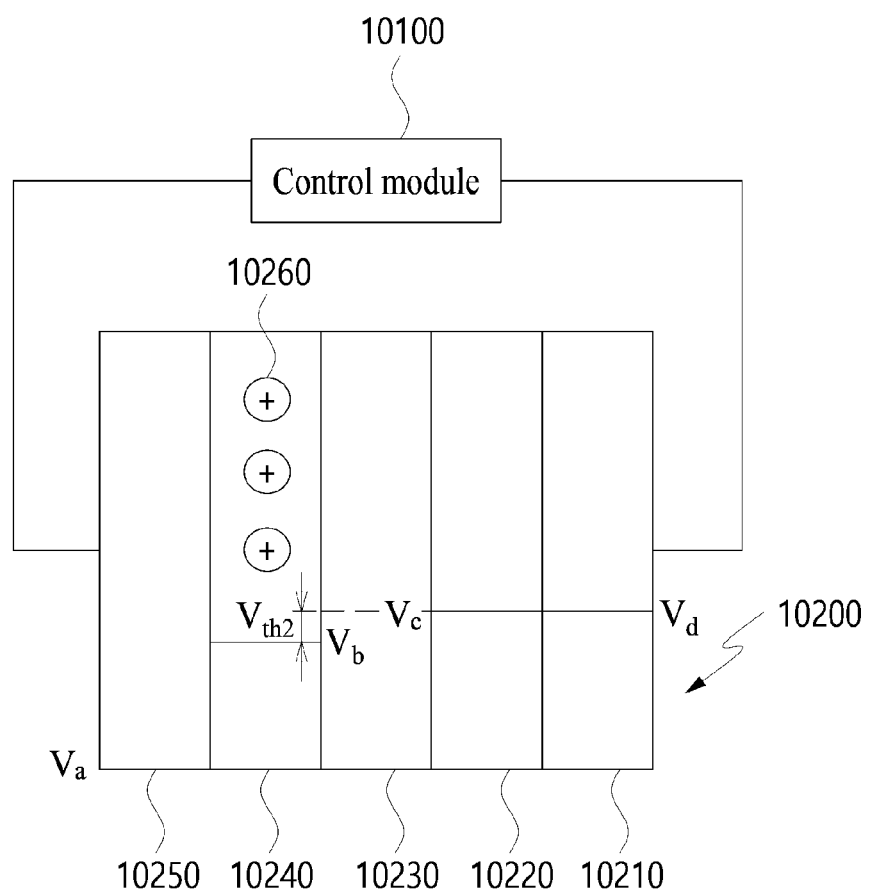
FIG. 17 is a view illustrating a change in a potential in a completion state of bleaching in the electrochromic device according to an embodiment of the present application.

FIG. 17 is a view illustrating a change in a potential in a completion state of bleaching in the electrochromic device according to an embodiment of the present application.

Referring to FIG. 17, the electrochromic element 10200 according to an embodiment may be connected to the control module 10100 and receive a voltage.

The third internal potential Vc rises due to the high voltage that is applied to the first electrode 10210 in FIG. 16, and the ions 10260 present in the electrochromic layer 10220 migrate to the ion storage layer 10240 due to the potential difference between the third internal potential Vc and the second internal potential Vb.

FIG. 17 illustrates a state in which migration of the ions 10260 is completed. By the ions 10260 migrating to the ion storage layer 10240, the second internal potential Vb may rise.

The internal potential of the ion storage layer 10240 may rise to a predetermined level. The second internal potential Vb may rise to the predetermined level. The second internal potential Vb may rise until the second internal potential Vb differs from the third internal potential Vc by the second threshold voltage Vth2. That is, in the bleaching completion stage, the difference between the third internal potential Vc and the second internal potential Vb may be the same as a magnitude of the second threshold voltage Vth2.

The ions 10260 migrate in accordance with the potential difference between the third internal potential Vc and the second internal potential Vb, and the second internal potential Vb also rises due to the migration of the ions 10260. When the difference between the third internal potential Vc and the second internal potential Vb is less than the magnitude of the second threshold voltage Vth2, the ions 10260 are unable to migrate. Consequently, the second internal potential Vb may rise only up to a value resulting from subtracting the second threshold voltage Vth2 from the third internal potential Vc. The second internal potential Vb may be maintained as long as the third internal potential Vc is not changed.

When the voltage application from the control module 10100 is released after completion of discoloration, the electrochromic element 10200 may return to the state illustrated in FIG. 10.

Figure 18:
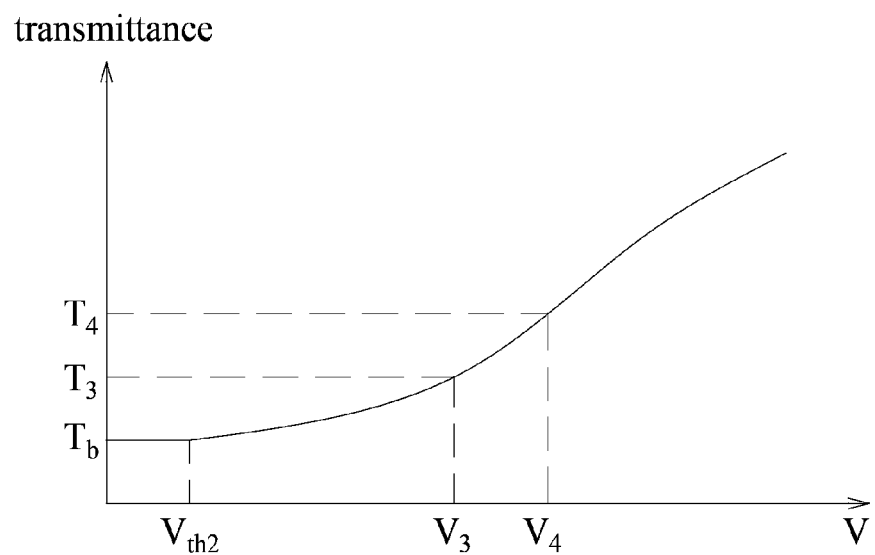
FIG. 18 is a graph illustrating a relationship between a voltage applied to the electrochromic device according to an embodiment of the present application and a transmittance of the electrochromic device.

FIG. 18 is a graph illustrating a relationship between a voltage applied to the electrochromic device according to an embodiment of the present application and a transmittance of the electrochromic device.

A voltage in FIG. 18 may refer to a potential difference due to voltages applied to the first electrode 10210 and the second electrode 10250. The voltage may be a potential difference due to the voltage applied to the first electrode 10210 with respect to the second electrode 10250. As illustrated in FIG. 15, the initial state of the electrochromic element 10200 is a colored state. The electrochromic layer 10220 of the electrochromic element 10200 includes the plurality of ions 10260.

Even when a voltage applied to the electrochromic element 10200 rises, the transmittance does not change until a predetermined level. The plurality of ions 10260 present in the electrochromic layer 10220 do not migrate to the ion storage layer 10240 before the potential difference applied between the first electrode 10210 and the second electrode 10250 reaches the predetermined level. Because the plurality of ions 10260 present in the electrochromic layer 10220 migrate at a voltage equal to or higher than the second threshold voltage Vth2, the ions 10260 do not migrate when the potential difference between the first electrode 10210 and the second electrode 10250 is less than the second threshold voltage Vth2 and migrate only when the potential difference between the first electrode 10210 and the second electrode 10250 is equal to or higher than the second threshold voltage Vth2.

Consequently, when the potential difference between the first electrode 10210 and the second electrode 10250 is less than the second threshold voltage Vth2, migration of the ions 10260 does not occur, and thus the electrochromic element 10200 is not discolored. When the potential difference between the first electrode 10210 and the second electrode 10250 is equal to or higher than the second threshold voltage Vth2, the ions 10260 migrate, and the electrochromic element 10200 is discolored. Consequently, when the potential difference between the first electrode 10210 and the second electrode 10250 is less than the second threshold voltage Vth2, the transmittance is not changed, and when the potential difference between the first electrode 10210 and the second electrode 10250 is equal to or higher than the second threshold voltage Vth2, the transmittance is changed.

When the potential difference between the first electrode 10210 and the second electrode 10250 is equal to or higher than the second threshold voltage Vth2, the electrochromic layer 10220 and the ion storage layer 10240 are bleached, and the transmittance of the electrochromic element 10200 gradually increases. The transmittance of the electrochromic element 10200 may increase to a predetermined transmittance.

By applying a voltage that is equal to or higher than the second threshold voltage Vth2 to the electrochromic element 10200, the control module 10100 may change the transmittance of the electrochromic element 10200. By applying a third voltage V3 to the electrochromic element 10200, the control module 10100 may discolor the electrochromic element 10200 so that the electrochromic element 10200 has a third transmittance T3. By applying a fourth voltage V4 to the electrochromic element 10200, the control module 10100 may discolor the electrochromic element 10200 so that the electrochromic element 10200 has a fourth transmittance T4. In this case, the third voltage V3 may be lower than the fourth voltage V4, and the third transmittance T3 may be lower than the fourth transmittance T4.

By applying a voltage equal to or higher than the second threshold voltage Vth2 to the electrochromic element 10200, the control module 10100 may change the transmittance of the electrochromic element 10200 regardless of a current state of the electrochromic element 10200. By applying the fourth voltage V4 to the electrochromic element 10200 in a state in which the electrochromic element 10200 has a minimum transmittance Tb, the control module 10100 may discolor the electrochromic element 10200 so that the electrochromic element 10200 has the fourth transmittance T4. By applying the fourth voltage V4 to the electrochromic element 10200 in a state in which the electrochromic element 10200 has the third transmittance T3, the control module 10100 may discolor the electrochromic element 10200 so that the electrochromic element 10200 has the fourth transmittance T4.

Because the electrochromic element 10200 may be discolored to have a desired transmittance by the control module 10100 controlling a magnitude of a voltage applied to the electrochromic element 10200 regardless of the current state of the electrochromic element 10200, a configuration for measuring the current state of the electrochromic element 10200 can be omitted.

The control module 10100 may control the electrochromic element 10200 to be discolored to have a desired transmittance on the basis of a driving voltage corresponding to an extent of discoloration stored in the storage unit 10140 of the control module 10100.

Figure 20:
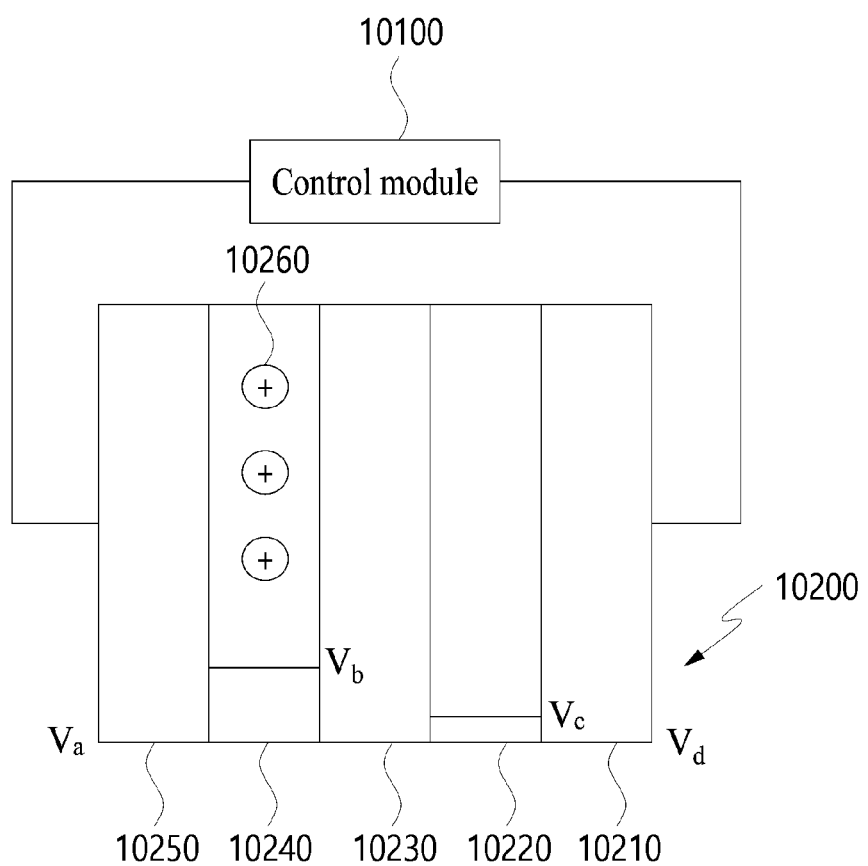
FIGS. 20 and 21 are view illustrating a relationship between a potential and an ion in a coloring process of the electrochromic device according to an embodiment of the present application.
Figure 21:
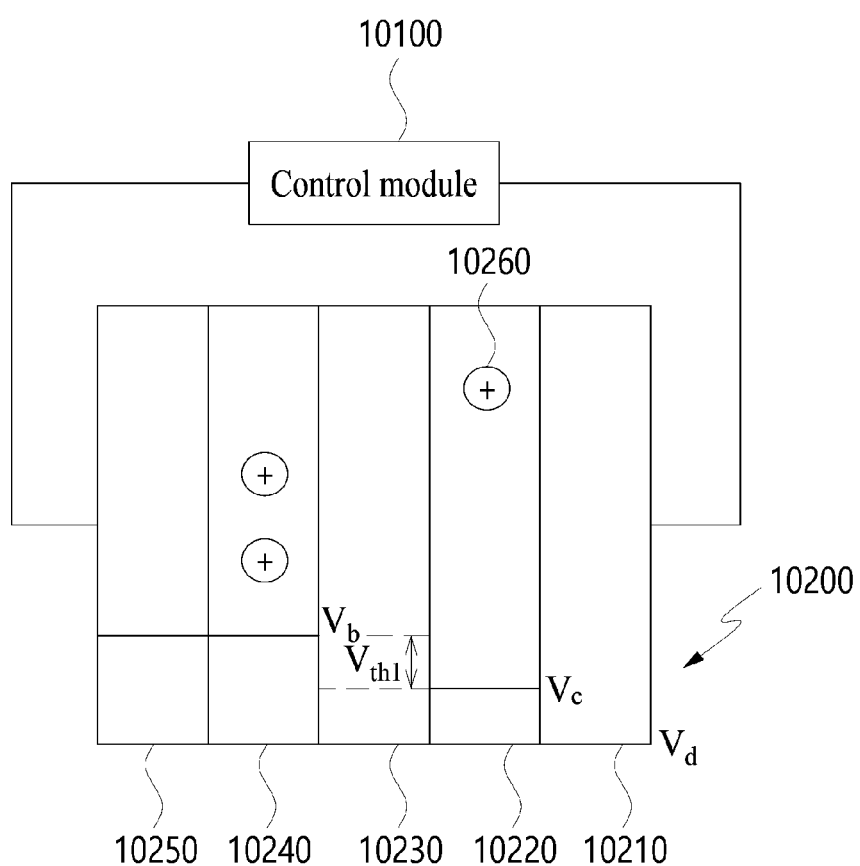
Figure 22:
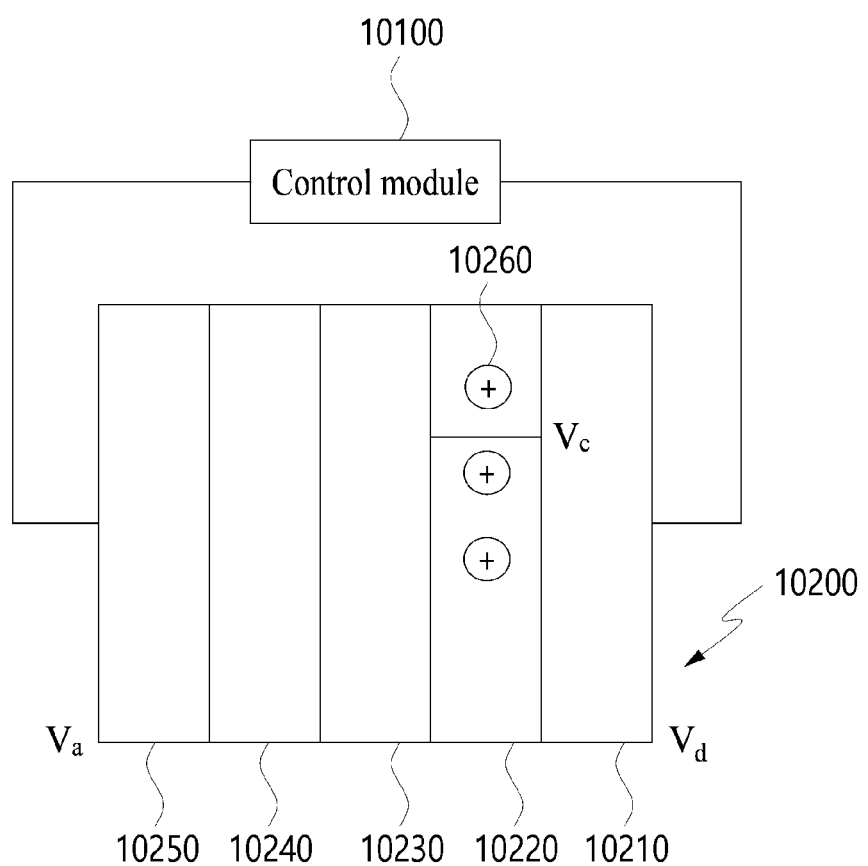
FIGS. 22 and 23 are view illustrating a relationship between a potential and an ion in a bleaching process of the electrochromic device according to an embodiment of the present application.
Figure 23:
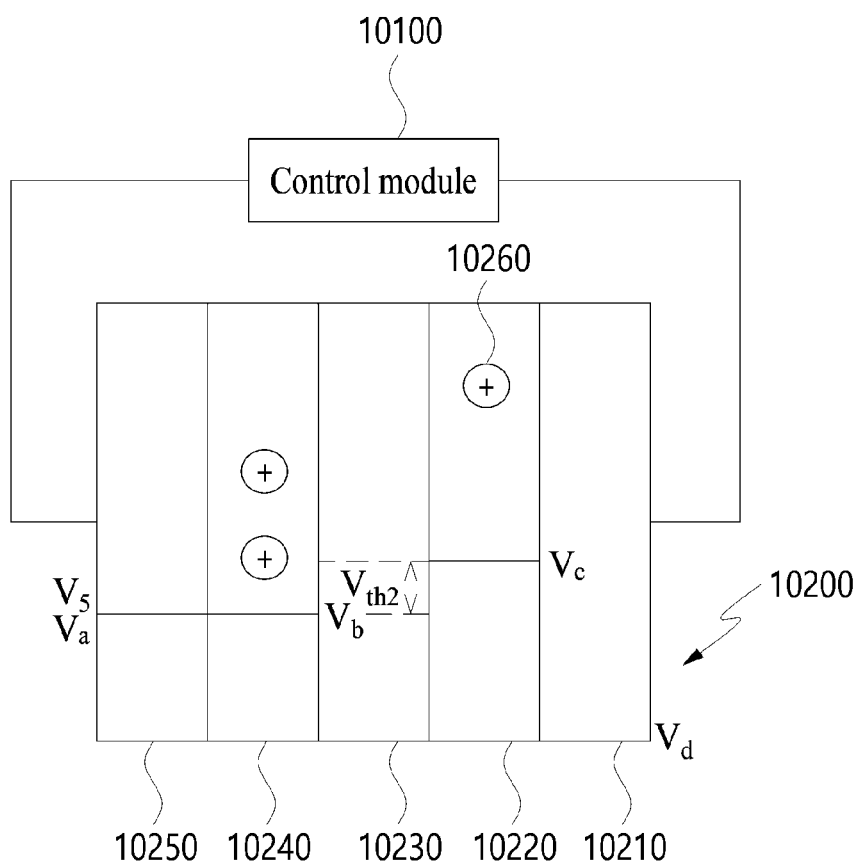

1.4. Transmittance in Accordance with Voltage Application in Coloration and Bleaching FIG. 19 is a view illustrating a relationship between a voltage applied to the electrochromic device according to an embodiment of the present application and a transmittance thereof, FIGS. 20 and 21 are views illustrating a relationship between a potential and an ion in a coloring process of the electrochromic device according to an embodiment of the present application, and FIGS. 22 and 23 are views illustrating a relationship between a potential and an ion in a bleaching process of the electrochromic device according to an embodiment of the present application.

As illustrated in FIG. 14 which has been described above, the transmittance of the electrochromic device may be determined by a voltage applied to the electrochromic device in a coloring process. Also, as illustrated in FIG. 18, the transmittance of the electrochromic device may be determined by a voltage applied to the electrochromic device in a bleaching process.

Figure 19:
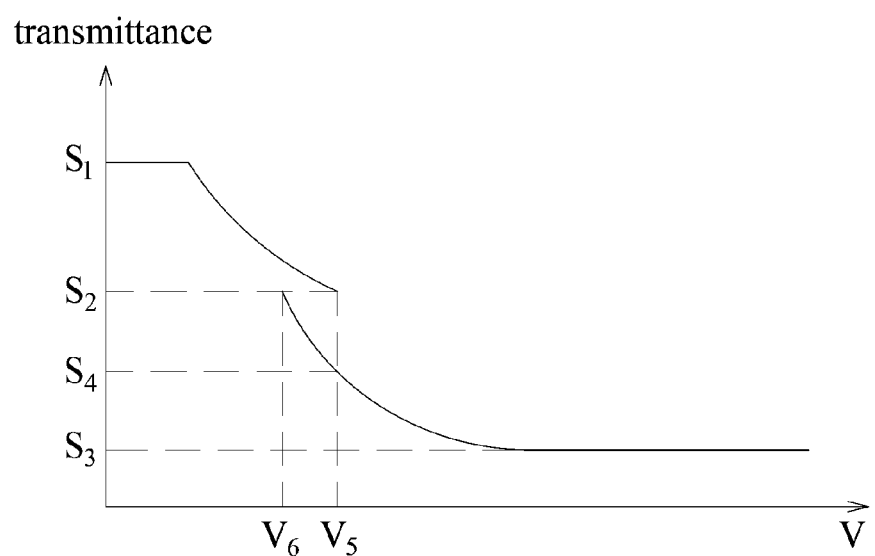
FIG. 19 is a view illustrating a relationship between a voltage applied to the electrochromic device according to an embodiment of the present application and a transmittance thereof.

With reference to FIG. 19, a change in a transmittance due to a voltage applied in a coloring process and a change in a transmittance due to a voltage applied in a bleaching process will be compared and described.

A first state S1 in FIG. 19 refers to a state in which the electrochromic element 10200 has the maximum transmittance, a second state S2 refers to a state in which the electrochromic element 10200 has a transmittance lower than that in the first state S1, a third state S3 refers to a state in which the electrochromic element 10200 has the minimum transmittance, and a fourth state S4 refers to a state in which the electrochromic element 10200 has a transmittance between those in the second state S2 and the third state S3. A voltage V refers to a potential difference due to voltages applied to the first electrode 10210 and the second electrode 10250. Here, the potential difference may be defined as a magnitude of a voltage of the second electrode 10250 with respect to the first electrode 10210.

FIG. 20 is a view illustrating the electrochromic device in the first state S1.

The control module 10100 does not apply a voltage to the first electrode 10210 and the second electrode 10250. The first electrode 10210 and the second electrode 10250 do not have an internal potential.

The ions 10260 may be located in the ion storage layer 10240. By the ions 10260 located in the ion storage layer 10240, the electrochromic element 10200 may be in the first state S1.

Due to the ions 10260, the ion storage layer 10240 may have a relatively high internal potential. Due to the ions 10260, the ion storage layer 10240 may have a higher internal potential than the electrochromic layer 10220. The second internal potential Vb of the ion storage layer 10240 may have a larger value than the third internal potential Vc of the electrochromic layer 10220.

FIG. 21 illustrates an internal potential and a position of the ions 10260 in a state in which migration of the ions 10260 is completed due to a voltage applied from the control module 10100.

Referring to FIG. 21, the control module 10100 may apply a fifth voltage V5 to the electrochromic element 10200. The electrochromic element 10200 may apply the fifth voltage V5 to the second electrode 10250. The electrochromic element 10200 may apply a voltage so that a difference between voltages applied to the second electrode 10250 and the first electrode 10210 is the fifth voltage V5. The electrochromic element 10200 may apply a voltage so that a potential difference between the second electrode 10250 and the first electrode 10210 is the fifth voltage V5.

Due to the fifth voltage V5 applied by the control module 10100, the first internal potential Va rises up to the fifth voltage V5. As the first internal potential Va rises, the second internal potential Vb also rises and has a level corresponding to the first internal potential Va.

The ions 10260 may migrate to the electrochromic layer 10220 due to the potential difference between the second internal potential Vb and the third internal potential Vc. The electrochromic layer 10220 may be reduced and colored due to gaining the ions, and the ion storage layer 10240 may be oxidized and colored due to losing the ions 10260. Due to the electrochromic layer 10220 and the ion storage layer 10240 being colored, the electrochromic element 10200 may be colored. Here, the electrochromic element 10200 may be in the second state S2. The electrochromic element 10200 may reach the second state S2 in which the electrochromic element 10200 has a transmittance lower than that in the first state S1 due to the coloration.

The third internal potential Vc of the electrochromic layer 10220 may rise due to gaining the ions 10260. The third internal potential Vc may rise until the third internal potential Vc differs from the second internal potential Vb by a specific level, and when migration of the ions 10260 is completed, the third internal potential Vc may reach a level that is lower than that of the second internal potential Vb by the first threshold voltage Vth1. That is, a difference between the second internal potential Vb and the third internal potential Vc may be the first threshold voltage Vth1.

Here, the third internal potential Vc may be proportional to the number of the ions 10260 located in the electrochromic layer 10220. The number of the ions 10260 located in the electrochromic layer 10220 is related to an extent of discoloration of the electrochromic layer 10220. That is, when the number of ions present in the electrochromic layer 10220 is large, the extent of coloration of the electrochromic layer 10220 is high, and when the number of ions present in the electrochromic layer 10220 is small, the extent of coloration of the electrochromic layer 10220 is low. Because the extent of discoloration of the electrochromic layer 10220 is related to the extent of discoloration of the electrochromic element 10200, the transmittance of the electrochromic element 10200 may be proportional to the third internal potential Vc.

The extent of discoloration of the electrochromic element 10200 may be determined in accordance with a ratio between the ions 10260 located in the electrochromic layer 10220 and the ions located in the ion storage layer 10240.

FIG. 22 is a view illustrating the electrochromic device in the third state S3.

The control module 10100 does not apply a voltage to the first electrode 10210 and the second electrode 10250. The first electrode 10210 and the second electrode 10250 do not have an internal potential.

The ions 10260 may be located in the electrochromic layer 10220. By the ions 10240 located in the electrochromic layer 10220, the electrochromic element 10200 may be in the third state S3.

Due to the ions 10260, the electrochromic layer 10220 may have a relatively high internal potential. Due to the ions 10260, the electrochromic layer 10220 may have a higher internal potential than the ion storage layer 10240. The third internal potential Vc of the electrochromic layer 10220 may have a larger value than the second internal potential Vb of the ion storage layer 10240. Here, the third internal potential Vc is illustrated as being higher than the second internal potential Vb in FIGS. 20 to 21. This is to facilitate the description and does not indicate an actual potential value.

FIG. 23 illustrates an internal potential and a position of the ions 10260 in a state in which migration of the ions 10260 is completed due to a voltage applied from the control module 10100.

Referring to FIG. 23, the control module 10100 may apply the fifth voltage V5 to the electrochromic element 10200. The fifth voltage V5 is the same voltage as the voltage applied to the electrochromic element 10200 in FIG. 21. The electrochromic element 10200 may apply the fifth voltage V5 to the second electrode 10250. The electrochromic element 10200 may apply a voltage so that a difference between the voltages applied to the second electrode 10250 and the first electrode 10210 is the fifth voltage V5. The electrochromic element 10200 may apply a voltage so that a potential difference the second electrode 10250 and the first electrode 10210 is the fifth voltage V5.

Due to the fifth voltage V5 applied by the control module 10100, the first internal potential Va rises up to the fifth voltage V5. Due to the rise of the first internal potential Va, the second internal potential Vb also rises and has a level corresponding to the first internal potential Va.

The ions 10260 may migrate to the ion storage layer 10240 due to the potential difference between the third internal potential Vc and the second internal potential Vb. The electrochromic layer 10220 may be oxidized and bleached due to losing the ions, and the ion storage layer 10240 may be reduced and bleached due to gaining the ions 10260. Due to the electrochromic layer 10220 and the ion storage layer 10240 being bleached, the electrochromic element 10200 may also be bleached. Here, the electrochromic element 10200 may be in the fourth state S4. The electrochromic element 10200 may reach the fourth state S4 in which the electrochromic element 10200 has a transmittance higher than that in the third state S3 due to the bleaching. The fourth state S4 may be a state in which the transmittance is higher than that in the third state S3.

The third internal potential Vc of the electrochromic layer 10220 may drop due to losing the ions 10260. The third internal potential Vc may drop until the third internal potential Vc differs from the second internal potential Vb by a specific level, and when migration of the ions 10260 is completed, the third internal potential Vc may reach a level that is higher than that of the second internal potential Vb by the second threshold voltage Vth2. That is, a difference between the third internal potential Vc and the second internal potential Vb may be the second threshold voltage Vth2.

Here, the third internal potential Vc may be proportional to the transmittance of the electrochromic element 10200.

When comparing 1) FIGS. 20 and 21 with 2) FIGS. 22 and 23, initial states are different and the applied voltages are the same in 1) FIGS. 20 and 21 and 2) FIGS. 22 and 23. FIGS. 20 and 21 illustrate a state in which the fifth voltage V5 is applied for coloration, and FIGS. 22 and 23 illustrate a state in which the fifth voltage V5 is applied for bleaching. The initial state in FIGS. 20 and 21 are state having a maximum transmittance, and the initial state in FIGS. 22 to 23 are state having a minimum transmittance.

The magnitude of the third internal potential Vc after migration of the ions 10260 is completed in FIG. 21 and the magnitude of the third internal potential Vc after migration of the ions 10260 is completed in FIG. 23 may be different. The magnitude of the third internal potential Vc in FIG. 21 may be smaller than the magnitude of the third internal potential Vc in FIG. 23.

In FIG. 21, the magnitude of the third internal potential Vc may be smaller than the fifth voltage V5. The magnitude of the third internal potential Vc may be smaller than the fifth voltage V5 by the first threshold voltage Vth1.

In FIG. 23, the magnitude of the third internal potential Vc may be larger than the fifth voltage V5. The magnitude of the third internal potential Vc may be larger than the fifth voltage V5 by the second threshold voltage Vth2.

Consequently, a transmittance in the second state S2, which is an optical state in FIG. 21, may be higher than a transmittance in the fourth state S4, which is an optical state in FIG. 23. In other words, an optical state of the electrochromic device may be changed when a specific voltage is applied to the electrochromic device in a coloring process and a specific voltage is applied to the electrochromic device in a bleaching process. The transmittance of the electrochromic device may be changed when a specific voltage is applied to the electrochromic device in the coloring process and a voltage equal to the specific voltage that was applied to the electrochromic device in the coloring process is applied to the electrochromic device in the bleaching process. That is, a transmittance when the electrochromic device receives a specific voltage in the coloring process may be larger than a transmittance when the electrochromic device receives a specific voltage in the bleaching process.

Although the case in which the transmittance when the electrochromic device receives a specific voltage in the coloring process is larger than the transmittance when the electrochromic device receives a specific voltage in the bleaching process has been described as an example with reference to the drawings, conversely, the transmittance when the electrochromic device receives a specific voltage in the coloring process may be smaller than the transmittance when the electrochromic device receives a specific voltage in the bleaching process.

Such a phenomenon may be a result due to the above-described ion migration and the threshold voltages or may be a result due to the electrochromic layer 10220 and the ion storage layer 10240 having different threshold voltages.

In addition, the control module 10100 may vary a driving voltage applied to the electrochromic element 10200 in accordance with whether the electrochromic element 10200 is in the coloring process or the bleaching process. The control module 10100 may determine a discoloration process of the electrochromic element 10200 and apply a driving voltage based on the determined discoloration process to the electrochromic element 10200.

In this case, a driving voltage for each discoloration process may be stored in the storage unit 10140 of the control module 10100. That is, a driving voltage corresponding to an extent of discoloration of the electrochromic element 10200 in the coloring process and a driving voltage corresponding to an extent of discoloration of the electrochromic element 10200 in the bleaching process may be stored in the storage unit 10140.

The control module 10100 may determine a discoloration process on the basis of a previously applied voltage. In this case, the control module 10100 may record an output driving voltage in the storage unit 10140, load a previous driving voltage that is stored in the storage unit 10140, and compare a current driving voltage with the previous driving voltage to determine a discoloration process. The control module 10100 may calculate a previous state by the previous driving voltage that is stored in the storage unit 10140, compare the calculated previous state with a target state to determine a discoloration process, and supply driving power on the basis of the determined discoloration process.

For example, the control module 10100 may apply a sixth voltage V6 to the electrochromic element 10200 in the bleaching process to realize a state equal to the second state S2 of FIG. 21, which is the coloring process. The sixth voltage V6 may be a voltage at a lower level than the fifth voltage V5. Because the third internal potential Vc of FIG. 23 should be dropped to have the same internal potential as the third internal potential Vc of FIG. 21, the second state S2 may be realized in the bleaching process when a voltage lower than the fifth voltage V5 is applied to the electrochromic element 10200.

Conversely, although not illustrated, the control module 10100 may apply a voltage higher than the fifth voltage V5 to the electrochromic element 10200 in the coloring process to realize a state equal to the fourth state S4 of FIG. 23, which is the bleaching process. Because the third internal potential Vc of FIG. 21 has to be increased to have the same internal potential as the third internal potential Vc of FIG. 23, the fourth state S4 may be realized in the coloring process when a voltage higher than the fifth voltage V5 is applied to the electrochromic element 10200.

1.5. Unchangeable Section in Coloring and Bleaching Processes

Figure 24:
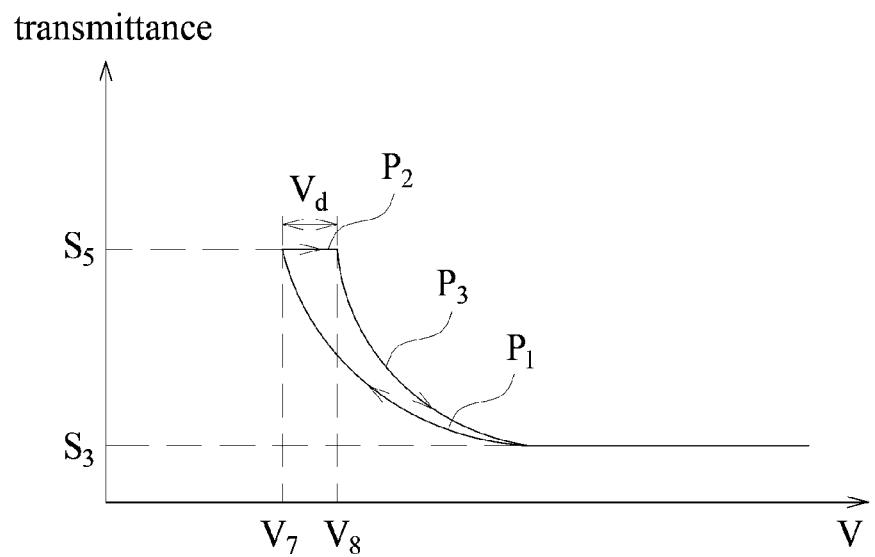
FIG. 24 is a view illustrating a relationship between a voltage applied to the electrochromic device according to an embodiment of the present application and a transmittance thereof.
Figure 25:
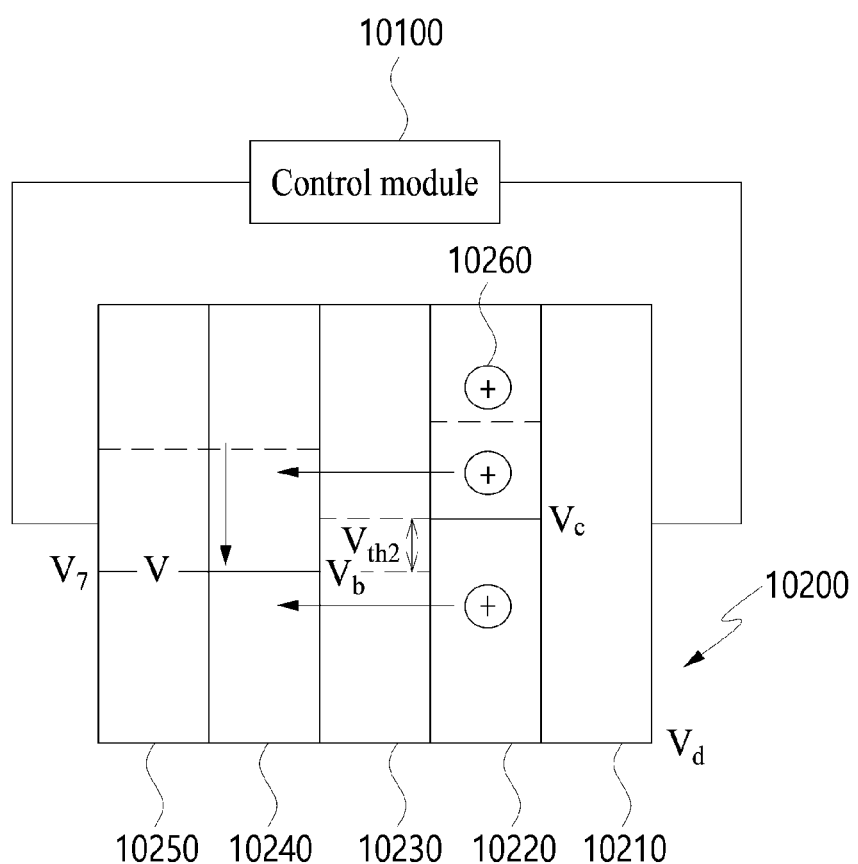
FIGS. 25 to 27 are view illustrating a relationship between a potential and an ion in a bleaching process and a coloring process of the electrochromic device according to an embodiment of the present application.
Figure 26:
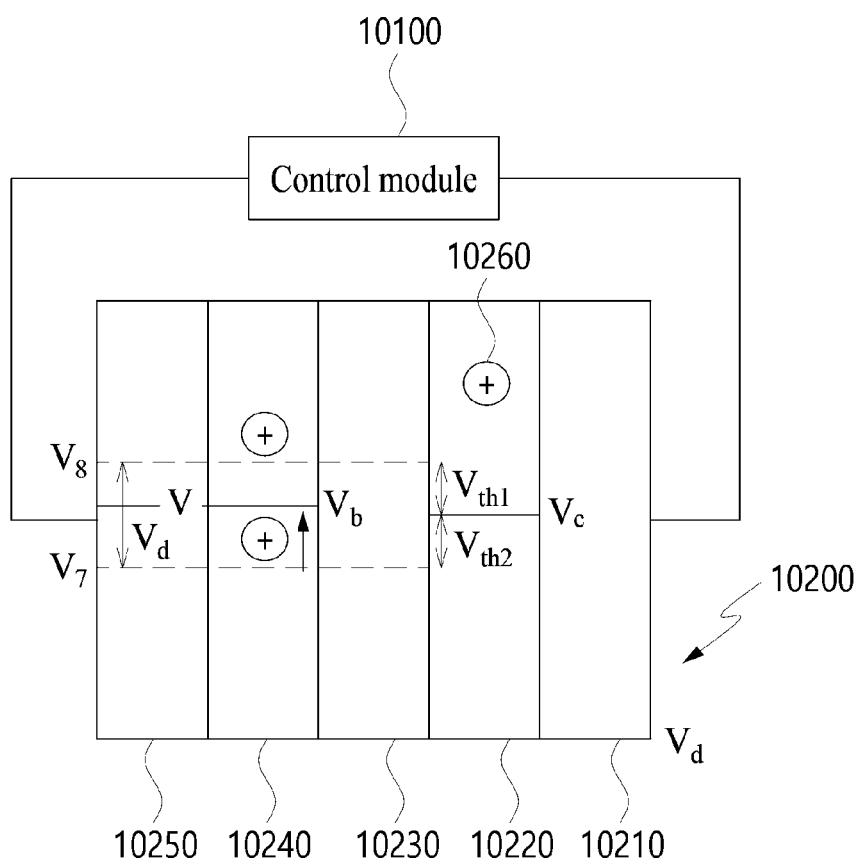
Figure 27:
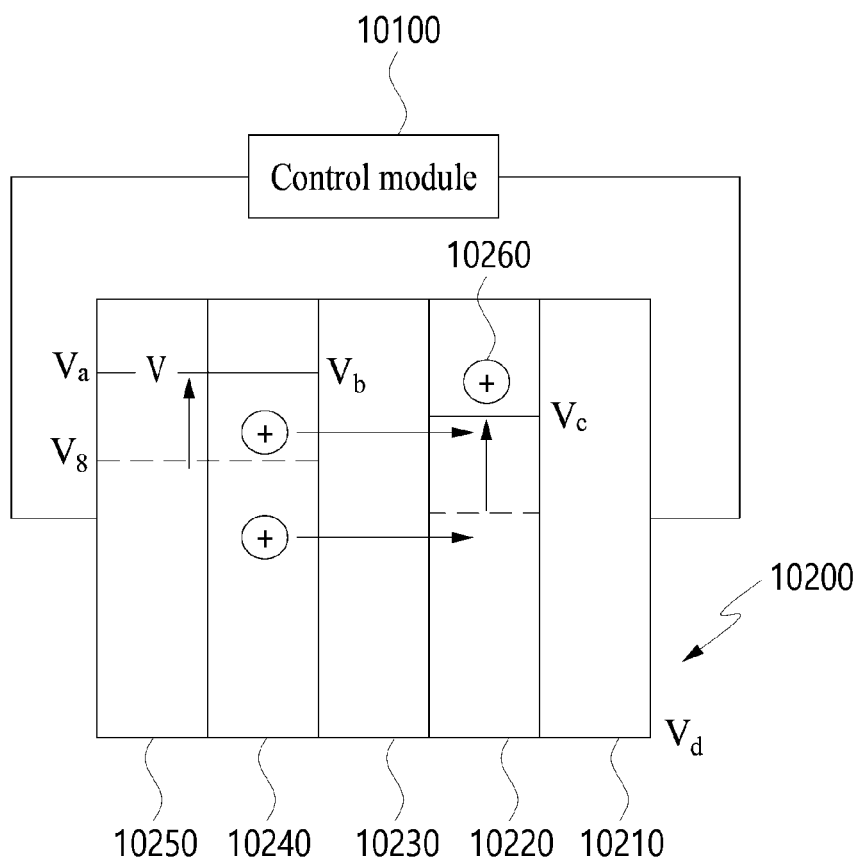

FIG. 24 is a view illustrating a relationship between a voltage applied to the electrochromic device according to an embodiment of the present application and a transmittance thereof, and FIGS. 25 to 27 are views illustrating a relationship between a potential and an ion in a bleaching process and a coloring process of the electrochromic device according to an embodiment of the present application.

In FIG. 24, the third state S3 refers to a state in which the electrochromic element 10200 has a minimum transmittance, and the fifth state S5 refers to a state in which the electrochromic element 10200 has a transmittance higher than that in the third state S3. The voltage V refers to a potential difference due to voltages applied to the first electrode 10210 and the second electrode 10250. Here, the potential difference may be defined as a magnitude of a voltage of the second electrode 10250 with respect to the first electrode 10210.

FIG. 24 includes a first section P1, a second section P2, and a third section P3. The first section P1 may be a bleaching section, the second section P2 may be an unchangeable section, and the third section P3 may be a coloring section.

The first section P1 may be a section in which a state of the electrochromic element 10200 is changed from the third state S3 to the fifth state S5, the second section P2 may be a section in which the state of the electrochromic element 10200 is maintained to be the fifth state S5, and the third section P3 may be a section in which the state of the electrochromic element 10200 is changed to the fifth state S5.

FIG. 25 is a view illustrating a relationship between potentials and ions in the first section P1.

Referring to FIG. 25 along with FIG. 24, the electrochromic element 10200 may be discolored from the third state S3 to the fifth state S5. The electrochromic element 10200 may be bleached from the third state S3 to the fifth state S5.

In the third state S3, the ions 10260 may be located in the electrochromic layer 10220. Here, when a voltage V with a gradually decreasing level is applied to the second electrode 10250, the second internal potential Vb may be decreased, and the ions 10260 in the electrochromic layer 10220 may migrate to the ion storage layer 10240 via the electrolyte layer 10230. In this process, the electrochromic layer 10220 may be oxidized and bleached due to losing the ions 10260, and the ion storage layer 10240 may be reduced and bleached due to gaining the ions 10260. By the ions 10260 in the electrochromic layer 10220 migrating to the ion storage layer 10240, the third internal potential Vc is gradually decreased.

When the drop of the voltage stops in a state in which the voltage applied to the second electrode 10250 has reached a seventh voltage V7, the drop of the third internal potential Vc also stops after the third internal potential Vc is dropped to a specific level. Here, a voltage difference between the third internal potential Vc and the seventh voltage V7 may be the second threshold voltage Vth2. That is, the drop of the third internal potential Vc stops in a state in which the third internal potential Vc has a voltage higher than the seventh voltage V7 by the second threshold voltage Vth2.

FIG. 26 is a view illustrating a relationship between potentials and ions in the second section P2.

Referring to FIG. 26 along with FIG. 24, the state of the electrochromic element 10200 may be maintained to be the fifth state S5. The second section P2 may be a section in which a transmittance of the electrochromic element 10200 is maintained even when a voltage applied to the electrochromic element 10200 rises.

In a general case, when an applied voltage is increased, a transmittance is decreased due to coloring. However, when a previous section is a bleaching section, the transmittance does not change even when a voltage is increased during a predetermined range. A section in which the transmittance does not change with a change in a voltage may be defined as an unchangeable section.

The unchangeable section may be exhibited when a voltage is increased for coloring in a case in which a previous section is a bleaching section and may also be exhibited when a voltage is dropped for bleaching in a case in which a previous section is a coloring section.

The voltage V applied to the electrochromic element 10200 to which the seventh voltage V7 was applied by the first section P1 may be gradually increased. Even when the voltage V increases, the ions 10260 do not migrate. Even when the voltage V increases in an unchangeable voltage section Vd, the ions 10260 do not migrate.

The unchangeable voltage section Vd may be a voltage section having a variation by the first threshold voltage Vth1 and the second threshold voltage Vth2 with respect to the third internal potential Vc. A lower limit of the unchangeable voltage section Vd may be a value lower than the third internal potential Vc by the second threshold voltage Vth2, and an upper limit of the unchangeable voltage section Vd may be a value higher than the third internal potential Vc by the first threshold voltage Vth1.

When a voltage in the unchangeable voltage section that is lower than the third internal potential Vc is applied to the electrochromic element 10200, a difference between the voltage V and the third internal potential Vc is smaller than the second threshold voltage Vth2, and the ions 10260 are unable to be released from the electrochromic layer 10220. Consequently, because migration of the ions 10260 does not occur, the third internal potential Vc is not changed, and the electrochromic layer 10220 and the ion storage layer 10240 are not discolored. In this way, the state of the electrochromic element 10200 is maintained.

When a voltage in the unchangeable voltage section that is higher than the third internal potential Vc is applied to the electrochromic element 10200, a difference between the voltage V and the third internal potential Vc is smaller than the first threshold voltage Vth1, and the ions 10260 are unable to be released from the ion storage layer 10240. Consequently, because migration of the ions 10260 does not occur, the third internal potential Vc is not changed, and the electrochromic layer 10220 and the ion storage layer 10240 are not discolored. In this way, the state of the electrochromic element 10200 is maintained.

The unchangeable voltage section Vd may correspond to a sum of magnitudes of the first threshold voltage Vth1 and the second threshold voltage Vth2. Consequently, the unchangeable voltage section Vd may be increased when a binding force of the electrochromic layer 10220 or the ion storage layer 10240 with the ions 10260 is large, and the unchangeable voltage section Vd may be decreased when the binding force of the electrochromic layer 10220 or the ion storage layer 10240 with the ions 10260 is small.

FIG. 27 is a view illustrating a relationship between potentials and ions in the third section P3.

Referring to FIG. 27 along with FIG. 24, the electrochromic element 10200 may be discolored from the fifth state S5 to the third state S3. The electrochromic element 10200 may be colored from the fifth state S5 to the third state S3.

In the third state S3, some ions of the plurality of ions 10260 may be located in the ion storage layer 10240. Here, when a voltage V higher than an eighth voltage V8 is applied to the electrochromic element 10200, the second internal potential Vb may be increased, and the ions 10260 in the ion storage layer 10240 may migrate to the electrochromic layer 10220 via the electrolyte layer 10230.

The eighth voltage V8 may be a voltage that is higher than the third internal potential Vc of the second section P2 by the first threshold voltage Vth1. In the third section P3, due to a voltage higher than the eighth voltage V8 being applied to the second electrode 10250, a value of a difference between the second internal potential Vb and the third internal potential Vc becomes higher than the first threshold voltage Vth1, and the ions 10260 in the ion storage layer 10240 may migrate to the electrochromic layer 10220.

In this process, the electrochromic layer 10220 may be reduced and colored due to gaining the ions 10260, and the ion storage layer 10240 may be oxidized and colored due to losing the ions 10260. By the ions 10260 in the ion storage layer 10240 migrating to the electrochromic layer 10220, the third internal potential Vc gradually increases.

The control module 10100 may generate driving power on the basis of the unchangeable section and apply the generated driving power to the electrochromic element 10200. The control module 10100 may supply driving power to the electrochromic element 10200 on the basis of the unchangeable section when changing between coloring and bleaching of the electrochromic element 10200.

The control module 10100 may determine a previous process of the electrochromic element 10200 and apply a different driving voltage to the electrochromic element 10200. When the previous process is a bleaching process, the control module 10100 may color the electrochromic element 10200 by not applying a voltage in the unchangeable section and applying a voltage higher than that in the unchangeable voltage section to the electrochromic element 10200. When the previous process is a coloring process, the control module 10100 may bleach the electrochromic element 10200 by not applying a voltage in the unchangeable section and applying a voltage lower than that in the unchangeable voltage section.

1.6. Threshold Voltage

Figure 28:
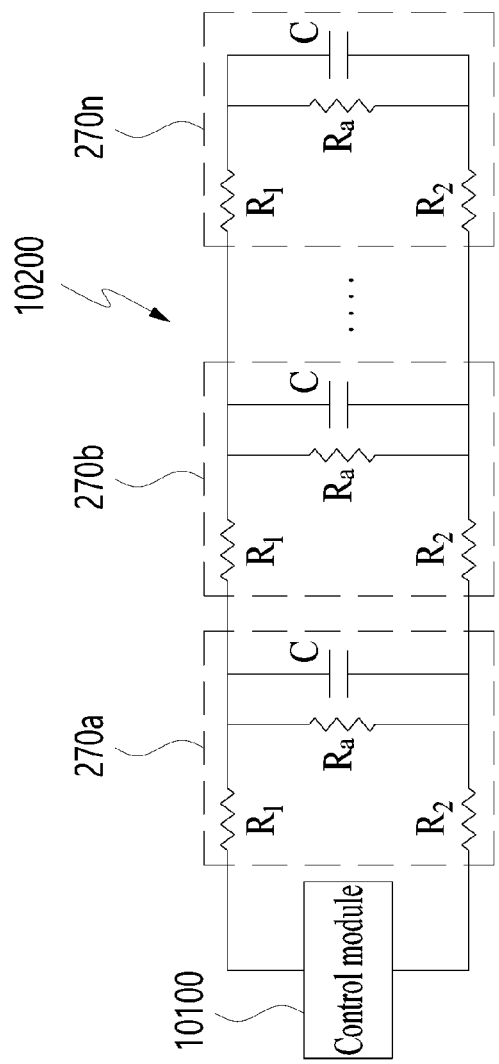
FIG. 28 is an equivalent circuit diagram of the electrochromic device according to an embodiment of the present application.

FIG. 28 is an equivalent circuit diagram of the electrochromic device according to an embodiment of the present application.

Referring to FIG. 28, the electrochromic element 10200 of the electrochromic device according to an embodiment may be connected to the control module 10100.

The electrochromic element 10200 may include a plurality of divided regions. The electrochromic element 10200 may include a first divided region 10270a to an $n^{th}$ divided region 10270n. The divided regions may be connected in parallel to each other.

The divided regions may be partial regions of the electrochromic element 10200 connected to the control module 10100.

The divided regions may be electrical regions instead of regions that may be physically divided. The electrochromic element 10200 includes the first electrode 10210, the electrochromic layer 10220, the electrolyte layer 10230, the ion storage layer 10240, and the second electrode 10250, and each of the layers constituting the electrochromic element 10200 may be formed of a single layer. Consequently, regions actually divided as the divided regions may not be present, and the divided regions may be regions virtually divided for electrical interpretation of the electrochromic element 10200.

All of the first divided region 10270a to the $n^{th}$ divided region 10270n may be interpreted as the same equivalent circuit. The $n^{th}$ divided region 10270n will be described as an example. The $n^{th}$ divided region 10270n may include a first resistance R1, a second resistance R2, a connection resistance Ra, and a capacitor C. The $n^{th}$ divided region 10270n may be interpreted as including the first resistance R1, the second resistance R2, the connection resistance Ra, and the capacitor C.

One end of the first resistance R1 and one end of the second resistance R2 may be electrically connected to an adjacent divided region, and the other end of the first resistance R1 and the other end of the second resistance R2 may be electrically connected to the connection resistance Ra and the capacitor C. That is, both ends of the connection resistance Ra may be electrically connected to the other end of the first resistance R1 and the other end of the second resistance R2, and both ends of the capacitor C may be electrically connected to the other end of the first resistance R1 and the other end of the second resistance R2.

Here, a horizontal direction may be an x-direction or y-direction in FIG. 3. The horizontal direction may be a direction moving away from the contact region between the control module 10100 and the electrochromic element 10200 along the second electrode 10250. The vertical direction may be a z-direction in FIG. 3. The vertical direction may be a direction toward the second electrode 10250 from the first electrode 10210.

The first resistance R1 may be a resistance in the horizontal direction of a partial region of the second electrode 10250. The second resistance R2 may be a resistance in the horizontal direction of a partial region of the first electrode 10210.

The connection resistance Ra may be a resistance in the vertical direction of the electrochromic element 10200. That is, the connection resistance Ra may be a resistance between the first electrode 10210 and the second electrode 10250. The connection resistance Ra may be the sum of vertical resistances of the first electrode 10210, the electrochromic layer 10220, the electrolyte layer 10230, the ion storage layer 10240, and the second electrode 10250, a contact resistance between the first electrode 10210 and the electrochromic layer 10220, a contact resistance between the electrochromic layer 10220 and the electrolyte layer 10230, a contact resistance between the electrolyte layer 10230 and the ion storage layer 10240, and a contact resistance between the ion storage layer 10240 and the second electrode 10250.

The capacitor C may be a capacitor generated by the first electrode 10210, the second electrode 10250, the electrochromic layer 10220, the electrolyte layer 10230, and the ion storage layer 10240. A sum of capacitances of capacitors C of the plurality of divided regions may be a capacity of the electrochromic element 10200.

A voltage charged in the capacitor C may rise with time due to RC delay and reach a predetermined voltage. The predetermined voltage may be a voltage divided by the first resistance R1, the second resistance R2, and the connection resistance Ra which are connected in series. That is, the predetermined voltage may be a voltage that is Ra/(R1+R2+Ra) times a voltage applied to the $n^{th}$ divided region 10270n due to the voltage division rule. Because the first resistance R1 and the second resistance R2 are resistances of a conductor, and the connection resistance Ra is a resistance of a combination of a conductor and a nonconductor, and thus the connection resistance Ra has an extremely larger value than the first resistance R1 and the second resistance R2, after time passes due to RC delay, the voltage charged in the capacitor C may correspond to a voltage applied to the $n^{th}$ divided region 10270n. That is, after time passes due to RC delay, the voltage charged in the capacitor C may become similar with a voltage applied to the $n^{th}$ divided region 10270n. Dramatically, after time passes due to RC delay, the voltage charged in the capacitor C may become equal to the voltage applied to the $n^{th}$ divided region 10270n.

The voltage charged in the capacitor C may be equal to an input voltage of an adjacent divided region. That is, the voltage charged in the capacitor C may be applied to the adjacent divided region. For example, a voltage charged in the capacitor C of the first divided region 10270a may be applied to the second divided region 10270b. A voltage charged in the capacitor C of the first divided region 10270a may be applied to one end of the first resistance R1 and one end of the second resistance R2 of the second divided region 10270b.

Because the voltage charged in the capacitor C of the divided region is proportional to the input voltage, voltages charged in the capacitors C of the plurality of divided regions may be sequentially charged by RC delay.

Voltages of the capacitors C of the plurality of divided regions may sequentially rise. Among the capacitors C of the plurality of divided regions, a capacitor C in a divided region close to the control module 10100 may be charged first, and a capacitor C in a divided region distant from the control module 10100 may be charged later. Among the capacitors C of the plurality of divided regions, a capacitor C in a divided region adjacent to the contact region between the control module 10100 and the electrochromic element 10200 may be charged first, and a capacitor C in a divided region spaced apart from the contact region may be charged later.

The capacitor C in the first divided region 10270a of the plurality of divided regions may be charged first, and capacitors C up to the capacitor C in the $n^{th}$ divided region 10270n may be sequentially charged.

Because a voltage charged in the capacitor C is a driving voltage applied to the first electrode 10210 and the second electrode 10250, an extent of discoloration may be determined by a voltage charged in the capacitor C.

Figure 29:
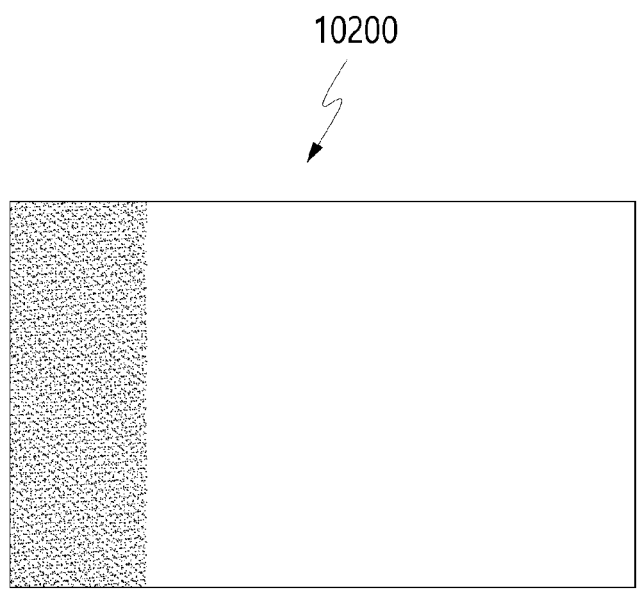
FIGS. 29 to 31 are view illustrating an extent of electric discoloration by time of the electrochromic element according to an embodiment of the present application.
Figure 30:
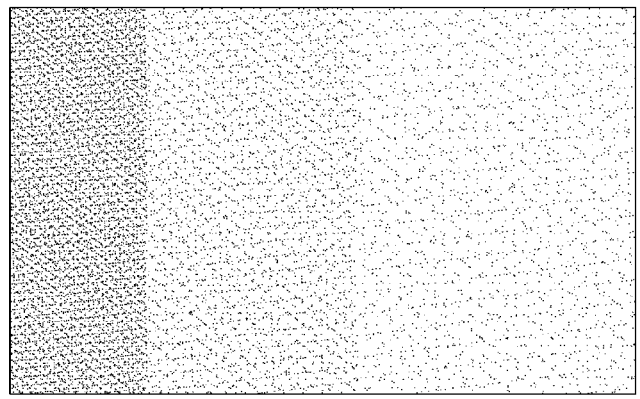
Figure 31:
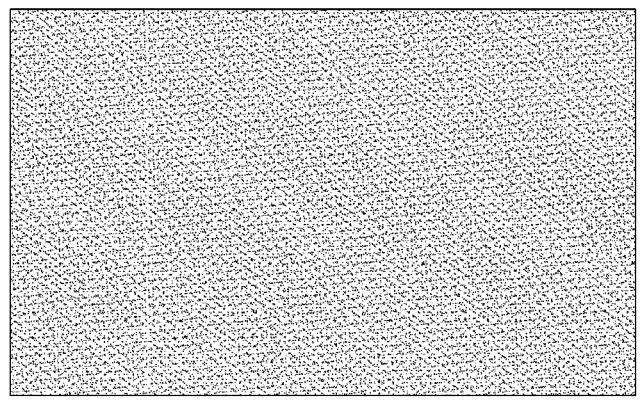

FIGS. 29 to 31 are views illustrating an extent of electric discoloration by time of the electrochromic element according to an embodiment of the present application.

When a voltage is applied from the control module 10100 to the electrochromic element 10200, in an initial stage, a region adjacent to the contact region between the control module 10100 and the electrochromic element 10200 is discolored first, and a region distant from the contact region is not discolored as illustrated in FIG. 29. That is, the extents of discoloration of the region adjacent to the contact region and the region spaced apart from the contact region may be different. In other words, a transmittance of the region adjacent to the contact region and a transmittance of a region spaced apart from the contact region may be different. The transmittance of the region adjacent to the contact region may be smaller than the transmittance of the region spaced apart from the contact region in the coloring process.

In an intermediate stage in which a voltage is continuously applied from the control module 10100 to the electrochromic element 10200, discoloration of the region adjacent to the contact region may be completed, and discoloration of the region spaced apart from the contact region may begin as illustrated in FIG. 30. Even in this case, the extents of discoloration of the region adjacent to the contact region and the region spaced apart from the contact region may be different. Even when the extent of discoloration of the region adjacent to the contact region reaches a target extent of discoloration, the extent of discoloration of the region spaced apart from the contact region may not reach the target extent of discoloration. In other words, the transmittance of the region adjacent to the contact region and the transmittance of the region spaced apart from the contact region may be different. In the coloring process, the transmittance of the region adjacent to the contact region may be smaller than the transmittance of the region spaced apart from the contact region. In the intermediate stage, an area of a region in which an extent of discoloration reaches the target extent of discoloration is gradually widened with time. The area of the region in which an extent of discoloration reaches the target extent of discoloration may be widened with time in a direction moving away from the contact region.

When a completion stage is reached after a voltage is continuously applied from the control module 10100 to the electrochromic element 10200, discoloration of the entire region of the electrochromic element 10200 is completed as illustrated in FIG. 31. A period from a time point at which application of a voltage to the electrochromic element 10200 begins to a time point at which discoloration of the entire region of the electrochromic element 10200 is completed may be defined as a threshold period.

When the threshold period is reached, a colored state of the entire region of the electrochromic element 10200 may be uniform. When the threshold period is reached, a variation between colored states at a first point and a second point of the electrochromic element 10200 may be at a predetermined level or lower. When the threshold period is reached, transmittances at the first point and the second point of the electrochromic element 10200 may correspond to each other. A maximum variation between the colored states at the first point and the second point of the electrochromic element 10200 may be a predetermined level or lower. When the threshold period is reached, a variation between the transmittances of the first point and the second point of the electrochromic element 10200 may be in the range of 0% to 30%.

The threshold period may be proportional to an area of the electrochromic element 10200. That is, the threshold period may be longer as the area of the electrochromic element 10200 is larger. In other words, a period during which the electrochromic element 10200 is uniformly discolored may be longer as the area of the electrochromic element 10200 is larger. A variation in colored states of different regions of the electrochromic element 10200 may also be proportional to the area of the electrochromic element 10200. A maximum variation in the colored states of the different regions of the electrochromic element 10200 may be increased as the area of the electrochromic element 10200 is increased.

Figure 32:
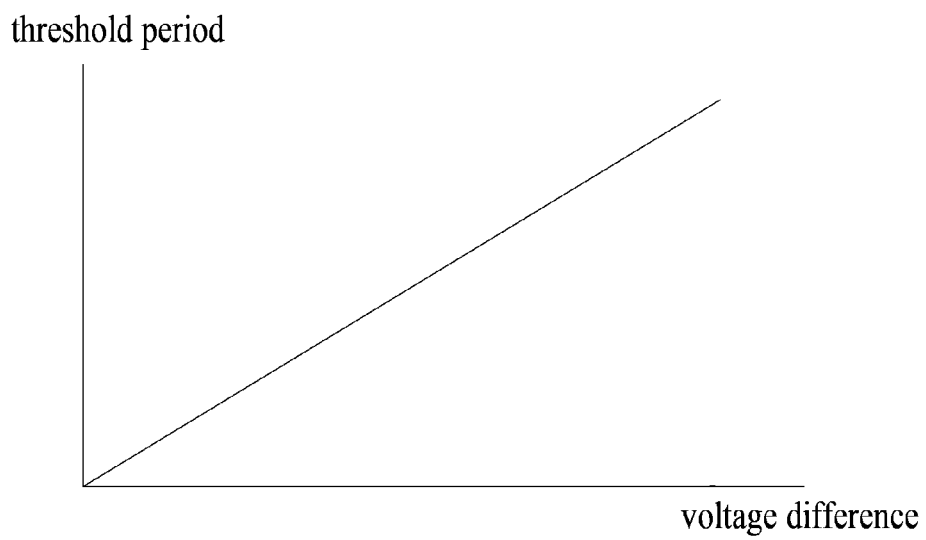
FIG. 32 is a graph of a threshold period with respect to a voltage according to an embodiment of the present application.

As illustrated in FIG. 32, the threshold period may be proportional to a voltage difference.

The voltage difference may be a value of a difference between a voltage applied to the electrochromic element 10200 from the control module 10100 and a voltage that is charged in the electrochromic element 10200.

The voltage difference may be proportional to a value of a difference between a current discoloration state and a target discoloration state. Because a voltage that is charged in the electrochromic element 10200 corresponds to the current discoloration state of the electrochromic element 10200, and a voltage applied to the electrochromic element 10200 corresponds to the target discoloration state, the voltage difference may be proportional to the value of the difference between the current discoloration state and the target discoloration state.

Figure 33:
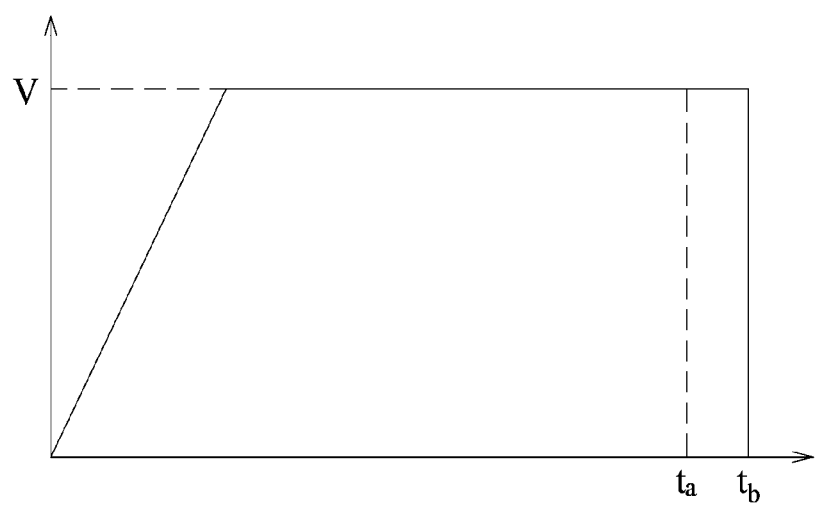
FIG. 33 is a view illustrating a voltage applied to the electrochromic element from the control module according to an embodiment of the present application.

FIG. 33 is a view illustrating a voltage applied to the electrochromic element from the control module according to an embodiment of the present application.

A voltage applied from the control module 10100 to the electrochromic element 10200 in an application stage will be described with reference to FIG. 33.

The control module 10100 may supply a driving voltage to the electrochromic element 10200. A period during which the driving voltage supplied from the control module 10100 to the electrochromic element 10200 is applied to the electrochromic element 10200 may be determined on the basis of the threshold period. A period tb during which a driving voltage is applied from the control module 10100 to the electrochromic element 10200 may be longer than a threshold period ta.

The control module 10100 may set the period tb during which the driving voltage is applied to the electrochromic element 10200 to be fixed in accordance with the threshold period ta and supply the driving voltage to the electrochromic element 10200. Alternatively, the control module 10100 may change the period tb during which the driving voltage is applied to the electrochromic element 10200 in accordance with the threshold period ta.

When the control module 10100 applies a driving voltage to the electrochromic element 10200 during the fixed period tb for applying the driving voltage to the electrochromic element 10200, the control module 10100 may calculate a maximum threshold period of the electrochromic element 10200 and apply a driving voltage to the electrochromic element 10200 for a period longer than the maximum threshold period. The maximum threshold period may be a threshold period required when the electrochromic element 10200 is discolored from a bleached state to a maximum colored state. The control module 10100 may apply a driving voltage to the electrochromic element 10200 for a period longer than the maximum threshold period regardless of to which state the electrochromic element 10200 is changed, and the calculation of the period for applying the driving voltage to the electrochromic element 10200 may be omitted. In this way, there is an effect of reducing the number of operations.

The threshold period ta may be related to the area of the electrochromic element 10200. The threshold period ta may be proportional to the area of the electrochromic element 10200. Because the maximum threshold period is also related to the area of the electrochromic element 10200, the control module 10100 may set the period tb during which the driving voltage is applied to the electrochromic element 10200 in accordance with the area of the electrochromic element 10200 and apply the driving voltage to the electrochromic element 10200.

When the control module 10100 changes the period tb during which the driving voltage is applied to the electrochromic element 10200 in accordance with the threshold period ta, the control module 10100 may measure a current potential of the electrochromic element 10200 and apply a driving voltage to the electrochromic element 10200 by changing the period tb during which the driving voltage is applied to the electrochromic element 10200 on the basis of the measured current potential. In this case, although not illustrated, the control module 10100 may further include a measuring unit capable of measuring a current potential of the electrochromic element 10200.

Alternatively, the control module 10100 may change the period tb during which the driving voltage is applied to the electrochromic element 10200 on the basis of pre-stored threshold period data. The threshold period data may be stored in the storage unit 10140 of the control module 10100, and the control module 10100 may change the period tb during which the driving voltage is applied to the electrochromic element 10200 on the basis of the threshold period data stored in the storage unit 10140. The threshold period data may also be related to the area of the electrochromic element 10200.

The threshold period data may be data related to a voltage difference and/or temperature. Because the threshold period is determined by the voltage difference, the control module 10100 may compare a voltage previously applied to the electrochromic element 10200 and a voltage currently applied to the electrochromic element 10200, calculate a voltage difference therebetween, and apply a driving voltage to the electrochromic element 10200 for a period longer than the threshold period ta corresponding to the calculated voltage difference. Because the threshold period is related to ion migration, the threshold period data may be data related to temperature. The control module 10100 may measure a temperature in real time and change the threshold period data stored in the storage unit 10140 in real time.

The threshold period data may include data in the application stage and data in the maintenance stage.

The threshold period data in the application stage may be data related to the voltage difference and/or temperature. The threshold period data in the maintenance stage may be data related to the voltage difference, temperature, and/or a period of the maintenance stage during which a voltage is not applied.

Figure 34:
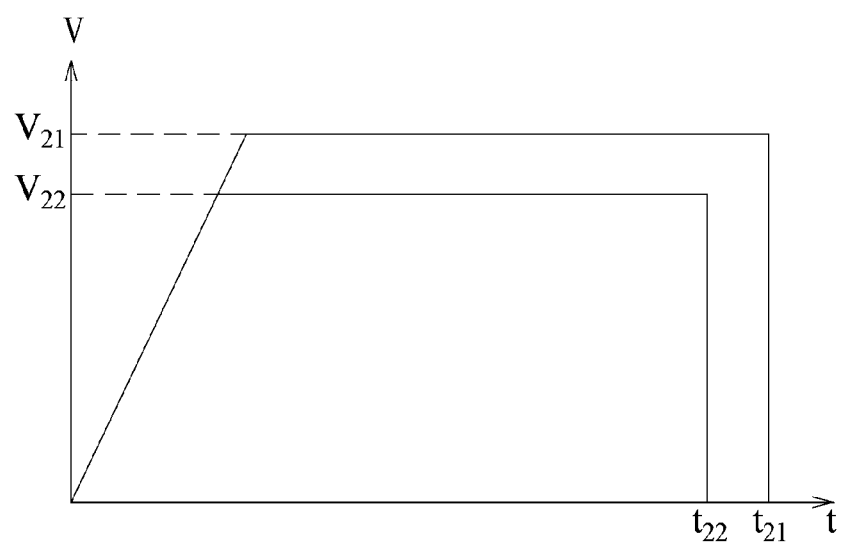
FIGS. 34 and 35 are view illustrating a threshold period in accordance with a voltage difference of the electrochromic device according to an embodiment of the present application.
Figure 35:
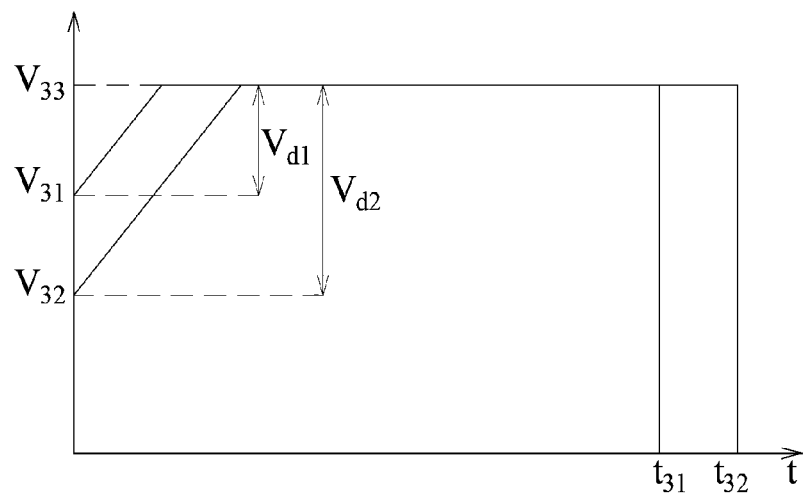

FIGS. 34 and 35 are views illustrating a threshold period in accordance with a voltage difference of the electrochromic device according to an embodiment of the present application.

FIG. 34 is a view illustrating a threshold period due to a voltage difference that varies in accordance with a target discoloration level in a bleached state.

In FIG. 34, a first driving voltage V21 is a driving voltage applied to the electrochromic element 10200 when the state of the electrochromic element 10200 is changed from a bleached state to a first colored state, and a second driving voltage V22 indicates a driving voltage applied to the electrochromic element 10200 when the state of the electrochromic element 10200 is changed from the bleached state to a second colored state.

The first colored state may refer to a state in which an extent of coloration is higher than that in the second colored state. The first colored state may refer to a state in which a transmittance is lower than that in the second colored state.

The first driving voltage V21 may be a voltage higher than the second driving voltage V22.

Because a driving voltage is not applied from the control module 10100 to the electrochromic element 10200 in the bleached state, a voltage difference may be equal to the first driving voltage V21 when the state of the electrochromic element 10200 is changed from the bleached state to the first colored state, and a voltage difference may be equal to the second driving voltage V22 when the state of the electrochromic element 10200 is changed from the bleached state to the second colored state. Because the voltage difference when the state of the electrochromic element 10200 is changed to the first colored state is smaller than the voltage difference when the state of the electrochromic element 10200 is changed to the second colored state, a second threshold period t22 when the state of the electrochromic element 10200 is changed to the second colored state may be shorter than a first threshold period t21 when the state of the electrochromic element 10200 is changed to the first colored state. That is, a period required for the electrochromic element 10200 to be uniformly colored to the second colored state may be shorter than a period required for the electrochromic element 10200 to be uniformly colored to the first colored state.

The first threshold period t21 when the state of the electrochromic element 10200 is changed to the first colored state and the second threshold period t22 when the state of the electrochromic element 10200 is changed to the second colored state may be stored in the storage unit 10140 of the control module 10100, and the control module 10100 may determine a period for applying a driving voltage to the electrochromic element 10200 on the basis of the first threshold period t21 and the second threshold period t22 stored in the storage unit 10140 and apply the driving voltage to the electrochromic element 10200.

When changing the state of the electrochromic element 10200 from the bleached state to the first colored state, the control module 10100 may color the electrochromic element 10200 by applying a driving voltage to the electrochromic element 10200 for a period longer than the first threshold period t21. Also, when changing the state of the electrochromic element 10200 from the bleached state to the second colored state, the control module 10100 may color the electrochromic element 10200 by applying a driving voltage to the electrochromic element 10200 for a period longer than the second threshold period t22.

FIG. 35 is a view illustrating a threshold period due to a voltage difference when the state of the electrochromic element 10200 is changed from a colored state to another discoloration level.

In FIG. 35, a first driving voltage V31 is a driving voltage applied to the electrochromic element 10200 when the state of the electrochromic element 10200 is changed from the first colored state to a third colored state, and a second driving voltage V32 indicates a driving voltage applied to the electrochromic element 10200 when the state of the electrochromic element 10200 is changed from the second colored state to the third colored state.

The first colored state may refer to a state in which an extent of coloration is higher than that in the second colored state. The first colored state may refer to a state in which a transmittance is lower than that in the second colored state. The first driving voltage V31 may be a voltage higher than the second driving voltage V32, and a third driving voltage V33 may be a voltage higher than the first driving voltage V31.

When the initial state of the electrochromic element 10200 is the first colored state, the first driving voltage V31 is charged in the electrochromic element 10200. That is, the case in which the initial state of the electrochromic element 10200 is the first colored state may be the same as the case in which the first driving voltage V31 is applied to the electrochromic element 10200.

When the initial state of the electrochromic element 10200 is the second colored state, the second driving voltage V32 is charged in the electrochromic element 10200. That is, the case in which the initial state of the electrochromic element 10200 is the second colored state may be the same as the case in which the second driving voltage V32 is applied to the electrochromic element 10200.

When the state of the electrochromic element 10200 is changed from the first colored state to the third colored state, the voltage difference may be a first voltage difference Vd1. The driving voltage in the first colored state of the electrochromic element 10200 may be the first driving voltage V31, the driving voltage in the third colored state of the electrochromic element 10200 may be the third driving voltage V33, and a difference between the third driving voltage V33 and the first driving voltage V31 may be the first voltage difference Vd1.

When the state of the electrochromic element 10200 is changed from the second colored state to the third colored state, the voltage difference may be a second voltage difference Vd2. The driving voltage in the second colored state of the electrochromic element 10200 may be the second driving voltage V32, the driving voltage in the third colored state of the electrochromic element 10200 may be the third driving voltage V33, and a difference between the third driving voltage V33 and the second driving voltage V32 may be the second voltage difference Vd2.

Because the first voltage difference Vd1 is smaller than the second voltage difference Vd2, a first threshold period t31 when the state of the electrochromic element 10200 is changed from the first colored state to the third colored state may be shorter than a second threshold period t32 when the state of the electrochromic element 10200 is changed from the second colored state to the third colored state.

A previous state is stored in the storage unit 10140 of the control module 10100. That is, a driving voltage that is previously output to the electrochromic element 10200 may be stored in the storage unit 10140 of the control module 10100. Every time a driving voltage is applied to the electrochromic element 10200, the control module 10100 may store the driving voltage in the storage unit 10140. The first colored state and the second colored state are stored in the storage unit 10140 of the control module 10100.

Threshold periods in accordance with voltage differences are stored in the storage unit 10140 of the control module 10100. When the state of the electrochromic element 10200 is changed from the first colored state to the third colored state, the control module 10100 may compare the third driving voltage V33, which is a target voltage to be applied to the electrochromic element 10200, with the first driving voltage V31, which is stored in the storage unit 10140, and calculate the first voltage difference Vd1. The control module 10100 may determine a period for applying the driving voltage to the electrochromic element 10200 on the basis of the first threshold period t31 corresponding to the first voltage difference Vd1 and apply the driving voltage to the electrochromic element 10200. Here, the period during which the driving voltage is applied to the electrochromic element 10200 may be longer than the first threshold period t31.

When the state of the electrochromic element 10200 is changed from the second colored state to the third colored state, the control module 10100 may compare the third driving voltage V33, which is a target value to be applied to the electrochromic element 10200, with the second driving voltage V32, which is stored in the storage unit 10140, and calculate the second voltage difference Vd2. The control module 10100 may determine a period for applying the driving voltage to the electrochromic element 10200 on the basis of the second threshold period t32 corresponding to the second voltage difference Vd2 and apply the driving voltage to the electrochromic element 10200. Here, the period during which the driving voltage is applied to the electrochromic element 10200 may be longer than the second threshold period t32.

Although the case in which the state of the electrochromic element 10200 is changed from a low colored state to a high colored state has been described above with reference to the drawings, the same description may also be applied to a case in which the state of the electrochromic element 10200 is changed from a high colored state to a low colored state. That is, the above description may also be applied to a bleaching process. A threshold period may be changed due to a voltage difference also in a process in which the electrochromic element 10200 is bleached.

Also, although the application stage is illustrated in FIGS. 34 and 35 and described in detail above with reference to FIGS. 34 and 35 as an example, the characteristics corresponding to the application stage may also be applied to the maintenance stage. In a maintenance stage, a previous state may be a voltage applied in the application stage or a voltage applied in a previous maintenance stage before the current maintenance stage. A threshold period may be determined on the basis of the previous state and a current state.

1.7. Maintenance Voltage

Figure 36:
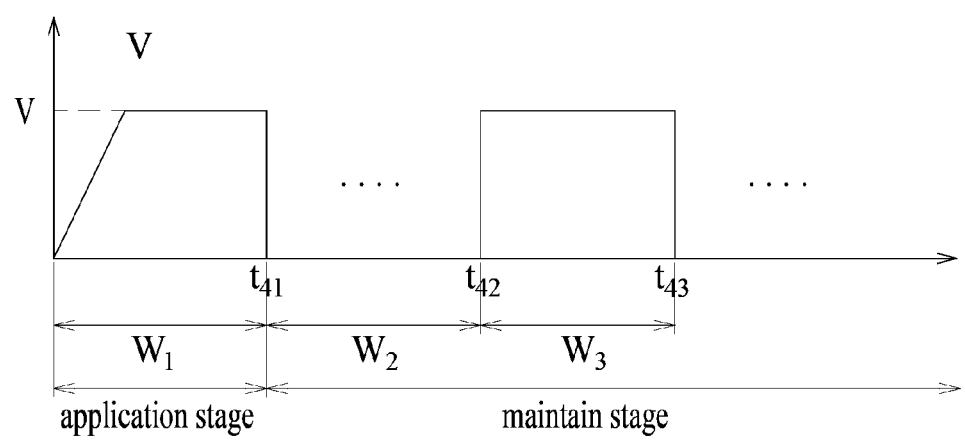
FIGS. 36 and 37 are view illustrating a threshold period in accordance with a duty cycle of the electrochromic device according to an embodiment of the present application.
Figure 37:
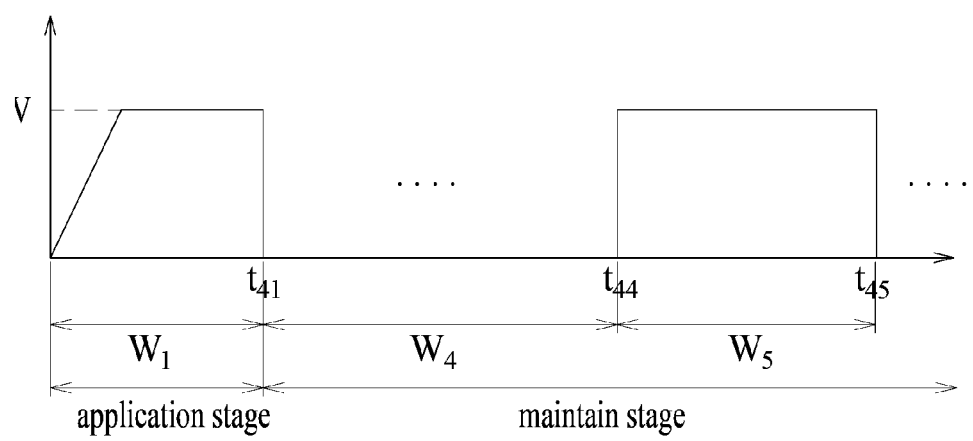

FIGS. 36 and 37 are views illustrating a threshold period in accordance with a duty cycle of the electrochromic device according to an embodiment of the present application.

A threshold period in accordance with a duty cycle in a maintenance stage will be described with reference to FIGS. 36 and 37.

FIG. 36 is a view illustrating a threshold period when a non-application period is relatively short, and FIG. 37 is a view illustrating a threshold period when a non-application period is relatively long.

Referring to FIG. 36, the control module 10100 according to an embodiment may apply a driving voltage to the electrochromic element 10200 in the application stage and the maintenance stage.

The application stage may be a stage in which the electrochromic element 10200 is discolored by the control module 10100. The application stage may be a stage in which the electrochromic element 10200 is discolored to a target discoloration level by the control module 10100. The application stage may include an initial discoloration stage and a discoloration level changing stage.

The maintenance stage refers to a stage in which a maintenance voltage is applied to the electrochromic element 10200 to maintain a state of the electrochromic element 10200. The control module 10100 may apply a maintenance voltage in the form of a pulse to the electrochromic element 10200 in the maintenance stage to maintain the state of the electrochromic element 10200.

In the application stage, the control module 10100 may apply a driving voltage up to a first time point t41. The control module 10100 may apply a gradually rising driving voltage during a predetermined section up to the first time point t41 and apply a driving voltage at a predetermined level. The application stage may be maintained for a first period w1.

The maintenance stage may include an application period and a non-application period. The application period may be defined as a period in which a driving voltage is applied, and the non-application period may be defined as a period in which the driving voltage is not applied. By the application period and the non-application period repetitively appearing in the maintenance stage, the control module 10100 may apply a voltage in the form of a pulse to the electrochromic element 10200.

A period from the first time point t41 at which the application stage ends to a second time point t42 at which the application period begins may be defined as a second period w2. The second period w2 may be a non-application period. A period from the second time point t42 at which the non-application period ends to a third time point t43 at which the application period ends may be defined as a third period w3.

The application period may be determined by a magnitude of a driving voltage applied in the application stage and the non-application period. The third period w3 may be determined by the magnitude of the driving voltage and the second period w2.

The third period w3 may be shorter than the first period w1.

A correlation between the magnitude of the driving voltage and the application period in the application stage will be described. A state change in the non-application period may be increased as the magnitude of the driving voltage in the application stage is larger. That is, an extent of natural discoloration may be increased as the magnitude of the driving voltage in the application stage is larger. Because a difference between a voltage charged in the electrochromic element 10200 and a driving voltage is increased as the magnitude of the driving voltage in the application stage is larger, a threshold period in the maintenance stage may be increased. Because the application period should be longer than the threshold period, the application period may be longer as the magnitude of the driving voltage is larger.

In a case in which the state of the electrochromic element 10200 is changed from a state in which the electrochromic element 10200 has a minimum transmittance to a state in which the electrochromic element 10200 has a maximum transmittance in the application stage, a threshold period in the maintenance stage in this case may be the maximum threshold period. The control module 10100 may store the maximum threshold period in the storage unit 10140 and apply a driving voltage to the electrochromic element 10200 for the maximum threshold period regardless of the magnitude of the driving voltage in the application stage to maintain the state of the electrochromic element 10200. In this way, there is an effect of reducing the number of operations of the control module 10100.

A correlation between the non-application period and the application period will be described with reference to FIGS. 36 and 37. The application stage in FIG. 37 is the same as the application stage in FIG. 36.

A period from the first time point t41 at which the application stage ends to a fourth time point t44 at which the application period begins may be defined as a fourth period w4. The fourth period w4 may be a non-application period. A period from the fourth time point t44 at which the non-application period ends to a fifth time point t45 at which the application period ends may be defined as a fifth period w5.

The non-application period of FIG. 36 is shorter than the non-application period of FIG. 37. That is, the second period w2 is a period shorter than the fourth period w4.

A state change of the electrochromic element 10200 may be increased as the non-application period is longer. That is, the extent of natural discoloration may be increased as the non-application period is longer. Because a difference between a voltage currently charged in the electrochromic element 10200 and a driving voltage increases as the non-application period is longer, the threshold period in the maintenance stage may be increased. Because the application period should be longer than the threshold period, the application period may be longer as the non-application period is longer.

That is, because the non-application period of FIG. 36 is shorter than the non-application period of FIG. 37, power consumption may be reduced by setting the application period of FIG. 36 to be shorter than the application period of FIG. 37, and there is an effect of uniformly maintaining the extent of discoloration of the electrochromic element 10200.

In other words, because the second period w2 of FIG. 36 is shorter than the fourth period w4 of FIG. 37, power consumption may be reduced by setting the third period w3 of FIG. 36 to be shorter than the fifth period w5 of FIG. 37, and there is an effect of uniformly maintaining the extent of discoloration of the electrochromic element 10200.

In the maintenance stage, because the duty cycle refers to a ratio between a sum of the application period and the non-application period and the application period, the duty cycle may be maintained corresponding to the ratio. However, when the magnitude of the driving voltage in the application stage increases, the duty cycle may also be increased to uniformly maintain the extent of discoloration.

The first period w1 may be equal to the third period w3, or the first period w1 may be longer than the third period w3. When the second period w2, which is the non-application period, is infinitely extended such that natural discoloration occurs and the electrochromic element 10200 is returned to its initial state, the first period w1 may be equal to the third period w3. Otherwise, the first period w1 may be longer than the third period w3. In this case, the third period w3 may be set to be shorter than the first period w1 to reduce power consumption.

Hereinafter, a device for driving the electrochromic element by applying a voltage to the electrochromic element will be described.

2. Electroactive Device

A device for driving the electrochromic element may drive an electroactive element 22000 as well as the electrochromic element. Hereinafter, the electroactive element 22000 and a device for driving the electroactive device 22000 are defined as an electroactive device 22001.

The electroactive element 22000 is an element including two electrodes and an intermediate layer disposed between the two electrodes and is activated or driven by receiving power. The electrochromic element is an example of the electroactive element 22000.

The activation and driving refers to a change in a state of the electroactive device 22001. The state may include at least one of an electrical state and an optical state.

The electroactive device 22001 may be driven in accordance with a predetermined electrical process.

The electrical process may include generation of power, transmission of the generated power, and a state change caused by the transmitted power.

Hereinafter, the electroactive device 22001 will be described in detail.

2.1. Detailed Description of Electroactive Device

Figure 38:
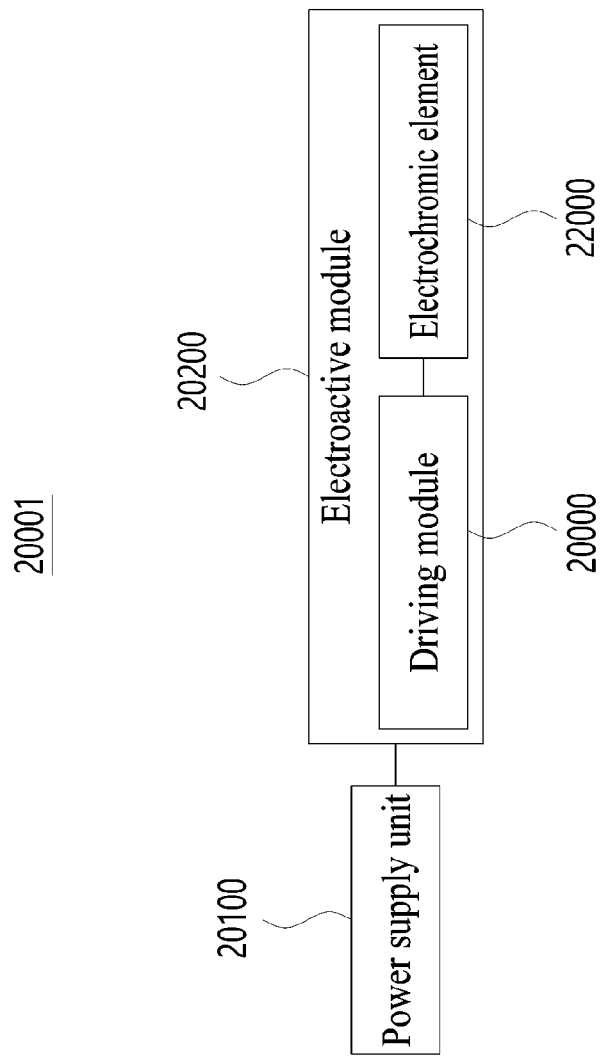
FIG. 38 is a view illustrating elements of an electroactive device according to an embodiment of the present application.

FIG. 38 is a view illustrating elements of an electroactive device according to an embodiment of the present application.

Referring to FIG. 38, an electroactive device 20001 according to an embodiment of the present application may include a power supply unit 20100 and an electroactive module 20200. The electroactive module 20200 may include a driving module 21000 and the electroactive element 22000. The electroactive device 20001 may further include other elements not illustrated in the drawing. However, the elements illustrated in FIG. 38 are not essential, and the electroactive device 20001 having more or less elements in comparison to those illustrated in FIG. 38 may also be realized.

The power supply unit 20100 may generate power.

The electroactive module 20200 may be driven by receiving active power from the power supply unit 20100.

The power supply unit 20100 may generate power for driving the electroactive module 20200. The power for driving the electroactive module 20200 may be defined as active power.

The active power may be transmitted to the electroactive module 20200. For the transmission of the active power, a predetermined electrical connector may be disposed between the power supply unit 20100 and the electroactive module 20200.

Types of the power supply unit 20100 may include i) a stored power supply unit configured to supply power stored therein to the electroactive module 20200 and ii) a converted power supply unit configured to receive power from outside, convert the received power to a type of power that can be used by the electroactive module 20200, and transmit the converted power to the electroactive module 20200.

Specifically, the power supply unit 20100 may be a vehicle battery, which is a type of the stored power supply unit 20100.

A state of the electroactive module 20200 may be changed by the electroactive module 20200 receiving active power. The electroactive module 20200 may include the driving module 21000 and the electroactive element 22000.

Hereinafter, the driving module 21000 and the electroactive element 22000 included in the electroactive module 20200 will be described. First, a function of the driving module 21000 will be described.

The driving module 21000 may drive the electroactive element 22000. The driving module 21000 may change a state of the electroactive element 22000.

The driving module 21000 may receive active power from the power supply unit 20100.

The driving module 21000 may generate driving power on the basis of the active power. The driving power may be defined as power for driving the electroactive element 22000. A state of the electroactive element 22000 may be changed due to the driving power.

Figure 39:
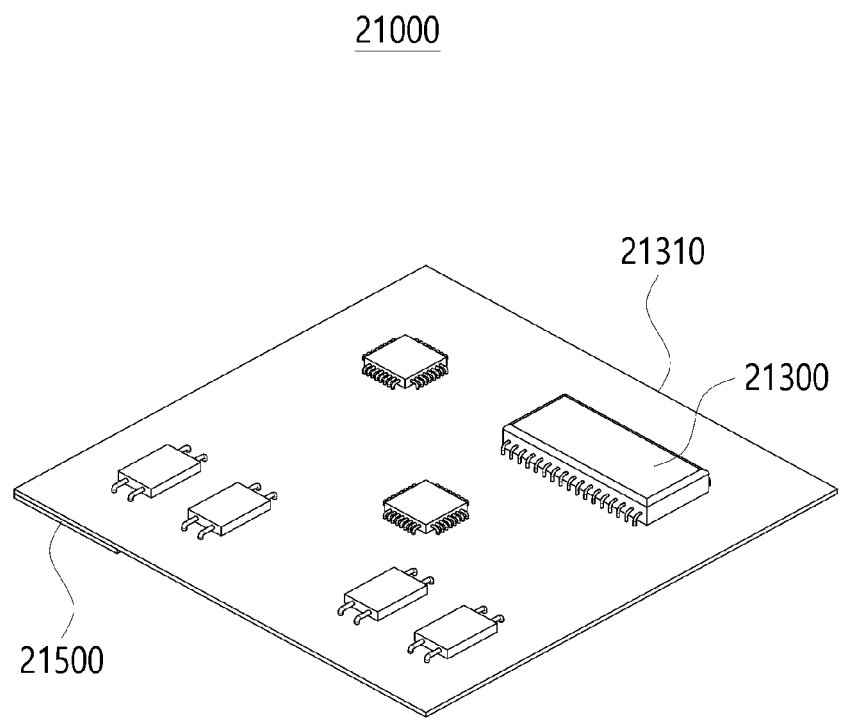
FIG. 39 is a view illustrating a driving module according to an embodiment of the present application.

FIG. 39 is a view illustrating the driving module 21000 according to an embodiment of the present application.

Referring to FIG. 39, the driving module 21000 according to an embodiment of the present application may include a driving unit 21300 and an electrical connecting member 21500. However, the elements illustrated in FIG. 39 are not essential, and the driving module 21000 having more or less elements in comparison to those illustrated in FIG. 39 may also be realized.

The driving unit 21300 may generate the driving power.

The electrical connecting member 21500 may transmit the driving power to the electroactive element 22000.

Hereinafter, elements of the driving module 21000 will be described in detail.

First, the driving unit 21300 will be described.

The driving unit 21300 according to an embodiment of the present application may receive active power, generate driving power, and output the driving power. The driving unit 21300 may select power of various sizes and polarities as the driving power. For example, the driving power may be 0 V.

The driving unit 21300 may be realized in a hardware form including a predetermined electronic circuit or chip or in a software form including a predetermined program.

The driving unit 21300 may be realized on a driving substrate 21310.

The driving unit 21300 may include elements having predetermined functions.

Figure 40:
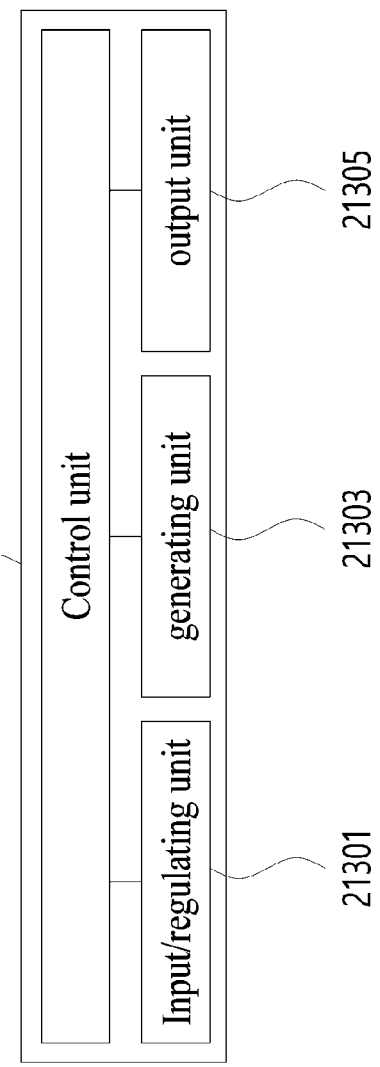
FIG. 40 is a block diagram illustrating a driving unit according to an embodiment of the present application.

FIG. 40 is a block diagram illustrating the driving unit 21300 according to an embodiment of the present application.

Referring to FIG. 40, the driving unit 21300 may include an input/regulating unit 21301, a generating unit 21303, an output unit 21305, and a control unit 21307. However, the elements illustrated in FIG. 40 are not essential, and the driving unit 21300 having more or less elements in comparison to those illustrated in FIG. 40 may also be realized. The elements of the driving unit 21300 may be elements classified according to functions of the driving unit 21300.

The input/regulating unit 21301 may receive active power from the power supply unit 20100.

The input/regulating unit 21301 may convert the active power into internal power. The internal power may be defined as power that can be used in the driving unit 21300. The internal power may be used by each of the elements of the driving unit 21300. The internal power may be transmitted to each of the elements of the driving unit 21300. The internal power may be transmitted to the generating unit 21303, the output unit 21305, and the control unit 21307. The internal power may be used in the generating unit 21303, the output unit 21305, and the control unit 21307.

The input/regulating unit 21301 may generate internal power having a smaller value than the active power. The input/regulating unit 21301 may drop the active power. The internal power may have a smaller value than the active power. To drop the active power, a predetermined voltage level shifter may be disposed in the input/regulating unit 21301.

The input/regulating unit 21301 may generate internal power that is more stabilized than the active power. The input/regulating unit 21301 may stabilize the active power. The internal power may be power that is more stable than the active power. For example, the active power may be power whose size is changeable, and the internal power may be constant power whose size is maintained. To stabilize the active power, a predetermined regulator may be disposed in the input/regulating unit 21301. Types of the regulator may include i) a linear regulator configured to directly regulate received power and ii) a switching regulator configured to generate a pulse on the basis of received power and adjust an amount of the pulse to output a precisely regulated voltage. Specifically, the input/regulating unit 21301 may receive power output from a vehicle battery, drop the power, and stabilize the power. Accordingly, the power output from the vehicle battery may be converted into power that can be used by the driving unit 21300.

The generating unit 21303 may generate driving power. The generating unit 21303 may receive internal power and generate driving power.

The generating unit 21303 may generate a plurality of driving powers having different properties. At least one of sizes and polarities of the plurality of driving powers may be different.

The generating unit 21303 may transmit the driving power to the output unit 21305.

The output unit 21305 may output the driving power. The driving power may be output from the driving unit 21300 via the output unit 21305.

The output unit 21305 may control the output of the driving power. The output unit 21305 of the driving unit 21300 may selectively output a plurality of driving powers received from the generating unit 21303. Properties of power output from the output unit 21305 may be different from properties of the driving power. The properties may include at least one of a size and a polarity. For example, the output unit 21305 may not output the driving power.

The output unit 21305 may transmit the driving power to the electrical connecting member 21500.

The control unit 21307 may generally control the driving unit 21300. The control unit 21307 may control the input/regulating unit 21301, the generating unit 21303, and the output unit 21305.

The control unit 21307 may control a generation of internal power.

The control unit 21307 may control a generation of the driving power. The control unit 21307 may allow the generating unit 21303 to generate at least one of the plurality of driving powers.

The control unit 21307 may control an output of the driving power. The control unit 21307 may allow the output unit 21305 to output power having different properties from those of the driving power.

The control unit 21307 may generate a control signal for controlling the driving unit 21300. The control unit 21307 may generate a control signal for controlling the input/regulating unit 21301, the generating unit 21303, and the output unit 21305. In terms of hardware, the control unit 21307 may be provided in the form of an electronic circuit such as a central processing unit (CPU) chip that processes an electrical signal to perform a controlling function. In terms of software, the control unit 21307 may be provided in the form of a program for driving the hardware of the control unit 21307. Specifically, the control unit 21307 may be provided as a microprocessor.

The driving unit 21300 may further include a separate feedback unit.

The feedback unit may prevent malfunctioning of the electroactive element 22000. That is, the feedback unit may operate so that the electroactive element 22000 is maintained in a normal state.

The feedback unit may have a predetermined feedback mechanism. The feedback mechanism may measure a current state of the electroactive element 22000 and drive an electrochromic element 22200 on the basis of the current state. For example, a voltage value or a current value of the electroactive element 22000 may be returned to the feedback unit. The feedback unit may measure the current state of the electroactive element 22000 on the basis of the voltage value or the current value. The feedback unit may transmit the measured current state to the control unit 21307. The feedback unit may generate a feedback signal corresponding to the measured current state and transmit the feedback signal to the control unit 21307. The control unit 21307 may change power output through the output unit 21305 on the basis of the feedback signal. The control unit 21307 may change a level of power output through the output unit 21305 on the basis of the feedback signal and control the electroactive element 22000 to be maintained in the normal state.

Alternatively, the feedback unit may separately operate from the control unit 21307. The feedback unit may be connected to the electroactive element 22000 and change power output from the output unit 21305 on the basis of the current state of the electroactive element 22000 so that the electroactive element 22000 is maintained in the normal state.

When the current state of the electroactive element 22000 is not the normal state, the feedback unit may drive the electroactive element 22000 so that the electroactive element 22000 reaches the normal state. The feedback unit may generally control the driving unit 21300 to generate driving power for allowing a state of the electroactive element 22000 to be the normal state.

The driving unit 21300 included in the driving module 21000 has been described above. Hereinafter, the electrical connecting member 21500 included in the driving module 21000 will be described.

The electrical connecting member 21500 according to an embodiment of the present application may be electrically connected to the driving unit 21300 and the electroactive element 22000.

The electrical connecting member 21500 may receive driving power from the driving unit 21300.

The electrical connecting member 21500 may transmit the driving power to the electroactive element 22000. The electroactive element 22000 may receive the driving power by the electrical connecting member 21500.

The functions of the elements of the driving module 21000 have been described above. Hereinafter, the electroactive element 22000 will be described.

Figure 41:
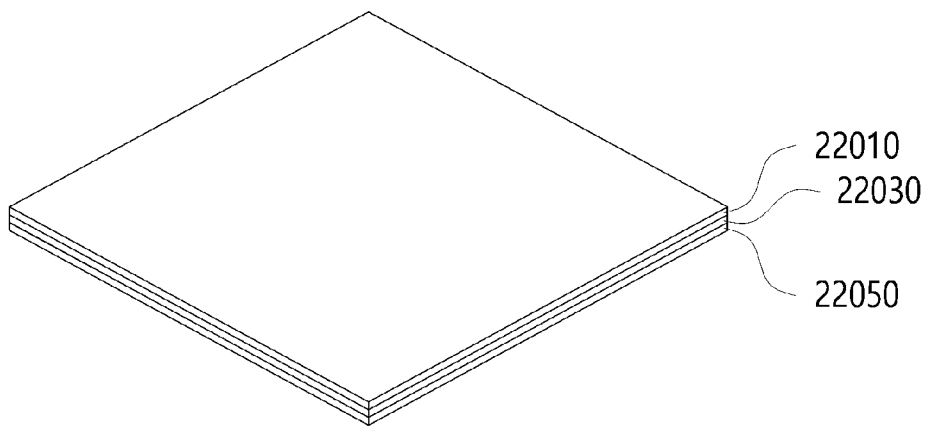
FIG. 41 is a view illustrating an electroactive element according to an embodiment of the present application.

FIG. 41 is a view illustrating the electroactive element 22000 according to an embodiment of the present application.

A state of the electroactive element 22000 according to an embodiment of the present application may be changed by the electroactive element 22000 receiving the driving power. The electroactive element 22000 may receive the driving power from the electrical connecting member 21500 of the driving module 21000.

Referring to FIG. 41, the electroactive element 22000 according to an embodiment of the present application may include electrode layers 22010 and 22050 and an intermediate layer 22030. However, the layers illustrated in FIG. 41 are not essential, and the electroactive element 22000 having more or less layers in comparison to those illustrated in FIG. 41 may also be realized.

The electrode layers may include a first electrode 22010 and a second electrode 22050.

The first electrode 22010 and the second electrode 22050 may be conductive. The first electrode 22010 and the second electrode 22050 may be formed of a conductive material. The above-described driving power may be applied to the first electrode 22010 and the second electrode 22050.

The driving power may include a voltage or a current. When a voltage is applied to the first electrode 22010 and the second electrode 22050, the first electrode 22010 and the second electrode 22050 may have a predetermined potential. When a current is applied to the first electrode 22010 and the second electrode 22050, the first electrode 22010 and the second electrode 22050 may have a predetermined potential due to the current.

The intermediate layer 22030 may be disposed between the first electrode 22010 and the second electrode 22050.

The intermediate layer 22030 may be in contact with the first electrode 22010 and the second electrode 22050.

The intermediate layer 22030 is a layer whose state is changeable. The intermediate layer 22030 is a layer whose state is changeable on the basis of driving power formed in the first electrode 22010 and/or the second electrode 22050.

The electrode layers and the intermediate layer 22030 may be realized in the form of a flat plate.

The electrode layers and the intermediate layer 22030 may include a plurality of regions.

The driving module 21000 and the electroactive element 22000 included in the electroactive module 20200 have been described above by focusing on the functions thereof. Hereinafter, shapes, positional relationships, and connection relationships of the elements included in the electroactive module 20200 will be described.

Throughout this specification, when it is mentioned that one element such a film, a region, or a substrate is "disposed in," "connected to," or "in contact with" another element, the element may be interpreted as being directly "disposed in," "connected to," or "in contact with" the other element, or still another element may be interpreted as being present between the element and the other element. Like elements are denoted by like reference numerals. As used herein, the term "and/or" includes any one of corresponding listed items or all combinations of one or more of the items.

Relative terms such as "upper," "side," and "lower" may be used to describe relationships between one element and another element illustrated in the drawings. The relative terms may be understood as intending to include different directions of an element in addition to directions depicted in the drawings. For example, when an element is turned over in the drawings, elements depicted as being present on upper surfaces of other elements are placed at lower surfaces of the other elements. Therefore, the term "upper" given as an example may depend on a specific direction in the drawings and include both "lower" and "upper" directions. When an element is in another direction (rotates 90° with respect to another direction), relative descriptions herein may be interpreted according to this.

An outer direction may be a direction corresponding to a direction toward a "side" from a central axis, and an inner direction may be a direction corresponding to a direction toward the central axis from the "side."

In the present specification, although terms such as first and second are used to describe various members, parts, regions, layers and/or portions, it is self-evident that the members, parts, regions, layers, and/or portions are not limited by the terms.

Figure 42:
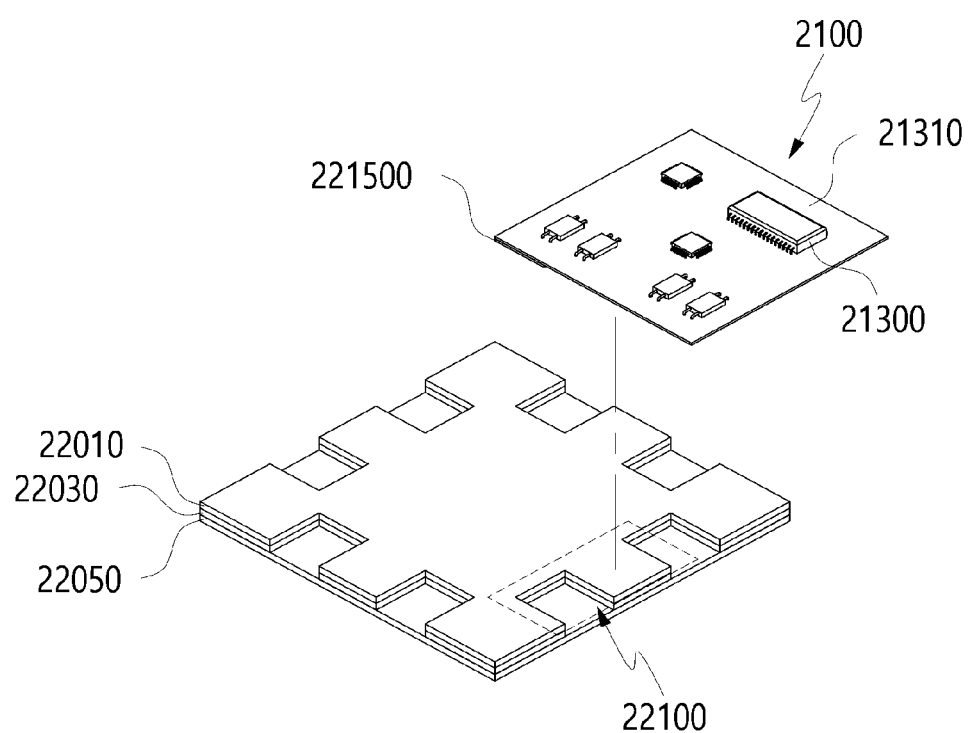
FIG. 42 is an exploded perspective view illustrating an electroactive module according to an embodiment of the present application.

FIG. 42 is an exploded perspective view illustrating the electroactive module 20200 according to an embodiment of the present application.

Referring to FIG. 42, the driving module 21000 may be disposed on the electroactive element 22000 having a specific structure.

The electroactive element 22000 may have a trench structure 22100. The trench structure 22100 may be a structure from which a partial region of the first electrode 22010 and a partial region of the intermediate layer 22030 are removed such that some of a plurality of regions of the second electrode 22050 are exposed toward the first electrode 22010.

Hereinafter, the trench structure 22100 of the electroactive element 22000 will be described in detail.

FIG. 43 is a view illustrating an electroactive element in which a trench structure according to an embodiment of the present application is formed.

Referring to FIG. 43, the trench structure 22100 may be formed in a region adjacent to a side surface of the electroactive element 22000.

The trench structure 22100 may be formed to pass through the first electrode 22010 and the intermediate layer 22030 of the electroactive element 22000 so that a partial region of the second electrode 22050 is exposed. As the trench structure 22100 is formed, a partial region of the first electrode 22010 and a partial region of the intermediate layer 22030 may be removed.

The trench structure 22100 may be formed along the side surface of the electroactive element 22000, or the trench structure 22100 may be formed apart from the side surface of the electroactive element 22000.

As illustrated in FIG. 43(*a*), when the trench structure 22100 is formed along the side surface of the electroactive element 22000, the trench structure 22100 may be formed such that a portion of the side surface of the electroactive element 22000 is ablated (removed). The trench structure 22100 may be formed such that a region of a side surface of the first electrode 22010 and a region of a side surface of the intermediate layer 22030 are removed. Accordingly, a partial cross-section of the first electrode 22010 and a partial cross-section of the intermediate layer 22030 may be exposed in the outer direction.

When the trench structure 22100 is formed along the side surface of the electroactive element 22000 as described above, there is an effect of simplifying a process of forming the trench structure 22100. When the trench structure 22100 is formed apart from the side surface of the electroactive element 22000, a start point and an end point of the process should be designed so that the trench structure 22100 is formed from a start point to an end point of the trench structure 22100. Conversely, when the trench structure 22100 is formed along the side surface of the electroactive element 22000, because the process may be performed by simply setting only the start point of the trench structure 22100, there is the effect of simplifying the process.

Also, when the trench structure 22100 is formed along the side surface of the electroactive element 22000, there is an effect of maximizing a region in which the electroactive element 22000 is utilized. In a case of the trench structure 22100 from which a side surface is not removed, a region of the electroactive element 22000 located in the outer direction from a region in which the trench structure 22100 is formed may be a region in which the electroactive element 22000 is unable to be driven. Conversely, when the trench structure 22100 is formed such that the side surface is ablated, a non-driving region is not formed in the electroactive element 22000. Consequently, in comparison to the trench structure 22100 of the same size formed such that the side surface is not ablated, the trench structure 22100 formed such that the side surface is ablated may have a larger region in which the electroactive element 22000 is driven. Accordingly, there is an effect of maximizing a region in which the electroactive element 22000 is utilized when the trench structure 22100 is formed along the side surface of the electroactive element 22000.

When the trench structure 22100 is formed apart from the side surface of the electroactive element 22000, the first electrode 22010 and the intermediate layer 22030 may be removed in an inner direction by being apart from the side surface of the electroactive element 22000 due to the trench structure 22100.

As the trench structure 22100 is formed apart from the side surface as described above, the present application has an effect of allowing the electroactive element 22000 to stably receive driving power. When the trench structure 22100 is formed in the electroactive element 22000 not to be spaced apart from the side surface, the driving module 21000 disposed in the trench structure may be separated from the electroactive element 22000 through an open side surface. Conversely, when the trench structure 22100 is formed apart from the side surface, the driving module 21000 may be supported by a region of the electroactive element 22000 remaining as much as a distance between the trench structure 22100 and the side surface and firmly coupled thereto. The firmly coupled driving module 21000 may stably supply driving power to the electroactive element 22000.

Referring again to FIG. 43(*a*), the trench structure 22100 may include a partial region of the first electrode 22010 adjacent to the side surface, a partial region of the intermediate layer 22030 adjacent to the side surface, and a partial region of the second electrode 22050 adjacent to the side surface. The trench structure 22100 may have a protrusion 22130 and a recess 22110 formed in the regions of the first electrode 22010, the intermediate layer 22030, and the second electrode 22050 adjacent to the side surface.

The recess 22110 may be defined as a region from which the partial region of the first electrode 22010 and the partial region of the intermediate layer 22030 are removed. The protrusion 22130 may be defined as a region located between adjacent recesses 22110.

The recess 22110 may allow an upper surface of the second electrode 22050 to be exposed toward the first electrode 22010. The upper surface of the second electrode 22050 may be exposed through the recess 22110.

The recess 22110 allows the regions of the first electrode 22010 and the intermediate layer 22030 of the electroactive element 22000 observed from the top to be seen as recessed.

Referring to FIG. 43(*b*), the trench structure 22100 may include a contact region 22150 and a pad region 22140.

The pad region 22140 may be may be defined as a region of the partial region of the second electrode 22050 exposed due to the plurality of recesses 22110. The contact region 22150 may be defined as the protrusion 22130 of the first electrode 22010. The contact region 22150 may be defined as a first protrusion 22131.

An upper surface of the pad region 22140 may be exposed in the upper direction. The upper surface of the pad region 22140 may be exposed toward the first electrode 22010.

Hereinafter, the driving module 21000 disposed in the electroactive element 22000 will be described.

The driving module 21000 may be disposed in a region of the electroactive element 22000. The driving module 21000 may be disposed to be adjacent to the side surface of the electroactive element 22000. The driving module 21000 may be disposed in a partial region of an outer boundary of the electroactive element 22000.

The driving module 21000 may cover a partial region of the electroactive element 22000. The driving module 21000 may be located to cover an upper surface adjacent to the side surface of the electroactive element 22000.

The driving module 21000 may cover the trench structure 22100. The driving module 21000 may be located in a region in which the trench structure 22100 is formed.

The driving module 21000 disposed in the electroactive element 22000 may be electrically connected to the above-described electroactive element 22000.

The driving module 21000 may be in contact with the electroactive element 22000. The driving module 21000 may be in contact with a region adjacent to the side surface of the electroactive element 22000.

The driving module 21000 may be in contact with the trench structure 22100 of the electroactive element 22000. The driving module 21000 may be in contact with a region of the electroactive element 22000 included in the trench structure 22100.

The driving module 21000 may be in contact with the contact region 22150 and the pad region 22140 included in the trench structure 22100.

The driving module 21000 may be in contact with a region of the second electrode 22050 exposed toward the first electrode 22010. The driving module 21000 may be in contact with an upper surface of the contact region 22150. The driving module 21000 may be in contact with the pad region 22140 via the recess 22110.

The driving module 21000 may be in contact with an upper surface of the pad region 22140.

The electroactive element 22000 may receive driving power via a region of the electroactive element 22000 in contact with the driving module 21000.

The electroactive element 22000 may receive driving power from the driving module 21000 in contact with the trench structure 22100. The driving module 21000 may apply driving power to the trench structure 22100.

The contact region 22150 and the pad region 22140 may receive driving power. The driving module 21000 may transmit driving power to the electroactive element 22000 via the contact region 22150 and the pad region 22140.

The electroactive module 20200 included in the electroactive device 20001 has been described in detail above.

Hereinafter, an electrochromic device, which is an example of the electroactive device 20001, will be described.

The electrochromic device is a device whose optical state changes due to receiving power.

When the electrochromic device receives power, the electrochromic element 22200 may be discolored. The discoloration may include coloration and bleaching.

Due to the reception of power, a light transmittance and absorptivity of the electrochromic device may be changed.

The electrochromic device may be used in a vehicle room mirror or a smart window of which a light transmittance or light reflectance needs to be adjusted.

The electrochromic device may include an electrochromic module, which is an example of the electroactive module 20200.

Hereinafter, an electrochromic module included in an electrochromic device will be described in detail.

The electrochromic module according to an embodiment of the present application may include the electrochromic element 22200 and the driving module 21000.

The electrochromic module may be driven by receiving active power from the power supply unit 20100. The electrochromic module may include the electrochromic element 22200, which is an example of the electroactive element 22000, and the above-described driving module 21000.

The electrochromic element 22200 included in the electrochromic module will be described first.

Figure 44:
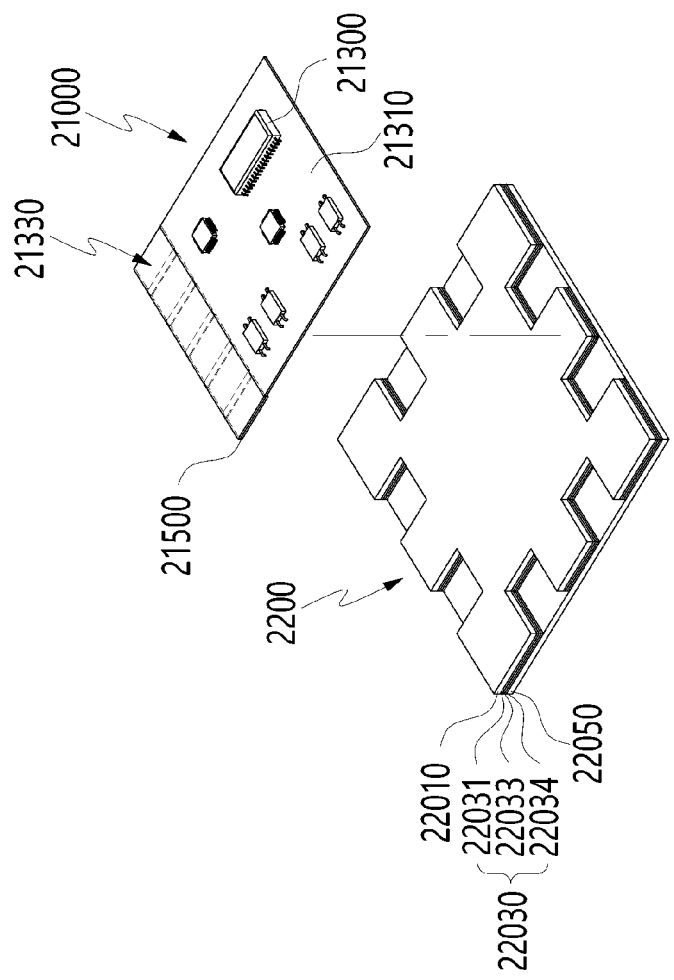
FIG. 44 is a view illustrating an electrochromic element according to an embodiment of the present application.

FIG. 44 is a view illustrating the electrochromic element 22200 according to an embodiment of the present application.

When driving power is supplied to the electrochromic element 22200, an optical state of the electrochromic element 22200 may be changed.

The optical state of the electrochromic element 22200 may be changed on the basis of an oxidation-reduction reaction.

A predetermined electrochromic material, electrons, and electrochromic ions may participate in the oxidation-reduction reaction. The electrochromic element 22200 may include the electrochromic material, the electrons, and the electrochromic ions.

The electrochromic material may be a material whose optical property is changed due to the oxidation-reduction reaction. The electrochromic ions may be ions that cause the oxidation-reduction reaction. The electrons may move the electrochromic ions to the electrochromic material.

Referring to FIG. 44, the electrochromic element 22200 may include the electrode layers 22010, 22050 and the intermediate layer and have the trench structure 22100. However, the layers illustrated in FIG. 44 are not essential, and the electrochromic element 22200 having more or less layers in comparison to those illustrated in FIG. 44 may also be realized.

The electrode layers may include the first electrode 22010 and the second electrode 22050.

The intermediate layer 22030 may be disposed between the first electrode 22010 and the second electrode 22050. The intermediate layer 22030 may include an electrochromic layer 22031, an electrolyte layer 22032, and an ion storage layer 22033.

The electrochromic layer 22031 may be in contact with the first electrode 22010 and be in contact with the electrolyte layer 22032.

The electrolyte layer 22032 may be in contact with the electrochromic layer 22031 and be in contact with the ion storage layer 22033.

The ion storage layer 22033 may be in contact with the electrolyte layer 22032 and be in contact with the second electrode 22050.

The electrochromic layer 22031 and the ion storage layer 22033 are not limited to being formed in the above order illustrated in FIG. 44 and may be formed in a reverse order. For example, the electrochromic layer 22031 may be in contact with the electrolyte layer 22032 and be in contact with the second electrode 22050.

The electrode layers and the intermediate layer 22030 of the electrochromic element 22200 may be in a solid state.

Hereinafter, the electrode layers and the intermediate layer 22030 of the electrochromic element 22200 will be described in detail.

Referring again to FIG. 44, the electrode layers of the electrochromic element 22200 according to an embodiment of the present application may include the first electrode 22010 and the second electrode 22050.

The first electrode 22010 and/or the second electrode 22050 may be provided in a flat plate shape.

Electrons may move via the first electrode 22010 and/or the second electrode 22050. Accordingly, as power is supplied to the electrodes, a current may flow in the electrodes, and a potential may be generated in the electrodes.

The electrode layers may have a predetermined optical property.

The first electrode 22010 and/or the second electrode 22050 may transmit light. That is, each of the electrodes may be realized as a transparent electrode. For example, when the first electrode 22010 of the electrochromic element 22200 is a transparent electrode, the second electrode 22050 may also be realized as a transparent electrode. Accordingly, light incident on the electrochromic element 22200 may pass through the first electrode 22010 and/or the second electrode 22050. The electrochromic element 22200 including the electrode layers having the above optical property may be used to realize a smart window.

When the electrode layers are realized as transparent electrodes as described above, a metal which is doped with at least one of indium, tin, zinc, and/or oxide may be selected as a material for realizing the electrodes. For example, ITO or ZnO may be selected as a material for realizing the transparent electrodes.

Alternatively, one of the first electrode 22010 and the second electrode 22050 may be formed of a material capable of reflecting light. That is, one of the first electrode 22010 and the second electrode 22050 may be realized as a reflective layer. When the first electrode 22010 of the electrochromic element 22200 is a transparent electrode, the second electrode 22050 may be realized as a reflective layer such that light incident on the electrochromic element 22200 is reflected by the second electrode 22050. Alternatively, when the second electrode 22050 is realized as a transparent electrode, the first electrode 22010 may be realized as a reflective layer. Accordingly, an object disposed to face the electrochromic element 22200 may be visible through the electrochromic element 22200. The electrochromic element 22200 including the reflective layer may be used to realize a smart mirror.

In this case, the first electrode 22010 may be formed of a metal material having a high reflectance. The first electrode 22010 may include at least one of Al, Cu, Mo, Cr, Ti, Au, Ag, and W. The second electrode 22050 may be formed with a transparent conductive material The electrochromic element 22200 according to an embodiment of the present application may be realized to be flexible. Corresponding to this, the electrode layers may also be realized to be flexible. Alternatively, the electrochromic element 22200 may have a curvature. Corresponding to this, the electrode layers may also have a curvature.

Hereinafter, the intermediate layer 22030 of the electrochromic element 22200 will be described.

The intermediate layer 22030 of the electrochromic element 22200 according to an embodiment of the present application may be electrically discolored.

Referring again to FIG. 44, the intermediate layer 22030 may include the electrochromic layer 22031, the electrolyte layer 22032, and the ion storage layer 22033.

The electrochromic layer 22031 and the ion storage layer 22033 may be electrically discolored.

Electrons may be injected into one of the electrochromic layer 22031 and the ion storage layer 22033, and electrons may be emitted from the remaining layer into which the electrons are not injected. An oxidation-reduction reaction may be caused in the electrochromic layer 22031 and the ion storage layer 22033 due to the transfer of the electrons.

Due to the transfer of the electrons, the electrochromic ions may migrate in the electrochromic element 22200. Because the electrons are provided in the electrochromic layer 22031 and/or the ion storage layer 22033, electrochromic ions including cathodic ions such as OH− and anodic ions such as H+ and Li+ may be injected into or ejected from the electrochromic element 22200, and as the electrochromic ions, the electrochromic layer 22031 and/or the ion storage layer 22033 are oxidized/reduced, the electrochromic layer 22031 and/or the ion storage layer 22033 is discolored.

An optical property of the electrochromic layer 22031 may be changed on the basis of the oxidation-reduction reaction.

The electrochromic layer 22031 and the ion storage layer 22033 may be discolored. Light transmittances and light absorptivities of the electrochromic layer 22031 and the ion storage layer 22033 may be changed.

Oxidation-reduction reactions that occur in the electrochromic layer 22031 and the ion storage layer 22033 may be different reactions.

That is, when the electrochromic layer 22031 is oxidized, the ion storage layer 22033 may be reduced, and when the electrochromic layer 22031 is reduced, the ion storage layer 22033 may be oxidized.

Accordingly, the ion storage layer 22033 may serve as a counter electrode of the electrochromic layer 22031.

State change corresponding to each other may be caused in the ion storage layer 22033 and the electrochromic layer 22031. For example, when the ion storage layer 22033 is oxidized and colored, the electrochromic layer 22031 may be reduced and colored, and when the ion storage layer 22033 is reduced and bleached, the electrochromic layer 22031 may be oxidized and bleached.

Alternatively, a reaction opposite to an electrochromic reaction in the electrochromic layer 22031 may occur in the ion storage layer 22033. For example, when the electrochromic layer 22031 is oxidized and colored, the ion storage layer 22033 may be reduced and bleached, and when the electrochromic layer 22031 is reduced and bleached, the ion storage layer 22033 may be oxidized and colored. A transmittance of the electrochromic element 22200 may be adjusted by the opposite reactions in the ion storage layer 22033 and the electrochromic layer 22031.

The electrochromic layer 22031 and the ion storage layer 22033 may include a material capable of electric discoloration. The electrochromic layer 22031 may include at least one oxide of $TiO$, $V_2O_5$, $Nb_2O_5$, $Cr_2O_3$, $MnO_2$, $FeO_2$, $CoO_2$, $NiO_2$, $RhO_2$, $Ta_2O_5$, $IrO_2$, and $WO_3$. The ion storage layer 22033 may include at least one oxide of $IrO_2$, $NiO_2$, $MnO_2$, $CoO_2$, iridium-magnesium oxide, nickel-magnesium oxide, and/or titanium-vanadium oxide.

The electrolyte layer 22032 may be disposed between the electrochromic layer 22031 and the ion storage layer 22033. The electrolyte layer 22032 may be an ion migration path between the electrochromic layer 22031 and the ion storage layer 22033. The electrochromic layer 22031 and the ion storage layer 22033 may exchange ions via the electrolyte layer 22032. The electrolyte layer 22032 may serve as an ion transport layer and block electron transfer. The electrochromic layer 22031 and the ion storage layer 22033 may be disposed in the electrochromic element 22200 to be insulated from each other while ionic conduction is allowed therebetween. That is, the electrolyte layer 22032 may prohibit transfer of electrons across the electrolyte layer 22032 but permit transport of ions.

The electrolyte layer 22032 may include an insulating material. For example, the electrolyte layer 22032 may include at least one of $SiO_2$, $Al_2O_3$, $Nb_2O_3$, $Ta_2O_5$, $LiTaO_3$, $LiNbO_3$, $La_2TiO_7$, $La_2TiO_7$, $SrZrO_3$, $ZrO_2$, $Y_2O_3$, $Nb_2O_5$, $La_2Ti_2O_7$, $LaTiO_3$, and $HfO_2$.

The electrode layers and the intermediate layer 22030 included in the electrochromic element 22200 have been described above. Hereinafter, the trench structure 22100 formed in the electrochromic element 22200 will be described.

The trench structure 22100 may be formed in the electrochromic element 22200 so that the electrochromic element 22200 is able to receive driving power. A partial region of the second electrode 22050 of the electrochromic element 22200 may be exposed due to the trench structure 22100.

The electrochromic element 22200 may be electrically connected to the driving module 21000 via the trench structure 22100. Driving power may be transmitted to the electrochromic element 22200 via the trench structure 22100.

Driving power may be supplied to the first electrode 22010 and the second electrode 22050 included in the trench structure 22100 of the electrochromic element 22200. As the driving power is supplied to the first electrode 22010 and the second electrode 22050, electrons may be supplied to the first electrode 22010 and the second electrode 22050. The electrons supplied to the electrodes may be provided to the intermediate layer 22030. The provided electrons may cause oxidation-reduction reactions in the electrochromic layer 22031 and the ion storage layer 22033. The electrochromic element 22200 may be electrically discolored on the basis of the oxidation-reduction reactions.

A shape of the trench structure 22100 formed in the electrochromic element 22200 will be described in detail.

Figure 45:
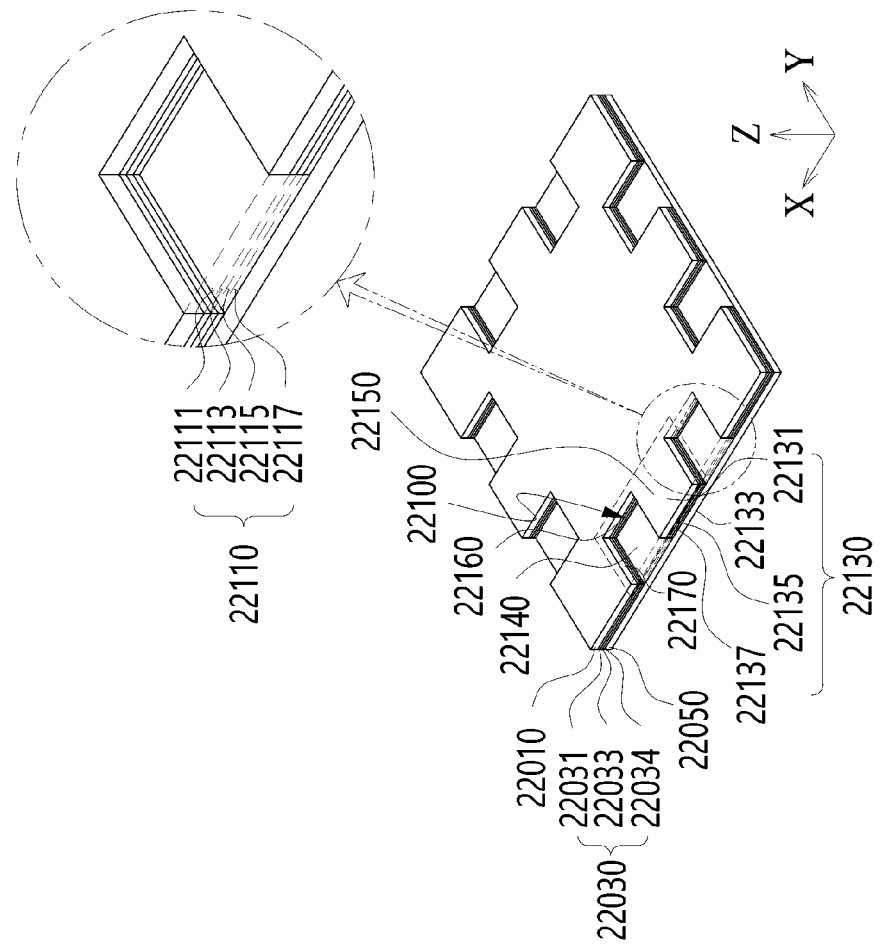
FIG. 45 is a view illustrating the electrochromic element in which a trench structure according to an embodiment of the present application is formed.

FIG. 45 is a view illustrating the electrochromic element 22200 in which the trench structure according to an embodiment of the present application is formed.

FIG. 46 is a view illustrating the electrochromic element in which the trench structure according to an embodiment of the present application is formed.

Hereinafter, description will be given with reference to FIGS. 45 and 46.

The trench structure 22100 may be formed in a region adjacent to a side surface of the electrochromic element 22200 according to an embodiment of the present application. Hereinafter, the case in which the trench structure 22100 is formed along the side surface of the electrochromic element 22200 will be described as an example.

Referring to FIG. 45, as the trench structure 22100 is formed, the electrochromic element 22200 may include a plurality of protrusions 22130 and recesses 22110. The trench structure 22100 may include regions of the first electrode 22010, the electrochromic layer 22031, the electrolyte layer 22032, the ion storage layer 22033, and the second electrode 22050 adjacent to the side surface of the electrochromic element 22200. The plurality of recesses 22110 and the plurality of protrusions 22130 may be formed in the regions of the first electrode 22010, the electrochromic layer 22031, the electrolyte layer 22032, and the ion storage layer 22033 adjacent to the side surface of the electrochromic element 22200.

The recesses 22110 may include a first recess 22111, a second recess 22113, a third recess 22115, and a fourth recess 22117, and the protrusions 22130 may include the first protrusion 22131, a second protrusion 22133, a third protrusion 22135, and a fourth protrusion 22137.

The first electrode 22010 may include the first protrusion 22131 and the first recess 22111. The electrochromic layer 22031 may include the second protrusion 22133 and the second recess 22113. The electrolyte layer 22032 may include the third protrusion 22135 and the third recess 22115, and the ion storage layer 22033 may include the fourth protrusion 22137 and the fourth recess 22117.

A region of the second electrode 22050 may be exposed through the recesses 22110. The second electrode 22050 may be exposed toward the first electrode 22010 through the recesses 22110. The second electrode 22050 may be exposed toward the driving module 21000 disposed in the electrochromic element 22200.

The protrusions 22130 may be disposed between the recesses 22110 adjacent to each other.

The trench structure 22100 may be defined by the recesses 22110 and the protrusions 22130.

The trench structure 22100 may include a plurality of pad regions 22140 and a plurality of contact regions 22150.

The pad regions 22140 may be defined as regions of the second electrode 22050 exposed due to the plurality of recesses 22110. Upper surfaces of the pad regions 22140 may be exposed in the upper direction. The pad regions 22140 may be exposed toward the first electrode 22010.

Upper surfaces of the contact regions 22150 may be exposed in the upper direction. The contact regions 22150 may be defined as the protrusions 22130 of the first electrode 22010. The contact region 22150 may be the first protrusion 22131.

The recesses 22110 and the protrusions 22130 may have predetermined surfaces.

The trench structure 22100 may include a plurality of recessed surfaces 22160, a plurality of protruding surfaces, and a plurality of connecting surfaces 22170.

The recessed surfaces 22160 may be defined as side surfaces of the electrochromic element 22200 exposed in the Y-axis direction through the recesses 22110.

The protruding surfaces may be defined as side surfaces of the protrusions 22130. The protruding surfaces may be the same surfaces as side surfaces of the electrochromic element in which the trench structure is not formed. The protruding surfaces may be surfaces parallel to the X-axis direction.

The connecting surfaces 22170 may be surfaces of the protrusions 22130 connecting the protruding surfaces to the recessed surfaces 22160. The connecting surfaces 22170 may be surfaces connecting the pad regions 22140 to the contact regions 22150. The connecting surfaces 22170 may be surfaces connecting the protruding surfaces to the recessed surfaces 22160 and parallel to the Y-axis.

The plurality of recessed surfaces 22160, protruding surfaces, and the connecting surfaces 22170 may define an outer shape of the trench structure 22100.

The recessed surfaces 22160 may be regions of the first electrode 22010, the electrochromic layer 22031, the electrolyte layer 22032, and the ion storage layer 22033 exposed in the outer direction through the recesses. Cross-sections of the first electrode 22010, the electrochromic layer 22031, the electrolyte layer 22032, and the ion storage layer 22033 may be exposed in the outer direction due to the recessed surfaces 22160.

The protruding surfaces may be the outermost side surfaces of the first electrode 22010, the electrochromic layer 22031, the electrolyte layer 22032, and the ion storage layer 22033. The protruding surfaces adjacent to each other may oppose each other to face each other.

The connecting surfaces 22170 may cause each of the layers of the electrochromic element 22200 located between the protruding surfaces and the recessed surfaces 22160 to be exposed. The connecting surfaces 22170 may be in contact with the pad regions 22140. The connecting surfaces 22170 of the ion storage layer 22033 may be in contact with the pad regions 22140.

The protruding surfaces of the protrusions 22130 may be located to have the same surfaces as side surfaces of the second electrode 22050. The protruding surfaces of the first protrusion 22131 to the fourth protrusion 22137 may have the same surfaces as the side surfaces of the second electrode 22050.

The plurality of recesses 22110 and the plurality of protrusions 22130 may be designed in various specifications. Hereinafter, sizes of the recesses 22110 and the protrusions 22130 will be described.

Referring to FIG. 46, the recesses and the protrusions may have predetermined sizes. A predetermined interval may be present between the recesses and the protrusions. The connecting surfaces, the recessed surfaces, and the protruding surfaces may have predetermined sizes.

The connecting surfaces may have a predetermined length in the inner and outer directions. A length of a first connecting surface may be a first length t1, and a length of a second connecting surface may be a second length t2.

The recessed surfaces and the protruding surfaces may have predetermined widths.

The recess may be formed to be spaced a predetermined distance d apart from an adjacent recess. The protrusion may be formed to be spaced the predetermined distance d apart from an adjacent protrusion.

Sizes of the above-described regions included in the trench structure may be changed in accordance with the purpose of realization. The sizes of the recesses and the protrusions 22130 may be changed. The sizes of the connecting surfaces, the recessed surfaces, and the protruding surfaces of the trench structure may be changed.

Lengths of the connecting surfaces may be changed. The length of the first connecting surface may be set as the first length t1, and the length of the second connecting surface may be set as the second length t2. Although the first length and the second length may be set to be equal to each other, the lengths may also be set to be different from each other depending on the purpose of realization.

The widths of the protrusions may be changed. The widths of the recesses may be changed. A first width w1 and a second width w2 may be changed.

The distance d between the protrusions and the recesses may be changed.

The electrochromic element 22200 has been described above. Hereinafter, the driving module 21000 will be described.

The driving module 21000 according to an embodiment of the present application may generate driving power for driving the electrochromic element 22200 and transmit the driving power to the electrochromic element 22200.

The driving module 21000 may include the driving unit 21300 and the electrical connecting member 21500.

The driving unit 21300 may generate driving power.

The electrical connecting member 21500 may transmit the driving power to the electrochromic element 22200.

The electrical connecting member 21500 may transmit the driving power generated by the driving unit 21300 to the electrochromic element 22200.

Hereinafter, each of the elements of the driving module 21000 will be described. First, the electrical connecting member 21500 will be described.

Figure 47:
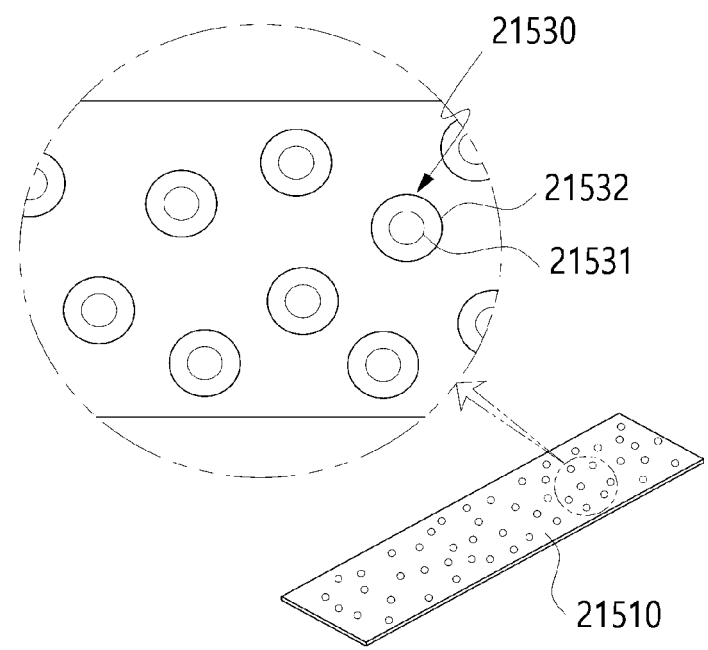
FIG. 47 is a view illustrating an electrical connecting member according to an embodiment of the present application.

FIG. 47 is a view illustrating an electrical connecting member according to an embodiment of the present application.

The electrical connecting member 21500 included in the electrochromic module according to an embodiment of the present application may include a conductive region.

The electrical connecting member 21500 may be a conductor 21530 that is conductive in one direction and insulated in the other direction. That is, the electrical connecting member 21500 may be a type of an anisotropic conducting film (ACF).

Referring to FIG. 47, the electrical connecting member 21500 according to an embodiment of the present application may include a base 21510 and a plurality of conductors 21530. However, the elements illustrated in FIG. 47 are not essential, and the electrical connecting member 21500 having more or less elements in comparison to those illustrated in FIG. 35 may also be realized.

The conductor 21530 may be conductive.

The base 21510 may define an outer shape of the electrical connecting member 21500, and the conductor 21530 may be contained in the base 21510.

Hereinafter, a configuration of the electrical connecting member 21500 will be described in detail.

The conductor 21530 may be conductive. Driving power may be transmitted to the electrochromic element 22200 via the conductor 21530.

The conductor 21530 may have an electrically insulating property in one direction and have an electrically conductive property in the other direction. The conductor 21530 may be conductive in a first direction and insulated in a second direction. The second direction may be a direction other than the first direction. For example, the second direction may be a direction perpendicular to the first direction. The first direction may be a direction in which an external force is applied.

The conductor 21530 may include a surface 21531 and an inside 21532. The surface 21531 and the inside 21532 may be realized with different materials. Although the conductors are illustrated as having the same sizes in FIG. 35, this is merely an example, and the conductors may also have different sizes.

The conductor 21530 may be classified in accordance with materials forming the surface 21531 and the inside 21532.

Types of the conductor 21530 may include i) a conductive coating conductor 21540 having a conductive surface 21541 which has a conductivity and an insulated inside 21542 which has insulating property and ii) an insulated coating conductor 21545 having an insulated surface 21546 and a conductive inside 21547.

The conductive surface 21541 of the conductive coating conductor 21540 may be the surface 21531 formed of a conductive material, and the insulated inside 21542 may be the inside 21532 formed of an insulating material. The insulated surface 21546 of the insulated coating conductor 21545 may be the surface 21531 formed of an insulating material, and the conductive inside 21547 may be the inside 21532 formed of a conductive material.

The conductive material may be a material such as gold, silver, nickel, and copper, and the insulating material may be a material such as an insulated organic polymer.

As illustrated in FIG. 47, a shape of the conductor 21530 may be spherical, but the shape of the conductor 21530 is not limited thereto. A size of the conductor 21530 may be properly adjusted depending on the purpose of realization.

The base 21510 may be in contact with the electroactive element 22000 and the driving unit 21300.

The base 21510 may define the outer shape of the electrical connecting member 21500. The base 21510 may be a type of filler.

The base 21510 may be realized in the form of a film or predetermined gel whose outer shape may be deformed. Hereinafter, description will be given by assuming that the base 21510 is a film. That is, the electrical connecting member 21500 may be realized with a film. The outer shape of the base 21510 may be changed due to an external force. That is, a volume of the base 21510 may be compressed due to an external force.

A plurality of conductors 21530 may be randomly disposed in the base 21510. Alternatively, the plurality of conductors 21530 may be uniformly disposed in the base 21510.

The base 21510 may fix a position of the conductor 21530 so that the conductor 21530 is able to maintain a predetermined positional relationships with the driving unit 21300 and the electroactive element 22000.

The base 21510 may be adhesive. The base 21510 may be adhered to the driving unit 21300 and the electrochromic element 22200. A lower surface of the base 21510 may be attached to a lower surface of the electrochromic element 22200, and an upper surface of the base 21510 may be attached to a lower surface of the driving unit 21300.

A separate adhesive material may be applied on at least a partial region of the base 21510. An adhesive material may be applied on the upper surface and the lower surface of the base 21510. The upper surface of the base 21510 may be adhered to the lower surface of the driving unit 21300 by the adhesive material applied on the upper surface of the base 21510. The lower surface of the base 21510 may be adhered to an upper surface of the electrochromic element 22200 by the adhesive material applied on the lower surface of the base 21510.

By the base 21510 being adhered to the driving unit 21300 and the electrochromic element 22200, an electrical connection relationship between at least some of the conductors 21530 in the base 21510 and the driving unit 21300 may be maintained. An electrical connection relationship between at least some of the conductors 21530 in the base 21510 and the electrochromic layer 22031 may also be maintained. Electrical stability of the electrochromic module may be improved by the adhesiveness of the base 21510.

Simultaneously, the base 21510 may have an insulating property. The base 21510 may have an insulating property in a region other than the region in which the conductors 21530 are contained.

That is, the base 21510 may electrically insulate a region other than the region including the conductors 21530 while allowing the driving unit 21300, the electroactive element 22000, and the conductors 21530 to be in contact with the base 21510, thereby improving an anisotropic property of the electrical connecting member 21500.

Hereinafter, conductivity and an insulating property of the electrical connecting member 21500 will be described in detail.

FIG. 48 is a view illustrating an anisotropic conductor having conductivity and an insulating property according to an embodiment of the present application.

Conductivity may be imparted to the electrical connecting member 21500 by an external force. The conductors 21530 may be conductive in one direction due to an external force. The external force may be a pressure.

Simultaneously, the electrical connecting member 21500 may be insulated in a direction different from the direction in which the electrical connecting member 21500 is conductive.

The electrical connecting member 21500 may have conductivity by receiving an external force. The outer shape of the base 21510 may be changed due to the external force. That is, the base 21510 may be compressed. A density of the conductors 21530 in the base 21510 may be changed due to the deformation of the base 21510.

Referring to FIG. 48(a), when the conductors 21530 are the conductive coating conductors 21540, the electrical connecting member 21500 may receive an external force in one direction and have conductivity and an insulating property. The electrical connecting member 21500 may have conductivity in a direction corresponding to the first direction. The electrical connecting member 21500 may have an insulating property in the second direction, which is different from the first direction.

As an external force is applied to the electrical connecting member 21500 in the direction corresponding to the first direction, the conductive coating conductors 21540 may come in contact with each other. As the shape of the base 21510 is changed, the conductive coating conductors 21540 included in the base 21510 may come in contact with each other. However, the conductive coating conductors 21540 not in contact with each other may still be present.

As the conductive coating conductors 21540 come in contact with each other due to the external force, driving power may be transmitted along the conductive surfaces 21541 of the conductive coating conductors 21540 in contact with each other. That is, a conductive path C may be formed along the conductive surfaces 21541. The conductive path C may be a conductive path C that is formed as the plurality of conductors 21530 come in contact with each other, and plurality of conductors 21530 in contact with each other come in contact with the first electrode 22010 and the second electrode 22050. The conductive path C may be formed in a direction corresponding to one direction.

The electrical connecting member 21500 may be insulated in a direction different from the one direction. The base 21510 may be present between the conductive coating conductors 21540 that are adjacent to each other without coming in contact with each other. The conductive coating conductors 21540 adjacent to each other without coming in contact with each other may be insulated from each other due to the base 21510.

As illustrated in FIG. 48(b), when the conductors 21530 are the insulated coating conductors 21545, the electrical connecting member 21500 may be conductive in a direction corresponding to a direction in which an external force is applied. The conductive inside 21547 may be exposed through the insulated surfaces 21546 of the insulated coating conductors 21545 spaced apart from each other. Simultaneously, the insulated coating conductors 21545 may come in contact with each other. The exposed conductive insides 21547 of the insulated coating conductors 21545 may come in contact with each other. The conductive path C may be formed along the conductive insides 21547 of the insulated coating conductors 21545 in contact with each other. Driving power may be transmitted along the conductive insides 21547 in contact with each other. The conductive path C may be formed in a direction corresponding to the direction in which the external force is applied.

The electrical connecting member 21500 may be insulated in the second direction different from the first direction. The insulated coating conductors 21545 adjacent to each other may be insulated from each other due to insulating materials of the insulated surfaces 21546.

To facilitate description, the below embodiment will be described by assuming that the conductors 21530 included in the electrical connecting member 21500 are the "insulated coating conductors 21545."

The electrical connecting member 21500 included in the driving module 21000 of the electrochromic module has been described above. Hereinafter, the driving unit 21300 and the driving substrate 21310 will be described.

FIG. 49 is a view illustrating an electrical connecting member and a driving substrate according to an embodiment of the present application.

Hereinafter, description will be given with reference to FIG. 49.

The driving unit 21300 according to an embodiment of the present application may generate driving power. The driving power may be transmitted to the electrochromic element 22200. The driving unit 21300 may apply the driving power to the electrical connecting member 21500, and the electrical connecting member 21500 may transmit the driving power to the electrochromic element 22200.

The driving unit 21300 included in the electrochromic module may be disposed on the predetermined driving substrate 21310. The driving unit 21300 may be realized on the driving substrate 21310.

A plurality of connecting members 21330 may be disposed in the driving substrate 21310. The connecting members 21330 may electrically connect the driving unit 21300 to the electrochromic element 22200. The connecting members 21330 may output the driving power to the electrochromic element 22200. The connecting members 330 may receive the driving power from the driving unit 21300. The connecting members 21330 may receive the driving power from the output unit 21305.

Properties of driving power output from the plurality of connecting members 21330 may be different for each of the connecting members. First driving power may be output through a first connecting member 21331, and second driving power may be output through a second connecting member 21333. The output of driving power through the connecting members 21330 may be controlled by the driving unit 21300. Alternatively, the driving power may be differently output from each of the connecting members 21330 due to different electrical properties of the connecting members 21330. That is, a resistance of the first connecting member 21331 and a resistance of the second connecting member 21333 may be different from each other. Accordingly, the first driving power output through the first connecting member 21331 may be controlled at a first voltage, and the second driving power output through the second connecting member 21333 may be controlled at a second voltage.

The plurality of connecting members 21330 may be formed apart from each other.

The plurality of connecting members 21330 may be formed at a lower surface of the driving substrate 21310 and be connected to the driving unit 21300. Alternatively, the plurality of connecting members 21330 may be connected to the driving unit 21300 via an upper surface of the driving substrate 21310. In this case, the plurality of connecting members 21330 may also be formed at the upper surface of the driving substrate 21310 through via holes passing through the driving substrate 21310.

The connecting members 21330 may be realized with a conductive material. For example, the connecting members 21330 may be realized with a metal material such as copper.

Each of the configurations of the driving module 21000 of the electrochromic module has been described above. Hereinafter, an electrical connection relationship between the electrical connecting member 21500 and the driving unit 21300 will be described.

The electrical connecting member 21500 and the driving substrate 21310 according to an embodiment of the present application may be electrically connected to each other. The electrical connecting member 21500 may be electrically connected to the connecting members 21330 of the driving substrate 21310.

The driving substrate 21310 may be disposed at an upper surface of the electrical connecting member 21500.

Referring to FIG. 49(*a*), the driving substrate 21310 may cover the upper surface of the electrical connecting member 21500. The driving substrate 21310 may completely cover the upper surface of the base 21510.

Referring to FIG. 49(*b*), the connecting members 21330 may be in contact with the upper surface of the base 21510.

The base 21510 may include a plurality of regions. The base 21510 may include a first base region 21511 and a second base region 21512. The driving substrate 21310 may include the plurality of connecting members 21330. The connecting members 21330 may include the first connecting member 21331 and the second connecting member 21333. The first base region 21511 may come in contact with the first connecting member 21331, and the second base region 21512 may come in contact with the second connecting member 21333.

The plurality of connecting members 21330 may be located in each of the base regions. The number of connecting members 21330 disposed in the electrical connecting member 21500 may be adjusted for each of the regions thereof. A plurality of first connecting members 21331 may come in contact with the first base region 21511, and a plurality of second connecting members 21333 may come in contact with the second base region 21512. The number of the first connecting members 21331 placed on the first base region 21511 and the number of the second connecting members 21333 placed on the second base region 21512 may be different from each other.

The insulated coating conductors 21545 contained in the base 21510 may be electrically connected to the driving unit 21300. The insulated coating conductors 21545 may include a first insulated coating conductor 21533 and a second insulated coating conductor 21534. The first insulated coating conductor 21533 may come in contact with the first connecting member 21331, and the second insulated coating conductor 21534 may come in contact with the second connecting member 21333.

A predetermined external force may be provided to the electrical connecting member 21500 so that the insulated coating conductors 21545 come in contact with the connecting members of the driving substrate.

The driving unit 21300 may transmit driving power to the electrical connecting member 21500. The driving unit 21300 may apply driving power to a transmission region of the electrical connecting member 21500 via the connecting members 21330 of the driving substrate 21310. The driving power may include the first driving power and the second driving power.

The driving unit may apply driving power to the electrochromic element 22200 for each of the regions of the electrical connecting member 21500. The driving unit may transmit the first driving power to the electrochromic element 22200 through the first base region 21511 and transmit the second driving power to the electrochromic element 22200 through the second base region 21512.

The driving power may be transmitted to the electrochromic element 22200 via the electrical connecting member 21500. The driving module 21000 and the electrochromic element 22200 may be electrically connected such that the driving power is applied to the electrochromic element 22200.

The connection relationships between the configurations of the driving module 21000 have been described above.

Hereinafter, connection relationships between the electrochromic element 22200 and each of the configurations of the driving module 21000 described above will be described.

FIG. 50 is a view illustrating the electrochromic module according to an embodiment of the present application.

Figure 51:
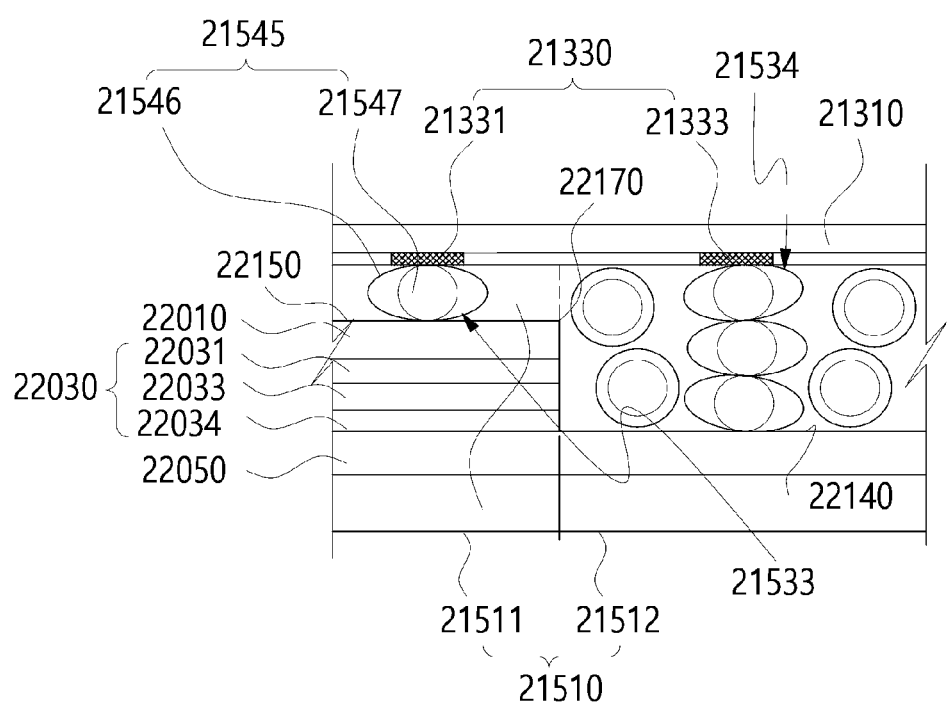
FIG. 51 is a side view illustrating an electrochromic element, an electrical connecting member, and a driving substrate according to an embodiment of the present application.

FIG. 51 is a side view illustrating the electrochromic element, the electrical connecting member, and the driving substrate according to an embodiment of the present application.

Hereinafter, description will be given with reference to FIGS. 50 and 51.

The electrochromic element 22200 according to an embodiment of the present application and the above-described driving module 21000 may be electrically connected to each other. The electrochromic element 22200 and the driving module 21000 may have a conductive path.

The driving module 21000 may be disposed adjacent to the electrochromic element 22200.

Referring to FIG. 50, the above-described driving module 21000 may be disposed in the electrochromic element 22200. The driving module 21000 may be disposed in an upper region adjacent to the side surface of the electrochromic element 22200. The driving module 21000 may be disposed in the trench structure 22100 of the electrochromic element 22200. The driving module 21000 may be disposed adjacent to a region included in the trench structure 22100. The driving module 21000 may be disposed at an upper surface of the trench structure 22100.

The driving module 21000 may include the electrical connecting member 21500 and the driving substrate 21310. The electrical connecting member 21500 may come in contact with the electrochromic element 22200, and the driving substrate 21310 may come in contact with the electrical connecting member. The electrical connecting member 21500 may be disposed between the electrochromic element 22200 and the driving substrate 21310. The driving substrate 21310 may be disposed at the upper surface of the electrical connecting member 21500.

The electrical connecting member 21500 of the driving module 21000 may come in contact with the electrochromic element 22200.

The electrical connecting member 21500 may be connected to the first electrode 22010 and the second electrode 22050 of the electrochromic element 22200. The electrical connecting member 21500 may be connected to a region of the first electrode 22010 and a region of the second electrode 22050 in the trench structure 22100. The driving module 21000 may come in contact with the recesses 22110 and the protrusions 22130 of the trench structure 22100. The driving module 21000 may come in contact with the contact regions 22150 of the first electrode 22010 and the pad regions 22140 of the second electrode 22050.

Referring to FIG. 51, the base 21510 of the electrical connecting member 21500 may be disposed at the upper surface of the electrochromic element 22200. The base 21510 of the electrical connecting member 21500 may be disposed to come in contact with the first electrode 22010 and the second electrode 22050 of the electrochromic element 22200. The base 21510 may be dispose in the trench structure 22100. The base 21510 may come in contact with the contact regions 22150 of the first electrode 22010 and the pad regions 22140 of the second electrode 22050 included in the trench structure 22100.

The base 21510 may be inserted into the recesses of the trench structure 22100. The base 21510 inserted into the recesses may come in contact with each of the regions of the electrochromic element 22200.

The base 21510 may be inserted into the recesses. The inserted base 21510 may come in contact with each of the regions of the electrochromic element 22200.

The base 21510 may come in contact with each of the layers of the electrochromic element 22200 exposed due to the trench structure 22100.

The base 21510 may come in contact with region of layers of the electrochromic element 22200 facing each other. The base 21510 may come in contact with the connecting surfaces 22170. The base 21510 may be located between the connecting surfaces 22170 adjacent to each other.

The base 21510 may come in contact with the second electrode 22050 exposed in the upper direction. The base 21510 may come in contact with the second electrode 22050 having an upper surface exposed toward the first electrode 22010. The base 21510 may come in contact with the pad regions 22140.

A side surface of the base 21510 may be the same surface as the side surface of the electrochromic element 22200.

Alternatively, the base 21510 may protrude in the outer direction of the electrochromic element 22200.

A predetermined external force may be applied to the electrochromic element 22200 and the driving module 21000 so that the electrochromic element 22200 and the driving module 21000 come in contact with each other. The electrochromic element 22200 and the electrical connecting member 21500 may come in contact with each other due to the external force. The base 21510 of the electrical connecting member 21500 may come in contact with the electrochromic element 22200 due to the external force. The outer shape of the base 21510 may be deformed, and the base 21510 may come in contact with the electrochromic element 22200.

As the outer shape of the base 21510 is deformed, the base 21510 inserted into the recesses 22110 may partially protrude in the outer direction of the electrochromic element 22200. As the base 21510 protrudes in the outer direction of the electrochromic element 22200, there is an effect improving reliability of electrical connection with the driving substrate 21310. In comparison to when the base 21510 does not protrude, a region of the protruding base 21510 that comes in contact with the driving substrate 21310 may widen. As the region of the base 21510 in contact with the driving substrate 21310 widens, a region of the base 21510 receiving driving power may widen. As the region of the base 21510 receiving the driving power widens, there are effects of decreasing a contact resistance, reducing voltage distortion, and decreasing power consumption.

Due to the adhesiveness of the base 21510, as the contact area widens, the driving substrate 21310 may be firmly adhered to the base 21510. As the driving substrate 21310 is firmly adhered to the base 21510, the base 21510 may stably receive driving power. Accordingly, the present application may have improved reliability of electrical connection.

The insulated coating conductors 21545 of the electrical connecting member 21500 may come in contact with the electrochromic element 22200. The insulated coating conductors 21545 included in the base 21510 may come in contact with the electrochromic element 22200.

Some of the insulated coating conductors 21545 of the plurality of insulated coating conductors 21545 may come in contact with the electrode layers in the trench structure. Some of the insulated coating conductors 21545 of the plurality of insulated coating conductors 21545 may come in contact with the first electrode 22010 or the second electrode 22050 located in the trench structure 22100. Some of the insulated coating conductors 21545 of the plurality of insulated coating conductors 21545 may come in contact with the pad regions 22140 or the contact regions 22150.

Some of the insulated coating conductors 21545 may have the conductive inside 21547 coming in contact with the first electrode 22010 or the second electrode 22050. Some of the insulated coating conductors 21545 may have the conductive inside 21547 coming in contact with the pad regions or the contact regions. Some of the insulated coating conductors 21545 may have the conductive inside 21547 that is exposed and comes in contact with the first electrode 22010 or the second electrode 22050.

The plurality of insulated coating conductors 21545 may be located between the first connecting members 21331 and the contact regions 22150. The plurality of insulated coating conductors 21545 may form at least one conductive path. The first connecting members 21331 and the contact regions 22150 may be electrically connected by the conductive path. A driving voltage of the driving unit 21300 may be applied to the electrochromic element 22200 via the first connecting members 21331, the conductive path, and the contact regions 22150.

The conductive path may be formed by the conductive insides 21547 of the plurality of insulated coating conductors 21545 coming in contact with each other. The conductive path may be formed by the conductive insides 21547 of the insulated coating conductors 21545 coming in contact with the first electrode 22010 or the second electrode 22050 coming in contact with each other. The conductive path may be formed by the exposed conductive insides 21547 of the insulated coating conductors 21545 coming in contact with each other.

Some of the insulated coating conductors 21545 of the plurality of insulated coating conductors 21545 located between the first connecting members and the contact regions may not form the conductive path.

The base and at least one insulated coating conductor may be located in the recesses of each of the layers included in the electrochromic element 22200.

The plurality of insulated coating conductors 21545 may be located between the second connecting members 21333 and the pad regions 22140. Some of the insulated coating conductors 21545 may form at least one conductive path. The second connecting members 21333 and the pad regions 22140 may be electrically connected by the conductive path. A driving voltage of the driving unit 21300 may be applied to the electrochromic element 22200 via the second connecting members 21333, the conductive path, and the pad regions 22140.

Different conductive paths may be electrically insulated from each other. The insulated coating conductors 21545 present between the conductive paths may not form a conductive path. The plurality of insulated coating conductors 21545 may not form a conductive path even when the plurality of insulated coating conductors 21545 come in contact with each other. Even when different insulated coating conductors 21545 come in contact with each other, the insulated coating conductors 21545 may be electrically insulated from each other. The insulated coating conductors 21545 that are not electrically connected to the pad regions 22140 or the contact regions 22150 are unable to form a conductive path even when the insulated coating conductors 21545 come in contact with each other.

The base 21510 may insulate between the conductive paths. The base 21510 is unable to form a conductive path between the conductive paths adjacent to each other. The base 21510 may be disposed between the plurality of insulated coating conductors 21545 forming the conductive path and the insulated coating conductors 21545 not forming a conductive path.

The different conductive paths may be insulated from each other by the insulated surfaces 21546 of the insulated coating conductors 21545. The insulated surfaces 21546 of the insulated coating conductors 21545 may be located between the different conductive paths.

The insulated coating conductors 21545 may come in contact with the intermediate layer 22030 of the trench structure. As the base 21510 is inserted into the recesses 22110, some of the insulated coating conductors 21545 may come in contact with the electrochromic layer 22031, the electrolyte layer 22032, and the ion storage layer 22033. Some of the insulated coating conductors 21545 may come in contact with the recessed surfaces or the connecting surfaces 22170. The insulated surfaces 21546 of the insulated coating conductors 21545 may come in contact with the recessed surfaces or the connecting surfaces 22170.

Connection between the electrical connecting member 21500 and the electrochromic element 22200 has been described above. Hereinafter, connection between the electrical connecting member 21500 and the driving substrate 21310 will be described.

The connecting members 21330 of the driving substrate 21310 may come in contact with the upper surface of the electrical connecting member 21500.

The connecting members 21330 of the driving substrate 21310 may be formed corresponding to the regions of the base 21510 or the trench structure 22100. The connecting members 21330 may be formed corresponding to the contact regions 22150 or the pad regions 22140. The connecting members 21330 may be disposed at positions corresponding to the contact regions 22150 or the pad regions 22140. The connecting members 21330 may be disposed to face the contact regions 22150 or the pad regions 22140.

The connecting members 21330 of the driving substrate 21310 may come in contact with the insulated coating conductors 21545 contained in the base 21510.

Some of the insulated coating conductors 21545 of the plurality of insulated coating conductors 21545 may come in contact with the connecting members 21330 of the driving substrate 21310 from which driving power is output. The conductive insides 21547 of the insulated coating conductors 21545 may come in contact with the connecting members.

Some of the insulated coating conductors 21545 of the plurality of insulated coating conductors 21545 may come in contact with the first connecting members 21331, or some of the insulated coating conductors 21545 of the plurality of insulated coating conductors 21545 may come in contact with the second connecting members 21333.

The electrochromic element 22200 may be electrically connected to the driving unit 21300 due to the above-described contacts between the electrochromic element 22200, the electrical connecting member 21500, and the driving substrate 21310.

A conductive path may be formed between the electrochromic element 22200 and the connecting members 21330 of the driving substrate 21310. The conductive path may be formed by the insulated coating conductors 21545 disposed between the driving substrate 21310 and the electrochromic element 22200. The conductive path may be formed by the insulated coating conductors 21545 coming in contact with the connecting members 21330 of the driving substrate 21310 and the electrochromic element 22200. As some of the insulated coating conductors 21545 of the plurality of insulated coating conductors 21545 coming in contact with each other come in contact with the first connecting members 21331 and the pad regions 22140, the conductive path may be formed between the first connecting members 21331 and the pad regions 22140. As some of the insulated coating conductors 21545 of the plurality of insulated coating conductors 21545 coming in contact with each other come in contact with the second connecting members 21333 and the contact regions 22150, the conductive path may be formed between the second connecting members 21333 and the contact regions 22150.

The insulated coating conductors 21545 disposed between the driving substrate 21310 and the electrochromic element 22200 may form a conductive path. The conductive path may be formed by the insulated coating conductors 21545 coming in contact with the connecting members 21330 of the driving substrate 21310 and the electrochromic element 22200.

Driving power may be transmitted to the electrochromic element 22200 by the electrical connection between the electrochromic element 22200, the electrical connecting member 21500, and the driving substrate 21310.

Driving power generated in the driving substrate 21310 may be transmitted to the electrical connecting member 21500 and the electrochromic element 22200. The driving power may be output through the connecting members 21330 of the driving substrate 21310. The driving power from the driving substrate 21310 may be applied to the plurality of insulated coating conductors 21545. The plurality of insulated coating conductors 21545 may transmit the driving power to the electrochromic element 22200. The plurality of insulated coating conductors 21545 may apply the driving power to the electrochromic element 22200 via the conductive insides 21547 coming in contact with each other.

Some of the insulated coating conductors 21545 may receive driving power via the conductive insides 21547 coming in contact with the connecting members 21330. Some of the insulated coating conductors 21545 may transmit the driving power to the electrochromic element via the conductive insides 21547 coming in contact with the electrode layers. Some of the insulated coating conductors 21545 may transmit the driving power to the electrochromic element via the conductive insides 21547 coming in contact with the pad regions 22140 or the contact regions 22150.

The insulated coating conductors 21545 are unable to transmit the driving power via the insulated surfaces 21546. The insulated surfaces 21546 may prevent driving power from being transmitted to the electrochromic element 22200. The insulated surfaces 21546 coming in contact with the electrochromic element 22200 may not transmit driving power to the electrochromic element.

The insulated surfaces 21546 of some of the insulated coating conductors 21545 of the plurality of insulated coating conductors 21545 may come in contact with the electrochromic element 22200. The insulated surfaces 21546 may come in contact with the connecting surfaces 22170 or the recessed surfaces.

Some of the insulated coating conductors 21545 of the plurality of insulated coating conductors 21545 may have the insulated surfaces 21546 coming in contact with each other.

When the electrochromic element 22200 receives driving power from the driving module 21000, an optical state of the electrochromic element 22000 may be changed.

The driving power may be applied to each of the regions of the electrochromic element 22200. The first driving power may be applied to the plurality of first insulated coating conductors 21533 connected to the first connecting members 21331, and the first driving power may be transmitted to the contact regions 22150 of the first electrode 22010. The second driving power may be applied to the plurality of second insulated coating conductors 21534 connected to the second connecting members 21333, and the second driving power may be transmitted to the pad regions 22140 of the second electrode 22050.

The optical state of the electrochromic element 22200 may be changed on the basis of the riving voltage. The electrochromic ions included in the electrochromic element 22200 may migrate due to the driving voltage. Due to the migration of the electrochromic ions, oxidation-reduction reactions may occur in the electrochromic layer 22031 and the ion storage layer 22033. Due to the oxidation-reduction reactions, the light transmittance and light absorptivity of the electrochromic element 22200 may be changed.

A ground voltage may be selected as at least one of the first driving power applied to the first electrode 22010 and the second driving power applied to the second electrode 22050 as a reference voltage. A potential formed in the electrochromic element 22200 may be measured with respect to the ground voltage.

As described above, the electrical connecting member 21500 may receive a predetermined pressure and be disposed in the electrochromic element 22200. Due to the pressure, the electrical connecting member 21500 may have a predetermined shape. Accordingly, the arrangement of the insulated coating conductors 21545 included in the electrical connecting member 21500 may be changed. Hereinafter, a predetermined shape of the electrical connecting member 21500 will be described.

An upper surface of an anisotropic conductive film (ACF) may have a curved shape. The curved shape may correspond to the trench structure. The curved shape may correspond to shapes of the protrusions and recesses of the trench structure. As a result, the curved shape may correspond to the contact regions 22150 and the pad regions 22140.

Properties of the driving power generated by the driving unit 21300 and the driving power applied to the electrochromic element 22200 may be different. That is, a predetermined change may occur in the driving power generated by the driving unit 21300 during a process in which the driving power is transmitted to the electrochromic element 22200. For example, a magnitude of the driving power may be lowered due to a voltage drop phenomenon.

The order in which the electrochromic layer 22031 and the ion storage layer 22033 of the above-described electrochromic element 22200 are stacked may be reversed. Accordingly, the descriptions related to the electrochromic layer 22031 and the ion storage layer 22033 may be reversed. For example, although it has been described above that the electrochromic layer 22031 comes in contact with the first electrode 22010 while the ion storage layer 22033 comes in contact with the second electrode 22050, when the stacking order is reverse, the electrochromic layer 22031 may come in contact with the second electrode 22050, and the ion storage layer 22033 may come in contact with the first electrode 22010.

Although it has been described above that the driving power is transmitted to the contact regions 22150 and the pad regions 22140 of the electrochromic element 22200, the driving power may also be transmitted to a region of the first electrode 22010 that is not the pad region 22140 or the contact region 22150. The region of the first electrode 22010, which is not the contact region 22150, may be a region of the first electrode 22010 located inward from the trench structure 22100.

The elements of the electrochromic module and connections between the elements have been described above. Hereinafter, a process for fabricating the electroactive device 20001 will be describe.

A case in which the electroactive device 20001 is an electrochromic device will be described as an example.

Figure 52:
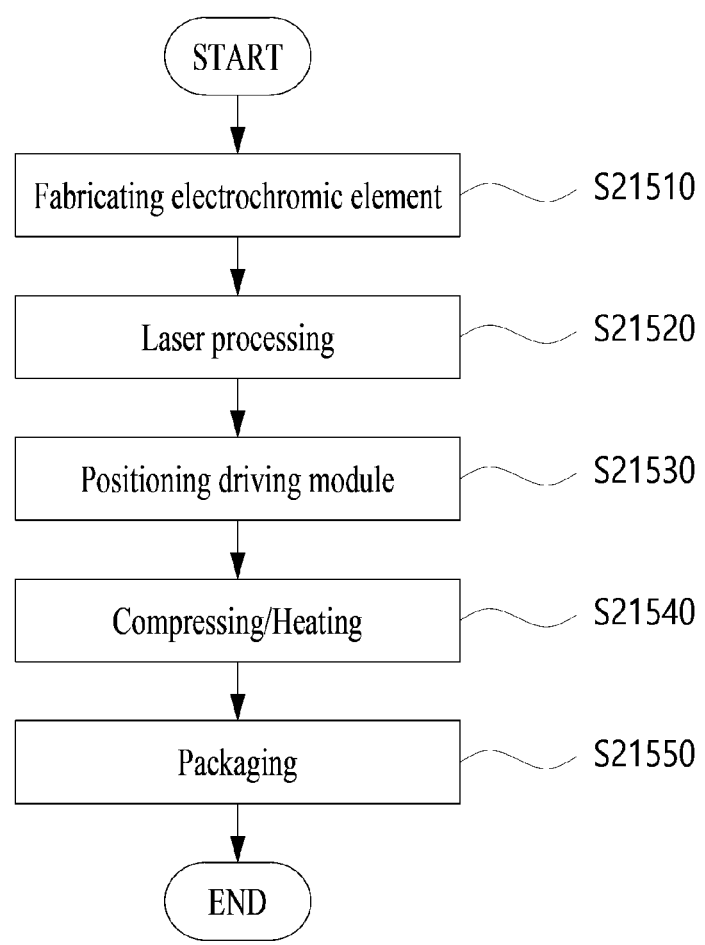
FIG. 52 is a flowchart illustrating a process order of the electrochromic device according to an embodiment of the present application.

FIG. 52 is a flowchart illustrating a process order of the electrochromic device according to an embodiment of the present application.

Referring to FIG. 52, steps of the process may include fabricating an electrochromic element (S21510), laser processing (S21520), positioning a driving module (S21530), compressing/heating (S21540), and packaging (S21550). Although all of Steps S21510 to S21550 may be performed, not all of Steps S21510 to S21550 need to be performed each time, and some of Steps S21510 to S21550 may be omitted.

In the fabricating of the electrochromic element (S21510), the electrochromic element 22200 may be formed. In this step, the first electrode 22010, the electrochromic layer 22031, the electrolyte layer 22032, the ion storage layer 22033, and the second electrode 22050 constituting the electrochromic element 22200 may be formed by a predetermined sputtering process on the basis of specifications to be realized and the purpose of the realization.

A predetermined process may be performed to form the trench structure 22100 of the electrochromic element 22200. To form the trench structure 22100, a process of ablating the first electrode 22010, the electrochromic layer 22031, the electrolyte layer 22032, and the ion storage layer 22033 of the electrochromic element 22200 may be performed. A process of allowing the upper surface of the second electrode 22050 of the electrochromic element 22200 to be exposed may be performed. The process of forming the trench structure 22100 may be referred to as an ablating process. The ablating process may include i) a contact process in which each of the layers of the electrochromic element 22200 is removed using a tool directly in contact with the electrochromic element 22200 and ii) a non-contact process in which each of the layers is removed without the use of the tool coming in contact with the electrochromic element 22200.

Hereinafter, the laser processing (S21520), which is an example of the non-contact process of the above ablating processes, will be described.

The laser processing (S21520) may be performed on the basis of sizes, shapes, and opening intervals of the recesses designed in accordance with the purpose of realization.

The laser processing (S21520) may be a process in which a region of the electrochromic element 22200 is heated and melted using a laser, and blowing the heated/melted region using high-pressure gas to remove the heated/melted region from the electrochromic element 22200.

The laser may heat and melt the first electrode 22010, the electrochromic layer 22031, the electrolyte layer 22032, and the ion storage layer 22033 to remove the first electrode 22010, the electrochromic layer 22031, the electrolyte layer 22032, and the ion storage layer 22033 so that the upper surface of the second electrode 22050 of the electrochromic element 22200 is exposed.

In the positioning of the driving module (S21530), the driving module 21000 for driving the electrochromic element 22200 may be disposed in the electrochromic element 22200. The driving module 21000 may be disposed in the electrochromic element 22200 so that a control signal may be transmitted to the electrochromic element 22200 via a region of the electrochromic element 22200 in which the trench structure 22100 is formed.

The electrical connecting member 21500 included in the driving module 21000 may be disposed in the trench structure of the electrochromic element 22200.

The driving substrate 21310 in which the driving unit 21300 is realized may be disposed around the electrochromic element 22200. As described above, when the electrochromic device is realized as an electrochromic mirror, the driving substrate 21300 may be disposed behind a reflective surface of the electrochromic element 22200. Alternatively, when the electrochromic element 22200 is realized as an electrochromic window, the driving substrate 21310 may be disposed such that the driving substrate 21310 does not affect a path of light transmitted through the electrochromic element 22200.

In the compressing/heating (S21540), a process of compressing the driving module 21000 may be performed so that the driving module 21000 is fixed to the electrochromic element 22200. The electrochromic module may be realized by the driving module 21000 being fixed to the electrochromic element 22200.

A process of compressing the driving module 21000 to fix the driving module 21000 may be performed. A direction of the compressing may be a direction perpendicular to a vertical direction of the electrochromic element 22200.

An ACF disposed in the electrochromic element 22200 may be fixed due to the compressing process.

An adhesive film of the ACF may be inserted into the recesses included in the trench structure 22100 of the electrochromic element 22200 due to the compressing process. The adhesive film may be adhered to the upper surface of the first electrode 22010 and the upper surface of the exposed second electrode 22050 of the electrochromic element 22200.

The conductors 21530 located between the driving unit 21300 and the electrochromic element 22200 may come in contact with each other due to the compressing process. In this way, a conductive path may be formed. The conductive path may be formed as a path in a direction corresponding to the direction of the compressing.

The conductors 21530 included in the fixed ACF may allow the first electrode 22010 and the driving unit 21300 to be electrically connected and the second electrode 22050 and the driving unit 21300 to be electrically connected due to the compressing process. The conductors 21530 may come in contact with the first electrode 22010 and the connecting members 21330 of the driving substrate 21310 and may come in contact with the second electrode 22050 and the connecting members 21330 of the driving substrate 21310. Accordingly, the driving unit 21300 and the electrical connecting member 21500 may be electrically connected to each other along the above-described conductive path.

In addition to the compressing process, a heating process of applying predetermined heat may be performed. The adhesive film may be more firmly fixed to the electrochromic element 22200 physically and chemically due to the heating process.

In the packaging (S21550), the electrochromic module realized in the above-described steps may be realized as an electrochromic device. In the packaging, a housing for protecting the electrochromic module realized on the basis of a realization/design purpose from external environment may be coupled to the electrochromic module.

In the above-described process of the electrochromic device according to an embodiment of the present application, the steps in the embodiment are not essential, and the process may selectively include the above-described steps. The steps are not necessarily performed in the above-described order, and a step described later may also be performed prior to a step described first. Any one of the steps may be repeatedly performed while another step is performed.

Hereinafter, an electrochromic process will be described.

The electrochromic device according to an embodiment of the present application may be electrically discolored. Hereinafter, electric discoloration of the electrochromic device will be described in detail.

Figure 53:
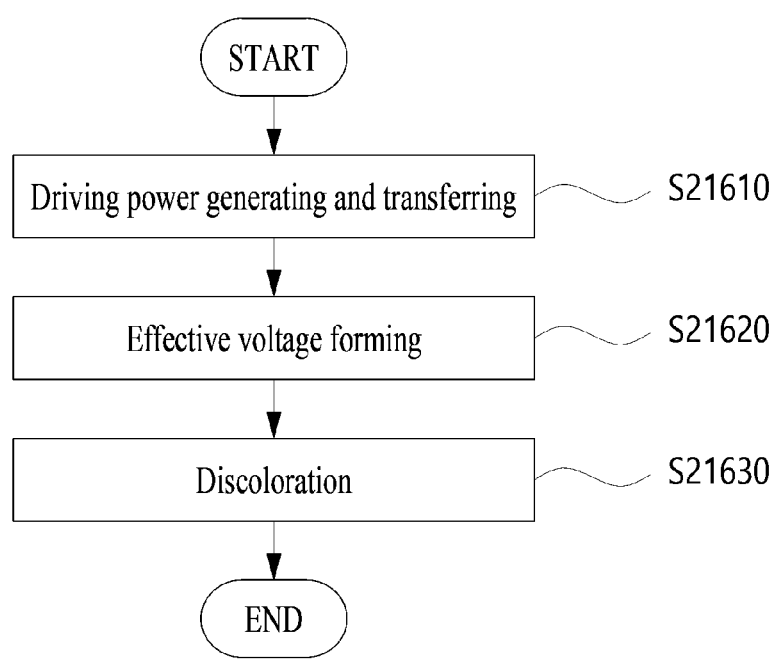
FIG. 53 is a flowchart illustrating an electrochromic method according to an embodiment of the present application.

FIG. 53 is a flowchart illustrating an electrochromic method according to an embodiment of the present application.

Referring to FIG. 53, the electrochromic method may include generating/transferring driving power (S21610), forming an effective voltage (S21620), and discoloration (S21630). Although all of Steps S21610 to S21630 may be performed, not all of Steps S21610 to S21630 need to be performed each time, and only one of Steps S21610 to S21630 may also be performed.

In the generating/transferring of the driving power (S21610), driving power for driving the electrochromic element 22200 may be generated, and the generated driving power may be applied to the electrochromic element 22200. The driving power formed in the above-described driving unit 21300 may be output to the electrical connecting member 21500, and the driving power applied to the electrical connecting member 21500 may be transferred to the electrode layers of the electrochromic element 22200 through the conductors 21530.

The driving power may be generated from the above-described driving unit 21300. The driving power is electric power for discoloring the electrochromic element 22200 and may have a voltage value or current value for activating the electrochromic element 22200.

The generated driving power may be conducted to the electrochromic element 22200 through the electrical connecting member 21500.

The electrochromic element 22200 according to an embodiment of the present application may receive the driving power through the electrical connecting member 21500. The driving power may be transferred to the electrochromic element 22200 via a conductive path formed in the driving unit 21300 of the electrochromic element 22200. As described above, the conductive path may be formed by the conductors 21530 coming in contact with each other.

In the forming of the effective voltage, an effective voltage that allows the electrochromic element 22200 to be discolored may be formed.

The effective voltage may be formed on the basis of the driving power applied to the electrochromic element 22200. The effective voltage may be formed on the basis of a difference between the first driving power applied to the first electrode 22010 included in the electrochromic element 22200 and the second driving power applied to the second electrode 22050 included in the electrochromic element 22200.

The effective voltage may be formed throughout an entire region of the electrochromic element 22200.

FIG. 54 is a view illustrating an effective voltage formed in the electrochromic element according to an embodiment of the present application.

As illustrated in FIG. 54(a), when an ACF is disposed in a region of the side surface of the electrochromic element 22200, an effective voltage may be formed in one direction of the electrochromic element 22200. The effective voltage may be an index that indicates an amount of electrons, which are electrical power sources, being supplied. That is, as the effective voltage is higher, an amount of electrons being supplied to the electrochromic element 22200 may be increased.

Referring to FIG. 54(b), the effective voltage formed throughout the entire region of the electrochromic element 22200 may be different for each of the regions. The effective voltage may be different for each of the regions due to a voltage drop phenomenon caused in one direction. That is, an effective voltage may be formed in the electrochromic element 22200 so that the effective voltage has a continuously dropping value in one direction of the electrochromic element 22200.

Specifically, an effective voltage in a region of the side surface of the electrochromic element 22200 in which the electrical connecting member 21500 is disposed may be a first effective voltage, and an effective voltage in a region adjacent to the above region may be a second effective voltage. The second effective voltage may be a voltage lower than the first effective voltage.

Although the first effective voltage may be a difference between the first driving power and the second driving power, the effective voltage in a region adjacent to the above region may be a value smaller than the difference between the first driving power and the second driving power.

In the discoloration, the transmittance/absorptivity of the electrochromic element 22200 may be changed. The color of the electrochromic element 22200 may be changed.

The electrochromic element 22200 may be electrically discolored according to a predetermined electric discoloration mechanism on the basis of the above-described effective voltages.

The electric discoloration mechanism may include steps of migration of electrochromic ions, oxidation-reduction, and discoloration.

In the migration of electrochromic ions, the electrochromic ions for electric discoloration may migrate in the electrochromic element 22200.

The electrochromic ions may migrate on the basis of the above-described effective voltages. The electrochromic ions may migrate from a region in which an electrical potential is high (a voltage is high) to a region in which a potential is low (a voltage is low) on the basis of the effective voltage.

The electrochromic ions may migrate due to electrons supplied to the electrochromic element 22200. As a predetermined Coulomb force is generated between the electrons and the electrochromic ions, the electrochromic ions may migrate to a region of the electrochromic element 22200 to which the electrons are supplied.

In the oxidation-reduction reaction and the discoloration, an oxidation-reduction reaction may occur in the electrochromic element 22200, and the electrochromic element 22200 may be discolored due to the oxidation-reduction reaction.

The oxidation-reduction reaction and the discoloration reaction may occur in the electrochromic layer 22031 and/or the ion storage layer 22033 of the electrochromic element 22200.

The electrochromic ions may cause an oxidation-reduction reaction with a predetermined electrochromic material contained in the electrochromic layer 22031 and/or the ion storage layer 22033 of the electrochromic element 22200.

FIG. 55 is a view illustrating electrical discoloration according to an embodiment of the present application.

Referring to FIG. 55, the optical state of the electrochromic element 22200 may be changed by the trench structure of the electrochromic element 22200.

Referring to FIG. 55(a), electric discoloration may occur in one direction or the other direction from the electrical connecting member.

Coloration may occur in the inner direction from the trench structure. Bleaching may occur in the inner direction from the trench structure.

An extent of coloration and/or a period required for transmittances to be uniform may be different for each of the regions of the electrochromic element 22200. When the electrochromic element 22200 includes a first region and a second region, a transmittance of the first region is a first transmittance, and a transmittance of the second region is a second transmittance, a predetermined period may be required for a value of the first transmittance and a value of the second transmittance to become equal to each other. A first period t1 may be required for the first region, and a second period t2 may be required for the second region.

A period t may be defined as a threshold period during which the electrochromic element is uniformly discolored. The threshold period may be proportional to a magnitude of a voltage. Consequently, a voltage may be applied for a longer period when a magnitude of the voltage being applied is relatively high, and a voltage may be applied for a shorter period when the magnitude of the voltage being applied is relatively low to induce the electrochromic element to be uniformly discolored.

As illustrated in FIG. 55(b), the electrical connecting member may be disposed at each of the four side surfaces of the electrochromic element. Here, when the electrochromic element is colored, the coloration may progress with time toward a center of the electrochromic element.

As described above, in the case of the electrochromic module including the electrochromic element 22200 in which the trench structure 22100 is formed and the electrical connecting member having an anisotropic conductive property, there is an effect of simplifying the arrangement of the driving module 21000. A process of producing the electrochromic module may be simplified.

Driving power should be applied to the first electrode 22010 and the second electrode 22050 for the electrochromic element 22200 to be driven.

When the trench structure 22100 is not formed, the electrochromic element 22200 should receive power from different positions. For example, the first electrode 22010 should receive driving power from the driving module 21000 disposed in the upper direction, and the second electrode 22050 should receive driving power from the driving module 21000 disposed in the lower direction. That is, when the trench structure 22100 is not formed, because the driving module 21000 has to be disposed at different positions of the electrochromic element 22200, a structure of the electrochromic module may become complex. The process may become complicated because an additional process should be performed to arrange the driving module 21000 at different positions of the electrochromic element 22200.

Alternatively, for the electrochromic element 22200 without the trench structure 22100 to receive power in the same direction, the electrochromic element 22200 should have electrodes having areas of different sizes. For example, an area of the second electrode 22050 may be wide, and the second electrode 22050 should be exposed in the outer direction of the first electrode 22010. Accordingly, regions of the first electrode 22010 and the exposed second electrode 22050 may receive power from the top. When areas of the electrodes included in the electrochromic element 22200 have different sizes, the electrodes are unable to be formed with the same process. Processes for forming the electrodes should be separately performed. Accordingly, when the trench structure 22100 is not formed, a process for producing the electrochromic module may become complicated. Because one of the electrodes should have a larger area than the other electrode, it may be difficult to reduce a size of the electrochromic module that includes the electrochromic element 22200 in which electrodes have areas of different sizes. When the region of the exposed second electrode 22050 is not entirely covered, the electrochromic element 22200 may be electrically unstable.

Conversely, when the electrochromic element 22200 includes the trench structure 22100, a process of fabricating the electrochromic module may be simplified, and the arrangement of the driving module 21000 may be simplified. An electrode may be exposed in one direction in the electrochromic element 22200 having the trench structure 22100. Accordingly, the driving module 21000 may be disposed at a position corresponding to the direction. Driving power may be applied to the first electrode 22010 and the second electrode 22050 of the electrochromic element 22200 by the driving module 21000 disposed in the direction. That is, because the driving module 21000 is only require to be disposed in one direction of the electrochromic element 22200, the arrangement of the driving module 21000 may be simplified. Accordingly, the process of producing the electrochromic module may be simplified. In the electrochromic element 22200 including the trench structure 22100, because it is not required for one electrode to have a wider area than the other electrode, size reduction of the electrochromic device may be facilitated. Because the electrodes exposed through the trench structure 22100 may be covered by the base of the electrical connecting member, the electrochromic element 22200 may become electrically stable.

2.2. Right-Angled Buffer Region

A buffer region 21100 may be formed in the electrochromic element 22200 according to an embodiment of the present application. The buffer region 21100 may be defined as a region of the electrochromic element 22200 to which driving power is not applied.

A conductive path may not be formed in a region corresponding to the buffer region 21100.

The conductors 21530 included in the electrical connecting member 21500 for driving the electrochromic element 22200 may be the conductive coating conductors 21540. Like the above-described insulated coating conductors 21545, the conductive coating conductors 21540 may be disposed in the electrochromic module or be electrically connected to each of the configurations of the electrochromic module. Consequently, overlapping descriptions will be omitted. That is, the above-described conductive coating conductors 21540 may be substituted with the insulated coating conductors 21545, the conductive surfaces 21541 may be substituted with the insulated surfaces 21546, and the insulated insides 21542 may be substituted with the conductive insides 21547.

The plurality of conductive coating conductors 21540 in the region of the base 21510 corresponding to the buffer region 21100 may not form a conductive path. The plurality of conductive coating conductors 21540 may be electrically insulated.

Figure 56:
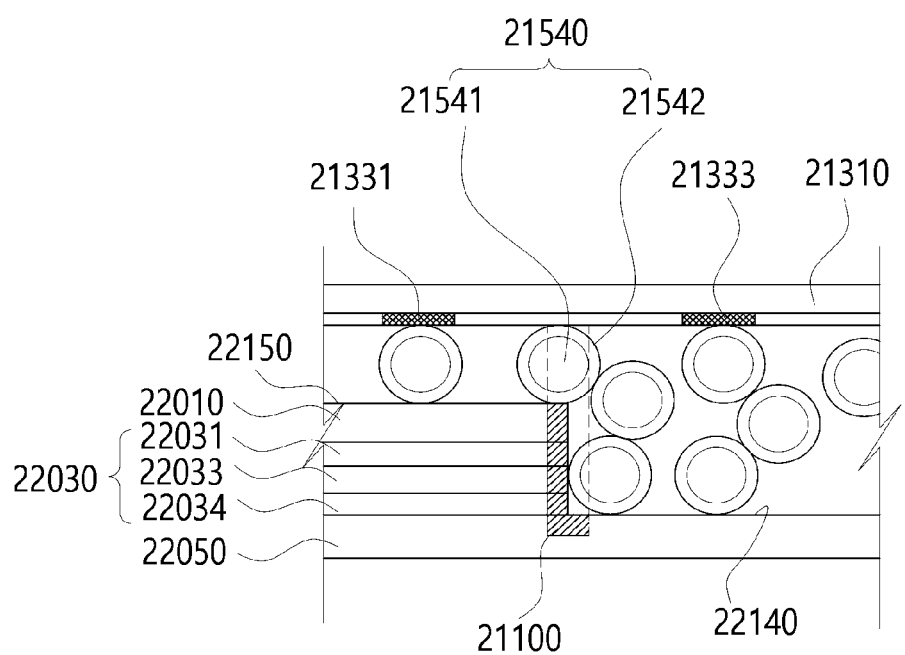
FIGS. 56 and 57 are views illustrating a driving substrate for formation of a buffer region according to an embodiment of the present application.
Figure 57:
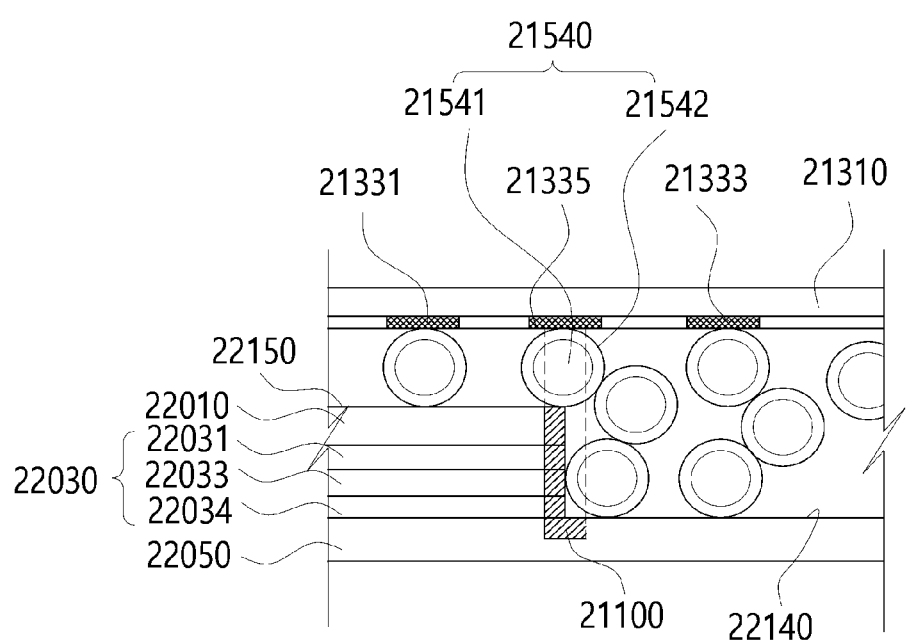

FIGS. 56 and 57 are views illustrating a driving substrate for formation of a buffer region according to an embodiment of the present application.

Hereinafter, description will be given with reference to FIGS. 56 and 57.

An angle between the connecting surface 22170 and the first electrode of the electrochromic element may be a right angle. An angle between the connecting surface 22170 and the second electrode of the electrochromic element may be a right angle. The conductors of the electrical connecting member may be the conductive coating conductors 21540.

A conductive path may not be formed between the buffer region 21100 and the driving substrate 21310.

The buffer region 21100 may be formed between the first electrode 22010 and the exposed second electrode 22050 of the trench structure 22100 of the electrochromic element. The buffer region 21100 may be formed between the protrusions 22130 and the recesses 22110. The buffer region 21100 may be formed between the pad regions 22140 and the contact regions 22150. The buffer region 21100 may be formed in a region corresponding to the connecting surfaces or the recessed surfaces.

When the electrochromic element includes a first region, a second region, and a third region, the first region may be a region of the first electrode, the second region may be the buffer region 21100, and the third region may be a region of the second electrode. The first region may be the pad region 22140, the third region may be the contact region 22150, and the second region may be the buffer region 21100. Here, the second region may be a partial region of the connecting surfaces or the recessed surfaces.

The buffer region 21100 may be realized by the connecting members 21330 included in the driving substrate 21310. The buffer region 21100 may be realized by adjusting intervals between the connecting members 21330 or controlling an output of driving power from the connecting members 21330. The connecting members 21330 may include the first connecting members 21331 and the second connecting members 21333. The first connecting members 21331 may be defined as the connecting members 21330 formed at positions corresponding to the contact regions 22150, and the second connecting members 21333 may be defined as the connecting members 21330 formed at positions corresponding to the pad regions 22140.

Referring to FIG. 56, the buffer region 21100 may be formed by not forming the connecting members 21330 in a region of the driving substrate 21310 corresponding to the buffer region 21100. The connecting members 21330 may not be formed in a region of the driving substrate 21310 between the first connecting members 21331 and the second connecting members 21333.

Alternatively, intervals between the connecting members 21330 and the connecting members 21330 adjacent thereto may be regulated. As the intervals between the connecting members 21330 are regulated, the connecting members 21330 may not be formed in the region of the driving substrate 21310 corresponding to the buffer region 21100. By making the connecting members 21330 spaced apart from each other, the connecting members 21330 may not be formed at a position in the driving substrate 21310 corresponding to the buffer region 21100. To form the buffer region 21100, the intervals between the first connecting members 21331 and the second connecting members 21333 may be adjusted.

The plurality of conductive coating conductors 21540 coming in contact with the buffer region 21100 may not come in contact with the connecting members 21330 of the driving substrate 21310. The conductive surfaces 21541 of the conductive coating conductors 21540 may not come in contact with the connecting members 21330.

The buffer region 21100 may not be electrically connected to the driving substrate 21310.

The buffer region 21100 may be insulated from the driving substrate 21310.

A conductive path may not be formed between the buffer region 21100 and the driving substrate 21310. The plurality of conductive coating conductors 21540 between the buffer region 21100 and the driving substrate 21310 may not form a conductive path. The plurality of conductive coating conductors 21540 between the buffer region 21100 and the driving substrate 21310 may come in contact with the electrode layers or the intermediate layer but not come in contact with the connecting members 21330 of the driving substrate 21310. The conductive surfaces 21541 of the plurality of conductive coating conductors 21540 may come in contact with the electrode layers or the connecting surfaces but not come in contact with the connecting members 21330 of the driving substrate 21310.

Referring to FIG. 57, the buffer region 21100 may be realized by controlling driving power being applied to the connecting members 21330 at positions corresponding to the buffer region 21100. The buffer region 21100 may be realized by controlling driving power applied to the connecting members 21330 located between the first connecting members 21331 and the second connecting members 21333. The connecting members 21330 located between the first connecting members 21331 and the second connecting members 21333 may be defined as buffer connecting members 21335.

The connecting members 21330 may be controlled so that the connecting members 21330 are unable to output driving power. An output of driving power by the connecting members 21330 may be controlled by the driving unit 21300. The driving unit 21300 may prevent the connecting members 21330 from outputting driving power. The driving unit 21300 may prevent the connecting members 21330 located between the first connecting members 21331 and the second connecting members 21333 from outputting driving power. The buffer connecting members 21335 may be unable to output driving power.

The output unit 21305 of the driving unit 21300 may not transmit driving power to the connecting members 21330. The control unit 21307 may control the output unit 21305 so that the output unit 21305 is unable to transmit driving power to the connecting members 21330.

When driving power is output through the connecting members 21330, the driving unit 21300 may prevent the driving power from being output. The control unit 21307 may stop the output of the driving power. When the driving unit 21300 includes a feedback unit, the feedback unit may measure whether driving power is output from the connecting members 21330. The feedback unit may measure whether driving power is applied to the buffer region 21100. The feedback unit may transmit a result of the measurement to the control unit 21307. When it is determined that the driving power is output or applied as a result of the measurement, the control unit 21307 may control at least one of the generating unit 21303 and the output unit 21305.

The buffer region 21100 may not be electrically connected to the driving substrate 21310.

The buffer region 21100 may be insulated from the driving substrate 21310.

The plurality of conductive coating conductors 21540 may not form a conductive path even when the plurality of conductive coating conductors 21540 come in contact with the electrode layers and the driving substrate 21310. The plurality of conductive coating conductors 21540 coming in contact with the electrode layers or the intermediate layer and the connecting members may not receive driving power. The plurality of conductive coating conductors 21540 may not receive driving power even when the plurality of conductive coating conductors 21540 come in contact with the connecting members of the driving substrate 21310. The conductive surfaces 21541 of the conductive coating conductors 21540 coming in contact with the buffer connecting members 21335 may not receive driving power.

Alternatively, the buffer region 21100 may be formed by insulating the driving unit 21300 from the connecting members 21330. The connecting members 21330 may not be electrically connected to the driving unit 21300. The buffer connecting members 21335 may be insulated from the driving unit 21300. The buffer connecting members 21335 may not receive driving power from the driving unit 21300. That is, the insulation may be performed by physically blocking an electrical connection between the driving unit 21300 and the connecting members 21330.

Figure 58:
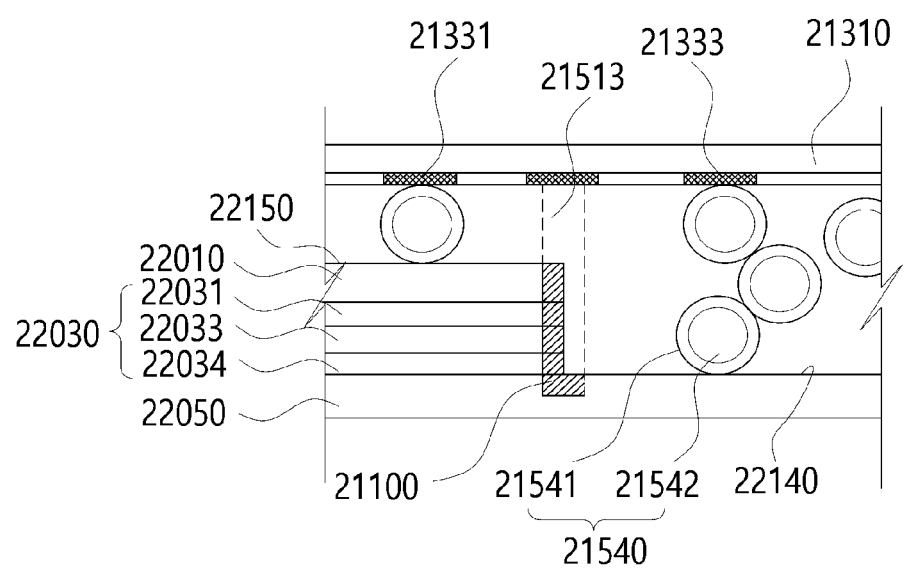
FIGS. 58 and 59 are views illustrating an electrical connecting member implemented for formation of a buffer region according to an embodiment of the present application.
Figure 59:
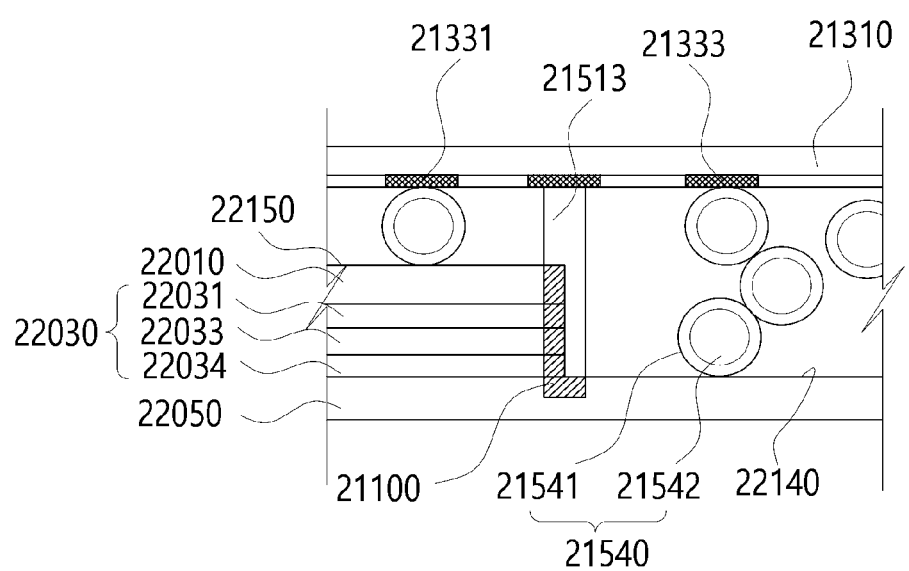

FIGS. 58 and 59 are views illustrating an electrical connecting member implemented for formation of a buffer region according to an embodiment of the present application.

Referring to FIGS. 58 and 59, the buffer region 21100 may be formed by controlling properties of a region of the electrical connecting member corresponding to the buffer region 21100. The properties may include an arrangement density and electrical properties of the conductors. The region of the electrical connecting member 21500 corresponding to the buffer region 21100 may be defined as a base buffer region 21513. The base buffer region 21513 may be located between a region of the base 21510 corresponding to the first connecting member 21331 and a region of the base 21510 corresponding to the second connecting member 21333.

Referring to FIG. 58, the buffer region 21100 may be realized by adjusting the arrangement density of the conductive coating conductors 21540 of the base 21510 of the electrical connecting member 21500. The buffer region 21100 may be formed by making the arrangement density of the conductive coating conductors 21540 of the base buffer region 21513 to be different from the arrangement density of the regions of the base 21510.

The arrangement density of the conductive coating conductors 21540 may be low or the conductive coating conductors 21540 may not be included in the base buffer region 21513. The arrangement density of the conductive coating conductors 21540 of the base buffer region 21513 may be lower than the arrangement density of the conductive coating conductors 21540 in a region of the base 21510 that is not the buffer region 21100.

The plurality of conductive coating conductors 21540 of the base buffer region 21513 may come in contact with each other but not form a conductive path. Some of the plurality of conductive coating conductors 21540 of the base buffer region 21513 may come in contact with the electrode layers or the intermediate layer and the driving substrate 21310 but not form a conductive path. The conductive surfaces 21541 of the plurality of conductive coating conductors 21540 of the base buffer region 21513 may come in contact with each other but not come in contact with the electrode layers, the intermediate layer, or the connecting members of the driving substrate 21310.

The arrangement density of the conductive coating conductors 21540 may be adjusted during a process of producing the electrical connecting member 21500.

Referring to FIG. 59, the buffer region 21100 may be formed by arranging a separate layer between a region and another region in a region of the base. The region between the one region and the other region may be the base buffer region 21513.

The separate layer may be an insulating layer.

The separate layer may be a layer that does not include the conductive coating conductors 21540.

A conductive path may not be formed in the base buffer region 21513. The base buffer region 21513 may not include the plurality of conductive coating conductors 21540 coming in contact with each other.

The plurality of conductive coating conductors 21540 may be located in a region adjacent to the base buffer region 21513. However, even when the plurality of conductive coating conductors 21540 apply driving power to the insulating layer, a conductive path may not be formed in the base buffer region 21513. A conductive path may not be formed even when the conductive surfaces 21541 of the conductive coating conductors 21540 come in contact with the insulating layer. Driving power may not be transmitted to the base buffer region 21513. When the base buffer region 21513 is a layer which does not include the conductive coating conductors 21540, driving power is unable to be transmitted to the base buffer region 21513.

Accordingly, the buffer region 21100 may not receive driving power from the base buffer region 21513.

The buffer region 21100 may also be formed by insulating the region of the electrical connecting member 21500 corresponding to the buffer region 21100 from the driving substrate 21310. The base buffer region 21513 may be insulated from the driving substrate 21310.

A predetermined insulating material may be disposed between the base buffer region and the driving substrate 21310.

A predetermined insulating layer may be disposed between the base buffer region 21513 and the driving substrate 21310. An upper surface of the base buffer region 21513 may be insulated. An insulating material may be applied on the upper surface of the base buffer region 21513. The insulating layer may be formed at the upper surface of the base buffer region 21513. An insulating film may be attached to the upper surface of the base buffer region 21513. The upper surface of the base buffer region 21513 may be coated and insulated.

Some of the conductors of the plurality of conductive coating conductors 21540 of the base buffer region 21513 may come in contact with the insulating material.

The base buffer region 21513 may not receive driving power from the driving substrate 21310. The conductive coating conductors 21540 of the base buffer region 21513 may not receive driving power from the driving substrate 21310.

Figure 60:
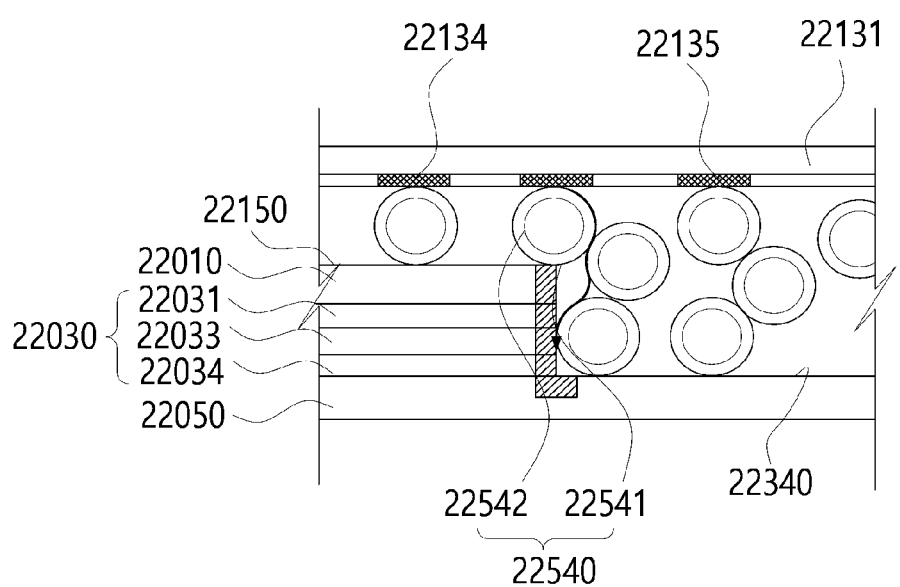
FIG. 60 is a view illustrating a conductive path according to an embodiment of the present application.

FIG. 60 is a view illustrating a conductive path according to an embodiment of the present application.

Referring to FIG. 60, when the buffer region 21100 is not formed, the plurality of conductive coating conductors 21540 coming in contact with the connecting members 21330 for the pad regions 22140 may come in contact with the contact regions 22150 as well as the pad regions 22140. Accordingly, power that should be applied to the pad regions 22140 may be applied to the contact regions 22150.

A short circuit phenomenon may occur in the electrochromic element 22200. Conversely, when the buffer region 21100 is formed, the short circuit phenomenon in the pad regions 22140 and the contact regions 22150 may be prevented.

Although not illustrated, the trench structure 22100 may have a slope. When the trench structure 22100 has a slope, the plurality of conductors 21530 may come in contact with the connecting surfaces 22170 or the recessed surfaces 22160. Accordingly, the electrochromic element 22200 may be damaged due to driving power being applied to the connecting surfaces 22170 or the recessed surfaces 22160. Conversely, when the buffer region 21100 is formed, a direct application of a driving voltage to the connecting surfaces 22170 or the recessed surfaces 22160 through the conductors 21530 may be prevented.

The sizes of the buffer region 21100 and the base buffer region 21513 illustrated in the drawings are merely examples, and the sizes are not limited thereto.

2.3. Inclined Buffer Region

The trench structure 22100 of the electrochromic element 22200 according to an embodiment of the present application may have a predetermined slope.

FIG. 61 is a view illustrating a trench structure having a slope of the electrochromic element according to an embodiment of the present application.

Figure 62:
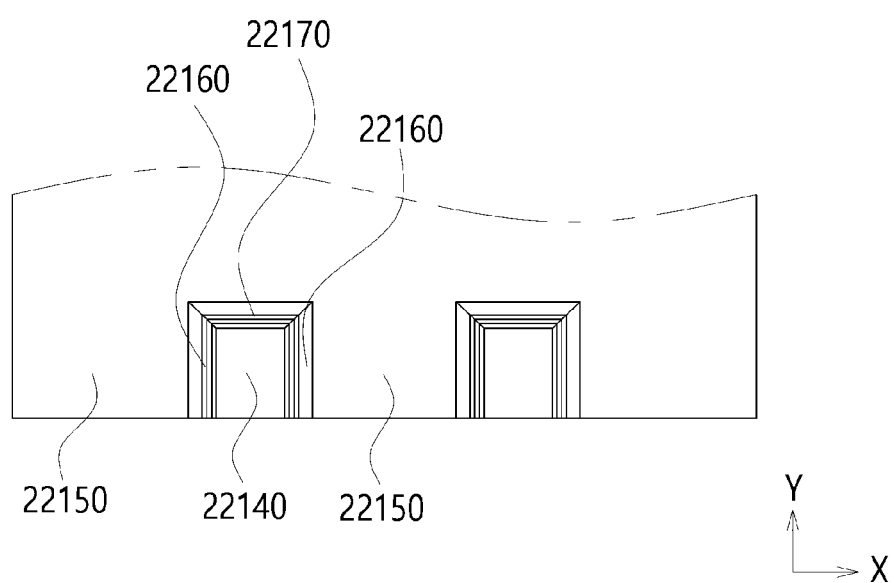
FIG. 62 is a view illustrating an upper surface of the trench structure having the slope of the electrochromic element according to an embodiment of the present application.

FIG. 62 is a view illustrating an upper surface of the trench structure having the slope of the electrochromic element according to an embodiment of the present application.

Figure 63:
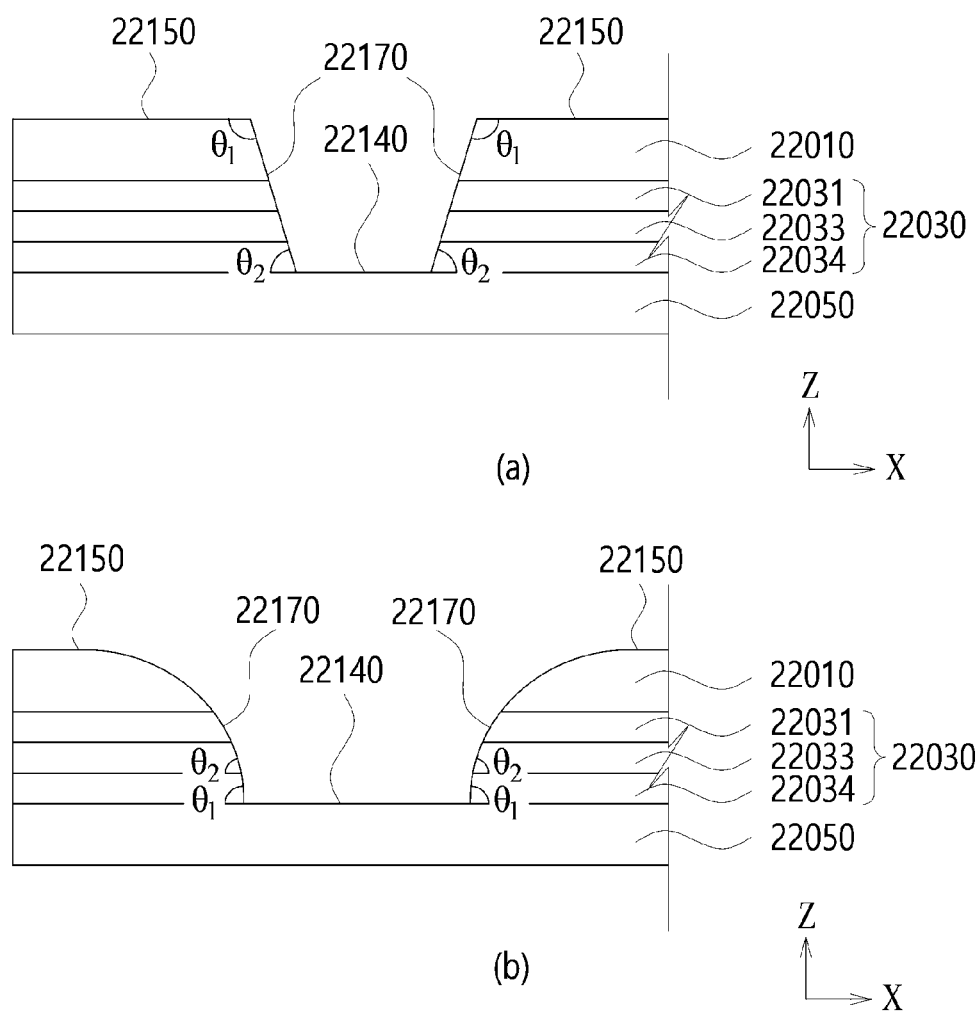
FIG. 63 is a view illustrating a side surface of the trench structure having the slope of the electrochromic element according to an embodiment of the present application.

FIG. 63 is a view illustrating a side surface of the trench structure having the slope of the electrochromic element according to an embodiment of the present application.

Hereinafter, description will be given with reference to FIGS. 61 to 63.

The trench structure having a slope may include the connecting surfaces 22170 and the recessed surfaces 22160 having predetermined angles.

The connecting surfaces 22170 and the recessed surfaces 22160 may have predetermined angles with respect to each of the regions of the electrochromic element 22200.

The connecting surfaces 22170 may have a first angle $\theta_1$ with the first electrode 22010 and have a second angle $\theta_2$ with the second electrode 22050.

The connecting surfaces 22170 and the recessed surfaces 22160 may have predetermined angles with respect to the upper surfaces of the protrusions 22130 or the upper surfaces of the pad regions 22140.

The above-described angles may be changed.

Predetermined angles between the connecting surfaces 22170 and each of the regions of the electrochromic element 22200 may be changed. A predetermined angle formed between the connecting surface 22170 and the first electrode 22010 or the second electrode 22050 may be changed. An angle formed between the first electrode 22010 or the second electrode 22050 and each region of the connecting surface 22170 may be changed. An angle of a first region of the connecting surface 22170 may be the first angle $\theta_1$, and an angle of a second region of the connecting surface 22170 may be the second angle $\theta_2$.

An angle formed between the recessed surface 22160 and each of the regions of the electrochromic element 22200 may also be changed as the above-described connecting surface 22170.

All regions of the electrochromic element 22200 included in the trench structure 22100 may be exposed in the upper direction.

The electrode layers and the intermediate layer 22030 included in the trench structure 22100 may be exposed in the upper direction.

The connecting surfaces 22170 and the recessed surfaces 22160 may be exposed in the upper direction. The first electrode 22010, the electrochromic layer 22031, the electrolyte layer 22032, and the ion storage layer 22033 of the connecting surfaces 22170 and the first electrode 22010, the electrochromic layer 22031, the electrolyte layer 22032, and the ion storage layer 22033 included in the recessed surfaces 22160 may be exposed in the upper direction.

The second electrode 22050 may be exposed in the upper direction. The pad regions 22140 of the second electrode 22050 may be exposed in the upper direction.

The electrical connecting member 21500 may be disposed in the electrochromic element 22200 in which the trench structure 22100 having a predetermined slope is formed.

The electrical connecting member 21500 may come in contact with the connecting surfaces 22170 and the recessed surfaces 22160 of the electrochromic element 22200.

The base 21510 of the electrical connecting member 21500 may come in contact with the connecting surfaces 22170 and the recessed surfaces 22160.

Some of the conductors 21530 of the plurality of conductors 21530 included in the base 21510 may come in contact with the connecting surfaces 22170 and the recessed surfaces 22160. When the conductors 21530 are the insulated coating conductors 21545, the conductive insides 21547 as well as the insulated surfaces 21546 of the insulated coating conductors 21545 may come in contact with the connecting surfaces 22170 or the recessed surfaces 22160.

The connecting members 21330 of the driving substrate 21310 may be formed in regions corresponding to the connecting surfaces 22170 and the recessed surfaces 22160.

A predetermined conductive path may be formed between the driving substrate 21310 and the connecting surfaces 22170 or the recessed surfaces 22160.

A conductive path may be formed by the plurality of conductors 21530 disposed between the connecting members 21330 and the connecting surfaces 22170. A conductive path may be formed by the plurality of conductors 21530 disposed between the connecting members 21330 and the recessed surfaces 22160.

Each of the layers of the electrochromic element 22200 included in the connecting surfaces 22170 and the recessed surfaces 22160 may receive driving power by the conductive path.

When the trench structure 22100 of the electrochromic element 22200 has a predetermined slope, the electrochromic element may have the buffer region 21100.

The buffer region 21100 may be defined as a region of the electrochromic element 22200 to which driving power is not applied.

The buffer region 21100 may be formed between the first electrode and the exposed second electrode in the trench structure of the electrochromic element. The buffer region 21100 may be formed between the protrusions and the recesses. The buffer region 21100 may be formed between the pad regions 22140 and the contact regions 22150. The buffer region 21100 may be formed at regions corresponding to the connecting surfaces or the recessed surfaces.

The above-described examples for forming the buffer region 21100 of the electrochromic element 22200 in which the electrical connecting member 21500 including the above-described conductive coating conductors 21540 is disposed may also be applied to the electrochromic element 22200 having a predetermined slope. Consequently, overlapping descriptions will be omitted.

Hereinafter, a case in which the conductors 21530 of the electrical connecting member 21500 are the insulated coating conductors 21545 will be described.

The buffer region 21100 may be formed by the driving substrate 21310, the driving unit 21300, or the electrical connecting member 21500.

The buffer region 21100 may be formed by the connecting members 21330 disposed in the driving substrate 21310. The buffer region 21100 may be formed by properly realizing the connecting members 21330, controlling an output of driving power from the connecting members 21330, or a combination of the two.

The conductive insides 21547 of the insulated coating conductors 21545 may come in contact with the buffer region 21100 while the insulated surfaces 21546 come in contact with the buffer region 21100.

Figure 64:
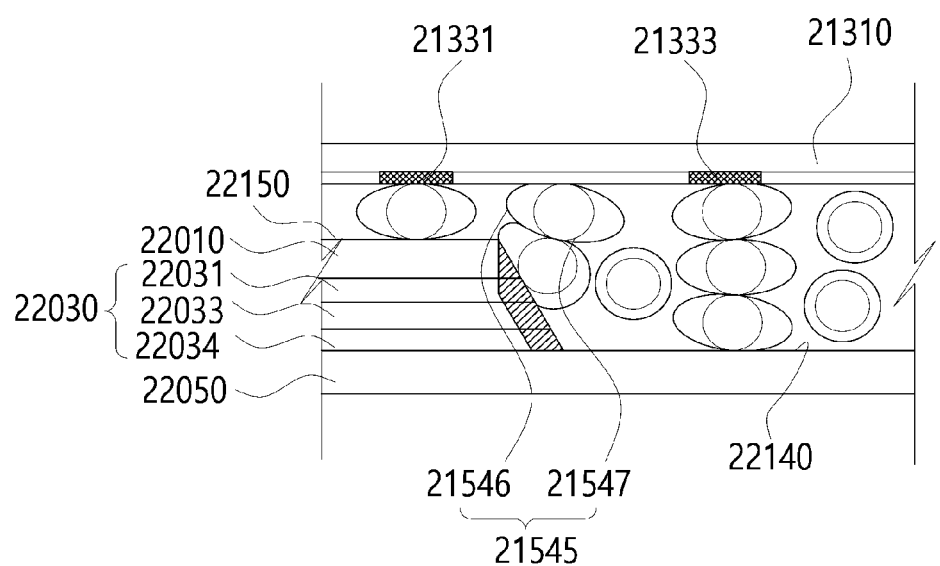
FIGS. 64 and 65 are views illustrating a driving substrate implemented for formation of a buffer region according to an embodiment of the present application.
Figure 65:
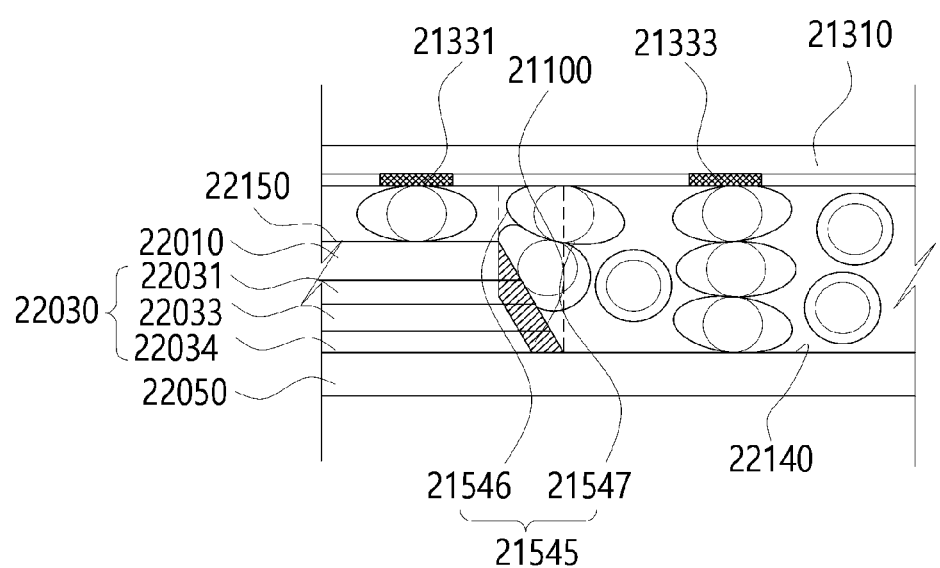

FIGS. 64 and 65 are views illustrating the driving substrate 21310 implemented for formation of a buffer region according to an embodiment of the present application.

Referring to FIG. 64, the buffer region 21100 may be formed by not forming the connecting members 21330 in the region of the driving substrate 21310 corresponding to the buffer region 21100. The connecting members 21330 may not be formed in a region of the driving substrate 21310 between the first connecting members 21331 and the second connecting members 21333.

Alternatively, intervals between the connecting members 21330 and the connecting members 21330 adjacent thereto may be regulated. As the intervals between the connecting members 21330 are regulated, the connecting members 21330 may not be formed in the region of the driving substrate 21310 corresponding to the buffer region 21100. To form the buffer region 21100, the intervals between the first connecting members 21331 and the second connecting members 21333 may be adjusted.

The plurality of insulated coating conductors 21545 coming in contact with the buffer region 21100 may not come in contact with the connecting members of the driving substrate 21310.

The buffer region 21100 may not be electrically connected to the driving unit 21300.

The buffer region 21100 may be insulated from the connecting members 21330 of the driving substrate 21310.

The plurality of insulated coating conductors 21545 located at an upper surface of the buffer region 21100 may not form a conductive path. The insulated coating conductors 21545 may come in contact with the electrode layers or the intermediate layer included in the buffer region 21100 but not come in contact with the driving substrate 21310. The buffer region 21100 may not receive driving power from the conductive insides 21547 of the insulated coating conductors 21545 coming in contact with the buffer region 21100.

The insulated coating conductors 21545 may not form a conductive path even when the conductive insides 21547 of the insulated coating conductors 21545 come in contact with the buffer region 21100. The conductive insides 21547 of the insulated coating conductors 21545 coming in contact with each other may come in contact with the buffer region but not come in contact with the connecting members 21330.

Referring to FIG. 65, the buffer region 21100 may be formed by controlling the connecting members 21330 at positions corresponding to the buffer region 21100. The buffer region 21100 may be formed by controlling the connecting members 21330 located between the first connecting members 21331 and the second connecting members 21333. The connecting members 21330 located between the first connecting members 21331 and the second connecting members 21333 may be defined as the buffer connecting members 21335.

The connecting members 21330 located between the first connecting members 21331 and the second connecting members 21333 may be controlled so that the connecting members 21330 are unable to output driving power. The buffer connecting members 21335 may be unable to output driving power.

The generating unit 21303 of the driving unit may not generate driving power to be transmitted to the connecting members 21330. The control unit may control the generating unit 21303 so that the generating unit 21303 does not generate driving power to be transmitted to the connecting members 21330.

The output unit 21305 of the driving unit 21300 may not transmit driving power to the connecting members 21330. The control unit may control the output unit 21305 so that the output unit 21305 does not transmit driving power to the connecting members 21330.

When driving power is output through the connecting members 21330, the driving unit may prevent the driving power from being output. The control unit 21307 may stop the output of the driving power. When the driving unit 21300 includes a feedback unit, the feedback unit may participate in the operation of the control unit 21307.

The buffer region 21100 may not be electrically connected to the driving substrate 21310.

The buffer region 21100 may be insulated from the driving substrate 21310.

The plurality of insulated coating conductors 21545 may not form a conductive path even when the plurality of insulated coating conductors 21545 come in contact with the electrode layers and the driving substrate 21310. The plurality of insulated coating conductors 21545 coming in contact with the electrode layers or the intermediate layer 22030 and the connecting members 21330 may not receive driving power.

The conductive insides 21547 of the insulated coating conductors 21545 coming in contact with the buffer connecting members 21335 may not receive driving power.

Figure 66:
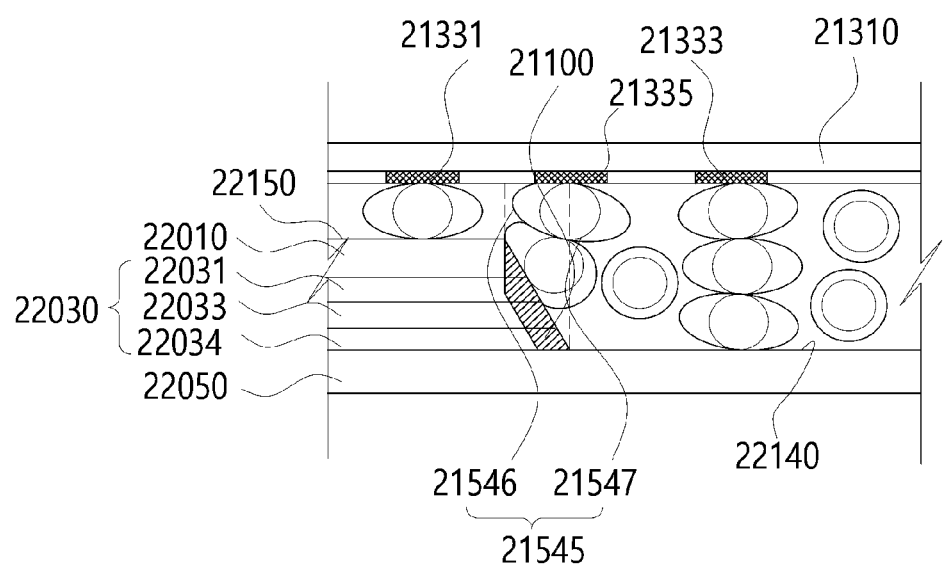
FIGS. 66 and 67 are views illustrating an electrical connecting member implemented for formation of a buffer region according to an embodiment of the present application.
Figure 67:
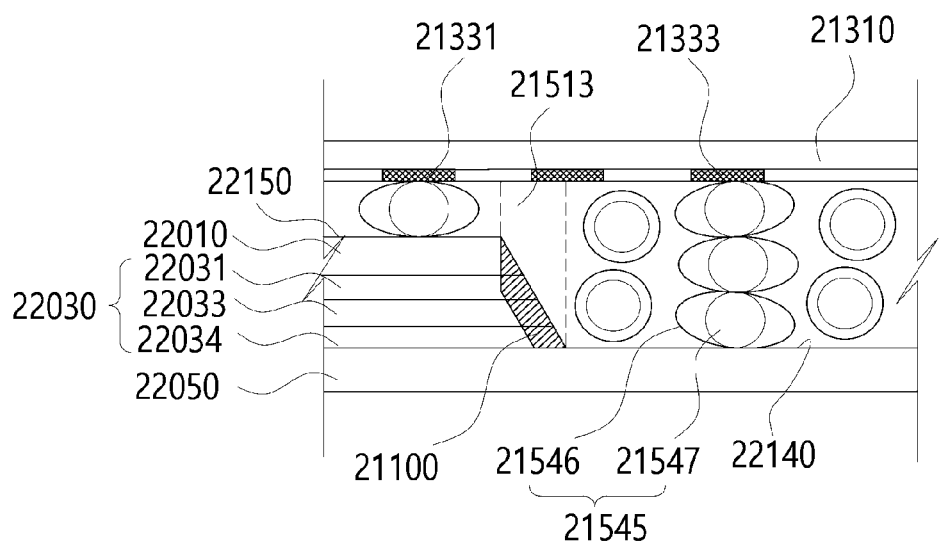

FIGS. 66 and 67 are views illustrating an electrical connecting member implemented for formation of a buffer region according to an embodiment of the present application.

Referring to FIGS. 66 and 67, the buffer region 21100 may be formed by properly adjusting the region of the electrical connecting member 21500 corresponding to the buffer region 21100. The region of the electrical connecting member 21500 may be defined as the above-described base buffer region 21513.

The base buffer region 21513 may be realized by adjusting the arrangement density of the insulated coating conductors 21545, adjusting the electrical properties of the insulated coating conductors 21545, or a combination of the two.

Referring to FIG. 66, the buffer region 21100 may be realized by adjusting the arrangement density of the insulated coating conductors 21545 of the base 22510 of the electrical connecting member 21500.

The arrangement density of the insulated coating conductors 21545 may be low or the insulated coating conductors 21545 may not be included in the base buffer region 21513.

The plurality of insulated coating conductors 21545 of the base buffer region 21513 may come in contact with each other but not form a conductive path. Some of the plurality of insulated coating conductors 21545 of the base buffer region 21513 may come in contact with the electrode layers or the intermediate layer and the driving substrate 21310 but not form a conductive path. The plurality of insulated coating conductors 21545 of the base buffer region 21513 may come in contact with each other but not come in contact with the electrode layers, the intermediate layer, or the connecting members of the driving substrate 21310.

Referring to FIG. 67, the buffer region 21100 may be formed by arranging a separate layer between a region and another region in a region of the base. The region between the one region and the other region may be the base buffer region 21513.

The separate layer may be an insulating layer.

The separate layer may be a layer that does not include the insulated coating conductors 21545.

The plurality of insulated coating conductors 21545 may be located in a region adjacent to the base buffer region 21513. However, even when the plurality of insulated coating conductors 21545 apply driving power to the predetermined layer, a conductive path may not be formed in the base buffer region 21513.

The buffer region 21100 may also be formed by insulating the region of the electrical connecting member 21500 corresponding to the buffer region 21100 from the driving substrate 21310. The base buffer region 21513 may be insulated from the driving substrate 21310.

A predetermined insulating material 1550 may be disposed between the base buffer region 21513 and the driving substrate 21310.

A predetermined insulating layer may be disposed between the base buffer region 21513 and the driving substrate 21310. An upper surface of the base buffer region 21513 may be insulated. The insulating material may be applied on the upper surface of the base buffer region 21513. The insulating layer may be formed at the upper surface of the base buffer region 21513. An insulating film may be attached to the upper surface of the base buffer region 21513. The upper surface of the base buffer region 21513 may be coated and insulated.

Some of the conductors of the plurality of insulated coating conductors 21545 of the base buffer region 21513 may come in contact with the insulating material.

The base buffer region 21513 may not receive driving power from the driving substrate 21310. The insulated coating conductors 21545 of the base buffer region 21513 may not receive driving power from the driving substrate 21310.

Figure 68:
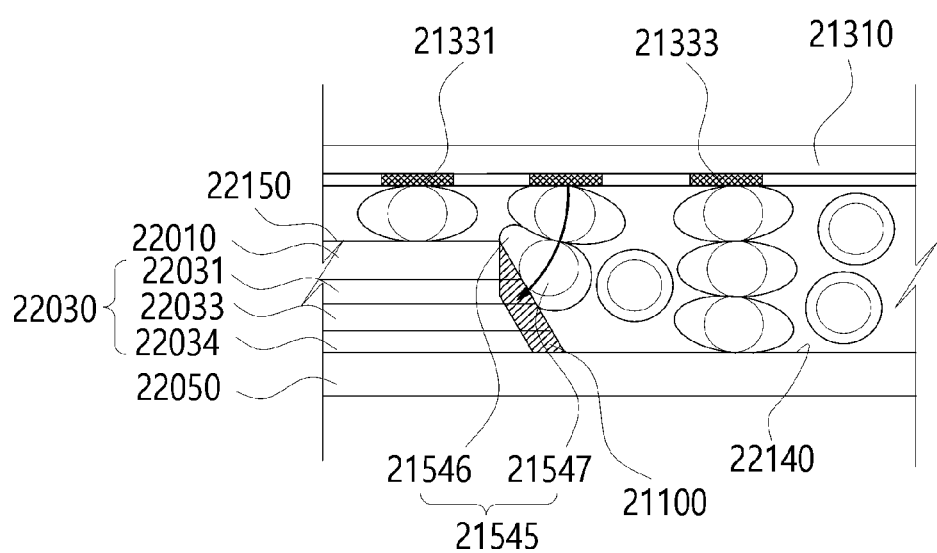
FIG. 68 is a view illustrating a conductive path according to an embodiment of the present application.

FIG. 68 is as view illustrating a conductive path according to an embodiment of the present application.

Referring to FIG. 68, when the buffer region 21100 is not formed, a conductive path may be formed by the conductive insides 21547 of the insulated coating conductors 21545 disposed between the connecting surfaces and the connecting members. Driving power may be applied to the intermediate layer 22030 via the conductive path and cause damage to the intermediate layer 22030 of the electrochromic element. Accordingly, when the buffer region 21100 is formed, damage to the intermediate layer 22030 of the electrochromic element 22200 may be prevented.

Sizes of the buffer region 21100 and the base buffer region 21513 illustrated in the drawings are merely examples, and the sizes are not limited thereto.

2.4. Distributing Member

The electrochromic device according to an embodiment of the present application may further include a distributing member 21700. The electrochromic module may further include the distributing member 21700. The driving module 21000 may further include the distributing member 21700.

Figure 69:
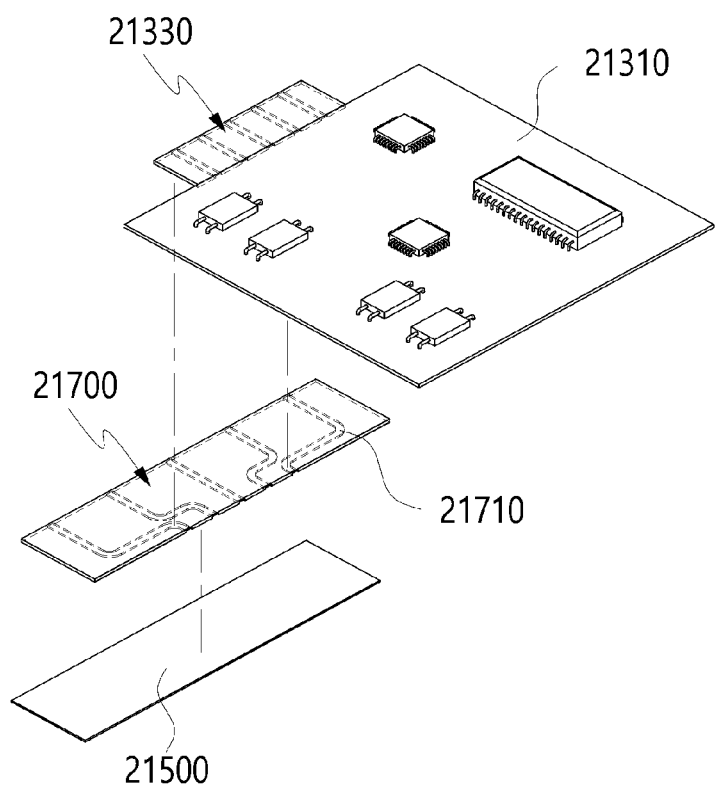
FIG. 69 is a view illustrating a driving module further including a distributing member according to an embodiment of the present application.

FIG. 69 is a view illustrating a driving module further including a distributing member according to an embodiment of the present application.

FIG. 70 is a view illustrating the driving module further including the distributing member according to an embodiment of the present application.

Hereinafter, description will be given with reference to FIGS. 69 and 70.

The distributing member 21700 may electrically connect the driving substrate 21310 to the electrical connecting member 21500.

The distributing member 21700 may include the distributing base and a plurality of distributing connecting members 21710.

The distributing base may define an outer shape of the distributing member 21700.

The distributing connecting members 21710 may have conductivity. The distributing connecting members 21710 may be realized with a conductive material.

The distributing connecting members 21710 may be bent in a predetermined shape.

The plurality of distributing connecting members 21710 may be disposed at predetermined intervals in distributing base.

The arrangement density of the distributing connecting members 21710 at one side of the distributing base may be different from the arrangement density of the distributing connecting members 21710 at the other side of the distributing base. The intervals between adjacent distributing connecting members 21710 disposed at one side of the distributing base may be different from the intervals between adjacent distributing connecting members 21710 disposed at the other side of the distributing base. For example, the distributing connecting members 21710 may be disposed at a first interval at one side, the distributing connecting members 21710 disposed at the side may extend in a bent shape toward the other side, and the distributing connecting members 21710 may be disposed at a second interval at the other side. The first interval may be smaller than the second interval.

The distributing member 21700 may electrically connect the driving substrate 21310 to the electrical connecting member 21500. The distributing connecting members 21710 of the distributing member 21700 may electrically connect the driving substrate 21310 to the electrical connecting member 21500. A conductive path may be formed between the driving substrate 21310 and the electrical connecting member 21500 by the distributing connecting members 21710.

The distributing member 21700 may be disposed to come in contact with the connecting members 21330 of the driving substrate 21310.

When the plurality of connecting members 21330 are disposed at the lower surface of the driving substrate 21310, the distributing member 21700 may be disposed at the lower surface of the driving substrate 21310. The distributing connecting members 21710 of the distributing member 21700 may come in contact with the plurality of connecting members 21330 disposed at the lower surface of the driving substrate 21310. In this case, the distributing connecting members 21710 may be disposed at a lower surface and an upper surface of the distributing member 21700. The distributing connecting members 21710 disposed at the lower surface may be disposed at the upper surface via throughholes.

When the plurality of connecting members 21330 are disposed at the upper surface of the driving substrate 21310, the distributing member 21700 may be disposed at the upper surface of the driving substrate 21310. The distributing connecting members 21710 of the distributing member 21700 may come in contact with the plurality of connecting members 21330 disposed at the upper surface of the driving substrate 21310. In this case, the distributing connecting members 21710 may be disposed only at the lower surface of the distributing member 21700.

The plurality of distributing connecting members 21710 of the distributing member 21700 may be connected to the plurality of connecting members 21330 of the driving substrate 21310. The plurality of distributing connecting members 21710 may include a first distributing connecting member 21711 and a second distributing connecting member 21713. The plurality of connecting members 21330 may include the first connecting member 21331 and the second connecting member 21333 disposed in the vicinity of the first connecting member 21331.

The plurality of distributing connecting members 21710 may correspond to the plurality of connecting members 21330.

Intervals between the distributing connecting members 21710 adjacent to each other may correspond to intervals between the connecting members 21330 adjacent to each other. The number of the distributing connecting members 21710 may be equal to the number of the connecting members 21330.

The first distributing connecting member 21711 may be connected to the first connecting member 21331, and the second distributing connecting member 21713 may be connected to the second connecting member 21333.

The distributing connecting members 21710 may not correspond to the plurality of connecting members 21330.

The intervals between the distributing connecting members 21710 adjacent to each other may not correspond to the intervals between the connecting members 21330 adjacent to each other. The number of the distributing connecting members 21710 may be different from the number of the connecting members 21330.

The first distributing connecting member 21711 may be connected to the first connecting member 21331, and the second distributing connecting member 21713 may be connected to another connecting member 21330 adjacent to the second connecting member 21333.

Due to the distributing connecting members 21710 coming in contact with the connecting members 21330, the distributing connecting members 21710 may be electrically connected to the connecting members 21330. The distributing member 21700 may be electrically connected to the driving unit 21300.

The distributing member 21700 may be electrically connected to the electrical connecting member 21500.

The distributing member 21700 may be disposed at the upper surface of the electrical connecting member 21500. The distributing member 21700 may come in contact with the upper surface of the electrical connecting member 21500. The base 21510 of the distributing member 21700 may come in contact with the upper surface of the electrical connecting member 21500.

The distributing member 21700 may cover the upper surface of the electrical connecting member 21500. The base 21510 of the electrical connecting member 21500 may be covered by the distributing member 21700.

The distributing connecting members 21710 of the distributing member 21700 may come in contact with the upper surface of the electrical connecting member 21500.

The plurality of distributing connecting members 21710 may come in contact with the base 21510 of the electrical connecting member 21500. The distributing connecting members 21710 may come in contact with the upper surface of the base 21510.

The plurality of distributing connecting members 21710 may come in contact with some of the conductors 21530 of the plurality of conductors 21530 of the electrical connecting member 21500.

Accordingly, the electrical connecting member 21500 may have a conductive path. The conductors 21530 in contact with the distributing connecting members 21710 may receive driving power. The conductors 21530 may receive driving power from the distributing connecting members 21710.

As the distributing member 21700 is electrically connected to the driving substrate 21310 and the electrical connecting member 21500 as described above, the electrochromic element 22200 may receive driving power from the driving substrate 21310.

Figure 71:
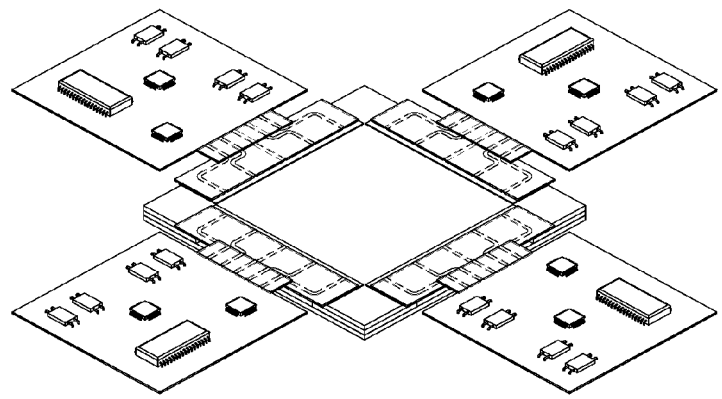
FIG. 71 is a view illustrating an electrochromic module further including the distributing member according to an embodiment of the present application.

FIG. 71 is a view illustrating an electrochromic module further including the distributing member according to an embodiment of the present application.

Referring to FIG. 71, the distributing member 21700 may be disposed between the driving substrate 21310 and the electrical connecting member 21500 disposed at the side surface of the electrochromic element 22200.

The plurality of conductors 21530 connected to the distributing connecting members 21710 may come in contact with the electrochromic element 22200.

The plurality of conductors 21530 connected to the distributing connecting members 21710 may come in contact with a region of the first electrode 22010 and a region of the second electrode 22050 of the trench structure 22100. The conductors 21530 may come in contact with the pad regions 22140 and the contact regions 22150.

A conductive path may be formed between the electrochromic element 22200 and the distributing member 21700. A conductive path may be formed between an upper region of the first electrode 22010 and an upper region of the second electrode 22050 and the distributing connecting members 21710. A conductive path may be formed between the pad regions 22140 and the distributing connecting members 21710 and between the contact regions 22150 and the distributing connecting members 21710.

Accordingly, the first electrode 22010 and the second electrode 22050 of the electrochromic element 22200 may receive driving power. The electrochromic element 22200 may be electrically discolored due to receiving driving power from the distributing member.

When the distributing member 21700 is present, there is an effect of simplifying the arrangement of the driving module 21000. When the distributing member 21700 is not present, sizes of the connecting members 21330 of the driving substrate 21310 should correspond to the size of the electrical connecting member 21500 to apply driving power to the entire region of the electrical connecting member 21500. However, when the distributing member 21700 is present, the sizes of the connecting members 21330 of the driving substrate 21310 may be formed smaller than the size of the electrical connecting member 21500. When the distributing member 21700 is present, the arrangement of the driving substrate 21310 may become efficient because the sizes of the connecting members 21330 may be formed smaller than the size of the electrical connecting member 21500. Consequently, when the distributing member 21700 is present, there is an effect of simplifying the arrangement of the driving module 21000.

Although the distributing member 21700 has been described above as being separately disposed from the driving module 21000, the distributing member 21700 may also be included in the electrical connecting member 21500. For example, the distributing member 21700 may be disposed at the upper surface of the base 21510.

2.5. Electrical Connector

The electrochromic element 22200 according to an embodiment of the present application may have a predetermined outer shape.

FIG. 72 is a view illustrating the electrochromic element 22200 according to an embodiment of the present application.

Referring to FIG. 72(a), the electrochromic element 22200 may be provided in a flat plate shape having a predetermined curvature. The electrochromic element 22200 may be provided in an elliptical flat plate shape. The side surface of the electrochromic element 22200 may have a predetermined curvature. The outermost portion of the electrochromic element 22200 may have a curvature.

Referring to FIG. 72(b), the electrochromic element 22200 may be provided in a trapezoidal flat plate shape. The side surface of the electrochromic element 22200 may include an upper side, a lower side, and a side connecting the upper side to the lower side. A longitudinal length of the upper side may be different from a longitudinal length of the lower side.

The trench structure 22100 according to an embodiment of the present application may be formed corresponding to the outer shape of the electrochromic element 22200.

When the electrochromic element 22200 has a predetermined curvature, the trench structure 22100 of the electrochromic element 22200 may have a predetermined curvature. A region of the electrochromic element 22200 included in the trench structure 22100 may have a predetermined curvature. The pad regions 22140 and the protrusions 22130 may have a predetermined curvature.

When the electrochromic element 22200 is provided in a trapezoidal flat plate shape, the trench structure 22100 may be formed at only the upper side and the lower side of the electrochromic element 22200.

When the number of trench structures 22100 formed at the upper side and the lower side are equal, intervals between adjacent trench structures 22100 may be different. Intervals between the trench structures 22100 formed at the upper side may be different from intervals between the trench structures 22100 formed at the lower side. Intervals between the recesses 22110 adjacent to each other and intervals between the protrusions 22130 formed at the upper side may be different from intervals between the recesses 22110 adjacent to each other and intervals between the protrusions 22130 adjacent to each other formed at the lower side. A length of a side surface of the protrusion 22130 at the upper side may be different from a length of a side surface of the protrusion 22130 at the lower side.

When the numbers of the trench structures 22100 formed at the upper side and the lower side are different, intervals between the trench structures 22100 of the electrochromic element may be same. The number of the trench structures 22100 may be determined so that the intervals between the trench structures 22100 are the same.

The electrochromic element 22200 formed in the trapezoidal flat plate shape may have the trench structure 22100 at the upper side, the lower side, and the side. In comparison to the electrochromic element 22200 in which the trench structure 22100 is not formed at the side, the electrochromic element 22200 having the trench structure 22100 formed at the side may have an effect of shortening an electric discoloration period. When the trench structure 22100 is disposed at the side, a region to which driving power is applied may widen in comparison to when the trench structure 22100 is not formed at the side. By receiving driving power through a wider area, there is an effect of shortening an electric discoloration period.

The electrochromic module including the electrochromic element 22200 having a predetermined shape may further include a predetermined electrical connector 23000.

Figure 73:
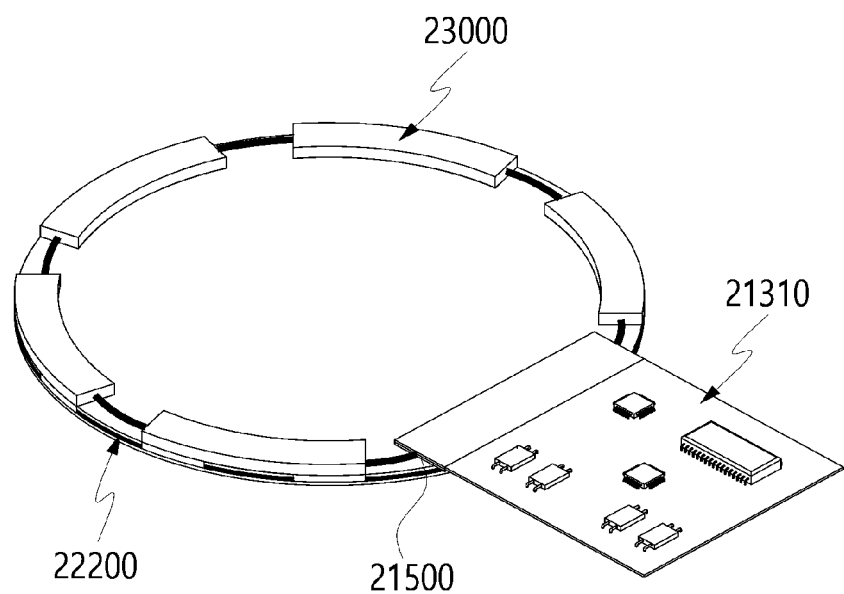
FIG. 73 is a view illustrating an electrochromic element having a predetermined shape and a driving module according to an embodiment of the present application.

FIG. 73 is a view illustrating an electrochromic element having a predetermined shape and a driving module according to an embodiment of the present application.

Referring to FIG. 73, the driving substrate 21310 may be disposed only at a partial region of the upper surface of the electrical connecting member 21500. The connecting members 21330 of the driving substrate 21310 may come in contact with only the partial region of the upper surface of the electrical connecting member 21500. The connecting members 21330 may come in contact with only a partial region of the base 21510.

The partial region of the electrical connecting member 21500 may receive driving power from the driving substrate 21310. The partial region of the base 21510 may receive driving power through the connecting members 21330.

Accordingly, driving power may be applied only to a partial region of the electrochromic element 22200.

The electrochromic module may include the predetermined electrical connector 23000 so that driving power is applied to the entire region of the electrical connecting member 21500. Driving power applied to the partial region may be transmitted to other regions through the predetermined electrical connector 23000.

The electrochromic module may include the electrical connector 23000 so that driving power applied only to the partial region is transmitted to other regions.

The electrical connector 23000 may be realized with at least one of a predetermined wire and a conductive film.

The electrical connector 23000 may be connected to the driving substrate 21310. The electrical connector 23000 connected to the connecting member 21330 may come in contact with other regions of the electrical connecting member 21500.

Alternatively, the electrical connector 23000 may be connected to a partial region of the electrical connecting member 21500. The electrical connector 23000 connected to the partial region may come in contact with other regions of the electrical connecting member 21500.

Alternatively, when a plurality of electrical connecting members 21500 are present, the electrical connector 23000 may electrically connect the plurality of electrical connecting members 21500. The electrochromic module may include the predetermined electrical connector 23000 so that driving power is applied to all of the electrical connecting members 21500.

The driving power transmitted to some of the electrical connecting members 21500 may be transmitted to other electrical connecting members 21500 through the electrical connector 23000.

Alternatively, when a plurality of distributing members 21700 are present, the electrical connector 23000 may electrically connect the plurality of distributing members 21700.

The electrochromic element may have a curved shape.

The above-described driving module 21000 may drive the electrochromic element 10200 of FIGS. 1 to 37. That is, the electrical connecting member 21500 of the above-described driving module 21000 may be disposed in the electrochromic element 10200 of FIGS. 1 to 37, and the trench structure 22100 may be formed in the electrochromic element 10200 of FIGS. 1 to 37 to receive driving power from the electrical connecting member 21500.

Second Embodiment Group

Hereinafter, another embodiment of the above-described electrochromic element will be described.

Hereinafter, an "optical state" of a configuration may be defined as a meaning that covers characteristics of the configuration related to light. The optical state may include a refractive index, a transmittance (transmissivity), color efficiency, an optical density, a color index, a discolored/bleached state, and the like.

Hereinafter, a "change in an optical state" may refer to changes in the above-mentioned optical states. However, unless particularly mentioned, hereinafter, a change in an optical state refers to a change in a discolored/bleached state.

Hereinafter, "differentiation" may refer to a visual differentiation. When one configuration and another configuration are differentiated, the configuration and the other configuration may be visually differentiated. In other words, when the configuration and the other configuration are differentiated, the configuration and the other configuration may be viewed as different configurations.

Hereinafter, an electrochromic element according to the second embodiment group will be described.

1. Electrochromic Element

An optical state of the electrochromic element may be changed due to receiving power. The power may include a current, a voltage, or the like.

Figure 74:
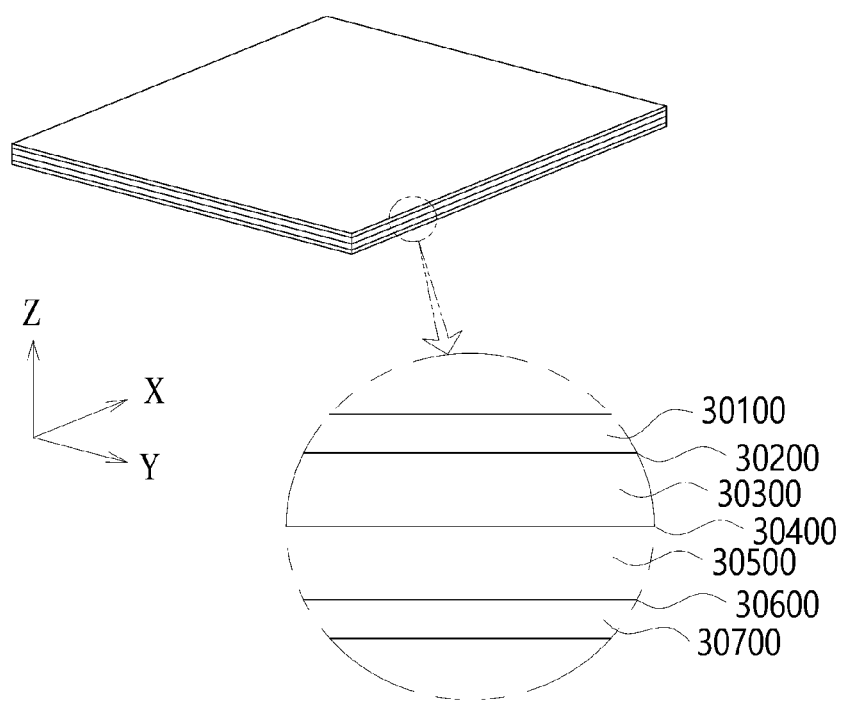
FIG. 74 is a view illustrating an electrochromic element according to an embodiment of the present application.

FIG. 74 is a view illustrating an electrochromic element 30001 according to an embodiment of the present application.

Referring to FIG. 74, the electrochromic element 30001 according to an embodiment of the present application includes a first electrode 30100, an electrochromic layer 30300, an ion transport storage layer 30500, and a second electrode 30700, and a first contact surface 30200, a boundary surface 30400, and a second contact surface 30600 may be formed in the electrochromic element 30001. However, the electrochromic element 30001 is not limited to having the elements illustrated in FIG. 74, and the electrochromic element 30001 including more elements in comparison to those illustrated in FIG. 74 may also be realized. For example, the electrochromic element 30001 may further include a power unit configured to apply power for changing an optical state of the electrochromic element 30001.

The first electrode 30100 and the second electrode 30700 may be disposed to face each other.

The electrochromic layer 30300 may be located between the first electrode 30100 and the second electrode 30700.

The ion transport storage layer 30500 may be disposed between the electrochromic layer 30300 and the second electrode 30700.

The first contact surface 30200 may be formed by the first electrode 30100 and the electrochromic layer 30300 coming in contact with each other.

The boundary surface 30400 may be formed by the electrochromic layer 30300 and the ion transport storage layer 30500 coming in contact with each other.

The second contact surface 30600 may be formed by the ion transport storage layer 30500 and the second electrode 30700 coming in contact with each other.

Hereinafter, each of the layers of the electrochromic element 30001 will be described in detail.

First, the first electrode 30100 and the second electrode 30700 will be described.

The first electrode 30100 and the second electrode 30700 may have a predetermined shape. The first electrode 30100 and the second electrode 30700 may be provided in a flat plate shape.

The first electrode 30100 and the second electrode 30700 may include at least one of a light transmitting material and a light reflecting material. The materials may be conductive.

The light transmitting material is a material having an optical property of transmitting most of light applied thereto. A metal which is doped with at least one of indium, tin, zinc, and/or oxide may be selected as the light transmitting material. Specifically, ITO or ZnO may be selected as the light transmitting material.

The light reflecting material is a material having an optical property of reflecting most of light applied thereto. The light reflecting material may be a material including at least one of Al, Cu, Mo, Cr, Ti, Au, Ag, and W.

The first electrode 30100 and the second electrode 30700 may be realized with appropriate materials according to a purpose of realizing the electrochromic element 30001.

When both of the first electrode 30100 and the second electrode 30700 are realized with the light transmitting material, light applied to the electrochromic element 30001 may transmit through the electrochromic element 30001. In this case, the electrochromic element 30001 may be use as an electrochromic window.

When the first electrode 30100 is realized with the light reflecting material while the second electrode 30700 is realized with the light transmitting material, or when the first electrode 30100 is realized with the light transmitting material while the second electrode 30700 is realized with the light reflecting material, light applied to the electrochromic element 30001 may be reflected from the electrochromic element 30001. In this case, the electrochromic element 30001 may be used as an electrochromic mirror.

A particle size of the first electrode 30100 may be larger than a particle size of the second electrode 30700. The first electrode 30100 may consist of particles of a larger size than that of particles constituting the second electrode 30700.

The particles constituting the first electrode 30100 may have a larger size than the particles constituting the second electrode 30700 due to different temperature conditions in processes for forming the first electrode 30100 and the second electrode 30700.

The particle size of the first electrode 30100 and the particle size of the second electrode 30700 may be inversely proportional to temperatures during the processes for forming the first electrode 30100 and the second electrode 30700. The particle size in a low-temperature process may be relatively larger than the particle size in a high-temperature process.

To realize the electrochromic element 30001, the second electrode 30700 may be separately formed and provided from the first electrode 30100, the electrochromic layer 30300, and the ion transport storage layer 30500. The process for forming the second electrode 30700 may be performed at a high-temperature.

To realize the electrochromic element 30001, the first electrode 30100 may be formed under the same process condition as those of the electrochromic layer 30300 and the ion transport storage layer 30500. The process for forming the first electrode 30100 may be performed at a relatively lower temperature than the temperature for forming the second electrode 30700.

Due to the temperature conditions of the processes, the size of the particles constituting the first electrode 30100 may be larger than the size of the particles constituting the second electrode 30700.

The low-temperature condition when forming the first electrode 30100 may prevent destruction of the electrochromic layer 30300 and the ion transport storage layer 30500 during the process for forming the electrochromic element 30001. When the first electrode 30100 is formed under a high-temperature condition, the electrochromic layer 30300 and the ion transport storage layer 30500 formed under the same process condition as the first electrode 30100 may be exposed to high-temperature environment. Because the electrochromic layer 30300 and the ion transport storage layer 30500 may be deteriorated under a high-temperature condition, the electrochromic layer 30300 and the ion transport storage layer 30500 may be destroyed due to the high-temperature process environment. Conversely, when the first electrode 30100 is formed under a low-temperature condition, destruction of the electrochromic layer 30300 and the ion transport storage layer 30500 due to deterioration may be prevented. Accordingly, destruction of the electrochromic layer 30300 and the ion transport storage layer 30500 during the process of forming the electrochromic element 30001 may be prevented.

The first electrode 30100 may have a smaller electrical resistance value than the second electrode 30700. The electrical resistance values of the first electrode 30100 and the second electrode 30700 may be based on the sizes of the particles constituting the first electrode 30100 and the second electrode 30700. The electrical resistance values may be inversely proportional to the sizes of the particles constituting the first electrode 30100 and the second electrode 30700. Accordingly, because the size of the particles constituting the first electrode 30100 is larger than the size of the particles constituting the second electrode 30700, the first electrode 30100 may have a lower electrical resistance value than the second electrode 30700.

It has been described above that the size of the particles constituting the first electrode 30100 is larger than the size of the particles constituting the second electrode 30700. However, conversely, the size of the particles constituting the second electrode 30700 may be larger than the size of the particles constituting the first electrode 30100. In this case, the second electrode 30700 may be formed together with the ion transport storage layer 30500 and the electrochromic layer 30300, and the first electrode 30100 may be separately formed. The second electrode 30700 may be formed at a higher temperature than a temperature condition of the process for forming the first electrode 30100. The second electrode 30700 may have a smaller electrical resistance value than the first electrode 30100.

Hereinafter, the electrochromic layer 30300 and the ion transport storage layer 30500 will be described.

The electrochromic layer 30300 and the ion transport storage layer 30500 may be disposed between the first electrode 30100 and the second electrode 30700.

The electrochromic layer 30300 may be disposed between the first electrode 30100 and the second electrode 30700. The electrochromic layer 30300 may be dispose to come in contact with a lower surface of the first electrode 30100. The electrochromic layer 30300 may be disposed to be spaced apart from the second electrode 30700 in the upper direction.

The ion transport storage layer 30500 may be disposed between the first electrode 30100 and the second electrode 30700. The ion transport storage layer 30500 may be disposed between the electrochromic layer 30300 and the second electrode 30700. The ion transport storage layer 30500 may be disposed to come in contact with a lower surface of the electrochromic layer 30300. The ion transport storage layer 30500 may be disposed to come in contact with an upper surface of the second electrode 30700.

Optical states of the electrochromic layer 30300 and the ion transport storage layer 30500 may be changed. The electrochromic layer 30300 and the ion transport storage layer 30500 may be electrically discolored/bleached. The changes in the optical states and the electrical discoloration may be due to power applied to the electrochromic element 30001.

The electrochromic layer 30300 and the ion transport storage layer 30500 may include an electrochromic material for changing the optical states.

The electrochromic material may include an oxidation-reduction material and chromic ions. The electrochromic material may be defined as a material whose optical characteristic is changeable.

The oxidation-reduction material may include reduction discoloration materials such as $TiO_2$, $V_2O_5$, $Nb_2O_5$, $Cr_2O_3$, $MnO_2$, $FeO_2$, $CoO_2$, $NiO_2$, $RhO_2$, $Ta_2O_5$, and $WO_3$, and oxidation discoloration materials such as $NiO_2$, $IrO_2$, $CoO_2$, iridium-magnesium oxide, nickel-magnesium oxide, and titanium-vanadium oxide.

The chromic ions may be defined as a material causing a change in an optical characteristic of the electrochromic material. The chromic ions may include cathodic ions such as OH− and anodic ions such as H+ and Li+.

The electrochromic layer 30300 and the ion transport storage layer 30500 may receive electrons. The electrochromic layer 30300 may receive electrons from the first electrode 30100. The ion transport storage layer 30500 may receive electrons from the second electrode 30700. Alternatively, the electrochromic layer 30300 and the ion transport storage layer 30500 may directly receive electrons from the power supply unit. The electrons may cause migration of the chromic ions. The chromic ions may be guided by the electrons supplied to the electrochromic layer 30300 and the ion transport storage layer 30500 and be supplied to the electrochromic layer 30300 and the ion transport storage layer 30500.

The ion transport storage layer 30500 may further include an insulating material. The ion transport storage layer 30500 may block migration of electrons on the basis of the insulating material.

The insulating material may include at least one of $SiO_2$, $Al_2O_3$, $Nb_2O_3$, $Ta_2O_5$, $LiTaO_3$, $LiNbO_3$, $La_2TiO_7$, $La_2TiO_7$, $SrZrO_3$, $ZrO_2$, $Y_2O_3$, $Nb_2O_5$, $La_2Ti_2O_7$, $LaTiO_3$, and $HfO_2$.

The electrochromic element 30001 that is not limited to the above-described arrangement order of the electrochromic layer 30300 and the ion transport storage layer 30500 may be realized. Specifically, the ion transport storage layer 30500 may be disposed at a lower surface of the first electrode 30100, and the electrochromic layer 30300 may be disposed between the ion transport storage layer 30500 and the second electrode 30700.

Each of the elements of the electrochromic element 30001 has been described in detail above.

Hereinafter, a change in an optical state of the electrochromic element 30001 will be described.

Figure 75:
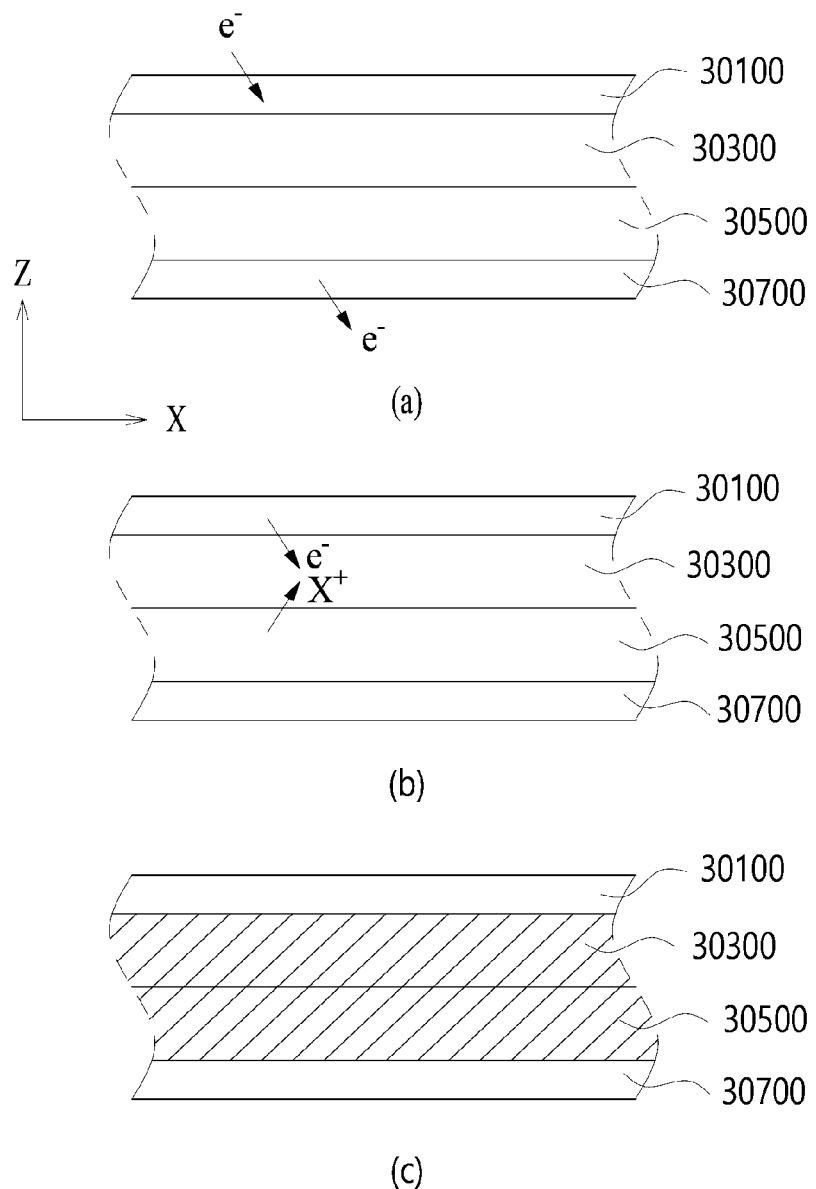
FIG. 75 is a view illustrating a change in an optical state of the electrochromic element according to an embodiment of the present application.

FIG. 75 is a view illustrating a change in an optical state of the electrochromic element 30001 according to an embodiment of the present application.

Hereinafter, a change in an optical state of the electrochromic element will be described with reference to (a) to (c) of FIG. 75.

Referring to (a) to (c) of FIG. 75, an optical state of the electrochromic element may be changed due to migration of electrons and migration of electrochromic ions.

The electrochromic element may exchange electrons with the power supply unit. The power supply unit may be at least one of a power generator configured to generate predetermined power, a control unit configured to generate control power for controlling a change in an optical state of the electrochromic element 30001, and a power application line extending from the power generator or the control unit.

The first electrode 30100 and the second electrode 30700 may exchange electrons with the power supply unit.

When the first electrode 30100 receives electrons from the power supply unit, the electrons may migrate from the second electrode 30700 to the power supply unit. Alternatively, when the electrons migrate from the first electrode 30100 to the power supply unit, the second electrode 30700 may receive electrons from the power supply unit.

Hereinafter, to facilitate description, description will be given by assuming that the first electrode 30100 receives electrons, and the electrons migrate from the second electrode 30700.

Electrons supplied to the first electrode 30100 may migrate along the first electrode 30100. The electrons may also migrate along the second electrode 30700. The electrons may migrate in a transverse direction along the first electrode 30100 or the second electrode 30700.

The electrons migrating along the first electrode 30100 may be transported to the electrochromic layer in each region of the first electrode 30100. Corresponding to this, electrons may be transported from the ion transport storage layer 30500 to each region of the second electrode 30700.

The electrons transported to the electrochromic layer 30300 may guide the electrochromic ions.

The electrons transported to the electrochromic layer 30300 may guide electrochromic ions contained in the electrochromic layer 30300 or the ion transport storage layer 30500 and allow the electrochromic ions to migrate to the electrochromic layer 30300.

Corresponding to this, the electrochromic ions contained in the ion transport storage layer 30500 may be transported from the ion transport storage layer 30500 to the electrochromic layer 30300.

The electrochromic layer 30300 may be electrically discolored due to the migrated electrons and electrochromic ions. The reduction discoloration material contained in the electrochromic layer 30300 may be reduced and discolored due to the migrated electrons and electrochromic ions.

Corresponding to this, the ion transport storage layer 30500 may also be electrically discolored. The oxidation discoloration material in the ion transport storage layer 30500 may be oxidized as the electrons and the electrochromic ions contained in the ion transport storage layer 30500 migrate. The ion transport storage layer 30500 may be discolored as the oxidation discoloration material is oxidized.

A potential may be formed in each of the regions of the first electrode 30100 and the second electrode due to the migration of electrons. The potential in each of the regions may be determined on the basis of the number of electrons present in the region.

A potential difference may be formed between the first electrode 30100 and the second electrode 30700. The potential difference may be a value corresponding to a difference between a potential of the first electrode 30100 and a potential of the second electrode 30700. Because the potentials may be determined on the basis of the number of electrons, the potential difference may be a value corresponding to a difference between the numbers of electrons present in the first electrode 30100 and the second electrode 30700.

An extent of electrical discoloration of the electrochromic element may be adjusted on the basis of the potentials and the potential difference. The potentials and the potential difference are values related to the number of electrons supplied to the electrochromic element 30001. Consequently, by adjusting the potentials and the potential difference, the number of electrons supplied to the electrochromic element and migrating from the electrochromic element may be adjusted. Because the electrochromic ions migrate and electrical discoloration is caused in accordance with the number of electrons, the extent of electrical discoloration of the electrochromic element 30001 may be adjusted in accordance with controlling the potentials and the potential difference.

The electrochromic element 30001 that is not limited to the above-described arrangement order of the electrochromic layer 30300 and the ion transport storage layer 30500 may be realized. Specifically, the terms "first" and "second" used herein are only for differentiating one element from another element, and the first electrode 30100 may be the second electrode 30700, and the second electrode 30700 may be the first electrode 30100. Accordingly, the ion transport storage layer 30500 may be disposed at the lower surface of the first electrode 30100, and the electrochromic layer 30300 may be disposed between the ion transport storage layer 30500 and the second electrode 30700. In this case, the ion transport storage layer 30500 may exchange electrons with the first electrode 30100, and the electrochromic layer 30300 may exchange electrons with the second electrode 30700.

The change in the optical state of the electrochromic element 30001 has been described above.

Hereinafter, an internal structure of the electrochromic element 30001 will be described.

Figure 76:
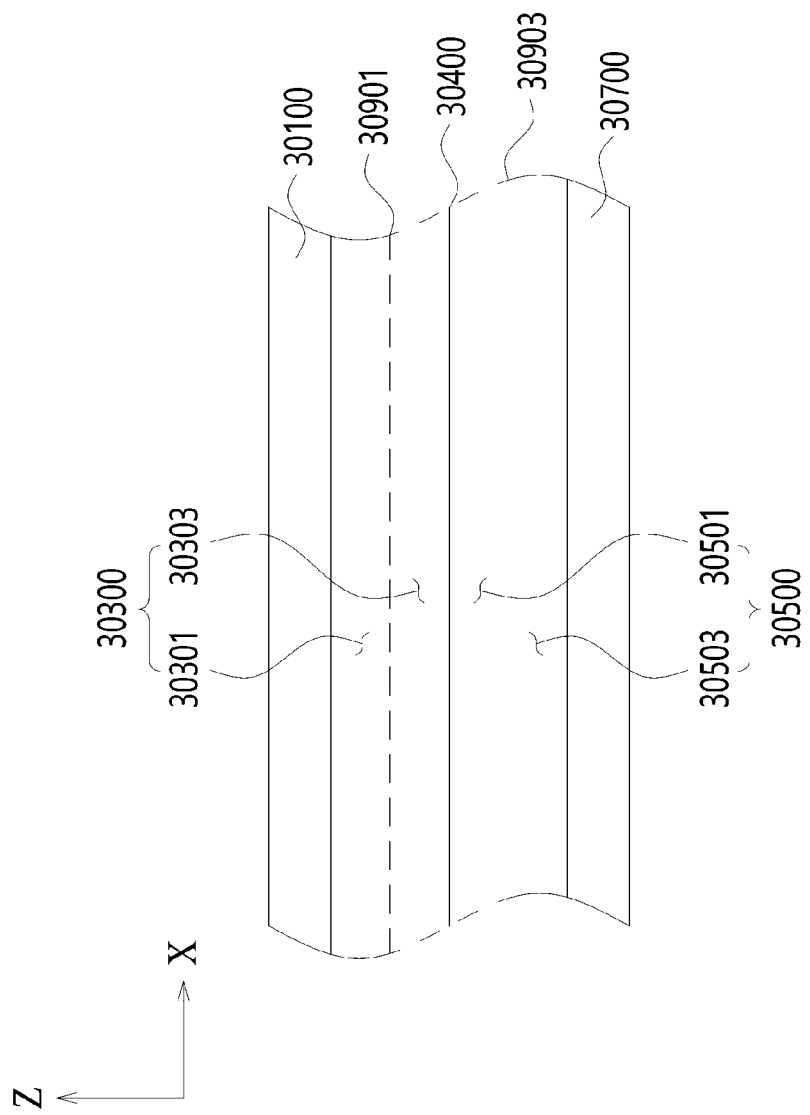
FIG. 76 is a view illustrating an internal structure of the electrochromic element according to an embodiment of the present application.

FIG. 76 is a view illustrating the internal structure of the electrochromic element 30001 according to an embodiment of the present application.

Referring to FIG. 76, the electrochromic element 30001 may have an internal structure including the first contact surface 30200, the boundary surface 30400, and the second contact surface 30600.

The first contact surface 30200, the boundary surface 30400, and the second contact surface 30600 may be defined as contact surfaces formed due to the layers of the electrochromic element 30001 coming in contact with each other.

The internal structure may be a structure in which a physical structure of the electrochromic element 30001 is continuous and discontinuous. The physical structure may have a predetermined outer shape and constitute the electrochromic element 30001.

Hereinafter, the first contact surface 30200, the boundary surface 30400, and the second contact surface 30600 will be described in detail.

First, the first contact surface 30200, the boundary surface 30400, and the second contact surface 30600 will be described.

The first contact surface 30200 may be a surface formed by the first electrode 30100 and the electrochromic layer 30300 coming in contact with each other. The first electrode 30100 and the electrochromic layer 30300 may come in contact with each other. The lower surface of the first electrode 30100 and an upper surface of the electrochromic layer 30300 may be the same surface. The first contact surface 30200 may be a contact surface between the first electrode 30100 and the electrochromic layer 30300. In other words, the first contact surface 30200 may be the lower surface of the first electrode 30100. Alternatively, the first contact surface 30200 may be the upper surface of the electrochromic layer 30300.

The second contact surface 30600 may be a surface formed by the ion transport storage layer 30500 and the second electrode 30700 coming in contact with each other. The ion transport storage layer 30500 and the second electrode 30700 may come in contact with each other. The lower surface of ion transport storage layer 30500 and an upper surface of the second electrode 30700 may be the same surface. The second contact surface 30600 may be a contact surface between the ion transport storage layer 30500 and the second electrode 30700. In other words, the second contact surface 30600 may be the lower surface of the ion transport storage layer 30500. Alternatively, the second contact surface 30600 may be the upper surface of the second electrode 30700.

The boundary surface 30400 may be formed by the electrochromic layer 30300 and the ion transport storage layer 30500 coming in contact with each other. The electrochromic layer 30300 and the ion transport storage layer 30500 may come in contact with each other. The lower surface of the electrochromic layer 30300 and the upper surface of the ion transport storage layer 30500 may be the same surface. The boundary surface 30400 may be a contact surface between the electrochromic layer 30300 and the ion transport storage layer 30500. In other words, the boundary surface 30400 may be the lower surface of the electrochromic layer 30300. Alternatively, the boundary surface 30400 may be the upper surface of the ion transport storage layer 30500.

The boundary surface 30400 may allow the electrochromic layer 30300 to be differentiated from the ion transport storage layer 30500. Each of the elements of the electrochromic element 30001 may be visually differentiated by the boundary surface 30400. The electrochromic layer 30300 and the ion transport storage layer 30500 may be visually differentiated by the boundary surface 30400.

The boundary surface 30400 may extend in a predetermined direction. The boundary surface 30400 may extend in a transverse direction. The boundary surface 30400 may extend in a direction parallel to the first contact surface 30200 and the second contact surface 30600.

A first imaginary line 30901 and a second imaginary line 30903 may be set in the electrochromic element 30001.

The first imaginary line 30901 and the second imaginary line 30903 may be some imaginary lines of plurality of arbitrary imaginary lines that may be set in the electrochromic element.

The first imaginary line 30901 and the second imaginary line 30903 may be set in different layers of the electrochromic element 30001.

The first imaginary line 30901 may be an imaginary line set in the electrochromic layer 30300. The first imaginary line 30901 may be an imaginary line of imaginary lines that may be arbitrarily set in the electrochromic layer 30300.

The second imaginary line 30903 may be an imaginary line set in the ion transport storage layer 30500. The second imaginary line 30903 may be an imaginary line of imaginary lines that may be arbitrarily set in the ion transport storage layer 30500.

The first imaginary line 30901 and the second imaginary line 30903 may be set in various positions in the electrochromic layer 30300 and the ion transport storage layer 30500. The positions of the first imaginary line 30901 and the second imaginary line 30903 are not limited to those illustrated in the drawings and may be set at different positions.

Alternatively, the first imaginary line 30901 and the second imaginary line 30903 may be selected from any of the arbitrary imaginary lines set in the electrochromic layer 30300 and the ion transport storage layer 30500.

The first imaginary line 30901 and the second imaginary line 30903 may be set to have various lengths.

The first imaginary line 30901 and the second imaginary line 30903 may be set to have a shorter length than longitudinal lengths of the layers of the electrochromic element 30001. Alternatively, the first imaginary line 30901 and the second imaginary line 30903 may be set to have a length corresponding to the longitudinal lengths of the elements of the electrochromic element 30001.

The first imaginary line 30901 and the second imaginary line 30903 may be set to extend in the transverse direction.

The first imaginary line 30901 and the second imaginary line 30903 may be set to extend in a direction parallel to at least one of the first contact surface 30200, the boundary surface 30400, and the second contact surface 30600.

Alternatively, the first imaginary line 30901 and the second imaginary line 30903 may be imaginary lines, which extend in the transverse direction or the direction parallel to at least one of the first contact surface 30200, the boundary surface 30400, and the second contact surface 30600, selected from the plurality of imaginary lines that may be arbitrarily set.

Hereinafter, the internal structure of the electrochromic element 30001 will be described.

Physical structures of the elements of the electrochromic element 30001 may be continuous while the physical structures of the elements are discontinuous from each other. A physical structure of the electrochromic layer 30300 and a physical structure of the ion transport storage layer 30500 may be continuous while the physical structure of the electrochromic layer 30300 and the physical structure of the ion transport storage layer 30500 are discontinuous from each other.

The physical structure of the electrochromic layer 30300 and the physical structure of the ion transport storage layer 30500 may be continuous with respect the imaginary lines. The continuity may be defined as a physical structure in one region and a physical structure in the other region being continuous when a physical structure is divided into one region and the other region by an imaginary line.

The physical structure of the electrochromic layer 30300 may be continuous with respect to the first imaginary line 30901, and the physical structure of the ion transport storage layer 30500 may be continuous with respect to the second imaginary line 30903.

The first imaginary line 30901 may be set in the electrochromic layer 30300. The first imaginary line 30901 may be an imaginary line set so that the physical structure of the electrochromic layer 30300 is continuous with respect to the first imaginary line 30901. The first imaginary line 30901 with respect to which the physical structure of the electrochromic layer 30300 may be continuous may be selected from the arbitrary imaginary lines that may be set in the electrochromic layer 30300.

The second imaginary line 30903 may be set in the ion transport storage layer 30500. The second imaginary line 30903 may be an imaginary line set so that the physical structure of the ion transport storage layer 30500 is continuous with respect to the second imaginary line 30903. The second imaginary line 30903 with respect to which the physical structure of the ion transport storage layer 30500 may be continuous may be selected from the arbitrary imaginary lines that may be set in the ion transport storage layer 30500.

A region of the electrochromic layer 30300 may be divided by the first imaginary line 30901, and a region of the ion transport storage layer 30500 may be divided by the second imaginary line 30903.

The region of the electrochromic layer 30300 may be divided into a first discoloration region 30301 and a second discoloration region 30303 by the first imaginary line 30901, and the region of the ion transport storage layer 30500 may be divided into a first ion region 30501 and a second ion region 30503 by the second imaginary line 30903. The first discoloration region 30301 may be adjacent to the first electrode 30100, and the second discoloration region 30303 may be adjacent to the ion transport storage layer 30500. The first ion region 30501 may be adjacent to the electrochromic layer 30300, and the second ion region 30503 may be adjacent to the second electrode 30700.

A physical structure of the first discoloration region 30301 and a physical structure of the second discoloration region 30303 may be continuous with respect to the first imaginary line 30901. A physical structure of the first ion region 30501 and a physical structure of the second ion region 30503 may be continuous with respect to the second imaginary line 30903.

Because each of the electrochromic layer 30300 and the ion transport storage layer 30500 is continuous, there is an effect of improving uniformity of electric discoloration. When each of the electrochromic layer 30300 and the ion transport storage layer 30500 is not continuous, it may be difficult for the electrochromic layer 30300 and the ion transport storage layer 30500 to transport received electrons or electrochromic ions to the entire region of the layers. Conversely, because each of the electrochromic layer 30300 and the ion transport storage layer 30500 is continuous, the electrochromic layer 30300 and the ion transport storage layer 30500 may receive electrons or electrochromic ions and transport the electrons or electrochromic ions to the entire region of the layers. Accordingly, an optical state may be changed in the entire region of each of the electrochromic layer 30300 and the ion transport storage layer 30500.

The first discoloration region 30301 and the second discoloration region 30303 are not actually separated from each other, constitute a single region in reality, and are merely regions defined by arbitrarily dividing the region of the electrochromic layer 30300 by the first imaginary line

30901. Likewise, the first ion region 30501 and the second ion region 30503 constitute a single region in reality.

The electrochromic layer 30300 and the ion transport storage layer 30500 may be discontinuous from each other with respect to the boundary surface 30400. One element and the other element being discontinuous with respect to the boundary surface 30400 may mean that the element and the other element are differentiated by the boundary surface 30400.

The physical structure of the electrochromic layer 30300 and the physical structure of the ion transport storage layer 30500 may be discontinuous from each other with respect to the boundary surface 30400. The physical structure of the second discoloration region 30303 and the physical structure of the second ion region 30503 may be discontinuous with respect to the boundary surface 30400.

Alternatively, the boundary surface 30400 may be formed between the electrochromic layer 30300 and the ion transport storage layer 30500 by the electrochromic layer 30300 and the ion transport storage layer 30500 being discontinuous from each other. The boundary surface 30400 may be formed by the electrochromic layer 30300 and the ion transport storage layer 30500 being differentiated from each other.

The boundary surface 30400 may be formed by the physical structure of the electrochromic layer 30300 and the physical structure of the ion transport storage layer 30500 being discontinuous from each other. The boundary surface 30400 may be formed by the physical structure of the second discoloration region 30303 and the physical structure of the first ion region 30501 being discontinuous from each other.

By the electrochromic layer 30300 and the ion transport storage layer 30500 being discontinuous from each other, there is an effect of stably causing electric discoloration. When the electrochromic layer 30300 and the ion transport storage layer 30500 are continuous with each other, the electrochromic layer 30300 and the ion transport storage layer 30500 exchange electrons. As the electrochromic layer 30300 and the ion transport storage layer 30500 exchange electrons, a difference between the numbers of electrons in the electrochromic layer 30300 and the ion transport storage layer 30500 is eliminated. Accordingly, electrochromic ions guided to a region containing a large number of electrons do not migrate further, and electric discoloration of the electrochromic element based on the migration is not caused. Consequently, the electrochromic element 30001 does not operate. Conversely, when the electrochromic layer 30300 and the ion transport storage layer 30500 are discontinuous from each other, the electrochromic layer 30300 and the ion transport storage layer 30500 are unable to exchange electrons. Accordingly, the difference between the numbers of electrons in the electrochromic layer 30300 and the ion transport storage layer 30500 is maintained. Accordingly, the electrochromic ions may migrate to the electrochromic layer 30300 or the ion transport storage layer 30500. Due to the migration of the electrochromic ions, the electrochromic layer 30300 or the ion transport storage layer 30500 may be electrically discolored. As a result, electric discoloration of the electrochromic element 30001 is stably caused, and the electrochromic element 30001 properly operates.

The internal structure of the electrochromic element 30001 due to the boundary surface 30400 and the imaginary lines has been described above.

Hereinafter, an example of a physical structure of the electrochromic element 30001 will be described.

Figure 77:
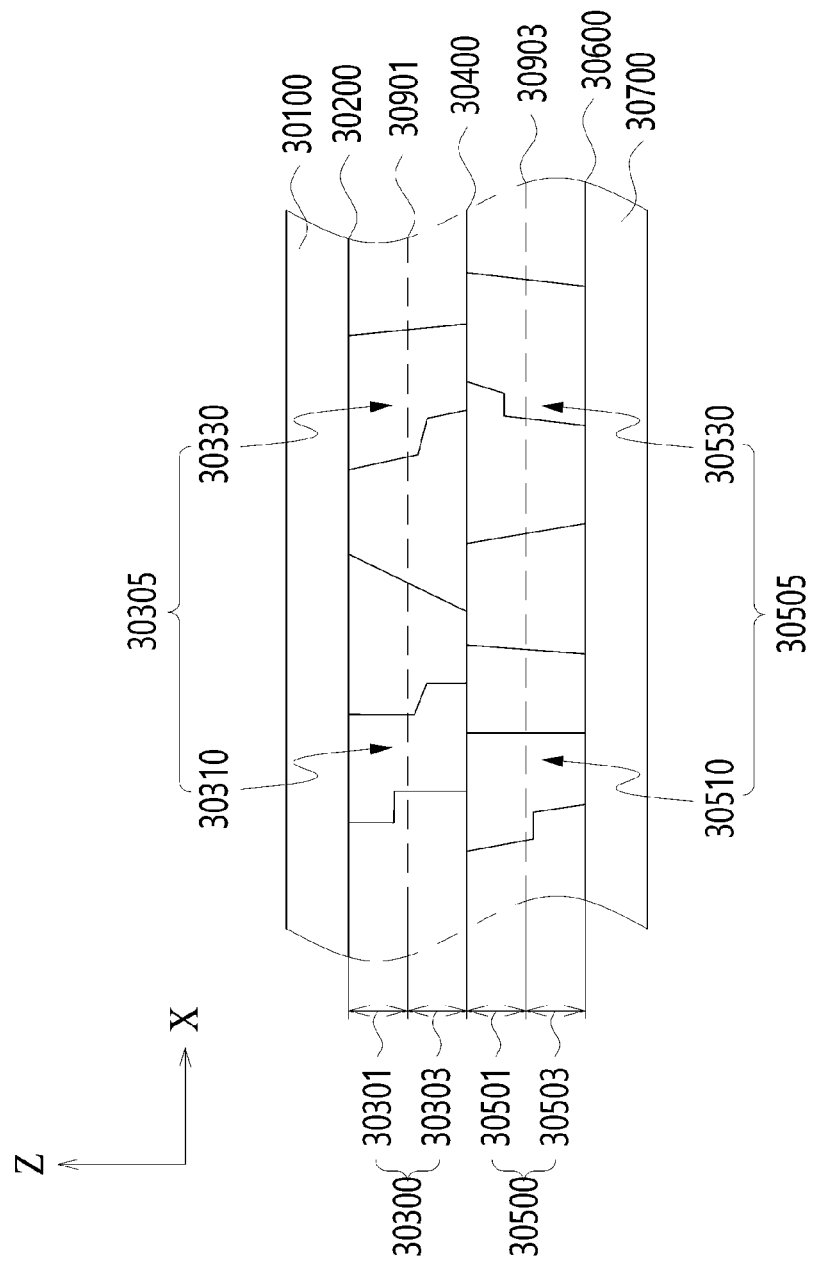
FIG. 77 is a cross-sectional view of the electrochromic element illustrating a column which is an example of a physical structure according to an embodiment of the present application.

FIG. 77 is a cross-sectional view of the electrochromic element 30001 illustrating a column, which is an example of a physical structure according to an embodiment of the present application.

Figure 78:
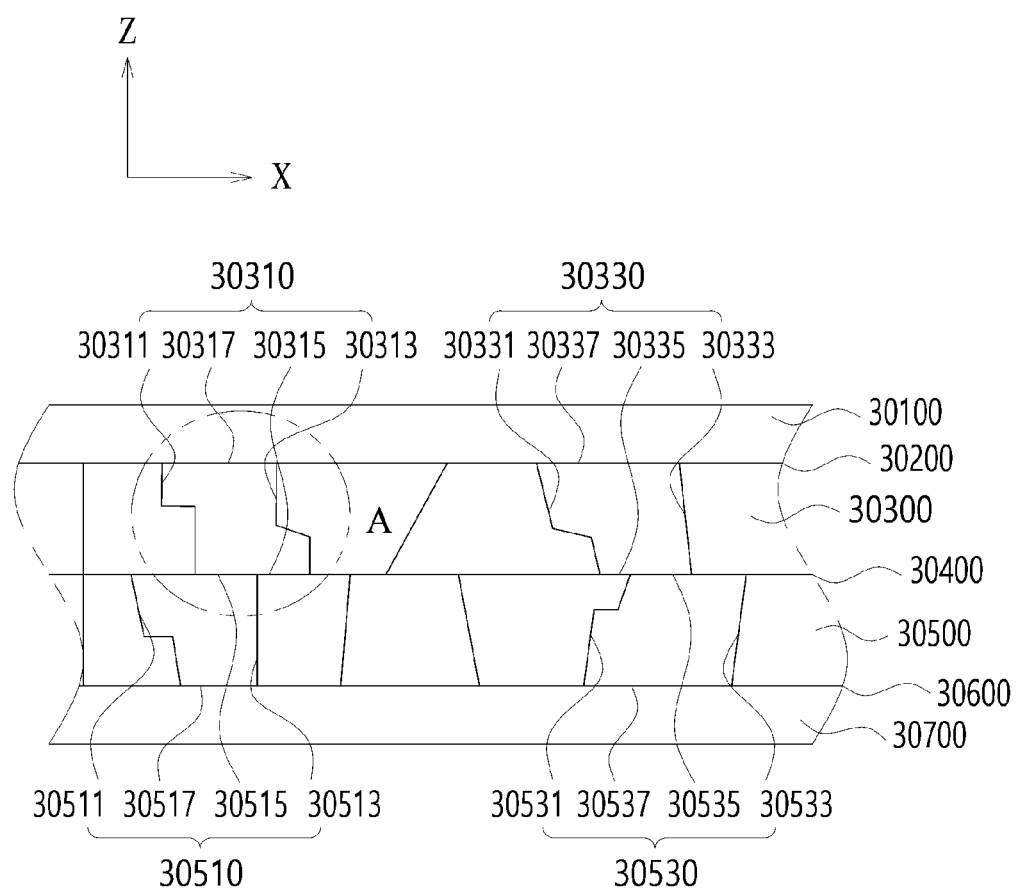
FIG. 78 is a cross-sectional view of the electrochromic element illustrating a column which is an example of a physical structure according to an embodiment of the present application.

FIG. 78 is a cross-sectional view of the electrochromic element 30001 illustrating a column, which is an example of a physical structure according to an embodiment of the present application.

Hereinafter, description will be given with reference to FIGS. 77 and 78.

The physical structure of the electrochromic element 30001 according to an embodiment of the present application may be a column.

The column may include a discoloration column 30305 including a first discoloration column 30310 and a second discoloration column 30330, and an ion column 30505 including a first ion column 30510 and a second ion column 30530. The discoloration column 30305 may be defined as a physical structure in the electrochromic layer 30300, and the ion column 30505 may be defined as a physical structure in the ion transport storage layer 30500.

The column may have an outer shape extending in one direction.

The column may have an outer shape extending from the first electrode 30100 to the second electrode 30700 or from the second electrode 30700 to the first electrode 30100.

Each of the columns may include an upper end, a lower end, a left end, and a right end.

The first discoloration column 30310 may include a first discoloration left end 30311, a first discoloration right end 30313, a first discoloration lower end 30315, and a first discoloration upper end 30317, the second discoloration column 30330 may include a second discoloration left end 30331, a second discoloration right end 30333, a second discoloration lower end 30335, and a second discoloration upper end 30337, the first ion column 30510 may include a first ion left end 30511, a first ion right end 30513, a first ion upper end 30515, and a first ion left end 30517, and the second ion column 30530 may include a second ion left end 30531, a second ion right end 30533, a second ion upper end 30535, and a second ion left end 30537.

The upper ends, the lower ends, the left ends, and the right ends may be organically connected to each other and define outer shapes of the columns.

The upper ends, the lower ends, the left ends, and the right ends may be visually recognized. The upper ends, the lower ends, the left ends, and the right ends may be visually recognized by differentiating the columns.

The columns may have predetermined positional relationships.

The positional relationships may include a contact relationship between the column and a region of the electrochromic element 30001 and a contact relationship between the column and another column.

The columns may come in contact with a region of the electrochromic element 30001.

The discoloration column 30305 may come in contact with the first contact surface 30200 or the boundary surface 30400. The upper end of the discoloration column 30305 may come in contact with the first contact surface 30200, and the lower end of the discoloration column 30305 may come in contact with the boundary surface 30400.

The ion column 30505 may come in contact with the boundary surface 30400 or come in contact with the second contact surface 30600. The upper end of the ion column 30505 may come in contact with the boundary surface 30400, and the lower end of the ion column 30505 may come in contact with the second contact surface 30600.

The columns may be spaced apart from or come in contact with each other.

The discoloration column 30305 may be formed to be spaced apart from another discoloration column 30305 or the ion column 30505. The ion column 30505 may be formed to be spaced apart from another ion column 30505 or the discoloration column 30505.

The discoloration column 30305 may be formed to come in contact with another discoloration column 30305. The first discoloration column 30310 may come in contact with the second discoloration column 30330 as illustrated. When the discoloration columns 30305 come in contact with each other, the left ends of the discoloration columns 30305 may come in contact with the right ends of the discoloration column 30305. The left ends and the right ends in contact with each other may be the same surfaces. The first discoloration right end 30313 of the first discoloration column 30310 may come in contact with the second discoloration left end 30331 of the second discoloration column 30330. In this case, the first discoloration right end 30313 and the second discoloration left end 30331 may be the same surface. Alternatively, the first discoloration left end 30311 of the first discoloration column 30310 may come in contact with the second discoloration right end 30333 of the second discoloration column 30330. In this case, the first discoloration left end 30311 and the second discoloration right end 30333 may be the same surface.

The ion columns 30505 may come in contact with each other. Because the first ion column 30510 and the second ion column 30530 may have the same positional relationship as that between the first discoloration column 30310 and the second discoloration column 30330 described above, overlapping description thereof will be omitted.

The discoloration column 30305 may come in contact with the ion column 30505. The first discoloration column 30310 and the second discoloration column 30330 may come in contact with the first ion column 30510 or the second ion column 30530.

When the discoloration column 30305 comes in contact with the ion column 30505, the lower end of the discoloration column 30305 may come in contact with the upper end of the ion column 30505. A region of the lower end of the discoloration column 30305 may come in contact with a region of the upper end of the ion column 30505. When the first discoloration column 30310 come in contact with the first ion column 30510, the first discoloration lower end 30315 may come in contact with the first ion upper end 30515.

The discoloration column 30305 may come in contact with two or more ion columns 30505. In this case, the lower end of the discoloration column 30305 may come in contact with upper ends of the two or more ion columns 30505. The ion column 30505 may come in contact with two or more discoloration columns 30305. In this case, the upper end of the ion column 30505 may come in contact with lower ends of the two or more discoloration columns 30305.

When the discoloration column 30305 come in contact with the ion column 30505, the left end and the right end of the discoloration column 30305 may come in contact with the left end or the right end of the ion column 30505. The first discoloration left end 30311 of the first discoloration column 30310 may come in contact with the first ion left end 30511 or the first ion right end 30513 of the first ion column 30510. Alternatively, the first discoloration left end 30311 of the first discoloration column 30310 may come in contact with the first ion left end 30511 of the first ion column 30510 and come in contact with the second ion right end 30533 of the second ion column 30530. The left end or the right end of the discoloration column 30305 and the left end or the right end of the ion column 30505 coming in contact with each other may be the same surface.

Alternatively, when the discoloration column 30305 comes in contact with the ion column 30505, the left end and the right end of the discoloration column 30305 may not come in contact with the left end or the right end of the ion column 30505. In this case, only the lower end of the discoloration column 30305 and the upper end of the ion column 30505 may come in contact with each other.

When the discoloration column 30305 comes in contact with the ion column 30505 as described above, the boundary surface 30400 may be formed at a surface at which the discoloration column 30305 comes in contact with the ion column 30505. In the boundary surface 30400, the lower end of the discoloration column 30305 and the upper end of the ion column 30505 may be the same surface. The boundary surface 30400 may be formed at the same surface. In other words, the boundary surface 30400 may be the lower end of the discoloration column 30305 or the upper end of the ion column 30505.

The columns may be continuous.

The column being continuous means that the outer shape of the column is continuous. The column being discontinuous from another column means that the column is differentiated from the other column.

The discoloration column 30305 and the ion column 30505 may be continuous. The first discoloration column 30310, the second discoloration column 30330, the first ion column 30510, and the second ion column 30530 may be continuous.

The columns may be continuous with respect to an imaginary line.

The discoloration column 30305 may be continuous with respect to the first imaginary line 30901.

The first imaginary line 30901 may be set in the electrochromic layer 30300. The first imaginary line 30901 may be an imaginary line set so that the discoloration column 30305 is continuous with respect to the first imaginary line 30901. The first imaginary line 30901 with respect to which the discoloration column 30305 may be continuous may be selected from the arbitrary imaginary lines that may be set in the electrochromic layer 30300.

The number of discoloration columns 30305 which are continuous by the first imaginary line 30901 may be 20% or more of the total number of discoloration columns 30305 present in the electrochromic layer 30300. Preferably, the number of discoloration columns 30305 which are continuous by the first imaginary line 30901 may be 50% or more of the total number of discoloration columns 30305 present in the electrochromic layer 30300. More preferably, the number of discoloration columns 30305 which are continuous by the first imaginary line 30901 may be 70% or more of the total number of discoloration columns 30305 present in the electrochromic layer 30300.

At least one of the left end and the right end of the discoloration column 30305 may be continuous with respect to the first imaginary line 30901.

The region of the electrochromic layer 30300 is divided into the first discoloration region 30301 and the second discoloration region 30303 by the first imaginary line 30901. Overlapping description on the first discoloration region 30301 and the second discoloration region 30303 will be omitted.

The discoloration column 30305 in the divided region may be continuous. The discoloration column 30305 of the first discoloration region 30301 and the discoloration column 30305 of the second discoloration region 30303 may be continuous.

The divided regions in the discoloration column 30305 may be continuous. The first discoloration region 30301 of the discoloration column 30305 and the second discoloration region 30303 of the discoloration column 30305 may be continuous.

The discoloration column 30305 being continuous with respect to the first imaginary line 30901 means that the left end of the discoloration column 30305 in the first discoloration region 30301 and the left end of the discoloration column 30305 in the second discoloration region 30303 are continuous and means that the left end of the discoloration column 30305 in the first discoloration region 30301 and the left end in the second discoloration region 30303 meet at one point on the first imaginary line 30901.

Alternatively, the discoloration column 30305 being continuous with respect to the first imaginary line 30901 means that the right end of the discoloration column 30305 in the first discoloration region 30301 and the right end of the discoloration column 30305 in the second discoloration region 30303 are continuous and means that the right end of the discoloration column 30305 in the first discoloration region 30301 and the right end in the second discoloration region 30303 meet at one point on the first imaginary line 30901.

In other words, the discoloration column 30305 being continuous with respect to the first imaginary line 30901 may mean that one or more of the left end of the discoloration column 30305 in the first discoloration region 30301, the left end of the discoloration column 30305 in the second discoloration region 30303, the right end of the discoloration column 30305 in the first discoloration region 30301 and the right end of the discoloration column 30305 in the second discoloration region 30303 meet at one point on the first imaginary line 30901 with respect to the first imaginary line 30901.

The ion column 30505 may be continuous with respect to the second imaginary line 30903.

The second imaginary line 30903 may be set in the ion transport storage layer 30500. The second imaginary line 30903 may be an imaginary line set so that the ion column 30505 is continuous with respect to the second imaginary line 30903. The second imaginary line 30903 with respect to which the ion column 30505 may be continuous may be selected from the arbitrary imaginary lines that may be set in the ion transport storage layer 30500.

The number of ion columns 30505 which are continuous by the second imaginary line 30903 may be 20% or more of the total number of ion columns 30505 present in the ion transport storage layer 30500. Preferably, the number of ion columns 30505 which are continuous by the second imaginary line 30903 may be 50% or more of the total number of ion columns 30505 present in the ion transport storage layer 30500. More preferably, the number of ion columns 30505 which are continuous by the second imaginary line 30903 may be 70% or more of the total number of ion columns 30505 present in the ion transport storage layer 30500.

At least one of the left end and the right end of the ion column 30505 may be continuous with respect to the second imaginary line 30903.

The region of the ion transport storage layer 30500 is divided into the first ion region 30501 and the second ion region 30503 by the second imaginary line 30903. Overlapping description on the first ion region 30501 and the second ion region 30503 will be omitted.

The ion column 30505 in the divided region may be continuous. The ion column 30505 of the first ion region 30501 and the ion column 30505 of the second ion region 30503 may be continuous.

The divided regions in the ion column 30505 may be continuous. The first ion region 30501 of the ion column 30505 and the second ion region 30503 of the ion column 30505 may be continuous.

The ion column 30505 being continuous with respect to the second imaginary line 30903 means that the left end of the ion column 30505 in the first ion region 30501 and the left end of the ion column 30505 in the second ion region 30503 are continuous and means that the left end of the ion column 30505 in the first ion region 30501 and the left end in the second ion region 30503 meet at one point on the second imaginary line 30903.

Alternatively, the ion column 30505 being continuous with respect to the second imaginary line 30903 means that the right end of the ion column 30505 in the first ion region 30501 and the right end of the ion column 30505 in the second ion region 30503 are continuous and means that the right end of the ion column 30505 in the first ion region 30501 and the right end in the second ion region 30503 meet at one point on the second imaginary line 30903.

In other words, the ion column 30505 being continuous with respect to the second imaginary line 30903 may mean that one or more of the left end of the ion column 30505 in the first ion region 30501, the left end of the ion column 30505 in the second ion region 30503, the right end of the ion column 30505 in the first ion region 30501, and the right end of the ion column 30505 in the second ion region 30503 meet at one point on the second imaginary line 30903 with respect to the first imaginary line 30901.

The discoloration column 30305 and the ion column 30505 may be discontinuous from each other.

The discoloration column 30305 and the ion column 30505 may be discontinuous from each other with respect to the boundary surface 30400. The discoloration column 30305 and the ion column 30505 may be differentiated by the boundary surface. The discoloration column 30305 and the ion column 30505 may be visually differentiated by the boundary surface.

The first discoloration column 30310 and the second discoloration column 30330 may be discontinuous from the first ion column 30510 and the second ion column 30530 with respect to the boundary surface 30400.

The discoloration column 30305 may come in contact with the ion column 30505 while the discoloration column 30305 is discontinuous from the ion column 30505.

The left end and the right end of the discoloration column 30305 may be discontinuous from the left end and the right end of the ion column 30505 coming in contact with the left end and the right end of the discoloration column 30305.

In this case, the left end or the right end of the discoloration column 30305 may come in contact with one of the let end and the right end of the ion column 30505. A tip of the left end of the discoloration column 30305 may come in contact with a tip of any one of the left end and the right end of the ion column 30505. In this case, a surface of the left end of the discoloration column 30305 and a surface of any one of the left end and the right end of the ion column 30505 coming in contact with each other may be the same surface.

The left end or the right end of the discoloration column 30305 and the left end or the right end of the ion column 30505 coming in contact with each other may be discontinuous with respect to the boundary surface 30400. For example, the left end of the discoloration column 30305 and the left end of the ion column 30505 coming in contact with each other may be discontinuous with respect to the boundary surface. The left end and the right end coming in contact with each other may be differentiated with respect to the boundary surface 30400. The left end and the right end coming in contact with each other may be visually differentiated with respect to the boundary surface 30400.

Alternatively, the discoloration column 30305 may come in contact with the ion column 30505 while the left ends and the right ends thereof do not come in contact with each other. In this case, only the lower end of the discoloration column 30305 and the upper end of the ion column 30505 coming in contact with the discoloration column 30305 may come in contact with each other. Even in this case, the discoloration column 30305 and the ion column 30505 may be differentiated with respect to the boundary surface 30400 and be discontinuous.

The columns may have various outer shapes.

Figure 79:
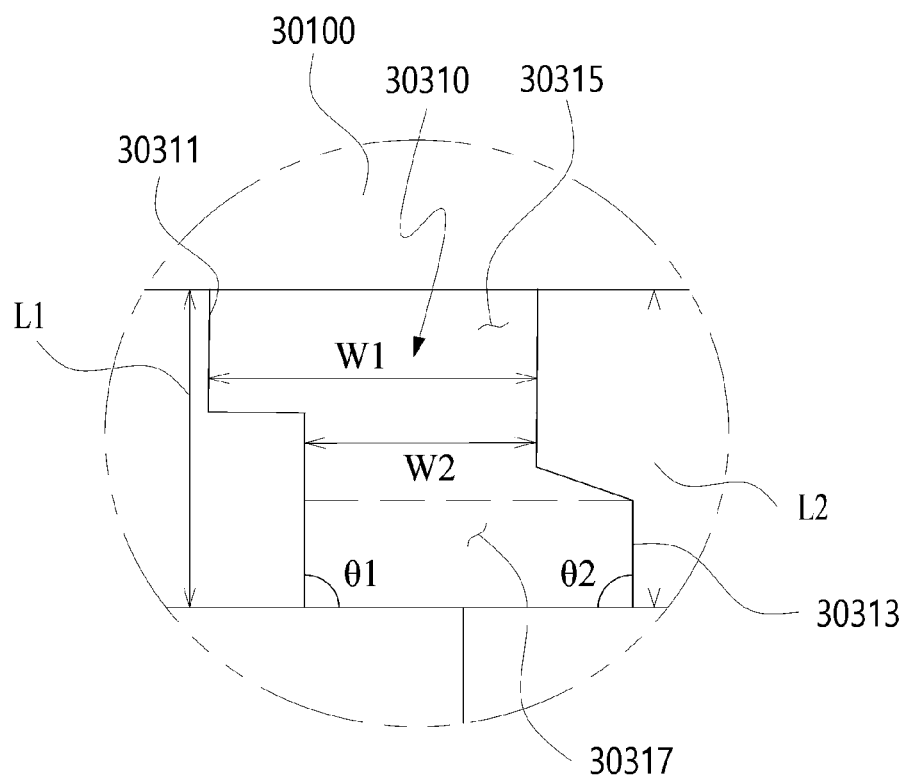
FIG. 79 is a view illustrating an outer shape of the column according to an embodiment of the present application.

FIG. 79 is a view illustrating an outer shape of the column according to an embodiment of the present application.

Referring to FIG. 79, each of the columns may have a predetermined width and a predetermined length and form a predetermined angle with another element.

The width and the length of each of the columns will be described with the first discoloration column 30310 as an example. The width and the length of the first discoloration column 30310, which will be described below, may also be applied to discoloration columns 30305 other than the first discoloration column 30310.

The first discoloration left end 30311 and the first discoloration right end 30313 of the first discoloration column 30310 may have predetermined lengths. The lengths may include a first length L1 and a second length L2.

The first discoloration left end 30311 may have the first length L1, and the first discoloration right end 30313 may have the second length L2.

The lengths of the first discoloration left end 30311 and the first discoloration right end 30313 may be formed as various lengths. The lengths of the first discoloration left end 30311 and the first discoloration right end 30313 may be equal to or different from each other. The first length L1 and the second length L2 may be lengths equal to or different from each other.

The first discoloration column 30310 may have various widths for each region. The first discoloration column 30310 may include the first region 30315 and the second region 30317. The widths may include a first width W1 and a second width W2. The first discoloration column 30310 may have the first width W1 in the first region 30315 and have the second width W2 in the second region 30317. The first width and the second width may be different from each other.

The first discoloration column 30310 may form predetermined angles with the first electrode 30100, the ion transport storage layer 30500, and the ion column 30505. The first discoloration left end 30311 and the first discoloration right end 30313 of the first discoloration column 30310 may form predetermined angles with the first electrode 30100, the ion transport storage layer 30500, and the ion column 30505.

When the first discoloration column 30310 comes in contact with the boundary surface 30400, the first discoloration column 30310 may form a predetermined angle with the boundary surface 30400. The angle may include the first angle θ1 and the second angle θ2. The first discoloration left end 30311 of the first discoloration column 30310 may form the first angle θ1 with the boundary surface 30400, and the first discoloration right end 30313 of the first discoloration column 30310 may form the second angle θ2 with the boundary surface 30400.

When the first discoloration column 30310 comes in contact with the first contact surface 30200, the first discoloration column 30310 may form a predetermined angle with the first contact surface 30200. In this case, because the angles may be formed as the above-described angles between the first discoloration column 30310 and the boundary surface 30400, overlapping description thereof will be omitted.

In the case of the ion column 30505, the ion column 30505 may form predetermined angles with the electrochromic layer 30300, the discoloration column 30305, and the second electrode 30700. When the ion column 30505 comes in contact with the boundary surface 30400, the ion column 30505 may form a predetermined angle with the boundary surface 30400. When the ion column 30505 comes in contact with the second contact surface 30600, the ion column 30505 may form a predetermined angle with the second contact surface 30600.

The electrochromic element 30001 including columns as a physical structure has been described above.

Hereinafter, a change in an optical state of the electrochromic element 30001 including the columns will be described.

The optical state of the electrochromic element 30001 including the columns may be changed due to migration of electrons and electrochromic ions.

Figure 80:
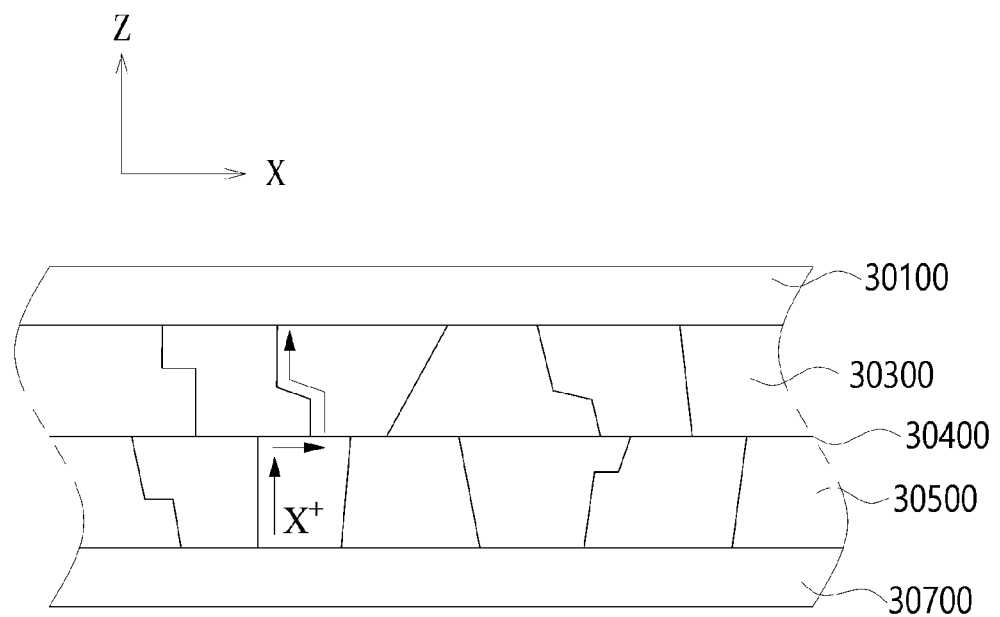
FIG. 80 is a view illustrating migration of electrochromic ions according to an embodiment of the present application.

FIG. 80 is a view illustrating migration of electrochromic ions according to an embodiment of the present application.

Referring to FIG. 80, the electrochromic ions may migrate in between adjacent columns and along the boundary surface 30400.

The electrochromic ions may migrate in between columns.

The electrochromic ions may migrate in between the discoloration columns 30305. The electrochromic ions may migrate along contact surfaces of the discoloration columns 30305 coming in contact with each other. The electrochromic ions may migrate along a contact surface between the first discoloration column 30310 and the second discoloration column 30330. The electrochromic ions may migrate along a contact surface between the left end and the right end of the discoloration column 30305 coming in contact with each other. The electrochromic ions may migrate along a contact surface between the first discoloration right end 30313 of the first discoloration column 30310 and the second discoloration left end 30331 of the second discoloration column 30330.

The electrochromic ions may migrate in between the ion columns 30505. Because the electrochromic ions migrating in between the ion columns 30505 may migrate like the electrochromic ions migrating in between the discoloration columns 303035, overlapping description thereof will be omitted.

The electrochromic ions may migrate along the boundary surface 30400. The electrochromic ions migrating along the boundary surface 30400 may migrate in the transverse direction.

There may be a predetermined effect as the columns and the boundary surface 30400 are formed in the electrochromic element 30001.

The effect may include an improvement in an electric discoloration speed, an improvement in uniformity of electric discoloration, and an improvement in a bleaching action.

Figure 81:
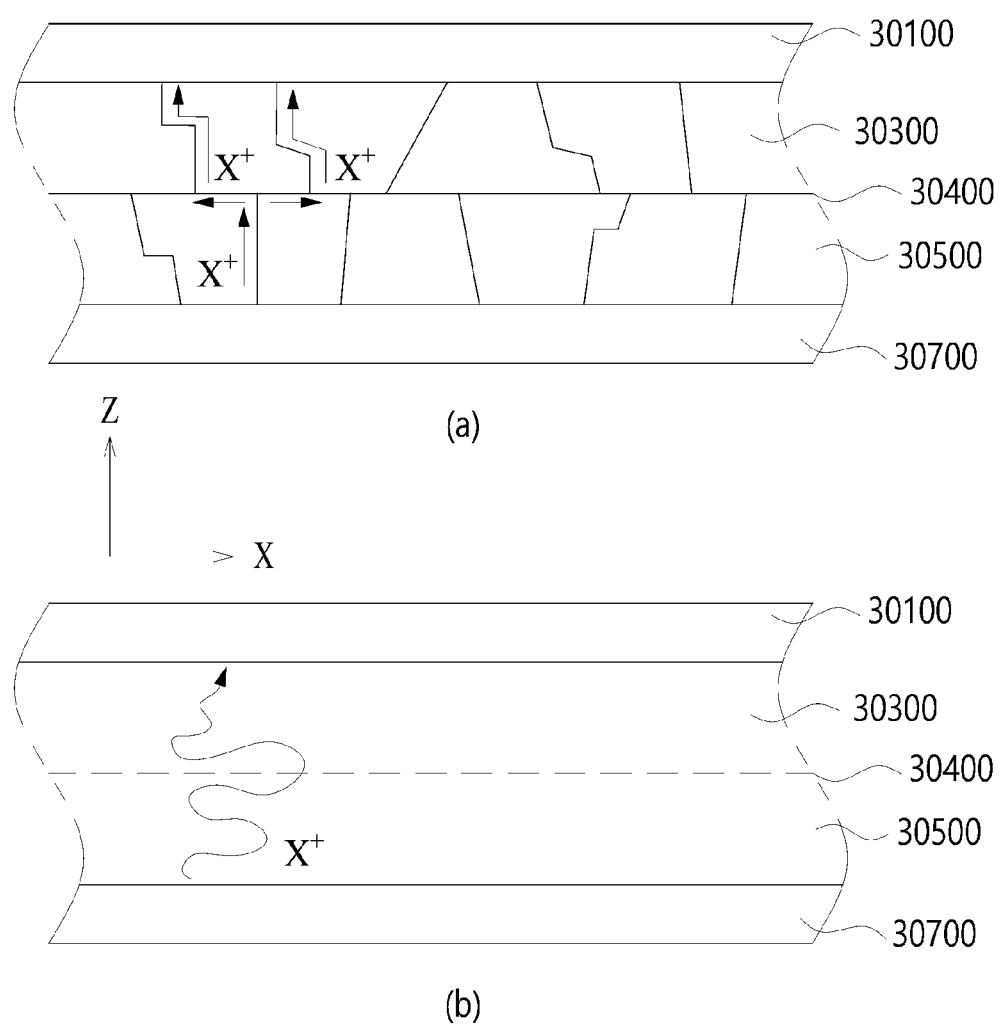
FIG. 81 is a comparative view for illustrating an improved electric discoloration speed of the electrochromic element including a column and a boundary surface according to an embodiment of the present application.

FIG. 81 is a comparative view for illustrating an improved electric discoloration speed of the electrochromic element 30001 including the columns and the boundary surface 30400 according to an embodiment of the present application.

FIG. 82 is a comparative view for illustrating improved uniformity of electric discoloration of the electrochromic element 30001 including the columns and the boundary surface 30400 according to an embodiment of the present application.

FIG. 83 is a comparative view for illustrating an improved bleaching action of the electrochromic element 30001 including the columns and the boundary surface 30400 according to an embodiment of the present application.

Hereinafter, description will be given with reference to FIGS. 81 to 83.

The electrochromic ions may migrate along a predetermined path.

The electrochromic ions may migrate in between the discoloration columns 30305 in contact with each other, be transported to the boundary surface 30400, and migrate along the boundary surface 30400 to migrate in between the ion columns 30505 in contact with each other. Alternatively, the electrochromic ions may migrate in between the ion columns 30505 in contact with each other, be transported to the boundary surface 30400, and migrate along the boundary surface 30400 to migrate in between the discoloration columns 30305.

As the electrochromic ions migrate along the columns and the boundary surface 30400, there is an effect of improving the electric discoloration speed.

When the electrochromic element does not include the columns and the boundary surface as illustrated in FIG. 81(b), a predetermined path along which the electrochromic ions migrate may not be formed in the electrochromic element. When the electrochromic ions migrate, the electrochromic ions migrate in irregular directions. When the electrochromic ions migrate from one element to the other element, the electrochromic ions may not migrate along the shortest path. Conversely, when the electrochromic element includes the columns and the boundary surface 30400, the electrochromic ions may migrate along the contact surfaces between the columns. Accordingly, when the electrochromic ions migrate from one element to the other element, the electrochromic ions migrate in a regular direction along the contact surfaces between the columns. That is, the electrochromic ions migrate from one element to the other element along the shortest path. As a result, when the electrochromic element 30001 includes the columns, the optical state of the electrochromic element 30001 may be changed due to the electrochromic ions migrating along the shortest path. Accordingly, when the electrochromic element 30001 includes the columns, there is an effect of improving the electric discoloration speed.

As the electrochromic ions migrate along the columns and the boundary surface 30400, there is an effect of improving the uniformity of electric discoloration. The uniformity of electric discoloration may be defined by variations in extents of electric discoloration of different regions. The uniformity of electric discoloration may be improved as the variations are smaller.

When the electrochromic element does not include the columns and the boundary surface 30400 as illustrated in FIG. 82(b), the electrochromic ions migrate irregularly. Due to the irregular migration of the electrochromic ions, the optical state of the electrochromic element may be changed irregularly in a plurality of regions of the electrochromic element.

Conversely, when the electrochromic element 30001 includes the boundary surface 30400, the electrochromic ions may migrate along the boundary surface 30400, and the electrochromic ions may be dispersed in the transverse direction. As the electrochromic ions migrate by being dispersed in the transverse direction, concentrations of the electrochromic ions transported to the plurality of regions may become uniform. Accordingly, the plurality of regions of the electrochromic element 30001 are electrically discolored with almost the same extent, and thus, optical states of the plurality of regions may become uniform. Accordingly, there is an effect of improving the uniformity of electric discoloration of the electrochromic element 30001.

When the electrochromic element 30001 includes columns in the plurality of regions, the electrochromic ions around the columns may be guided to adjacent columns. The electrochromic ions may be dispersed to the plurality of regions due to the columns, and the dispersed electrochromic ions may migrate along contact surfaces between the columns in contact with each other. Accordingly, the electrochromic ions may be transported to the entire region of the electrochromic element 30001. As a result, the plurality of regions of the electrochromic element 30001 are electrically discolored with almost the same extent, and thus, optical states of the plurality of regions may become uniform. Accordingly, there is an effect of improving the uniformity of electric discoloration of the electrochromic element 30001.

As the electrochromic ions migrate along the columns and the boundary surface 30400, there is an effect of improving a bleaching action.

When the electrochromic element does not include the columns and the boundary surface 30400 as illustrated in FIG. 83(b), the electrochromic element may have a memory effect. The memory effect may be defined as a phenomenon in which, after application of power to the electrochromic element is stopped, an optical state based on power applied before the stoppage of the application of power is maintained. When the electrochromic element does not include the columns and the boundary surface 30400, the electrochromic ions may migrate due to power applied thereto and remain at positions resulting from the migration even after the application of power is stopped. Because the positions of the electrochromic ions are maintained, a colored state of the electrochromic element due to the migrated electrochromic ions is also maintained.

Conversely, when the electrochromic element 30001 includes the boundary surface 30400, the electrochromic ions are guided to the boundary surface 30400 after the application of power is stopped. Accordingly, after the application of power is stopped, the electrochromic element 30001 is bleached instead of maintaining a colored state due to the electrochromic ions before the stoppage of the application of power.

When the electrochromic element 30001 includes the columns, the electrochromic ions are guided to the columns after the application of power is stopped. Because the columns are formed in the plurality of regions of the electrochromic element 30001, the electrochromic ions migrate by being simultaneously guided to the plurality of regions. Accordingly, after the application of power is stopped, the electrochromic element 30001 is bleached instead of maintaining a colored state due to the electrochromic ions before the stoppage of the application of power.

As a result, when the electrochromic element 30001 includes the columns and the boundary surface 30400, the bleaching action after the stoppage of the application of power may be improved.

Hereinafter, a reflectance during a colored state and a reflectance during a bleached state for each wavelength will be described when the electrochromic element 30001 is realized in the form of a mirror.

The electrochromic element 30001 may be realized in the form of a mirror by one of the first electrode 30100 and the second electrode 30700 being realized with a light reflecting material or the electrochromic element 30001 being disposed on a mirror.

Figure 84:
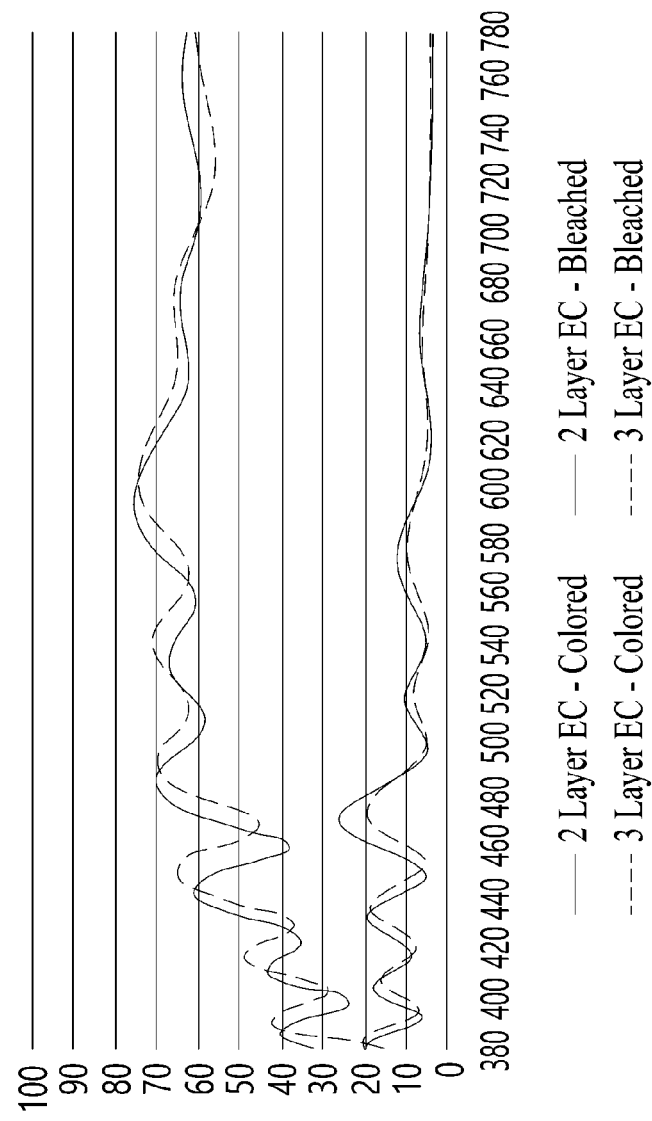
FIG. 84 is a view illustrating reflectances during a colored state and a bleached state for each wavelength of the electrochromic element according to a first embodiment.

FIG. 84 is a view illustrating reflectances during the colored state and the bleached state for each wavelength of the electrochromic element 30001 according to an embodiment.

Referring to FIG. 84, the electrochromic element 30001 may have an effect of being realized with a simpler process in comparison to a conventional electrochromic element while having the same optical characteristics and performance as the conventional electrochromic element.

The effect will be described with reference to Table 1 below and FIG. 84.

TABLE 1

| Color | Wavelength (nm) | 3 Layer EC (conventional) Colored(%) | 3 Layer EC (conventional) Bleached(%) | 2 Layer EC Colored(%) | 2 Layer EC Bleached(%) |
|---|---|---|---|---|---|
| Violet | 400 | 10.915 | 30.399 | 15.933 | 24.763 |
| Blue | 476 | 19.257 | 55.114 | 23.608 | 66.262 |
| Green | 550 | 5.335 | 68.415 | 7.111 | 61785 |
| Amber | 580 | 9.772 | 66.56 | 11.42 | 72.237 |
| Orange | 610 | 5.583 | 73.799 | 4.398 | 72.992 |
| Red | 700 | 4.636 | 61.423 | 4.642 | 61 |
| Visible | Average | 7.849 | 59.967 | 8.541 | 59.727 |
|  | Difference (Bleached − Colored) | 52.118% | | 51.186% | |

The conventional electrochromic element is defined as an electrochromic element in which three layers are disposed between a first electrode and a second electrode. In other words, the conventional electrochromic element further includes a layer other than the electrochromic layer and the ion transport storage layer between the first electrode and the second electrode. The conventional electrochromic element is 3 Layer EC in Table 1 above and FIG. 84.

The electrochromic element 30001 according to an embodiment is the electrochromic element 30001 in which two layers are disposed between the first electrode 30100 and the second electrode 30700. The electrochromic element 30001 according to the present application includes only the electrochromic layer 30300 and the ion transport storage layer 30500 between the first electrode 30100 and the second electrode 30700. The electrochromic element 30001 according to the present application is 2 Layer EC in Table 1 above and FIG. 84.

In an experiment, reflectances in a colored state and a bleached state were measured by applying light in a visible light range to the electrochromic element 30001 realized with the mirror.

Light in a visible light range was applied to 3 Layer EC, which is the conventional electrochromic element realized with a mirror. Here, an average reflectance in a colored state was 7.849%, an average reflectance in a bleached state was 59.967%, and a difference between the reflectances in the colored state and the bleached state was 52.118%.

The light in the visible light range includes violet light having a wavelength of 400 nm, blue light having a wavelength of 476 nm, green light having a wavelength of 550 nm, amber light having a wavelength of 580 nm, orange light having a wavelength of 610 nm, and red light having a wavelength of 700 nm.

When violet light having a wavelength of 400 nm was applied to the electrochromic element 30001, a reflectance in a colored state was 15.933%, and a reflectance in a bleached state was 24.763%.

When blue light having a wavelength of 476 nm was applied to the electrochromic element 30001, a reflectance in a colored state was 23.608%, and a reflectance in a bleached state was 66.262%.

When green light having a wavelength of 550 nm was applied to the electrochromic element 30001, a reflectance in a colored state was 7.111%, and a reflectance in a bleached state was 61.785%.

When amber light having a wavelength of 580 nm was applied to the electrochromic element 30001, a reflectance in a colored state was 11.420%, and a reflectance in a bleached state was 72.237%.

When orange light having a wavelength of 610 nm was applied to the electrochromic element 30001, a reflectance in a colored state was 4.398%, and a reflectance in a bleached state was 72.992%.

When red light having a wavelength of 700 nm was applied to the electrochromic element 30001, a reflectance in a colored state was 4.642%, and a reflectance in a bleached state was 61.000%.

As a result, due to light in the visible light range being applied to the electrochromic element 30001, the average reflectance in the colored state was 8.541%, the average reflectance in the bleached state was 59.727%, and the difference between the average reflectances in the colored state and the bleached state was 51.186%.

According to the above experiment, the difference between the reflectances in the colored state and the bleached state of the electrochromic element 30001 is almost the same as that of 3 Layer EC. In other words, the electrochromic element 30001 has almost the same performance as the conventional 3 Layer EC.

Simultaneously, the electrochromic element 30001 has an effect of being formed with a simpler process. In the case of the conventional 3 Layer EC, because three layers are disposed between the first electrode and the second electrode, a process for forming the three layers has to be performed to realize the 3 Layer EC. Conversely, because two layers are disposed between the first electrode and the second electrode in the case of the electrochromic element 30001 according to the present application, only a process for forming the two layers is required to realize the electrochromic element 30001. Consequently, because the number of processes required to realize the electrochromic element 30001 is smaller than the number of processes required to realize the conventional 3 Layer EC, the process for realizing the electrochromic element 30001 may be simplified.

2. Region of Ion Transport Storage Layer of Electrochromic Element

Figure 85:
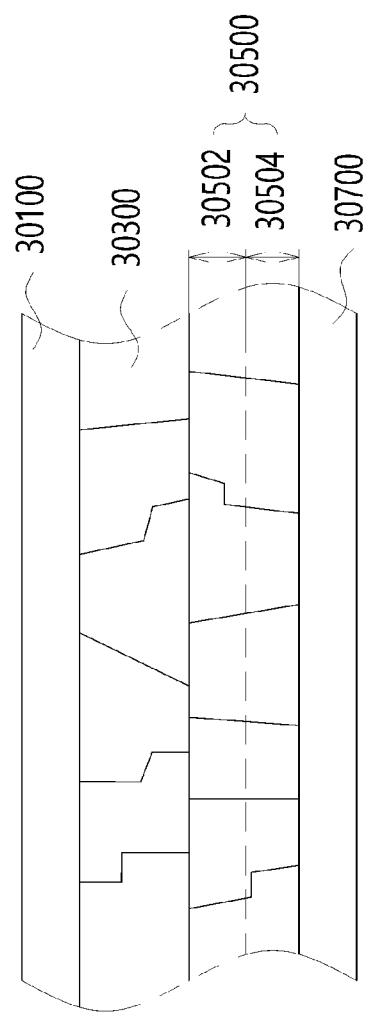
FIG. 85 is a view illustrating an upper region and a lower region of an ion transport storage layer according to an embodiment of the present application.

FIG. 85 is a view illustrating an upper region 30502 and a lower region 30504 of the ion transport storage layer 30500 according to an embodiment of the present application.

Figure 86:
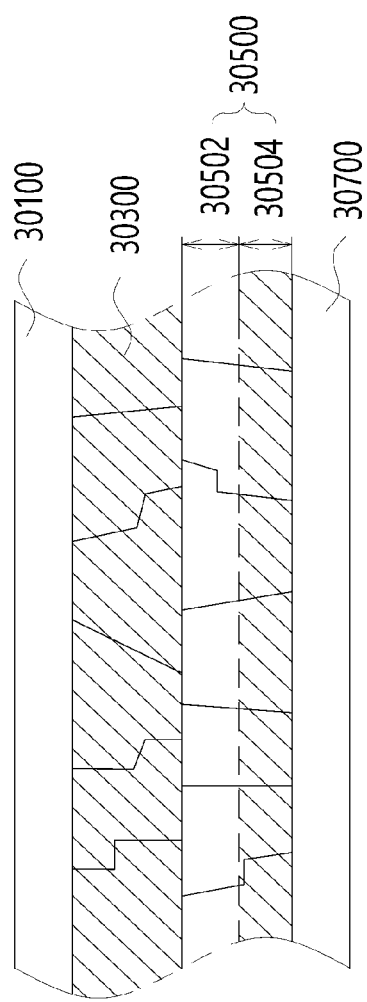
FIG. 86 is a view illustrating discoloration of the electrochromic element according to an embodiment of the present application.

FIG. 86 is a view illustrating discoloration of the electrochromic element 30001 according to an embodiment of the present application.

Referring to FIG. 85, the ion transport storage layer 30500 according to an embodiment of the present application may include the upper region 30502 and the lower region 30504.

The upper region 30502 and the lower region 30504 may have different material compositions.

The ion transport storage layer 30500 may include a first material and a second material. The first material may be defined as an insulating material. The second material may be defined as an electrochromic material.

The upper region 30502 may include the first material.

The lower region 30504 may include the first material and the second material.

The electrochromic material may include an oxidation-reduction material and electrochromic ions. The electrochromic material may be defined as a material whose optical characteristic is changeable.

The oxidation-reduction material may include reduction discoloration materials such as $TiO_2$, $V_2O_5$, $Nb_2O_5$, $Cr_2O_3$, $FeO_2$, $CoO_2$, $NiO_2$, $RhO_2$, $Ta_2O_5$, and $WO_3$, and oxidation discoloration materials such as $NiO_2$, $IrO_2$, $CoO_2$, iridium-magnesium oxide, nickel-magnesium oxide, and titanium-vanadium oxide.

The chromic ions may be defined as a material causing a change in an optical characteristic of the electrochromic material. The chromic ions may include cathodic ions such as OH— and anodic ions such as H+ and Li+.

The insulating material may include at least one of $SiO_2$, $Al_2O_3$, $Nb_2O_3$, $Ta_2O_5$, $LiTaO_3$, $LiNbO_3$, $La_2TiO_7$, $La_2TiO_7$, $SrZrO_3$, $ZrO_2$, $Y_2O_3$, $Nb_2O_5$, $La_2Ti_2O_7$, $LaTiO_3$, and $HfO_2$. The upper region 30502 and the lower region 30504 may have different material concentrations.

A concentration of the first material may be 90% or higher in the upper region 30502.

The concentration of the first material may be 40% to 80%, a concentration of the second material may be 20% to 60%, and a concentration ratio between the first material and the second material may be 8:2 to 4:6 in the lower region 30504.

The concentration ratio between the first material and the second material in the lower region 30504 may be changed for each position.

In the lower region 30504, the concentration of the second material may increase closer toward the electrochromic layer 30300 or the upper region 30502. In the lower region 30504, the concentration of the first material may increase closer toward the second electrode 30700.

In the lower region 30504, an amount of the second material with respect to the first material in a region close to the upper region 30502 may be smaller than an amount of the second material with respect to the first material in a region close to the second electrode 30700.

In the lower region 30504, an amount of the first material with respect to the second material in the region close to the second electrode 30700 may be smaller than an amount of the first material with respect to the second material in a region close to the upper region 30502.

Due to the upper region 30502 and the lower region 30504 having different material compositions as described above, characteristics of the upper region 30502 may be different from characteristics of the lower region 30504.

The upper region 30502 and the lower region 30504 may have different characteristics. The different characteristics may include optical characteristics and electrical characteristics. The optical characteristics may include a refractive index, a transmittance, or the like. The electrical characteristics may include insulation, electrical resistance, ion transportation, or the like.

The optical characteristics may include a first optical characteristic and a second optical characteristic, and the electrical characteristic may include a first electrical characteristic and a second electrical characteristic.

The upper region 30502 may have the first optical characteristic and the lower region 30504 may have the second optical characteristic while the first optical characteristic and the second optical characteristic are different.

The upper region 30502 may have the first electrical characteristic and the lower region 30504 may have the second electrical characteristic while the first electrical characteristic and the second electrical characteristic are different. For example, the lower region 30504 may have an electrical property that allows electrons and electrochromic ions to migrate in the lower region 30504 while the upper region 30502 has an electrical property that allows migration of electrochromic ions but blocks migration of electrons in the upper region 30502.

Due to the upper region 30502 and the lower region 30504 having different characteristics, chromic stability of the electrochromic element 30002 may be improved. For example, when both the upper region 30502 and the lower region 30504 are conductive, electrons in the electrochromic layer 30300 may be transported to the ion transport storage layer 30500. When the ion transport storage layer 30500 includes the oxidation discoloration material, the ion transport storage layer 30500 may be bleached by the electrochromic ions migrating to the ion transport storage layer 30500. Conversely, the electrical characteristics of the upper region 30502 and the lower region 30504 may be different such that the upper region 30502 is insulated and the lower region 30504 is conductive. In this case, electrons in the electrochromic layer 30300 may be blocked by the upper region 30502. Accordingly, the colored state of the ion transport storage layer 30500 may be maintained. As a result, the chromic stability of the electrochromic element 30001 may be improved.

Referring to FIG. 86, the upper region may maintain an optical state therein even when power is applied to the electrochromic element 30001.

When first power is applied to the electrochromic element 30001, the electrochromic layer 30300 and the lower region 30504 may have a first optical state, and the upper region 30502 may have the first optical state. When second power is applied to the electrochromic element, the electrochromic layer 30300 and the lower region 30504 may have a second optical state, and the upper region 30502 may still have the first optical state.

In other words, when power for discoloration of the electrochromic element 30001 is applied to the electrochromic element 30001, the electrochromic layer 30300 and the lower region 30504 may be colored while the upper region 30502 remains bleached.

3. Still Another Embodiment of First Electrode and Second Electrode of Electrochromic Element The first electrode 30100 and the second electrode 30700 according to an embodiment of the present application may have similar characteristics. The characteristics may include electrical characteristics and optical characteristics.

The electrical characteristics of the first electrode 30100 and the second electrode 30700 may be similar. The electrical characteristics may include insulation, electrical resistance, ion transportation, or the like. A resistance of the first electrode 30100 and a resistance of the second electrode 30700 may have similar values.

The optical characteristics of the first electrode 30100 and the second electrode 30700 may be similar.

The size of particles constituting the first electrode 30100 and the size of particles constituting the second electrode 30700 may be adjusted so that the first electrode 30100 and the second electrode 30700 have similar characteristics. The particle size of the first electrode 30100 and the particle size of the second electrode 30700 may be similar.

Temperature conditions of processes for forming the first electrode 30100 and the second electrode 30700 may be adjusted to be similar to make the particle size of the first electrode 30100 similar to the particle size of the second electrode 30700. A temperature condition of the process for forming the first electrode 30100 may be set to be similar to a temperature condition of the process for forming the second electrode 30700. Accordingly, the particle size of the first electrode 30100 may be adjusted to be similar to the particle size of the second electrode 30700.

Due to the first electrode 30100 and the second electrode 30700 having similar characteristics, there is an effect of improving uniformity of discoloration of the electrochromic element. For example, when the first electrode 30100 and the second electrode 30700 have different electrical resistance values, the first electrode 30100 and the second electrode 30700 may receive electrons at different speeds. Speeds at which electrons are transported to each of the electrochromic layer 30300 and the ion transport storage layer 30500 from the first electrode 30100 and the second electrode 30700 may be different. Accordingly, a speed at which an optical state is changed may be different in the electrochromic layer 30300 and the ion transport storage layer 30500. Conversely, when the first electrode 30100 and the second electrode 30700 have similar electrical resistance values, the first electrode 30100 and the second electrode 30700 may receive electrons and transport the electrons to the electrochromic layer 30300 and the ion transport storage layer 30500 at similar speeds. Accordingly, a speed at which an optical state is changed may be similar in the electrochromic layer 30300 and the ion transport storage layer 30500. As a result, because the optical states in the layers are changed at similar speeds, there is an effect of improving uniformity of discoloration of the electrochromic element.

4. Actually Realized Electrochromic Element

Figure 87:
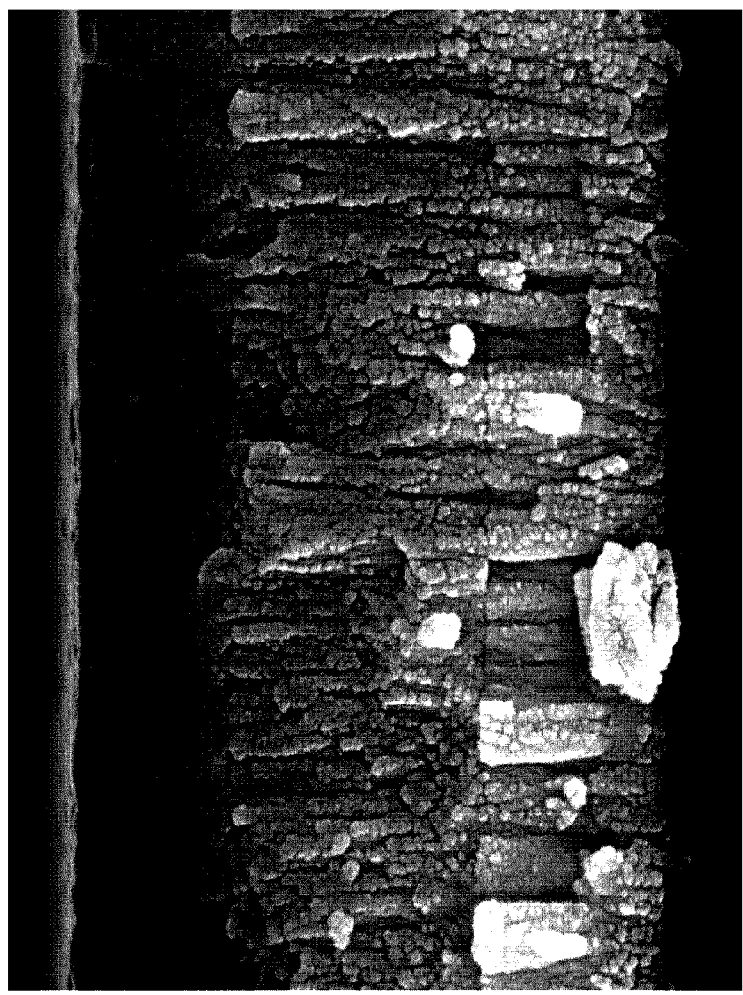
FIG. 87 is a view illustrating an actually realized electrochromic element according to an embodiment of the present application.

FIG. 87 is a view illustrating an actually realized electrochromic element according to an embodiment of the present application.

Figure 88:
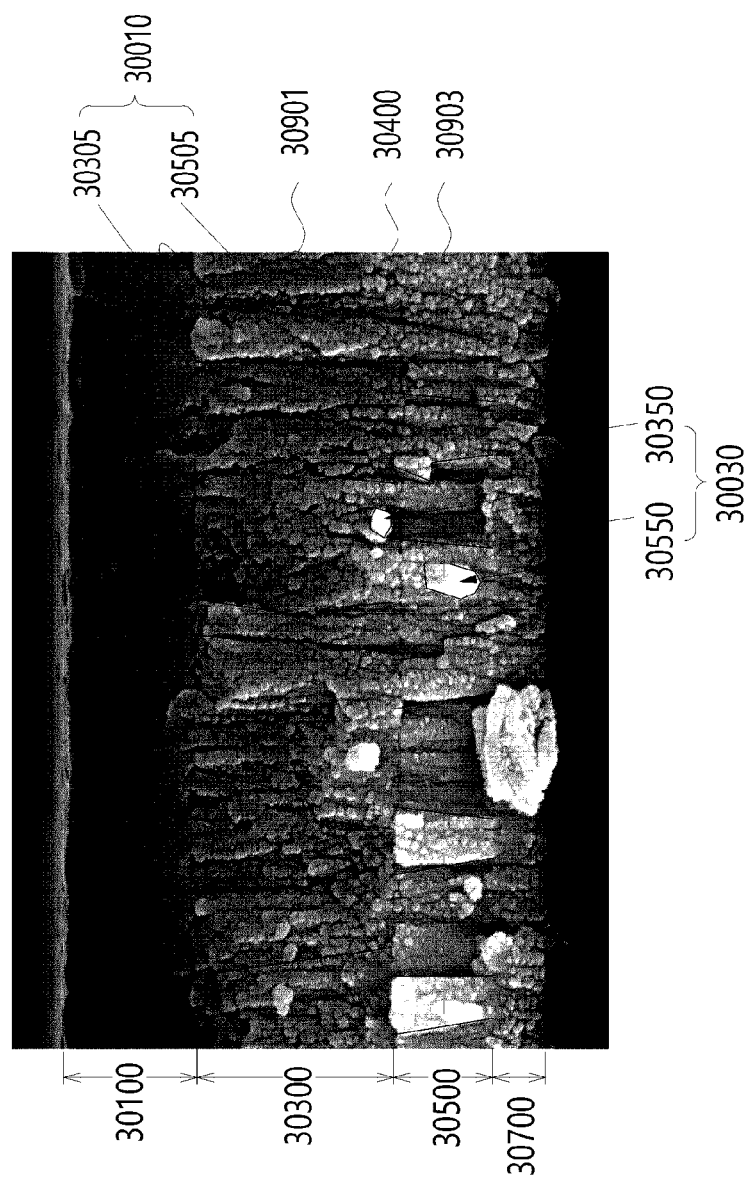
FIG. 88 is a view illustrating a first imaginary line and a second imaginary line set in the actually realized electrochromic element according to an embodiment of the present application and each layer of the electrochromic element.

FIG. 88 is a view illustrating a first imaginary line and a second imaginary line set in the actually realized electrochromic element according to an embodiment of the present application and each layer of the electrochromic element.

Hereinafter, description will be given with reference to FIGS. 87 and 88.

According to an embodiment of the present application, an actually realized electrochromic element may include the first electrode 30100, the electrochromic layer 30300, the ion transport storage layer 30500, and the second electrode 30700. The first contact surface 30200 may be formed by the first electrode 30100 coming in contact with the electrochromic layer 30300, the boundary surface 30400 may be formed by the electrochromic layer 30300 coming in contact with the ion transport storage layer 30500, and the second contact surface 30600 may be formed by the ion transport storage layer 30500 coming in contact with the second electrode 30700.

The first imaginary line 30901 may be set in the electrochromic layer 30300. The first imaginary line 30901 may be set so that the physical structure in the electrochromic layer 30300 is continuous with respect to the first imaginary line 30901.

The second imaginary line 30903 may be set in the ion transport storage layer 30500. The second imaginary line 30903 may be set so that the physical structure in the ion transport storage layer 30500 is continuous with respect to the second imaginary line 30903.

However, the physical structure of the electrochromic layer 30300 and the physical structure of the ion transport storage layer 30500 may be discontinuous from each other with respect to the boundary surface 30400.

The electrochromic element may include columns 30010 and mediums 30030 as the physical structure. The column formed in the electrochromic layer 30300 may be defined as the discoloration column 30305, and the column formed in the ion transport storage layer 30500 may be defined as the ion column 30505. The medium 30030 formed in the electrochromic layer 30300 may be defined as a discoloration medium 30350, and the medium 30030 formed in the ion transport storage layer 30500 may be defined as an ion medium 30550.

A plurality of discoloration columns 30305 may be formed in the electrochromic layer 30300. A plurality of ion columns 30505 may be formed in the ion transport storage layer 30500.

The discoloration columns 30305 may be formed to be spaced apart or come in contact with other discoloration columns 30305. When the discoloration columns 30305 come in contact with each other, the left ends and the right ends of the discoloration columns 30305 in contact with each other may come in contact with each other.

The ion columns 30505 may be formed to be spaced apart or come in contact with other ion columns 30505. When the ion columns 30505 come in contact with each other, the left ends and the right ends of the ion columns 30505 in contact with each other may come in contact with each other.

The discoloration columns 30305 and the ion columns 30505 may come in contact with each other. In this case, the lower ends of the discoloration columns 30305 may come in contact with the upper ends of the ion columns 30505.

The discoloration columns 30305 and the ion columns 30505 may be continuous with respect to the imaginary lines. The discoloration column 30305 may be continuous with respect to the first imaginary line 30901, and the ion columns 30505 may be continuous with respect to the second imaginary line 30903. The left ends and the right ends of the discoloration columns 30305 may be continuous with respect to the first imaginary line 30901, and the left ends and the right ends of the ion columns 30505 may be continuous with respect to the second imaginary line 30903.

The discoloration columns 30305 and the ion columns 30505 may be discontinuous with respect to the boundary surface 30400. The discoloration columns 30305 and the ion columns 30505 may come in contact with each other while the right ends or the left ends of the discoloration columns 30305 are discontinuous from the right ends or the left ends of the ion columns 30505 with respect to the boundary surface 30400.

The discoloration medium 30350 and the ion medium 30550 may be continuous and discontinuous from each other.

The discoloration medium 30350 and the ion medium 30550 may be continuous with respect to the virtual lines. The discoloration medium 30350 may be continuous with respect to the first imaginary line 30901, and the ion medium 30550 may be continuous with respect to the second imaginary line 30903. An outer peripheral surface of the discoloration medium 30350 may be continuous with respect to the first imaginary line 30901, and an outer peripheral surface of the ion medium 30550 may be continuous with respect to the second imaginary line 30903.

The discoloration medium 30350 and the ion medium 30550 may be discontinuous with respect to the boundary surface 30400. The outer peripheral surface of the discoloration medium 30350 and the outer peripheral surface of the ion medium 30550 may be discontinuous from each other with respect to the boundary surface 30400.

By the electrochromic layer 30300 and the ion transport storage layer 30500 being continuous and the electrochromic layer 30300 and the ion transport storage layer 30500 being discontinuous from each other, there is an effect in that an optical state of the electrochromic element is stably changed.

When each of the electrochromic layer 30300 and the ion transport storage layer 30500 is discontinuous, it becomes difficult for the electrochromic layer 30300 and the ion transport storage layer 30500 to receive electrons or electrochromic ions and transport the electrons or electrochromic ions to the entire region of each of the layers. Conversely, by the electrochromic layer 30300 and the ion transport storage layer 30500 being continuous, the electrochromic layer 30300 and the ion transport storage layer 30500 may receive electrons or electrochromic ions and transport the electrons or electrochromic ions to the entire region of each of the layers. Accordingly, an optical state may be changed in the entire region of each of the electrochromic layer 30300 and the ion transport storage layer 30500.

By the electrochromic layer 30300 and the ion transport storage layer 30500 being discontinuous from each other, there is an effect in that electric discoloration is stably caused. When the electrochromic layer 30300 and the ion transport storage layer 30500 are continuous with each other, the electrochromic layer 30300 and the ion transport storage layer 30500 exchange electrons. Due to the electron exchange between the electrochromic layer 30300 and the ion transport storage layer 30500, a difference between the numbers of electrons in the electrochromic layer 30300 and the ion transport storage layer 30500 is eliminated. Accordingly, electrochromic ions guided to a region containing a large number of electrons do not migrate further, and electric discoloration of the electrochromic element based on the migration is not caused. Consequently, the electrochromic element 30001 does not operate. Conversely, when the electrochromic layer 30300 and the ion transport storage layer 30500 are discontinuous from each other, the electrochromic layer 30300 and the ion transport storage layer 30500 are unable to exchange electrons. Accordingly, the difference between the numbers of electrons in the electrochromic layer 30300 and the ion transport storage layer 30500 is maintained. Accordingly, the electrochromic ions may migrate to the electrochromic layer 30300 or the ion transport storage layer 30500. Due to the migration of the electrochromic ions, the electrochromic layer 30300 or the ion transport storage layer 30500 may be electrically discolored. As a result, electric discoloration of the electrochromic element 30001 is stably caused, and the electrochromic element 30001 properly operates.

That is, by the electrochromic layer 30300 and the ion transport storage layer 30500 being continuous and discontinuous from each other, an optical state may be uniformly changed and maintained in the entire region of each of the layers. Accordingly, there is an effect in that the optical state of the electrochromic element is stably changed.

The above-described electrochromic element 30001 may be another embodiment of the electrochromic element 10200 of FIGS. 1 to 37. The above-described driving module 21000 may drive the electrochromic element 30001 of FIGS. 74 to 88. That is, the electrical connecting member 21500 of the above-described driving module 21000 may be disposed in the electrochromic element 30001 of FIGS. 74 to 88, and the trench structure 22100 may be formed in the electrochromic element 30001 of FIGS. 74 to 88 to receive driving power from the electrical connecting member 21500.

Third Embodiment Group

Hereinafter, an electrochromic device according to a third embodiment group will be described.

Figure 89:
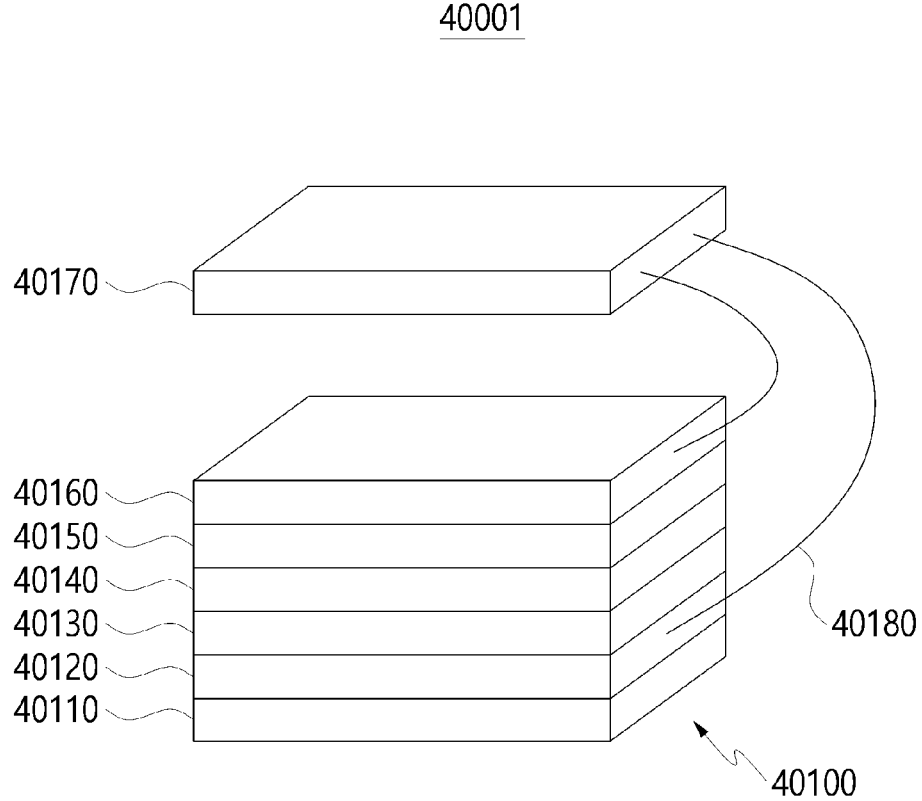
FIG. 89 is a view illustrating an electrochromic device according to a first embodiment.

FIG. 89 is a view illustrating an electrochromic device according to a first embodiment.

Referring to FIG. 89, an electrochromic device 40001 according to a first embodiment includes an electrochromic element 40100.

The electrochromic element 40100 may include a substrate 40110, a transparent electrode 40120, a first electrochromic layer 40130, an ion transport layer 40140, a second electrochromic layer 40150, and a reflective layer 40160.

The electrochromic element 40100 may be connected to a driving circuit 40170. The driving circuit 40170 may be electrically connected to the electrochromic element 40100 through a wiring 40180.

The driving circuit 40170 may be disposed in a region adjacent to the reflective layer 40160. A distance between the driving circuit 40170 and the first electrochromic layer 40130 may be longer than a distance between the driving circuit 40170 and the second electrochromic layer 40150.

The driving circuit 40170 may be disposed on a rear surface of the reflective layer 40160. By the substrate 40110 being adjacent to the outside and the driving circuit 40170 being disposed on the rear surface of the reflective layer 40160, the driving circuit 40170 may be prevented from being visible from the outside.

The electrochromic element 40100 may be a mirror. When the electrochromic element 40100 is a mirror, the electrochromic element 40100 may receive a driving voltage, and thus a reflectance of the electrochromic element 40100 may change.

The transparent electrode 40120 may be disposed on the substrate 40110. The transparent electrode 40120 and the reflective layer 40160 may be disposed to face each other. The first electrochromic layer 40130, the ion transport layer 40140, and the second electrochromic layer 40150 may be disposed between the transparent electrode 40120 and the reflective layer 40160.

The transparent electrode 40120 may transmit incident light. The transparent electrode 40120 may be formed of a transparent conductive material. The transparent electrode 40120 may include a metal which is doped with at least one of indium, tin, zinc, and/or oxide. For example, a first electrode 40210 and a second electrode 40250 may be formed of indium tin oxide (ITO), zinc oxide (ZnO), or indium zinc oxide (IZO). Alternatively, the transparent electrode 40120 may be formed of a silver nanowire, a metal mesh, oxide metal oxide (OMO), a carbon nanotube, or the like.

The reflective layer 40160 may be formed of a metal material having a high reflectance. The reflective layer 40160 may include at least one of aluminum (Al), copper (Cu), molybdenum (Mo), chrome (Cr), titanium (Ti), gold (Au), silver (Ag), and tungsten (W).

The first electrochromic layer 40130 may be disposed on the transparent electrode 40120. The first electrochromic layer 40130 may be formed of a material that is discolored due to movement of ions. The first electrochromic layer 40130 may include at least one oxide of TiO, $V_2O_5$, $Nb_2O_5$, $Cr_2O_3$, $MnO_2$, $FeO_2$, $CoO_2$, $NiO_2$, $RhO_2$, $Ta_2O_5$, $IrO_2$, $WO_3$, iridium-magnesium oxide, nickel-magnesium oxide, and titanium-vanadium oxide.

The ion transport layer 40140 may be an ion movement path between the first electrochromic layer 40130 and the second electrochromic layer 40150. The first electrochromic layer 40130 and the second electrochromic layer 40150 may exchange ions through the ion transport layer 40140. While the ion transport layer 40140 becomes a movement path for ions, the ion transport layer 40140 may act as a barrier for electrons. That is, ions can move through the ion transport layer 40140, but electrons cannot move therethrough. In other words, the first electrochromic layer 40130 and the second electrochromic layer 40150 can exchange ions through the ion transport layer 40140 but cannot exchange electrons therethrough.

The ion transport layer 40140 may include an insulating material. The ion transport layer 40140 may be a solid. The ion transport layer 40140 may include at least one of $SiO_2$, $Al_2O_3$, $Nb_2O_3$, $Ta_2O_5$, $LiTaO_3$, $LiNbO_3$, $La_2TiO_7$, $La_2TiO_7$, $SrZrO_3$, $ZrO_2$, $Y_2O_3$, $Nb_2O_5$, $La_2Ti_2O_7$, $LaTiO_3$, and $HfO_2$.

The second electrochromic layer 40150 may be disposed on the ion transport layer 40140. The second electrochromic layer 40150 may be formed of a material that is discolored due to movement of ions. The second electrochromic layer 40150 may include at least one oxide of TiO, $V_2O_5$, $Nb_2O_5$, $Cr_2O_3$, $MnO_2$, $FeO_2$, $CoO_2$, $NiO_2$, $RhO_2$, $Ta_2O_5$, $IrO_2$, $WO_3$, iridium-magnesium oxide, nickel-magnesium oxide, and titanium-vanadium oxide.

The first electrochromic layer 40130 and the second electrochromic layer 40150 may be formed of different materials.

Ions may be injected into any one of the first electrochromic layer 40130 and the second electrochromic layer 40150. The ions may be at least one of H+ ions or Li+ ions.

Optical properties of the first electrochromic layer 40130 and the second electrochromic layer 40150 may be changed due to movement of ions. When ions are injected into the first electrochromic layer 40130, the first electrochromic layer 40130 may be discolored. When ions are injected into the first electrochromic layer 40130, the first electrochromic layer 40130 may be colored or bleached. When ions are injected into the first electrochromic layer 40130, a light transmittance and/or a light absorbance of the first electrochromic layer 40130 may be changed. The first electrochromic layer 40130 may be reduced as ions are injected into the first electrochromic layer 40130. The first electrochromic layer 40130 may be reduced and discolored as ions are injected into the first electrochromic layer 40130. The first electrochromic layer 40130 may be reduced and colored as ions are injected into the first electrochromic layer 40130. Alternatively, when ions are injected into the first electrochromic layer 40130, the first electrochromic layer 40130 may be reduced and bleached.

The ions injected into the first electrochromic layer 40130 may be desorbed. When the ions of the first electrochromic layer 40130 are desorbed, the optical properties of the first electrochromic layer 40130 may be changed. When the ions of the first electrochromic layer 40130 are desorbed, the first electrochromic layer 40130 may be discolored. When the ions of the first electrochromic layer 40130 are desorbed, the first electrochromic layer 40130 may be colored or bleached. When the ions of the first electrochromic layer 40130 are desorbed, the light transmittance and/or light absorbance of the first electrochromic layer 40130 may be changed. The first electrochromic layer 40130 may be oxidized as the ions of the first electrochromic layer 40130 are desorbed. The first electrochromic layer 40130 may be oxidized and discolored as the ions of the first electrochromic layer 40130 are desorbed. The first electrochromic layer 40130 may be oxidized and colored as the ions of the first electrochromic layer 40130 are desorbed. Alternatively, when the ions of the first electrochromic layer 40130 are desorbed, the first electrochromic layer 40130 may be oxidized and bleached.

Ions may be injected into the second electrochromic layer 40150. When ions are injected into the second electrochromic layer 40150, the optical properties of the second electrochromic layer 40150 may be changed. When ions are injected into the second electrochromic layer 40150, the second electrochromic layer 40150 may be discolored. When ions are injected into the second electrochromic layer 40150, the second electrochromic layer 40150 may be colored or bleached. When ions are injected into the second electrochromic layer 40150, the light transmittance and/or light absorbance of the second electrochromic layer 40150 may be changed. The second electrochromic layer 40150 may be reduced as ions are injected into the second electrochromic layer 40150. The second electrochromic layer 40150 may be reduced and discolored as ions are injected into the second electrochromic layer 40150. The second electrochromic layer 40150 may be reduced and colored as ions are injected into the second electrochromic layer 40150. Alternatively, when ions are injected into the second electrochromic layer 40150, the second electrochromic layer 40150 may be reduced and bleached.

The ions injected into the second electrochromic layer 40150 may be desorbed. When the ions of the second electrochromic layer 40150 are desorbed, the optical properties of the second electrochromic layer 40150 may be changed. When the ions of the second electrochromic layer 40150 are desorbed, the second electrochromic layer 40150 may be discolored. When the ions of the second electrochromic layer 40150 are desorbed, the second electrochromic layer 40150 may be colored or bleached. When the ions of the second electrochromic layer 40150 are desorbed, the light transmittance and/or light absorbance of the second electrochromic layer 40150 may be changed. The second electrochromic layer 40150 may be oxidized as the ions of the second electrochromic layer 40150 are desorbed. The second electrochromic layer 40150 may be oxidized and discolored as the ions of the second electrochromic layer 40150 are desorbed. The second electrochromic layer 40150 may be oxidized and colored as the ions of the second electrochromic layer 40150 are desorbed. Alternatively, when the ions of the second electrochromic layer 40150 are desorbed, the second electrochromic layer 40150 may be oxidized and bleached.

When the ions of the first electrochromic layer 40130 are desorbed, the ions may move to the second electrochromic layer 40150. When the ions of the second electrochromic layer 40150 are desorbed, the ions may move to the first electrochromic layer 40130.

Chemical reactions that occur in the first electrochromic layer 40130 and the second electrochromic layer 40150 may be different reactions. Reverse chemical reactions may occur in the first electrochromic layer 40130 and the second electrochromic layer 40150. When the first electrochromic layer 40130 is oxidized, the second electrochromic layer 40150 may be reduced. When the first electrochromic layer 40130 is reduced, the second electrochromic layer 40150 may be oxidized.

Accordingly, the first electrochromic layer 40130 may serve as a counter electrode of the second electrochromic layer 40150.

States of the first electrochromic layer 40130 and the second electrochromic layer 40150 may be changed due to movement of the ions.

State changes that correspond to each other may be caused in the first electrochromic layer 40130 and the second electrochromic layer 40150. For example, when the first electrochromic layer 40130 is colored, the second electrochromic layer 40150 may also be colored, and, when the first electrochromic layer 40130 is bleached, the second electrochromic layer 40150 may also be bleached. When the first electrochromic layer 40130 is oxidized and colored, the second electrochromic layer 40150 may be reduced and colored, and, when the first electrochromic layer 40130 is reduced and colored, the second electrochromic layer 40150 may be oxidized and colored.

Any one of the first electrochromic layer 40130 and the second electrochromic layer 40150 may serve as an electrochromic layer, and the other one may serve as an ion storage layer.

When the first electrochromic layer 40130 serves as an electrochromic layer, the second electrochromic layer 40150 may serve as an ion storage layer.

The case in which the first electrochromic layer 40130 serves as an electrochromic layer and the second electrochromic layer 40150 serves as an ion storage layer will be described below.

For example, the first electrochromic layer 40130 may contain tungsten atoms, and the second electrochromic layer 40150 may contain iridium atoms.

The first electrochromic layer 40130 may contain oxidized tungsten. The first electrochromic layer 40130 may contain W03.

The second electrochromic layer 40150 may contain oxidized iridium. The second electrochromic layer 40150 may contain $IrO_2$ and $Ta_2O_5$. In the second electrochromic layer 40150, $IrO_2$ and $Ta_2O_5$ may exist in a mixed form.

In this case, the first electrochromic layer 40130 may be reduced and colored, and the second electrochromic layer 40150 may be oxidized and colored. Also, the first electrochromic layer 40130 may be oxidized and bleached, and the second electrochromic layer 40150 may be reduced and bleached.

That is, when the ions move from the first electrochromic layer 40130 to the second electrochromic layer 40150, the first electrochromic layer 40130 and the second electrochromic layer 40150 may be bleached, and, when the ions move from the second electrochromic layer 40150 to the first electrochromic layer 40130, the first electrochromic layer 40130 and the second electrochromic layer 40150 may be colored.

As the first electrochromic layer 40130 containing the tungsten atoms is disposed nearby the substrate 40110, deterioration may be reduced, and thus the discolored color may be maintained. Since, as compared with the tungsten atoms, the iridium atoms are more prone to deformation when heat is applied thereto, by causing the first electrochromic layer 40130 containing the tungsten atoms to be disposed nearby the substrate 40110 which is adjacent to the outside, an effect of preventing the deterioration can be achieved.

When the first electrochromic layer 40130 serves as an ion storage layer, the second electrochromic layer 40150 may serve as an electrochromic layer.

The case in which the first electrochromic layer 40130 serves as an ion storage layer and the second electrochromic layer 40150 serves as an electrochromic layer will be described below.

For example, the first electrochromic layer 40130 may contain iridium atoms, and the second electrochromic layer 40150 may contain tungsten atoms.

The first electrochromic layer 40130 may contain oxidized iridium. The first electrochromic layer 40130 may contain $IrO_2$ and $Ta_2O_5$. In the first electrochromic layer 40130, $IrO_2$ and $Ta_2O_5$ may exist in a mixed form.

The second electrochromic layer 40150 may contain oxidized tungsten. The second electrochromic layer 40150 may contain W03.

In this case, the first electrochromic layer 40130 may be oxidized and colored, and the second electrochromic layer 40150 may be reduced and colored. Also, the first electrochromic layer 40130 may be reduced and bleached, and the second electrochromic layer 40150 may be oxidized and bleached.

That is, when the ions move from the first electrochromic layer 40130 to the second electrochromic layer 40150, the first electrochromic layer 40130 and the second electrochromic layer 40150 may be colored, and, when the ions move from the second electrochromic layer 40150 to the first electrochromic layer 40130, the first electrochromic layer 40130 and the second electrochromic layer 40150 may be bleached.

As the first electrochromic layer 40130 containing the iridium atoms is disposed nearby the substrate 40110, variation between the maximum reflectance and the minimum reflectance may increase. Light incident through the substrate 40110 is incident on the first electrochromic layer 40130 through the transparent electrode 40120. Here, since, when the transparent electrode 40120 is ITO, a difference between refractive indices of the ITO and iridium is less than a difference between refractive indices of the ITO and tungsten, the amount of light that disappears at the surface may be reduced. That is, as the first electrochromic layer 40130 is formed of a material containing iridium atoms, the amount of light incident into the electrochromic element 40100 may increase, and, in this way, the variation between the maximum reflectance and the minimum reflectance may increase. Since the range in which the amount of light is adjustable increases as the variation between the maximum reflectance and the minimum reflectance increases in the electrochromic element 40100, by forming the first electrochromic layer 40130 with a material containing iridium atoms, an effect of widening the range in which the electrochromic element 40100 is controllable can be achieved.

Also, since the iridium atoms are relatively stable in a photocatalytic reaction, even when the first electrochromic layer 40130 containing the iridium atoms is irradiated with light, a change in electrical properties of the first electrochromic layer 40130 is small. Thus, an effect of extending a service life of a product can be achieved.

Figure 90:
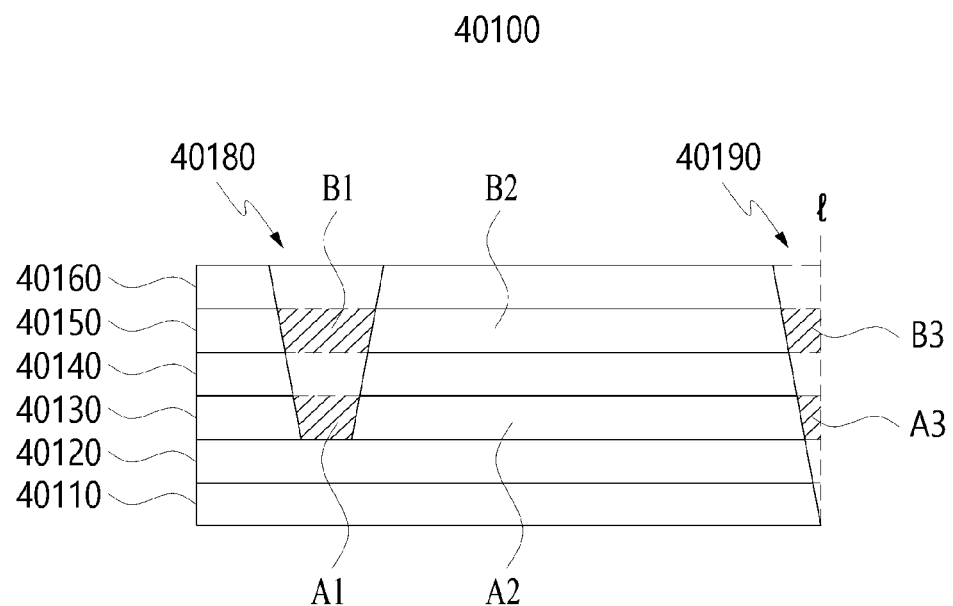
FIG. 90 is a view illustrating a cross-section of an electrochromic element according to the first embodiment.

FIG. 90 is a view illustrating a cross-section of an electrochromic element according to the first embodiment.

Referring to FIG. 90, the electrochromic element 40100 according to the first embodiment includes the substrate 40110, the transparent electrode 40120, the first electrochromic layer 40130, the ion transport layer 40140, the second electrochromic layer 40150, and the reflective layer 40160.

A contact hole 40180 may be formed in the electrochromic element 40100. The contact hole 40180 may be a passage that electrically connects the driving circuit 40170 and the transparent electrode 40120.

The contact hole 40180 may be formed to pass through the first electrochromic layer 40130, the ion transport layer 40140, the second electrochromic layer 40150, and the reflective layer 40160. The contact hole 40180 may cause a portion of the transparent electrode 40120 to be exposed. Portions of the first electrochromic layer 40130, the ion transport layer 40140, the second electrochromic layer 40150, and the reflective layer 40160 may be removed due to the contact hole 40180.

The contact hole 40180 may be formed by laser or etching. A region removed due to the contact hole 40180 may be formed with an inclined surface having an angle. An acute angle may be formed between the contact hole 40180 and a boundary surface of each layer.

Partial regions where the first electrochromic layer 40130, the ion transport layer 40140, the second electrochromic layer 40150, and the reflective layer 40160 are removed by contact hole 40180 may be defined as removal regions. The removal region may gradually become larger from the first electrochromic layer 40130 toward the reflective layer 40160. For example, a removal region of the first electrochromic layer 40130 may be smaller than a removal region of the ion transport layer 40140, the removal region of the ion transport layer 40140 may be smaller than a removal region of the second electrochromic layer 40150, and the removal region of the second electrochromic layer 40150 may be smaller than a removal region of the reflective layer 40160.

A width of the removal region may gradually increase from the first electrochromic layer 40130 toward the reflective layer 40160. For example, a width of the removal region of the first electrochromic layer 40130 may be smaller than a width of the removal region of the ion transport layer 40140, the width of the removal region of the ion transport layer 40140 may be smaller than a width of the removal region of the second electrochromic layer 40150, and the width of the removal region of the second electrochromic layer 40150 may be smaller than a width of the removal region of the reflective layer 40160.

The removal region of the first electrochromic layer 40130 may be defined as a first removal region A1, and the removal region of the second electrochromic layer 40150 may be defined as a second removal region B1. The first removal region A1 may be smaller than the second removal region B1. In the first electrochromic layer 40130 and the second electrochromic layer 40150, the removal region of the second electrochromic layer 40150 that is adjacent to the driving circuit 40170 may be larger than the removal region of the first electrochromic layer 40130.

A cutting portion 40190 may be formed in the electrochromic element 40100. Since the electrochromic element 40100 is stacked on a single substrate and then cut into a plurality of electrochromic elements by a cutting process, each electrochromic element 40100 may include the cutting portion 40190.

Portions of the substrate 40110, the transparent electrode 40120, the first electrochromic layer 40130, the ion transport layer 40140, the second electrochromic layer 40150, and the reflective layer 40160 may be removed by the cutting portion 40190.

The cutting portion 40190 may be formed by laser or etching. A region removed due to the cutting portion 40190 may be formed with an inclined surface having an angle. An acute angle may be formed between the cutting portion 40190 and a boundary surface of each layer. The cutting portion 40190 may be formed on the basis of a cutting line 1.

When the cutting portion 40190 is formed by laser, even when cutting is performed on the basis of the cutting line 1, a region removed due to the cutting portion 40190 may be formed with an inclined surface having an angle.

Partial regions where the substrate 40110, the transparent electrode 40120, the first electrochromic layer 40130, the ion transport layer 40140, the second electrochromic layer 40150, and the reflective layer 40160 are removed due to the cutting portion 40190 may be defined as cutting regions. The cutting region may gradually become larger from the substrate 40110 toward the reflective layer 40160. For example, a cutting region of the substrate 40110 may be smaller than a cutting region of the transparent electrode 40120, the cutting region of the transparent electrode 40120 may be smaller than a cutting region of the first electrochromic layer 40130, the cutting region of the first electrochromic layer 40130 may be smaller than a cutting region of the ion transport layer 40140, the cutting region of the ion transport layer 40140 may be smaller than a cutting region of the second electrochromic layer 40150, and the cutting region of the second electrochromic layer 40150 may be smaller than a removal region of the reflective layer 40160.

A width of the cutting region may gradually increase from the substrate 40110 toward the reflective layer 40160. For example, a width of the cutting region of the reflective layer 40160 may be larger than a width of the cutting region of the second electrochromic layer 40150, the width of the cutting region of the second electrochromic layer 40150 may be larger than a width of the cutting region of the ion transport layer 40140, the width of the cutting region of the ion transport layer 40140 may be larger than a width of the cutting region of the first electrochromic layer 40130, the width of the cutting region of the first electrochromic layer 40130 may be larger than a width of the cutting region of the transparent electrode 40120, and the width of the cutting region of the transparent electrode 40120 may be larger than a width of the cutting region of the substrate 40110.

The cutting region of the first electrochromic layer 40130 may be defined as a first cutting region A3, and the cutting region of the second electrochromic layer 40150 may be defined as a second cutting region B3. The first cutting region A3 may be smaller than the second cutting region B3. In the first electrochromic layer 40130 and the second electrochromic layer 40150, the cutting region of the second electrochromic layer 40150 that is adjacent to the driving circuit 40170 may be larger than the cutting region of the first electrochromic layer 40130.

The first electrochromic layer 40130, the ion transport layer 40140, the second electrochromic layer 40150, and the reflective layer 40160 may further include residual regions. The residual region may be a region between the contact hole 40180 and the cutting portion 40190. The first electrochromic layer 40130 may include a first residual region A2. The second electrochromic layer 40150 may include a second residual region B2.

The second residual region B2 of the second electrochromic layer 40150 that is adjacent to the driving circuit 40170 may be smaller than the first residual region A2 of the first electrochromic layer 40130. A region where a material is removed in the second electrochromic layer 40150 which is adjacent to the driving circuit 40170 may be larger than a region where a material is removed in the first electrochromic layer 40130 which is spaced apart from the driving circuit 40170. The sum of the second removal region B1 and the second cutting region B3 of the second electrochromic layer 40150 may be larger than the sum of the first removal region A1 and the first cutting region A3 of the first electrochromic layer 40130.

Figure 91:
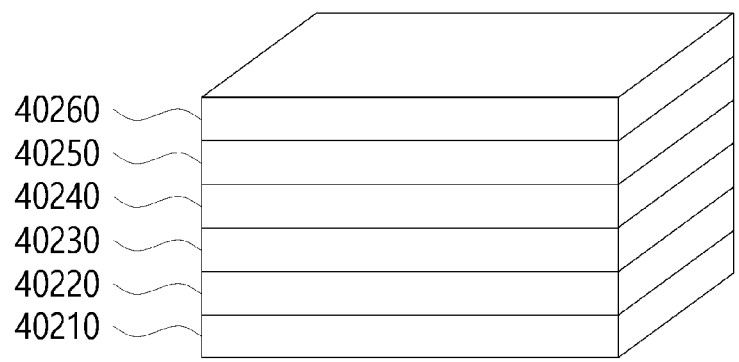
FIG. 91 is a view illustrating an electrochromic device according to a second embodiment.
Figure 92:
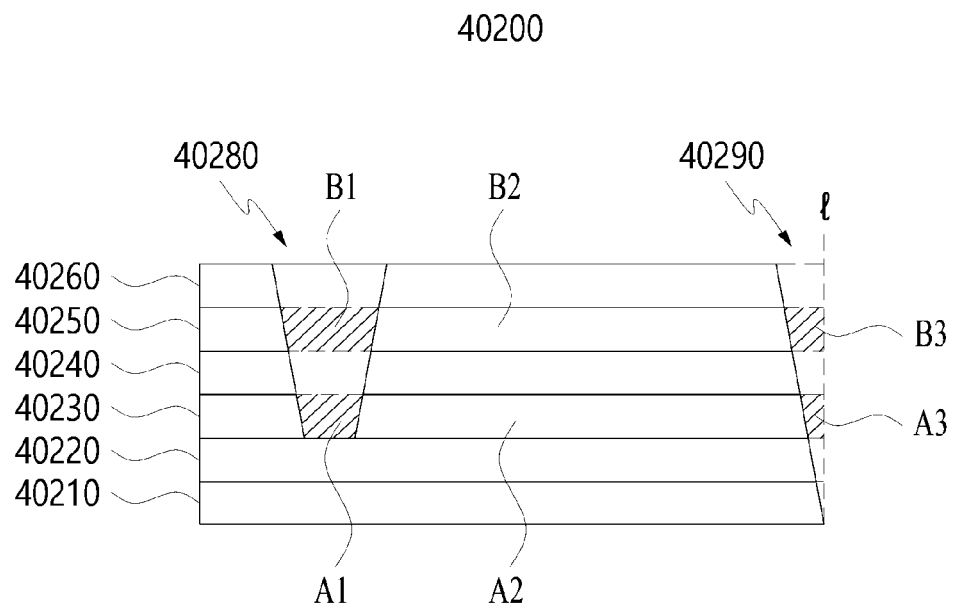
FIG. 92 is a cross-sectional view of an electrochromic element according to the second embodiment.

FIG. 91 is a view illustrating an electrochromic device according to a second embodiment, and FIG. 92 is a cross-sectional view of an electrochromic element according to the second embodiment.

The electrochromic device according to the second embodiment is the same as that according to the first embodiment except that the reflective layer is substituted by a transparent electrode. Therefore, in describing the second embodiment, like reference numerals will be assigned to configurations in common with the first embodiment, and detailed description thereof will be omitted.

Referring to FIGS. 91 and 92, an electrochromic element 40200 according to the second embodiment may include a substrate 40210, a first transparent electrode 40220, a first electrochromic layer 40230, an ion transport layer 40240, a second electrochromic layer 40250, and a second transparent electrode 40260.

The electrochromic element 40200 may be a window. When the electrochromic element 40200 is a window, the electrochromic element 40200 may receive a driving voltage, and a transmittance of the electrochromic element 40200 may be changed.

The first transparent electrode 40220 may be formed on the substrate 40210. The first transparent electrode 40220 and the second transparent electrode 40260 may be formed to face each other. The first electrochromic layer 40230, the ion transport layer 40240, and the second electrochromic layer 40250 may be disposed between the first transparent electrode 40220 and the second transparent electrode 40260.

A contact hole 40280 may be formed in the electrochromic element 40200. The contact hole 40280 may be a passage that electrically connects the first transparent electrode 40220 to an external driving circuit.

The contact hole 40280 may be formed by laser or etching. A region removed due to the contact hole 40280 may be formed with an inclined surface having an angle. An acute angle may be formed between the contact hole 40280 and a boundary surface of each layer.

The removal region of the first electrochromic layer 40230 may be defined as a first removal region A1, and the removal region of the second electrochromic layer 40250 may be defined as a second removal region B1. The first removal region A1 may be smaller than the second removal region B1. In the first electrochromic layer 40230 and the second electrochromic layer 40250, the removal region of the first electrochromic layer 40230 that is adjacent to the substrate 40210 may be smaller than the removal region of the second electrochromic layer 40250.

A cutting portion 40290 may be formed in the electrochromic element 40200. Portions of the substrate 40210, the first transparent electrode 40220, the first electrochromic layer 40230, the ion transport layer 40240, the second electrochromic layer 40250, and the second transparent electrode 40260 may be removed by the cutting portion 40290.

The cutting portion 40290 may be formed by laser or etching. A region removed due to the cutting portion 40290 may be formed with an inclined surface having an angle. An acute angle may be formed between the cutting portion 40290 and a boundary surface of each layer. The cutting portion 40290 may be formed on the basis of a cutting line 1.

The cutting region of the first electrochromic layer 40230 may be defined as a first cutting region A3, and the cutting region of the second electrochromic layer 40250 may be defined as a second cutting region B3. The first cutting region A3 may be smaller than the second cutting region B3. In the first electrochromic layer 40230 and the second electrochromic layer 40250, the cutting region of the first electrochromic layer 40230 that is adjacent to the substrate 40210 may be smaller than the cutting region of the second electrochromic layer 40250.

The first electrochromic layer 40230 and the second electrochromic layer 40250 may be formed of different materials. The electrochromic element 40200 may have different properties according to materials constituting the first electrochromic layer 40230 and the second electrochromic layer 40250.

Figure 93:
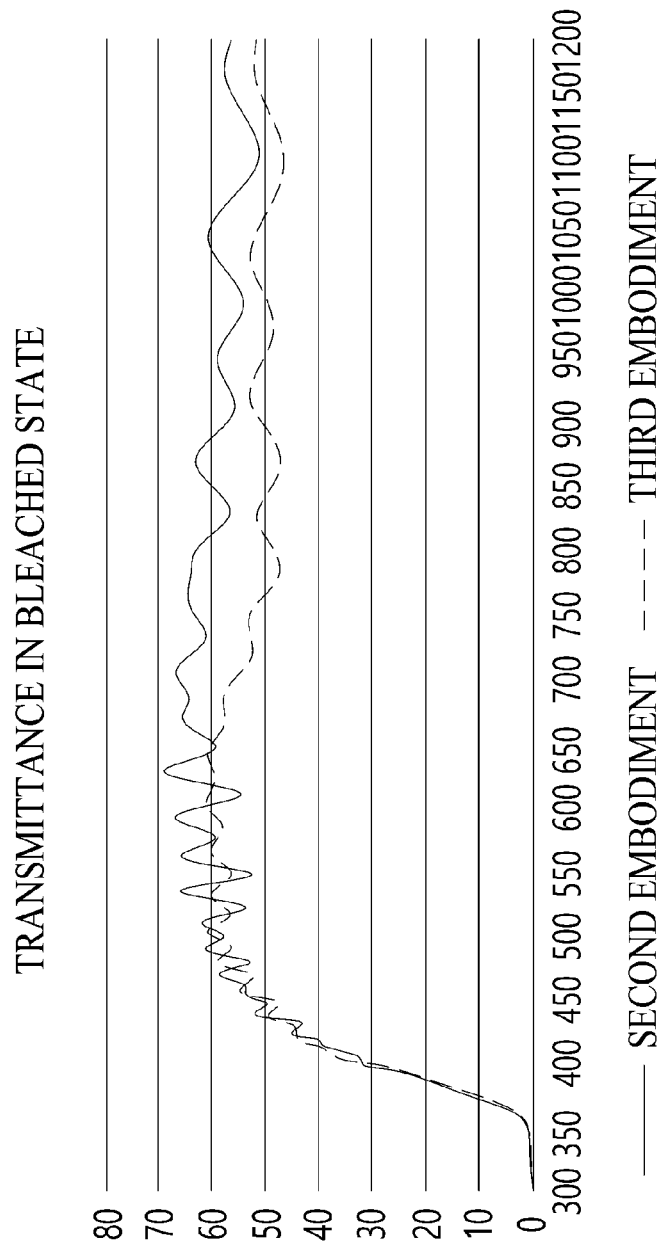
FIG. 93 is a view illustrating transmittances in a bleached state of an electrochromic element according to the second embodiment and an electrochromic element according to a third embodiment.
Figure 94:
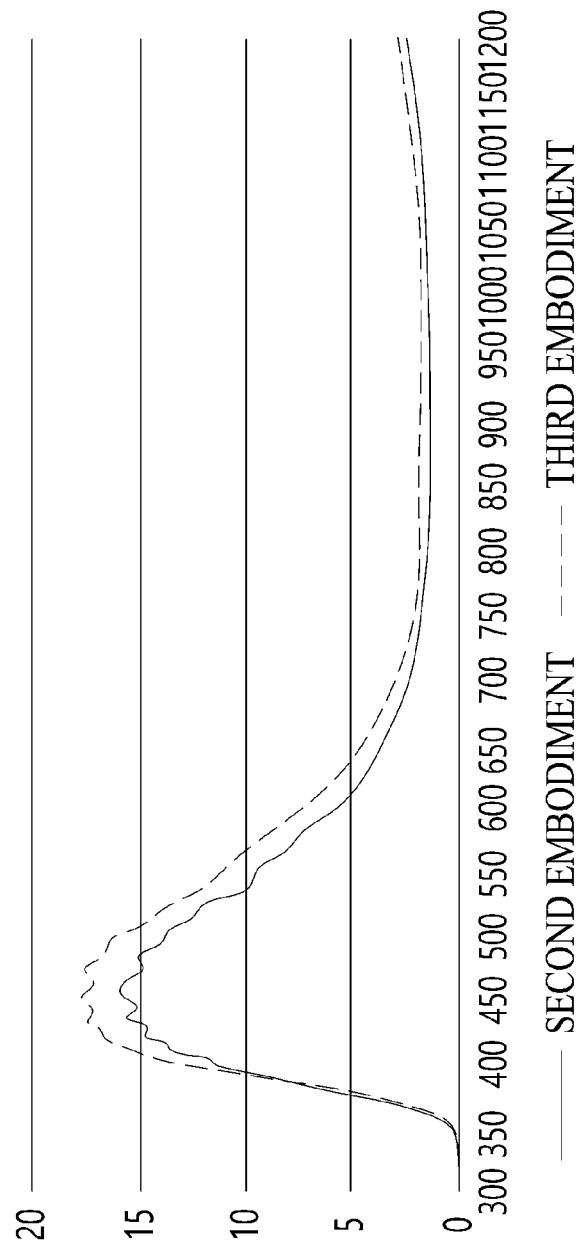
FIG. 94 is a view illustrating transmittances in a colored state of the electrochromic element according to the second embodiment and an electrochromic element according to the third embodiment.

FIG. 93 is a view illustrating transmittances in a bleached state of an electrochromic element according to the second embodiment and an electrochromic element according to the third embodiment, and FIG. 94 is a view illustrating transmittances in a colored state of the electrochromic element according to the second embodiment and the electrochromic element according to the third embodiment.

The second embodiment and the third embodiment show the electrochromic element having the structure of FIG. 91, and materials included in a first electrochromic layer and a second electrochromic layer are different in the second embodiment and the third embodiment.

The second embodiment will be described below.

In the second embodiment, the first electrochromic layer 40230 of the electrochromic element 40200 may serve as an electrochromic layer, and the second electrochromic layer 40250 thereof may serve as an ion storage layer.

The first electrochromic layer 40230 may contain tungsten atoms, and the second electrochromic layer 40250 may contain iridium atoms.

The first electrochromic layer 40230 may contain oxidized tungsten. The first electrochromic layer may contain $WO_3$.

The second electrochromic layer 40250 may contain oxidized iridium. The second electrochromic layer 40250 may contain $IrO_2$ and $Ta_2O_5$. In the second electrochromic layer 40250, $IrO_2$ and $Ta_2O_5$ may exist in a mixed form.

In this case, the first electrochromic layer 40230 may be reduced and colored, and the second electrochromic layer 40250 may be oxidized and colored. Also, the first electrochromic layer 40230 may be oxidized and bleached, and the second electrochromic layer 40250 may be reduced and bleached.

That is, when the ions move from the first electrochromic layer 40230 to the second electrochromic layer 40250, the first electrochromic layer 40230 and the second electrochromic layer 40250 may be bleached, and, when the ions move from the second electrochromic layer 40250 to the first electrochromic layer 40230, the first electrochromic layer 40230 and the second electrochromic layer 40250 may be colored.

The electrochromic element 40200 according to the second embodiment may have spectral transmittances shown in FIG. 93 when bleached and have spectral transmittances shown in FIG. 94 when colored.

Specifically, with respect to a transmittance in a visible light region, with the wavelength in the range of 400 nm to 700 nm, the electrochromic element 40200 may have, in average, a transmittance of 57.392% when bleached and a transmittance of 9.284% when colored.

As the first electrochromic layer 40230 containing the tungsten atoms is disposed nearby the substrate 40210, variation between the transmittance when bleached and transmittance when colored increase. As a result there is an effect that the range of transmittance that the electrochromic element 40200 may control is widened.

Also, as the first electrochromic layer 40230 containing the tungsten atoms is disposed nearby the substrate 40210, deterioration may be reduced, and thus the discolored color may be maintained. Since, as compared with the tungsten atoms, the iridium atoms are more prone to deformation when heat is applied thereto, by causing the first electrochromic layer 40230 containing the tungsten atoms to be disposed nearby the substrate 40210 which is adjacent to the outside, an effect of preventing the deterioration can be achieved.

The third embodiment will be described below.

In the third embodiment, the first electrochromic layer 40230 of the electrochromic element 40200 may serve as an ion storage layer, and the second electrochromic layer 40250 thereof may serve as an electrochromic layer.

The first electrochromic layer 40230 may contain iridium atoms, and the second electrochromic layer 40250 may contain tungsten atoms.

The first electrochromic layer 40230 may contain oxidized iridium. The first electrochromic layer 40230 may contain $IrO_2$ and $TaO_5$. In the first electrochromic layer 40230, $IrO_2$ and $TaO_5$ may exist in a mixed form The second electrochromic layer 40250 may contain oxidized tungsten. The second electrochromic layer 40250 may contain W03.

In this case, the first electrochromic layer 40230 may be oxidized and colored, and the second electrochromic layer 40250 may be reduced and colored. Also, the first electrochromic layer 40230 may be reduced and bleached, and the second electrochromic layer 40250 may be oxidized and bleached.

That is, when the ions move from the first electrochromic layer 40230 to the second electrochromic layer 40250, the first electrochromic layer 40230 and the second electrochromic layer 40250 may be colored, and, when the ions move from the second electrochromic layer 40250 to the first electrochromic layer 40230, the first electrochromic layer 40230 and the second electrochromic layer 40250 may be bleached.

The electrochromic element 40200 according to the third embodiment may have spectral transmittances shown in FIG. 93 when bleached and have spectral transmittances shown in FIG. 94 when colored.

Specifically, with respect to a transmittance in a visible light region, with the wavelength in the range of 400 nm to 700 nm, the electrochromic element 40200 may have, in average, a transmittance of 55.543% when bleached and a transmittance of 10.882% when colored.

Also, in the case of the electrochromic element according to the third embodiment, variation of transmittance according to wavelength is small in a visible light region. Since the variation of transmittance according to wavelength is small in the electrochromic element according to the third embodiment, an effect of preventing color of the electrochromic element from being viewed as another color in a specific condition can be achieved.

Also, since the iridium atoms are relatively stable in a photocatalytic reaction, even when the first electrochromic layer 40230 containing the iridium atoms that is adjacent to the outside is irradiated with light, a change in electrical properties of the first electrochromic layer 40230 is small. Thus, an effect of extending a service life of a product can be achieved.

Figure 95:
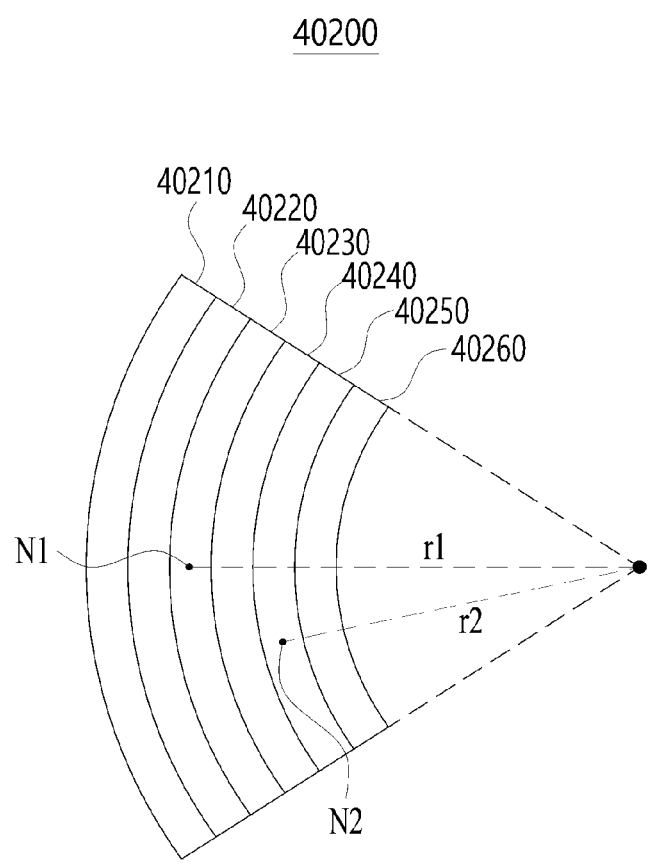
FIG. 95 is a view illustrating an electrochromic element having a curvature.

FIG. 95 is a view illustrating an electrochromic element having a curvature.

The electrochromic element according to the second embodiment and the electrochromic element according to the third embodiment may be manufactured in the form having a curvature.

The electrochromic element may be manufactured in a curved form, manufactured in a bendable form, or manufactured in a flexible form.

When the electrochromic element is manufactured in a curved form, the electrochromic element may be applied to a vehicle window or a vehicle sunroof.

Each layer of the electrochromic element 40200 may have a curvature. The layers of the electrochromic element 40200 may have different radii of curvature. Each layer of the electrochromic element 40200 may have a radius of curvature that gradually becomes larger toward the substrate 40210 and have a radius of curvature that gradually becomes smaller toward the second transparent electrode 40260. The center of the curvature of the electrochromic element 40200 may be toward the second transparent electrode 40260.

The first transparent electrode 40220 may have a radius of curvature smaller than that of the substrate 40210. The first electrochromic layer 40230 may have a radius of curvature smaller than that of the first transparent electrode 40220. The ion transport layer 40240 may have a radius of curvature smaller than that of the first electrochromic layer 40230. The second electrochromic layer 40250 may have a radius of curvature smaller than that of the ion transport layer 40240. The second transparent electrode 40260 may have a radius of curvature smaller than that of the second electrochromic layer 40250.

The first electrochromic layer 40230 may have a first radius of curvature r1. The first radius of curvature r1 may be defined as a distance between the center of the curvature of the first electrochromic layer 40230 and an middle point N1 of the first electrochromic layer 40230.

The second electrochromic layer 40250 may have a second radius of curvature r2. The second radius of curvature r2 may be defined as a distance between the center of the curvature of the second electrochromic layer 40250 and an middle point N2 of the second electrochromic layer 40250.

The first radius of curvature r1 may be larger than the second radius of curvature r2.

In the case of the second embodiment, the radius of curvature of the first electrochromic layer 40230 containing the tungsten atoms may be larger than the radius of curvature of the second electrochromic layer 40250 containing the iridium atoms. Since flexibility of iridium oxide containing iridium atoms is higher than flexibility of tungsten oxide containing tungsten atoms, there is an effect of improving structural stability of the electrochromic element 40200 according to the second embodiment.

Figure 96:
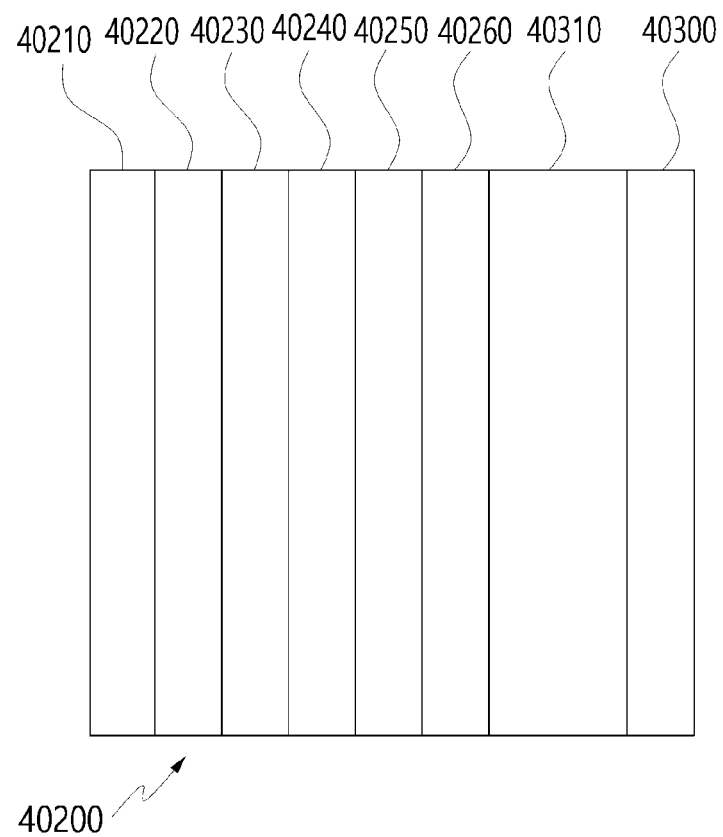
FIG. 96 is a view illustrating an electrochromic device applied to glass for buildings.

FIG. 96 is a view illustrating an electrochromic device applied to glass for buildings.

The electrochromic element according to the second embodiment and the electrochromic element according to the third embodiment may be applied to glass for buildings.

An electrochromic device 40201 may include an electrochromic element 40200, an external glass 40300, and a fluid chamber 40310.

The electrochromic element 40200 may include a substrate 40210, a first transparent electrode 40220, a first electrochromic layer 40230, an ion transport layer 40240, a second electrochromic layer 40250, and a second transparent electrode 40260.

The external glass 40300 may be glass coming into contact with outside air.

The fluid chamber 40310 may be disposed between the external glass 40300 and the electrochromic element 40200. The fluid chamber 40310 may be disposed between the second transparent electrode 40260 and the external glass 40300.

A fluid may be injected into the fluid chamber 40310. Heat exchanged between the outside and the electrochromic element 40200 may be reduced due to the fluid injected into the fluid member 40310. As a result, an insulating effect can be improved.

As compared with the first electrochromic layer 40230, the second electrochromic layer 40250 may be more adjacent to the outside. Alternatively, as compared with the first electrochromic layer 40230, the second electrochromic layer 40250 may be more adjacent to the fluid.

In the case of the second embodiment, the first electrochromic layer 40230 may contain tungsten atoms, and the second electrochromic layer 40250 may contain iridium atoms. The second electrochromic layer 40250 containing the iridium atoms may be disposed in a region more adjacent to the fluid than the first electrochromic layer 40230 containing the tungsten atoms.

In the case of the third embodiment, the first electrochromic layer 40230 may contain iridium atoms, and the second electrochromic layer 40250 may contain tungsten atoms. The second electrochromic layer 40250 containing the tungsten atoms may be disposed in a region more adjacent to the fluid than the first electrochromic layer 40230 containing the iridium atoms.

Although the configurations and features of the present application have been described above on the basis of the embodiments, the embodiments are not limited thereto. One of ordinary skill in the art should clearly understand that the present application may be changed or modified in various ways within the idea and the scope of the embodiments. Thus, it should be noted that such changes or modifications belong to the scope of the attached claims.

What is claimed is:

1. An electrochromic device comprising:
   a transparent electrode layer;
   a first electrochromic layer positioned on the transparent electrode layer;
   an ion transport layer positioned on the first electrochromic layer;
   a second electrochromic layer positioned on the ion transport layer;
   a reflective layer positioned on the second electrochromic layer; and
   a driving circuit applying a voltage to the reflective layer and the transparent electrode layer,
   wherein a distance between the first electrochromic layer and the driving circuit is longer than a distance between the second electrochromic layer and the driving circuit,
   wherein when the second electrochromic layer is colored by the movement of ions, the first electrochromic layer is colored,
   the electrochromic device further comprising a contact hole formed through the reflective layer, the first electrochromic layer, the ion transport layer, and the second electrochromic layer, and
   wherein a removal region of the second electrochromic layer by the contact hole is larger than a removal region of the first electrochromic layer by the contact hole.

2. The electrochromic device of claim 1,
   wherein the first electrochromic layer includes an atom of iridium, and
   wherein the second electrochromic layer includes an atom of tungsten.

3. The electrochromic device of claim 1, further comprising:
   a substrate positioned below the transparent electrode layer, and
   a cutting region formed by cutting the reflective layer, the first electrochromic layer, the ion transport layer, the second electrochromic layer, the transparent electrode layer and the substrate,
   wherein a cutting region of the second electrochromic layer is larger than a cutting region of the first electrochromic layer.

4. The electrochromic device of claim 1,
   wherein the first electrochromic layer includes an atom of tungsten, and
   wherein the second electrochromic layer includes an atom of iridium.

5. An electrochromic device comprising:
   a substrate having a curvature;
   a first transparent electrode positioned on the substrate;
   a first electrochromic layer positioned on the first transparent electrode;
   an ion transport layer positioned on the first electrochromic layer;
   a second electrochromic layer positioned on the ion transport layer; and
   a second transparent electrode positioned on the second electrochromic layer,
   wherein the first electrochromic layer has a first radius of curvature,
   wherein the second electrochromic has a second radius of curvature, and
   wherein the first radius of curvature and the second radius of curvature are different from each other,
   the electrochromic device further comprising a contact hole formed through the second transparent electrode, the second electrochromic layer, the ion transport layer, and the first electrochromic layer, and
   wherein a removal region of the first electrochromic layer by the contact hole is smaller than a removal region of the second electrochromic layer by the contact hole.

6. The electrochromic device of claim 5,
wherein the first radius of curvature is greater than the second radius of curvature.

7. The electrochromic device of claim 5,
wherein the first electrochromic layer includes an atom of tungsten, and
wherein the second electrochromic layer may include an atom of iridium.

8. The electrochromic device of claim 5,
wherein the first electrochromic layer includes an atom of iridium, and
wherein the second electrochromic layer may include an atom of tungsten.

9. The electrochromic device of claim 5, further comprising:
a cutting region formed by cutting the substrate, the first transparent electrode, the first electrochromic layer, the ion transport layer, the second electrochromic layer, and the second transparent electrode,
wherein a cutting region of the first electrochromic layer is smaller than a cutting region of the second electrochromic layer.

10. An electrochromic device comprising:
a substrate;
a first transparent electrode positioned on the substrate;
a first electrochromic layer positioned on the first transparent electrode;
an ion transport layer disposed on the first electrochromic layer;
a second electrochromic layer positioned on the ion transport layer;
a second transparent electrode positioned on the second electrochromic layer;
a glass substrate in contact with outdoor air; and
a fluid positioned between the glass substrate and the second transparent electrode,
wherein the second electrochromic layer is adjacent to the fluid as compared to the first electrochromic layer,
the electrochromic device further comprising a contact hole formed through the second transparent electrode, the second electrochromic layer, the ion transport layer, and the first electrochromic layer, and
wherein a removal region of the second electrochromic layer by the contact hole is larger than a removal region of the first electrochromic layer by the contact hole.

11. The electrochromic device of claim 10,
wherein the first electrochromic layer includes an atom of tungsten, and
wherein the second electrochromic layer includes an atom of iridium.

12. The electrochromic device of claim 10,
wherein the first electrochromic layer includes an atom of iridium, and
wherein the second electrochromic layer includes an atom of tungsten.

* * * * *